US012746553B2

(12) United States Patent
Sundström

(10) Patent No.: US 12,746,553 B2
(45) Date of Patent: Sep. 29, 2026

(54) METHOD AND SYSTEM FOR OPERATING A COMMINUTION PROCESS IN A BALL MILL

(71) Applicant: S.P.M. Instrument AB, Strängnäs (SE)

(72) Inventor: Tim Sundström, Åkers Styckebruk (SE)

(73) Assignee: S.P.M. Instrument AB, Strängnäs (SE)

( * ) Notice: Subject to any disclaimer, the term of this patent is extended or adjusted under 35 U.S.C. 154(b) by 96 days.

(21) Appl. No.: 18/553,981

(22) PCT Filed: Apr. 11, 2022

(86) PCT No.: PCT/SE2022/050363
§ 371 (c)(1),
(2) Date: Oct. 4, 2023

(87) PCT Pub. No.: WO2022/216219
PCT Pub. Date: Oct. 13, 2022

(65) Prior Publication Data

US 2024/0253053 A1 Aug. 1, 2024

Related U.S. Application Data

(63) Continuation-in-part of application No. PCT/SE2021/000006, filed on Apr. 9, 2021.

(30) Foreign Application Priority Data

Oct. 8, 2021 (SE) .................................. 2151243-9

(51) Int. Cl.
*B02C 17/18* (2006.01)
*G01H 1/00* (2006.01)

(52) U.S. Cl.
CPC ......... *B02C 17/1805* (2013.01); *G01H 1/003* (2013.01)

(58) Field of Classification Search
CPC ........ B02C 17/18; B02C 17/1805; G01H 1/00
See application file for complete search history.

(56) References Cited

U.S. PATENT DOCUMENTS 2,824,700 A * 2/1958 Weston .................. B02C 25/00 241/34
2,927,536 A 3/1960 Rhoades
(Continued)

FOREIGN PATENT DOCUMENTS

AU 2010202771 A1 1/2011
BR PI 0603403-9 A 4/2008
(Continued)

OTHER PUBLICATIONS

International Search Report and Written Opinion received in Application No. PCT/SE2022/050363 mailed Jun. 15, 2022 in 14 pages.
(Continued)

*Primary Examiner* — Bobby Yeonjin Kim
(74) *Attorney, Agent, or Firm* — Knobbe, Martens, Olson & Bear, LLP

(57) ABSTRACT

A method of operating a comminution process in a ball mill (10) including a rotatable shell (20) having an internal shell surface (22) comprising protrusions (310) configured to engage material (30) for grinding received solid material feed particles (115) by tumbling the material in the rotating shell (20) to generate product particles (95; 96) output (200), thereby causing a vibration. The method comprising rotating the shell (20); providing a solid material feed rate set point value for setting a solid material feed rate; analysing product particles (96); generating at least one product measurement value based on said product particle analysis being indicative of a product particle size; receiving a vibration signal indicative of said vibration; receiving a position signal indicative of a rotational position of said rotating shell; generating, based on said vibration signal and said position
(Continued)

signal, at least one status parameter value indicative of said internal state including a toe position value; receiving data indicative of a desired product particle size; generating a toe position reference value based on received data and a correlation data set indicative of a causal relationship between a certain internal state and product particle size; generating said solid material feed rate set point value based on a desired product particle size thereby influencing said internal state for controlling or affecting said product particle size.

22 Claims, 51 Drawing Sheets

(56) References Cited

U.S. PATENT DOCUMENTS 3,155,790 A 11/1964 Lemonnier
3,482,523 A 12/1969 Morando
3,554,012 A 1/1971 Sohoel
3,705,516 A 12/1972 Reis
3,802,634 A 4/1974 Mix
3,806,278 A 4/1974 Grennan
3,918,831 A 11/1975 Grennan
4,070,132 A 1/1978 Lynch
4,302,813 A 11/1981 Kurihara
4,378,194 A 3/1983 Bandukwalla
4,404,640 A 9/1983 Dumbeck et al.
4,417,849 A 11/1983 Morris
4,419,046 A 12/1983 Carlini
4,528,852 A 7/1985 Sohoel
4,744,242 A 5/1988 Anderson et al.
4,828,454 A 5/1989 Morris et al.
4,831,365 A 5/1989 Thomas et al.
4,894,644 A 1/1990 Thomas
4,912,661 A 3/1990 Potter
4,988,979 A 1/1991 Sasaki et al.
4,991,442 A 2/1991 Matsumoto
5,109,700 A 5/1992 Hicho
5,192,929 A 3/1993 Walker et al.
5,201,292 A 4/1993 Grajski et al.
5,258,923 A 11/1993 Imam et al.
5,365,787 A 11/1994 Hernandez et al.
5,386,945 A * 2/1995 Nose ........................ B02C 25/00
241/34
5,390,545 A 2/1995 Doan
5,445,028 A 8/1995 Bianchi et al.
5,548,540 A 8/1996 Staver et al.
5,633,811 A 5/1997 Canada et al.
5,752,665 A 5/1998 Wason
5,825,657 A 10/1998 Hernandez
5,852,793 A 12/1998 Board et al.
5,870,699 A 2/1999 Canada et al.
5,895,857 A 4/1999 Robinson et al.
5,911,362 A 6/1999 Wood et al.
6,041,339 A 3/2000 Yu et al.
6,053,047 A 4/2000 Dister et al.
6,155,790 A 12/2000 Pyoetsiae et al.
6,260,004 B1 7/2001 Hays et al.
6,330,525 B1 12/2001 Hays et al.
6,332,116 B1 12/2001 Qian et al.
6,351,713 B1 2/2002 Board et al.
6,351,714 B1 2/2002 Birchmeier
6,496,782 B1 12/2002 Claus et al.
6,560,566 B1 5/2003 Lysen
6,591,682 B1 7/2003 Lysen
6,618,128 B2 9/2003 Van Voorhis et al.
6,792,360 B2 9/2004 Smulders et al.
6,801,864 B2 10/2004 Miller
6,874,364 B1 * 4/2005 Campbell ............ G01N 29/046
73/659
6,874,366 B2 4/2005 Magne Ortega et al.
7,010,445 B2 3/2006 Battenberg et al.
7,027,953 B2 4/2006 Klein
7,133,801 B2 11/2006 Song
7,136,794 B1 11/2006 Bechhoefer
7,352,076 B1 4/2008 Gabrys
7,489,254 B2 2/2009 Rodriguez et al.
7,505,852 B2 3/2009 Board
7,640,139 B2 12/2009 Sahara et al.
7,699,249 B2 4/2010 Jarvinen
7,770,458 B2 8/2010 Blanchard et al.
7,949,496 B2 5/2011 Lindberg et al.
8,020,792 B2 9/2011 Theberge et al.
8,762,104 B2 6/2014 Hedin
8,810,396 B2 8/2014 Hedin
8,812,265 B2 8/2014 Hedin
9,091,259 B2 7/2015 Tamminen et al.
9,200,980 B2 12/2015 Hedin
9,213,671 B2 12/2015 Hedin
9,279,715 B2 3/2016 Hedin
9,341,512 B2 5/2016 Shrivastav
9,416,787 B2 8/2016 Tamminen et al.
9,441,776 B2 9/2016 Byrne et al.
9,772,219 B2 9/2017 Hedin
9,863,845 B2 1/2018 Mesiäet al.
9,885,634 B2 2/2018 Hedin
9,964,430 B2 5/2018 Hedin
9,964,634 B2 5/2018 Nikolov et al.
10,133,257 B2 11/2018 Hedin
10,260,935 B2 4/2019 Hedin
10,330,523 B2 6/2019 Hedin
10,337,957 B2 7/2019 Hedin
10,670,176 B2 6/2020 Byrne et al.
10,788,808 B2 9/2020 Hedin
10,809,152 B2 10/2020 Hedin
10,852,179 B2 12/2020 Hedin
11,015,972 B2 5/2021 Hedin
11,054,301 B2 7/2021 Hedin
11,255,747 B2 2/2022 Hedin
11,561,127 B2 1/2023 Hedin
11,599,085 B2 3/2023 Hedin
11,614,357 B2 3/2023 Hedin
12,105,498 B2 10/2024 Hedin
2002/0017139 A1 2/2002 Werner et al.
2003/0040885 A1 2/2003 Schoess et al.
2003/0047008 A1 3/2003 Gopalakrishnan et al.
2003/0062025 A1 4/2003 Samoto et al.
2003/0129062 A1 7/2003 Sabini et al.
2003/0130811 A1 7/2003 Boerhout
2003/0133808 A1 7/2003 Sabini et al.
2003/0137648 A1 7/2003 Van Voorhis et al.
2003/0182071 A1 9/2003 Ditommaso et al.
2004/0025590 A1 2/2004 Schaad et al.
2004/0083009 A1 4/2004 Curless et al.
2004/0101048 A1 5/2004 Paris
2004/0107078 A1 6/2004 Chiu et al.
2004/0186680 A1 9/2004 Jin et al.
2004/0199348 A1 10/2004 Hitchcock et al.
2004/0246284 A1 12/2004 Mura et al.
2004/0255679 A1 * 12/2004 Valderrama Reyes ......................
G01H 1/003
73/649
2004/0255680 A1 12/2004 Ortega et al.
2005/0011266 A1 1/2005 Robinson et al.
2005/0033501 A1 2/2005 Liu et al.
2005/0209811 A1 9/2005 Lindberg et al.
2005/0246150 A1 11/2005 Shiromaru et al.
2005/0252205 A1 11/2005 Stavale et al.
2006/0120854 A1 6/2006 Wakeman et al.
2006/0138258 A1 6/2006 Jarvinen
2006/0150738 A1 7/2006 Leigh
2007/0033785 A1 2/2007 Kohring
2007/0112443 A1 5/2007 Latham et al.
2007/0145168 A1 6/2007 Theberge et al.
2007/0212210 A1 9/2007 Kernan et al.
2007/0241920 A1 10/2007 Rodriguez et al.
2007/0282545 A1 12/2007 Board
2008/0033695 A1 2/2008 Sahara et al.
2008/0161959 A1 7/2008 Jerard et al.
2008/0223135 A1 9/2008 Blanchard et al.
2009/0035018 A1 2/2009 Koga et al.
2009/0164142 A1 6/2009 Studer et al.

(56) References Cited

U.S. PATENT DOCUMENTS

| | | | | |
|---|---|---|---|---|
| 2009/0193900 | A1 | 8/2009 | Janssens et al. | |
| 2009/0256874 | A1 | 10/2009 | Samoto et al. | |
| 2009/0259348 | A1 | 10/2009 | Syu | |
| 2010/0147627 | A1 | 6/2010 | Lakomiak et al. | |
| 2010/0288051 | A9 | 11/2010 | Janssens et al. | |
| 2010/0292937 | A1 | 11/2010 | Hosny et al. | |
| 2011/0285532 | A1 | 11/2011 | Hedin | |
| 2011/0295556 | A1 | 12/2011 | Hedin | |
| 2011/0295557 | A1 | 12/2011 | Hedin | |
| 2011/0297768 | A1 | 12/2011 | Theberge et al. | |
| 2012/0296582 | A1 | 11/2012 | Hedin | |
| 2012/0326443 | A1 | 12/2012 | Vince et al. | |
| 2012/0330580 | A1 | 12/2012 | Fruh et al. | |
| 2013/0064682 | A1 | 3/2013 | Sun et al. | |
| 2013/0108473 | A1 | 5/2013 | Tamminen et al. | |
| 2014/0365176 | A1 | 12/2014 | Hedin | |
| 2014/0372079 | A1 | 12/2014 | Hedin | |
| 2015/0032389 | A1 | 1/2015 | Hedin | |
| 2015/0086382 | A1 | 3/2015 | Tamminen et al. | |
| 2015/0375235 | A1 | 12/2015 | Roitto et al. | |
| 2017/0036213 | A1 | 2/2017 | Pirttiniemi et al. | |
| 2017/0219420 | A1 | 8/2017 | Takahashi | |
| 2017/0225172 | A1 | 8/2017 | Nower et al. | |
| 2017/0356301 | A1 | 12/2017 | Florindo | |
| 2017/0356450 | A1 | 12/2017 | Cheng et al. | |
| 2018/0100480 | A1 | 4/2018 | Duquette et al. | |
| 2018/0126384 | A1 | 5/2018 | Robles et al. | |
| 2018/0369829 | A1 | 12/2018 | Kaartinen et al. | |
| 2019/0162748 | A1 | 5/2019 | Haylock et al. | |
| 2019/0203736 | A1 | 7/2019 | Hambe et al. | |
| 2019/0346343 | A1 | 11/2019 | Bowers et al. | |
| 2019/0383702 | A1* | 12/2019 | Hedin | G06F 7/06 |
| 2020/0276593 | A1* | 9/2020 | Mueller | B02C 25/00 |
| 2021/0088368 | A1 | 3/2021 | Sheth | |
| 2021/0199523 | A1 | 7/2021 | Sheth et al. | |
| 2021/0223094 | A1 | 7/2021 | Hedin | |
| 2022/0042513 | A1 | 2/2022 | Sarkar et al. | |
| 2022/0341815 | A1 | 10/2022 | Hedin | |
| 2023/0297066 | A1 | 9/2023 | Hedin | |
| 2023/0302460 | A1 | 9/2023 | Sundström | |
| 2023/0304849 | A1 | 9/2023 | Hedin | |
| 2023/0324216 | A1 | 10/2023 | Hedin | |
| 2023/0338962 | A1 | 10/2023 | Sundström | |
| 2024/0189829 | A1 | 6/2024 | Sundström | |
| 2024/0318667 | A1 | 9/2024 | Sundström | |

FOREIGN PATENT DOCUMENTS

| | | | | |
|---|---|---|---|---|
| CA | 507503 | A | 11/1954 | |
| CA | 2456566 | A1 | 7/2004 | |
| CA | 2456608 | A1 | 7/2004 | |
| CN | 1738680 | A | 2/2006 | |
| CN | 1926413 | A | 3/2007 | |
| CN | 101173868 | A | 5/2008 | |
| CN | 101266197 | B | 9/2008 | |
| CN | 109635847 | A | 4/2019 | |
| CN | 208873487 | A | 5/2019 | |
| CN | 107159435 | B | 7/2019 | |
| CN | 110285045 | U | 9/2019 | |
| CN | 110374869 | A | 10/2019 | |
| CN | 209943103 | U | 1/2020 | |
| CN | 114555292 | A | 5/2020 | |
| CN | 111618659 | A | 9/2020 | |
| CN | 109331984 | B | 10/2020 | |
| CN | 112621382 | A | 4/2021 | |
| CN | 212898882 | U | 4/2021 | |
| CN | 112834142 | A | 5/2021 | |
| CN | 114689298 | A | 7/2022 | |
| DE | 3424692 | A1 | 2/1986 | |
| DE | 4218799 | A1 | 12/1993 | |
| DE | 10135674 | A1 | 2/2003 | |
| EP | 0107178 | A2 | 5/1984 | |
| EP | 1226414 | A2 | 7/2002 | |
| EP | 1477783 | A2 | 11/2004 | |
| EP | 1513254 | A1 | 3/2005 | |
| EP | 2296724 | A1 | 3/2011 | |
| EP | 2810027 | A1 | 12/2014 | |
| EP | 3 1 44 070 | A1 | 3/2017 | |
| EP | 4060436 | A1 | 9/2022 | |
| FI | 20030078 | A | 1/2003 | |
| FI | 20146166 | A | 7/2016 | |
| FR | 1093003 | | 4/1955 | |
| GB | 2190198 | A | 11/1987 | |
| GB | 2451310 | A | 1/2009 | |
| GB | 2559541 | A | 8/2018 | |
| GB | 2599702 | A | 4/2022 | |
| JP | S60195426 | A | 10/1985 | |
| JP | H01127934 | A | 5/1989 | |
| JP | H01178814 | A | 7/1989 | |
| JP | H04279826 | A | 10/1992 | |
| JP | 11179636 | A | 7/1999 | |
| JP | 2000-141275 | A | 5/2000 | |
| JP | 2003-141275 | | 5/2000 | |
| JP | 2020-015106 | A | 1/2020 | |
| KR | 101638623 | B1 | 7/2016 | |
| KR | 20200056635 | A | 5/2020 | |
| RU | 94006918 | A | 4/1996 | |
| SU | 1389847 | A1 | 4/1988 | |
| WO | WO 1995/13655 | A1 | 5/1995 | |
| WO | WO 1995/27183 | A1 | 10/1995 | |
| WO | WO 1996/05486 | A1 | 2/1996 | |
| WO | WO 1998/01831 | A1 | 1/1998 | |
| WO | WO 2000/04361 | A1 | 1/2000 | |
| WO | WO-0103840 | A1 * | 1/2001 | G01N 29/0609 |
| WO | WO 200103840 | A1 | 1/2001 | |
| WO | WO 2001/31309 | A2 | 5/2001 | |
| WO | WO 2002/073150 | A2 | 9/2002 | |
| WO | WO 2002/090267 | A1 | 11/2002 | |
| WO | WO 2003/062766 | A1 | 7/2003 | |
| WO | WO-2004065014 | A1 * | 8/2004 | B02C 25/00 |
| WO | WO 2007/124528 | A1 | 11/2007 | |
| WO | WO 2007/137132 | A2 | 11/2007 | |
| WO | WO 2010/020287 | A1 | 2/2010 | |
| WO | WO 2010/074643 | A1 | 7/2010 | |
| WO | WO 2010/074645 | A1 | 7/2010 | |
| WO | WO 2010/074646 | A1 | 7/2010 | |
| WO | WO 2010/074648 | A1 | 7/2010 | |
| WO | WO 2010/128928 | A1 | 11/2010 | |
| WO | WO 2011/087440 | A1 | 7/2011 | |
| WO | WO 2011/160069 | A1 | 12/2011 | |
| WO | WO 2013/112713 | A1 | 8/2013 | |
| WO | WO 2015/077735 | | 5/2015 | |
| WO | WO-2016022663 | A2 * | 2/2016 | B02C 25/00 |
| WO | WO-2016107988 | A1 * | 7/2016 | B02C 25/00 |
| WO | WO 2016/176788 | A1 | 11/2016 | |
| WO | WO 2017/093608 | A1 | 6/2017 | |
| WO | WO 2017/093609 | A1 | 6/2017 | |
| WO | WO 2019/070544 | A1 | 4/2019 | |
| WO | WO 2019/204882 | A1 | 10/2019 | |
| WO | WO 2019/232511 | A1 | 12/2019 | |
| WO | WO 2021/055879 | A1 | 3/2021 | |
| WO | WO 2021/206600 | A1 | 10/2021 | |
| WO | WO 2022/000072 | A1 | 1/2022 | |
| WO | WO 2022/109126 | A1 | 5/2022 | |
| WO | WO 2022/216218 | A1 | 10/2022 | |
| WO | WO 2022/216219 | A1 | 10/2022 | |
| WO | WO 2024/080915 | A1 | 4/2024 | |

OTHER PUBLICATIONS

"Affinity Laws," Intro to Pumps, 2023, pp. 1-5.

Alatalo, "Charge Dynamics in Tumbling Mills Simulation and Measurement with an In-Mill Sensor," Licentiate Thesis, 2011, 66 pgs.

"Attrition (erosion)," Wikipedia, 2020, pp. 1-3.

"Axis," Wiktionary, 2021, pp. 1-5.

"A smart mill liner package that provides maximum productivity to your operation," FLSmidth, 2021, p. 2.

"Axis of rotation," Wiktionary, 2021, 1 pg.

"Brittleness," Wikipedia, 2020, pp. 1-4.

"Centrifugal force," Wikipedia, 2020, pp. 1-9.

"Centripetal force," Wikipedia, 2020, pp. 1-10.

"ChipperEKG," Andritz, Pulp & Paper, 2013, pp. 1-8.

(56) References Cited

OTHER PUBLICATIONS

"Compressive strength," Wikipedia, 2020, pp. 1-5.
"Control Theory," Wikipedia, 2021, pp. 1-18.
"Crusher," Wikipedia, 2022, pp. 1-11.
Donker, S., "On-Line Sensors for Measuring the Total Ball and Charge Level in Tumbling Mills," University of Cape Town, Centre for Minerals Research, Apr. 2014.
Dynamic Image Analysis, https://www.sympatec.com/en/particle-measurement/sensors/dynamic-image-analysis/, printed Jul. 1, 2025.
Gugel, "Optimal Sag mill Control Using Vibration & Digital Signal Processing Techniques," SAG Conference, 2015, pp. 1-8.
"Granite," Wikipedia, pp. 1-7.
"Hematite," Wikipedia, 2020, pp. 1-6.
Holmes et al., "An On-line Surface Vibration Monitoring System for AG/SAG Mills," Conference Paper, 2006.
Samotics, powerpoint 2023, pp. 1.
"Instance-based learning," Wikipedia, 2021, pp. 1-2.
"Iron oxide," Wikipedia, 2020, pp. 1-7.
"Kalman filter," Wikipedia, 2021, pp. 1-39.
Karesvuori, et al., "Integrated Approach to Monitoring and Control of Mineral Grinding rocesses," IFAC, 2006, pp. 1-6.
Kongas et al., "New Particle Size Analysis System for Mineral Slurries," IFAC New Technologies for Automation of Metallurgical Industry, 2003, pp. 309-314.
Laser Scattering Particle Size Distribution Analyzer, https://www.horiba.com/usa/products/detail/action/show/Product/partica-la-960v2-1944/, printed Jul. 1, 2025.
"Least mean squares filter," Wikipedia, 2022, pp. 1-7.
"Liquid-ring pump," Wikiepdia, 2023, pp. 1-3.
"LoadIQ Mill Scanning Technology," FLSmidth, 2021, pp. 1-8.
"LoadIQ Smart sensor Technology," FLSmidth, 2022, pp. 1-6.
Löfdahl, "Estimeringsmetoder för vibrationsbaserade kvarnfyllnadsmätningar," 2008:228 CIV, 46 pgs.
"Magnetite," Wikipedia, 2020, pp. 1-10.
Mastersizer for Particle Size Measurement, https://www.mining-technology.com/products/mastersizer/, printed Jul. 1, 2025.
McClure, "Overload Detection in Semi-Autogenous Grinding: A Nonlinear Process Monitoring Approach," 9th International Symposium on Advanced Control of Chemical Processes, IFAC, 2015, 6 pgs.
"Mill (grinding)," Wikipedia, 2019, pp. 1-6.
"Mill Vibration Analysis," MillSlicer, 2019, pp. 1-5.
"Natural frequency," Wikipedia, 2023, pp. 1-2.
Orhan et al., "Tool wear evaluation by vibration analysis during end milling of AISI D3 cold work tool steel with 35 HRC hardness," NDT&E International 40, 2007, pp. 121-126.
Outotec, "Outotec MillSense mill charge sensor system," https://www.outotec.com/products/analyzers-and-automation/millsense-mill-charge-s , printed on Oct. 29, 2019, 4 pgs.
Particle size analyzers, https://www.malvernpanalytical.com/en/products/category/particle-size-analyzers, printed Jul. 1, 2025.
"Perth-based company Process IQ, ideal partner for United States revolutionary mining technology," 2017, 2 pgs.
"Piston pump," 2023, Wikipedia, pp. 1-2.
"Polar coordinate system," Wikipedia, 2020, pp. 1-9.
"Pump," Wikipedia, 2023, pp. 1-19.
"Pump cavitation and how to avoid it," Xylem, Jun. 2017, pp. 1-12.
"Principle of SAG Mill Operation," image.
"PSI 300i particle size analyzer," Metso:Outotec, 2021, pp. 1-6.
PSI® 500i particle size analyzer, https://www.metso.com/portfolio/psi-500i-particle-size-analyzer/, printed Jul. 1, 2025.
"Reciprocating pump," Wikipedia, 2023, pp. 1-3.
"Regression analysis," Wikipedia, 2023, pp. 1-12.
"Rheology," Wikipedia, 2022, pp. 1-10.
"Rotary vane pump," Wikipedia, 2023, pp. 1-3.
Spencer et al., "Prediction of AG/SAG Mill Variables from Surface Vibrations," Research Gate, 2006, pp. 1-7.
Tahir et al., "The Correlation Between Tool Wear and Vibration Signals from Piezoelectric in End Milling of AISI P20+NI," Journal of Mechanical Engineering, vol. SI3(2), 2017, pp. 49-62.
"Tenacity (mineralogy)," Wikipedia, 2020, 1 pg.
"TriSlicer Mill Vibration Analysis," Process IQ, 2022, pp. 1-6.
"Vacuum Pump," 2023, Wikipedia, pp. 1-12.
Yin et al., "Impact Load Behavior between Different Charge and Lifter in a Laboratory-Scale Mill," MDPI, 2017.
International Preliminary Report on Patentability in PCTSE2023051006 dated Apr. 15, 2025.
European Search Report received in EP application No. 22785076.5 dated Apr. 29, 2025.
Swedish Search Report received in SE Application No. 2351161-1 date Apr. 29, 2024.
Swedish Search Report received in SE Application No. 2351160-3 date May 2, 2024.
International Search Report and Written Opinion received in International Application No. PCT/SE2024/000003 dated Jun. 10, 2024.
Extended European search report, dated Sep. 2, 2015; Application No. 13744257.0, in 4 pages.
International Search Report, dated May 15, 2013, from PCT/SE2013/050079, in 5 pages.
Extended European search report, dated Sep. 16, 2015; Application No. 12810816.4, in 6 pages.
Autocorrelation—Wikipedia, the free encyclopedia, Dec. 12, 2008, p. 2-6, http://en.wikipedia.org/wik+B160+B151:D154+B160+B+B151:D159.
Autocorrelation from Wikipedia, 2009, http:// en.wikipedia.org/wiki/autocorrelation, pp. 1-6.
"Affinitetslagarna," Wikipedia SE, 2021, 1 pg.
Aka et al., "Numerical investigation of volute tongue design on hemodynamic characteristics and hemolysis of the centrifugal blood pump," SN Applied Sciences, 2021, 3:49, pp. 1-9.
"Back pressure," Wikipedia, 2023, pp. 1-2.
Bernoulli, "Bernoulli's principle," Wikipedia, 2021, pp. 1-12.
"Bernoullis ekvation," Wikipedia SE, 2021, pp. 1-3.
Bowles, "Effects and Control of Pulsation in Gas Measurement," 2021, pp. 1-11.
Campbell et al., "Sag Mill Monitoring Using Surface Vibrations," Proceedings Internatioanl Autogenous and Semiautogenous Grinding Tecnology, 2001.
"Centrifugal force," Wikipedia, 2023, pp. 1-13.
"Centrifugal pump," Wikipedia, 2021, pp. 1-8.
Chang, et al., "A Novel Envelop Detector for High-Frame Rate, High-Frequency Ultrasound Imaging", IEEE Transactions on Ultrasonics, Ferroelectrics, and Frequency Control, 2007, vol. 54, No. 9, pp. 1792-1801.
Cheah et al., "Numerical Flow Simulation in a Centrifugal Pump at Design and Off-Design Conditions," International Journal of Rotating Machinery, vol. 2007, Article ID: 83641, 2007, pp. 1-9.
Cui et al., "Analysis of Radial Force and Vibration Energy in a Centrifugal Pump," Mathematical Problems in Engineering, vol. 2020, Article ID 6080942, 2020, pp. 1-12.
Corbo et al., "Practical Design Against Pump Pulsations," Proceedings of the Twenty-Second International Pump Users Symposium, 2005, pp. 138-177.
Das et al., "Interpretation of mill vibration signal via wireless sensing" in Minerals Engineering, vol. 24, No. 3, dated Sep. 15, 2019, pp. 245-251.
"Den teoretiska pumpkurvan," 2021, pump hand boken, pp. 1-3.
Doguer et al., "New Time Domain Method for the Detection of Roller Bearing Defects" Proceedings of International Conference on Condition Monitoring & Machinery Failure Prevention Technologies CM 2008, Edinburgh, Jul. 2008.
Dominick, Joe, "PeakVue as a Part of a Reliability Based Maintenance Program", Emerson Process Management—CSI, DoctorKnow® Application Paper, 2010 pp. 1-15.
"Draft tube," Wikipedia, 2020, pp. 1-3.
Elliot, et al., "13.2 Correlation and Autocorrelation Using the FFT", Fast Transforms: Algorithms, Analyses, Applications (New York: Academic Press), 1982, pp. 545-547.
Elsey, "The Silent Pump Killer: Radial Thrust," Pump & Systems, 2021, pp. 1-8.
"Eulers ekvation," Pumphandboken 3.2.3, pp. 1-3.
Evans, "Calculating Radial Thrust," Pump & Systems, 2011, pp. 1-5.

(56) References Cited

OTHER PUBLICATIONS

"Fictitious force," Wikipedia, 2023, pp. 1-11.
Fluid Engineering Inc. "Minimizing Pressure Pulsations by Pump," Infomedia, 2010, pp. 1-11.
"Francis turbine," Wikipedia, 2021, pp. 1-6.
"Frequency," Wikipedia, 2023, pp. 1-8.
"Forluster och verkningsgrad i centrifugalpumpar," Masosine Process Pumps, 2021, pp. 1-3.
Gülich, "Centrifugal Pumps," Springer, 2008.
Henshaw, "The Function of the Volute," Pump & Systems, 2012, pp. 1-4.
"Impeller," Wikipedia, 2021, pp. 1-5.
"Introduktion till kapitlet om pumpar," Chesterton Connect, pp. 1-3.
Kernan, "Pumps 101: Operation, Maintenance and Monitoring Basics," ITT, 2010, pp. 1-10.
"KSB Radial Thrust," KSB, 2023, pp. 1-7.
"KSB Specific Speed," KSB, 2023, pp. 1-7.
Lundy, James, "Detecting Lubrication Problems Using Shock Pulse", Lubrication & Fluid Power, Feb. 2006.
Mais, Jason, Spectrum Analysis—The key features of analyzing spectra, https://www.skf.com/binaries/pub12/Images/0901d1968024acef-CM5118-EM-Spectrum-Analysis_tcm 12-113997.pdf, viewed online on Apr. 20, 2022, published on May 2002 (Year: 2002).
Milman, Andrew, "Mathematical Principles of Remote Sensing: Making Inferences from Noisy Data", Sleeping Bear Press, Michigan, 1999. pp. 215-233.
"Mill race," Wikipedia, 2021, pp. 1-3.
"Newton's laws of motion," Wikipedia, 2021, p. 1-8.
"Pelton wheel," Wikipedia, 2021, pp. 1-6.
"Phase (waves)," Wikipedia, 2023, pp. 1-7.
"Pump," Wikipedia, 2021, pp. 1-6.
"Reactive centrifugal force," Wikipedia, 2023, pp. 1-4.
Renwick, John, Condition Monitoring of Machinery Using Computerized Vibration Signature Analysis, IEEE Transactions on Industry Applications, vol. IA-20, No. 3, May/Jun. 1984, pp. 519-527 (Year: 1984).
Robinson, et al., "How Advanced Analysis Identifies Lubrication Problems", Machinery Health, Pumps & Systems, 2007, pp. 66-67.
Robinson, James C., "Autocorrelation as a Diagnostic Tool", 2007, pp. 1-22.
"Rotordynamisak pumpars grunder," Chesterton Connect, 2021, pp. 1-3.
Rouse, What is Nyquist Theorem, Whatis.com, Sep. 2005.
"Specific speed," Wikipedia, 2021, pp. 1-5.
Stebler, "Fluid Mekanik,", Fysika Institutionen CTH 1985, pp. 1-39.
"Turbine," Wikipedia, 2021, pp. 1-7.
"Uppfordringshöjd," Masosine Process Pumps, 2021, pp. 1-3.
Venturi, "Venturi Effect," Wikipedia, pp. 1-7.
Vogel, "The Importance of Best Efficiency Point (BEP)," Efficient Plant, 2013, pp. 1-111.
"Volute (pump)," Wikipedia, 2021, pp. 1-2.
"Water turbine," Wikipedia, 2021, pp. 1-12.
Wnek, "Pressure Pulsations Generated by Centrifugal Pumps," Warren Pumps, 1987, pp. 1-7.
European Search Report for International App. No. 19154113.5, dated Jun. 6, 2019, in 7 pages.
European Search Report for European App. No. 21210020.0, dated Jun. 7, 2022, in 10 pages.
European Search Report for European App. No. 21822089.5, dated Mar. 12, 2024, in 10 pages.
Supplemental Partial European Search Report for EP Application No. 13837138, mailed May 4, 2016, in 4 pages.
International Search Report, dated Jun. 7, 2011, from corresponding PCT Application No. PCT/SE2011/050035.
International Search Report for International App. No. PCT/SE2013/051062, dated Feb. 21, 2014, in 6 pages.
Banks, Jeffrey et al, "Lubrication Level Diagnosis using vibration analysis", 2004 IEEE Aerospace Conference proceedings, vol. 6, Mar. 6, 2004, pp. 3528-2534.
International seach report dated Sep. 11, 2012 from corresponding PCT Application No. PCT/SE2012/050827.
Extended European Search Report for International App No. 19162332.1 dated Jul. 18, 2019 in 10 pages.
European Search Report for Application No. EP10772330 dated Oct. 20, 2017.
International search report dated Jul. 7, 2010 from corresponding PCT Application PCT/SE2010/050257.
European Search Report for Application No. 17292870.6 dated Mar. 14, 2018.
European Search Report in European Application No. 22199346.2 dated Jan. 16, 2023 in 8 pages.
International Search Report and Written Opinion in PCT/SE2021/000006 dated Jul. 1, 2021 in 11 pages.
International Preliminary Report on Patentability for International PCT Application No. PCT/SE2022/050914 dated Jan. 12, 2024 in 14 pages.
International Search Report and Written Opinion for International PCT Application No. PCT/SE2022/050914 dated Dec. 7, 2022 in 14 pages.
International Preliminary Report on Patentability for International PCT Application No. PCT/SE2022/050915 dated Jan. 12, 2024 in 15 pages.
International Search Report and Written Opinion for International PCT Application No. PCT/SE2022/050915 dated Dec. 7, 2022 in 14 pages.
International Search Report and Written Opinion received in International Application No. PCT/SE2023/050332, mailed May 24, 2023, in 19 pages.
International Search Report and Written Opinion received in International Application No. PCT/SE2023/050333, mailed May 24, 2023, in 20 pages.
Maleki-Moghaddam et al, A method to predict shape and trajectory of charge in industrial mills, in: minerals engineering, vol. 46, pp. 157-168, May 9, 2013; section 3.1.1, toe position.
Chinese Search Report received in Corresponding Chinese Application No. 2021800407603 dated Jun. 3, 2024.
Extended European Search Report received in corresponding EP Application No. 21783733.5 dated Jul. 19, 2024.
Swedish Search Report received in Sweden Application No. 2450329-4 mailed Oct. 18, 2024.
International Search Report and Written Opinion in PCTSE2023051006 dated Dec. 20, 2023.
International Search Report & Written Opinion received in International Application No. PCT/SE2023/000010 dated Jan. 15, 2024.
European Search Report received in EP application No. 22785077.3 dated Apr. 17, 2025.
Bureau of Indian Standards, "Conditional Monitorig and Diagnostics of Machines—Vibration Condition Monitoring," General Procedures, Part 1, 2002, pp. 1-57.
Roe, et al. "The environment, 1-18 international standards, asset health management and condition monitoring: An integrated strategy," Reliability Engineering and System Safety, 2009, vol. 94, No. 2, pp. 474-478.
Spencer et al., "Acoustic Emissions Monitoring of Sag Mill Perofrmance," IEEE, 1999.
International Search Report in PCT/SE2021/00004 dated Jul. 15, 2021 in 5 pages.
Extended European Search Report in EP Application No. 22879025.9 dated Jul. 23, 2025.
Extended European Search Report in EP Application No. 22879026.7 dated Aug. 11, 2025.
Search Report in CN 2022800269576 dated Nov. 29, 2025.

* cited by examiner

Memory 460
| #01 | #02 | #03 |
|---|---|---|
| Time slot | | |
| dt | P(i) | S(i) |
| i | Position | Se(i) |
| 1 | 0 | Se1 |
| 2 | 0 | Se2 |
| 3 | 1 | Se3 |
| 4 | 0 | Se4 |
| 5 | 0 | Se5 |
| 6 | 0 | Se6 |
| 7 | 0 | Se7 |
| 8 | 0 | Se8 |
| 9 | 0 | Se9 |
| 10 | 0 | Se10 |
| 11 | 0 | Se11 |
| 12 | 0 | Se12 |
| 13 | 0 | Se13 |
| 14 | 0 | Se14 |
| 15 | 0 | Se15 |
| 16 | 0 | Se16 |
| 17 | 0 | Se17 |
| 18 | 0 | Se18 |
| 19 | 0 | Se19 |
| 20 | 0 | Se20 |
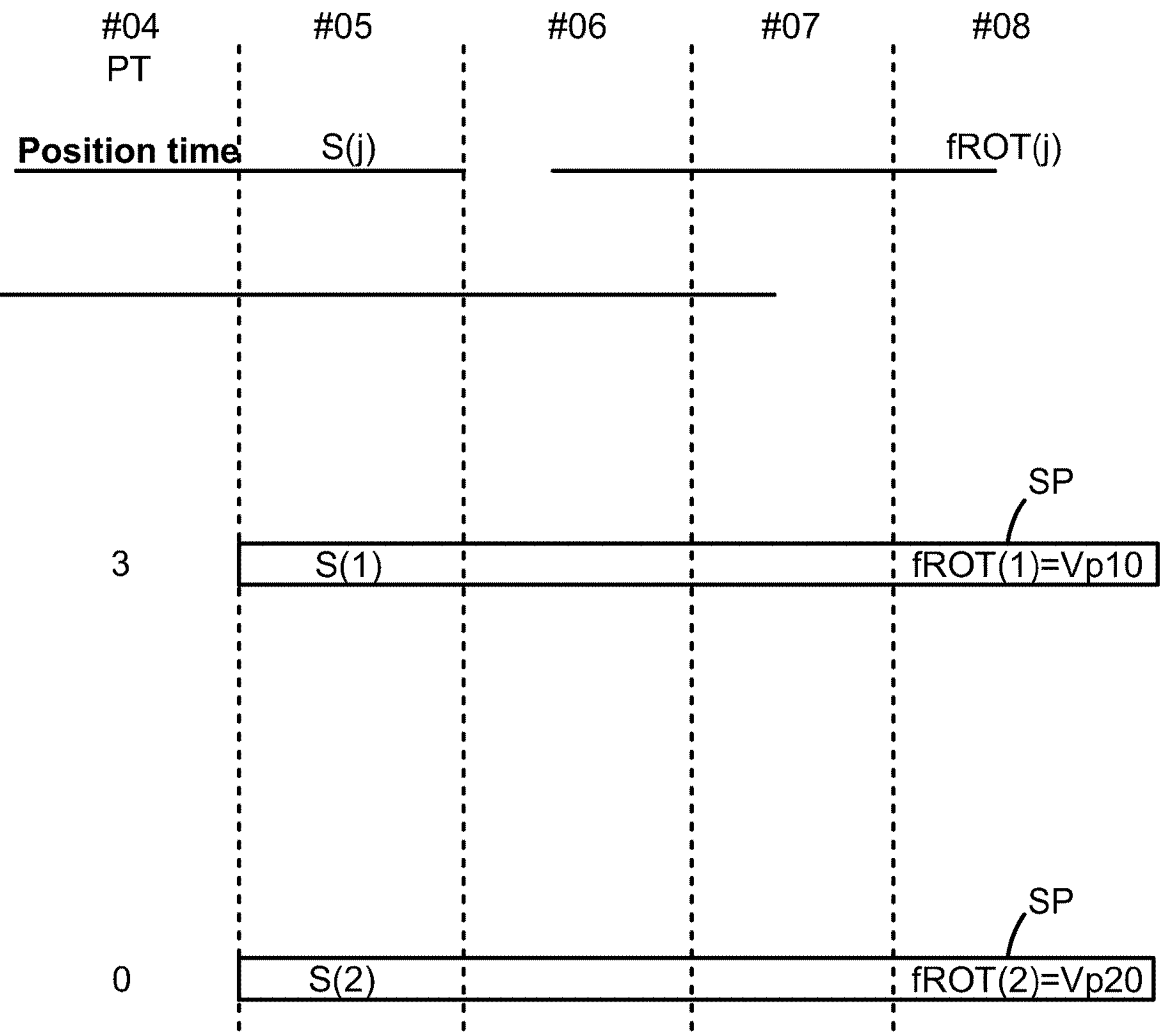
FIG. 8 Part 1

Figure 8:
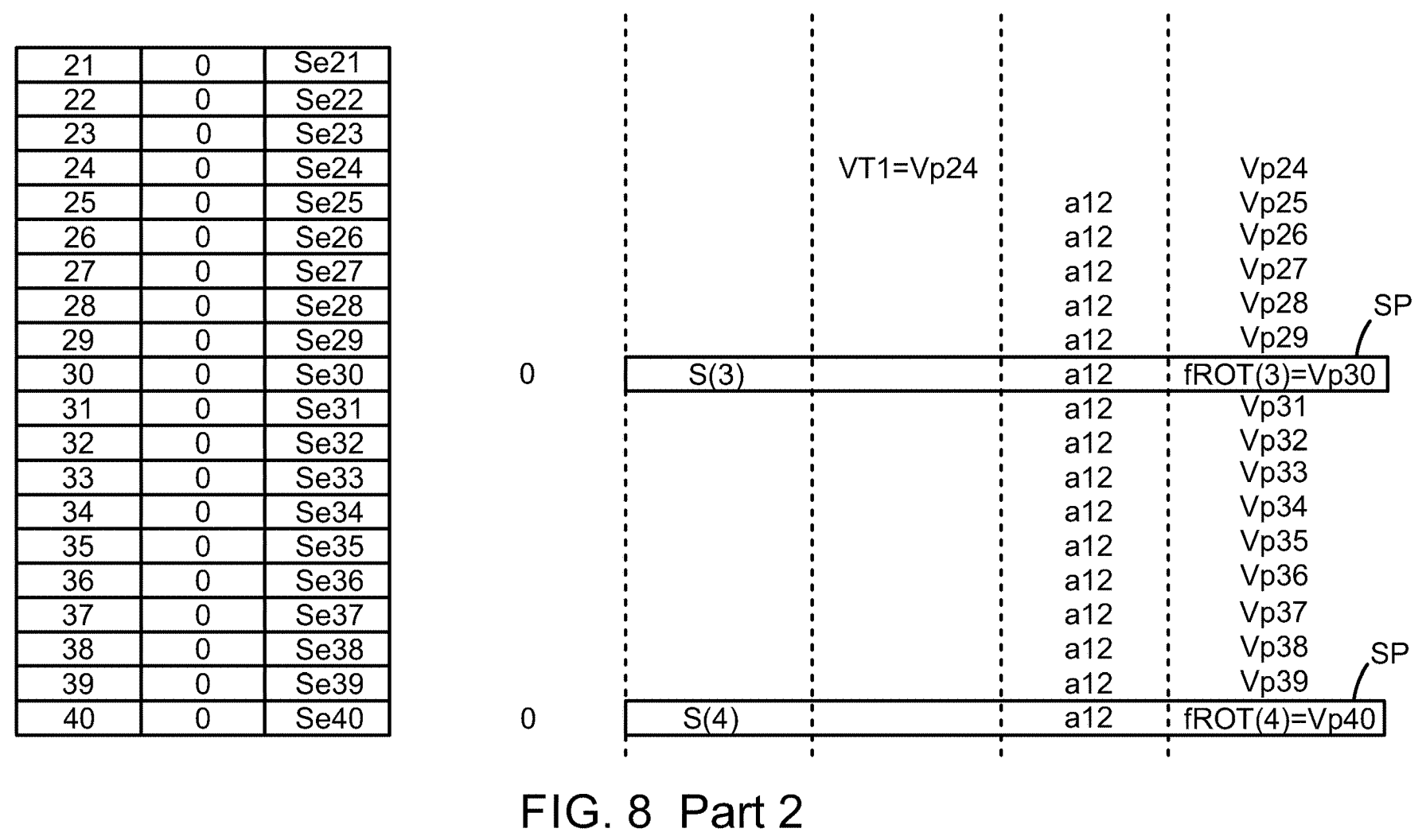

| | | | | | | | | |
|---|---|---|---|---|---|---|---|---|
| 21 | 0 | Se21 | | | | | | |
| 22 | 0 | Se22 | | | | | | |
| 23 | 0 | Se23 | | | | | | |
| 24 | 0 | Se24 | | | VT1=Vp24 | | Vp24 | |
| 25 | 0 | Se25 | | | | a12 | Vp25 | |
| 26 | 0 | Se26 | | | | a12 | Vp26 | |
| 27 | 0 | Se27 | | | | a12 | Vp27 | |
| 28 | 0 | Se28 | | | | a12 | Vp28 | |
| 29 | 0 | Se29 | | | | a12 | Vp29 | |
| 30 | 0 | Se30 | 0 | S(3) | | a12 | fROT(3)=Vp30 | SP |
| 31 | 0 | Se31 | | | | a12 | Vp31 | |
| 32 | 0 | Se32 | | | | a12 | Vp32 | |
| 33 | 0 | Se33 | | | | a12 | Vp33 | |
| 34 | 0 | Se34 | | | | a12 | Vp34 | |
| 35 | 0 | Se35 | | | | a12 | Vp35 | |
| 36 | 0 | Se36 | | | | a12 | Vp36 | |
| 37 | 0 | Se37 | | | | a12 | Vp37 | |
| 38 | 0 | Se38 | | | | a12 | Vp38 | |
| 39 | 0 | Se39 | | | | a12 | Vp39 | |
| 40 | 0 | Se40 | 0 | S(4) | | a12 | fROT(4)=Vp40 | SP |

FIG. 8 Part 2

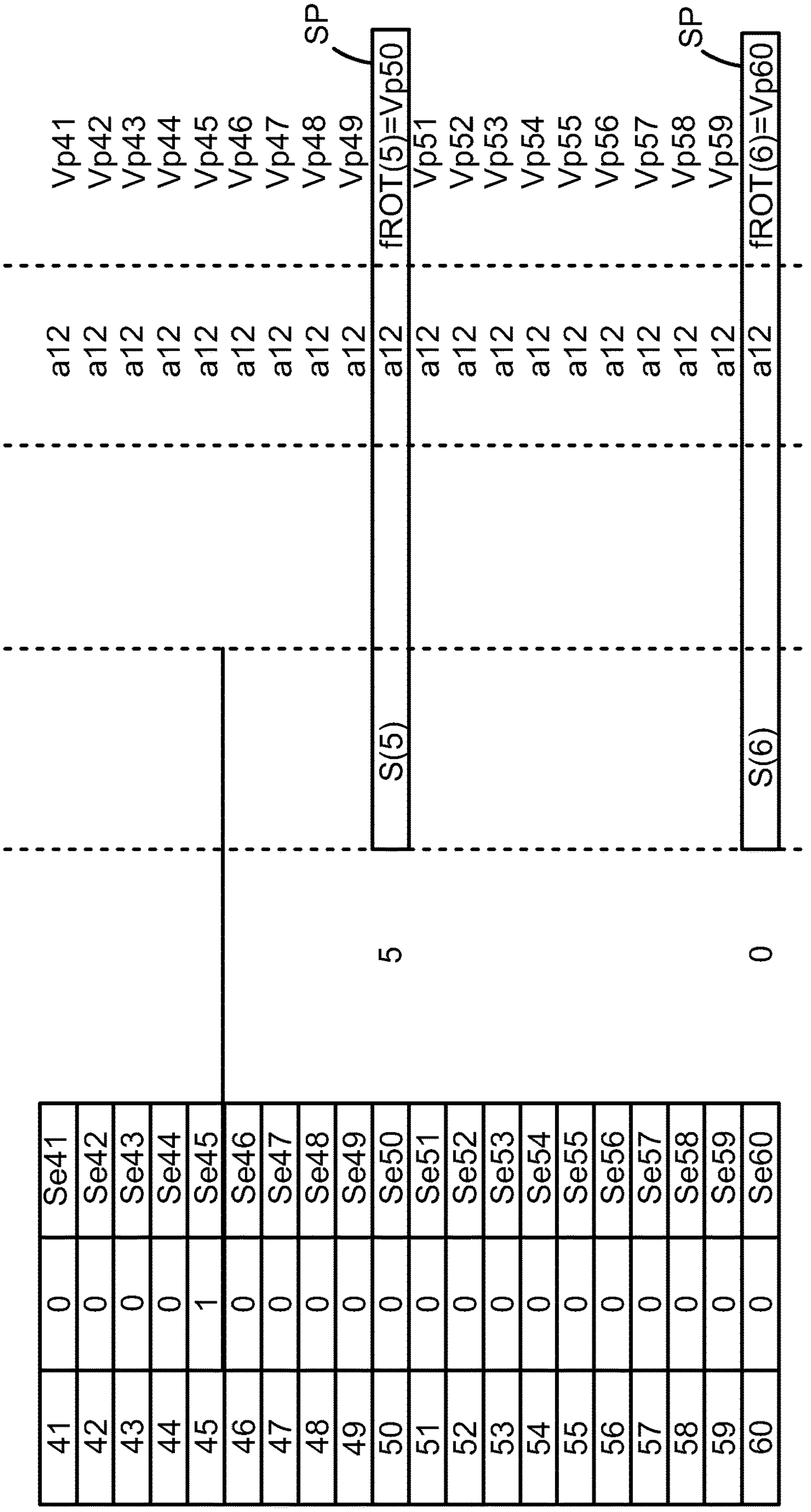
FIG. 8 Part 3

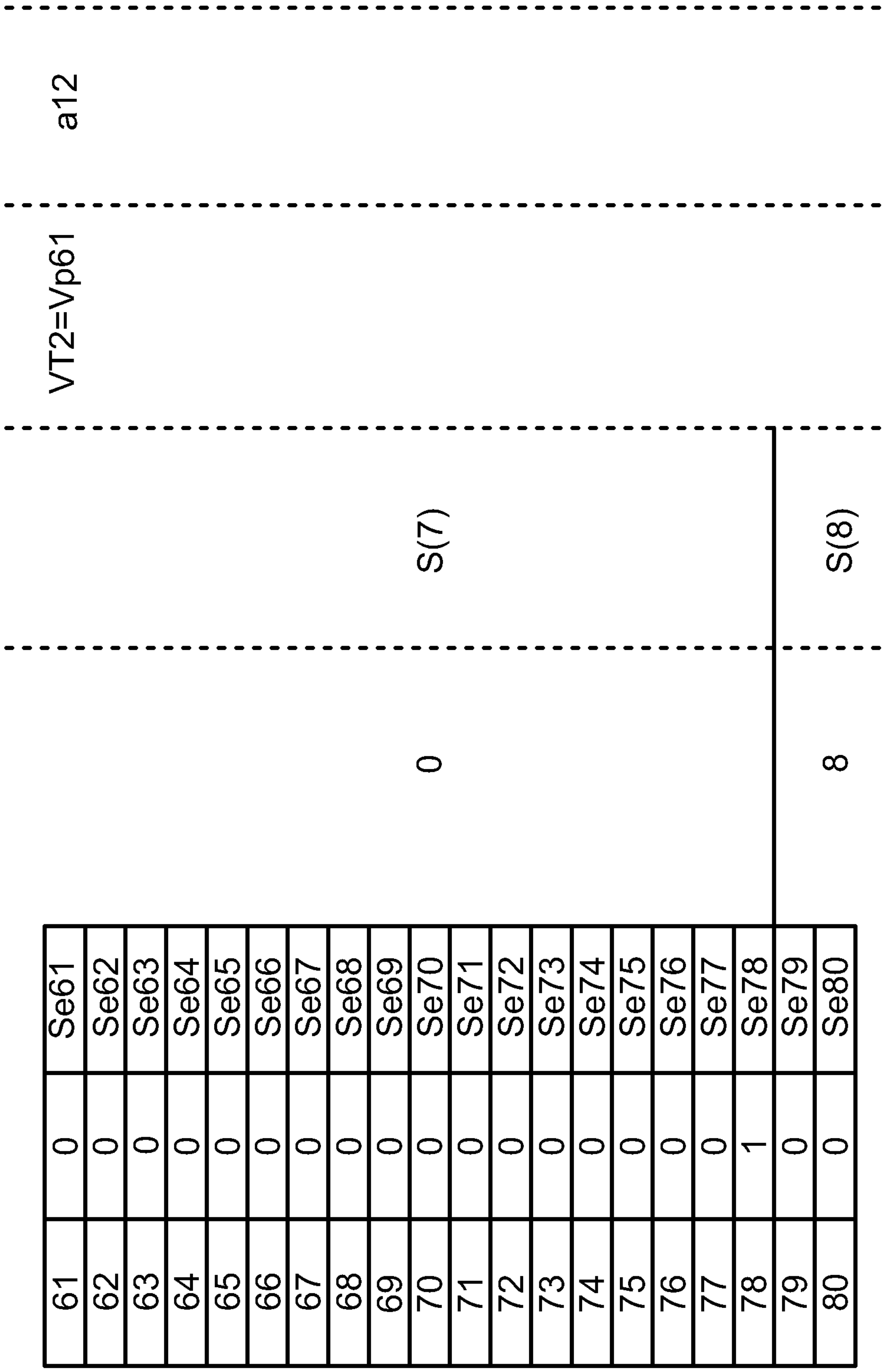
| | | |
|---|---|---|
| 61 | 0 | Se61 |
| 62 | 0 | Se62 |
| 63 | 0 | Se63 |
| 64 | 0 | Se64 |
| 65 | 0 | Se65 |
| 66 | 0 | Se66 |
| 67 | 0 | Se67 |
| 68 | 0 | Se68 |
| 69 | 0 | Se69 |
| 70 | 0 | Se70 |
| 71 | 0 | Se71 |
| 72 | 0 | Se72 |
| 73 | 0 | Se73 |
| 74 | 0 | Se74 |
| 75 | 0 | Se75 |
| 76 | 0 | Se76 |
| 77 | 0 | Se77 |
| 78 | 1 | Se78 |
| 79 | 0 | Se79 |
| 80 | 0 | Se80 |
FIG. 8 Part 4

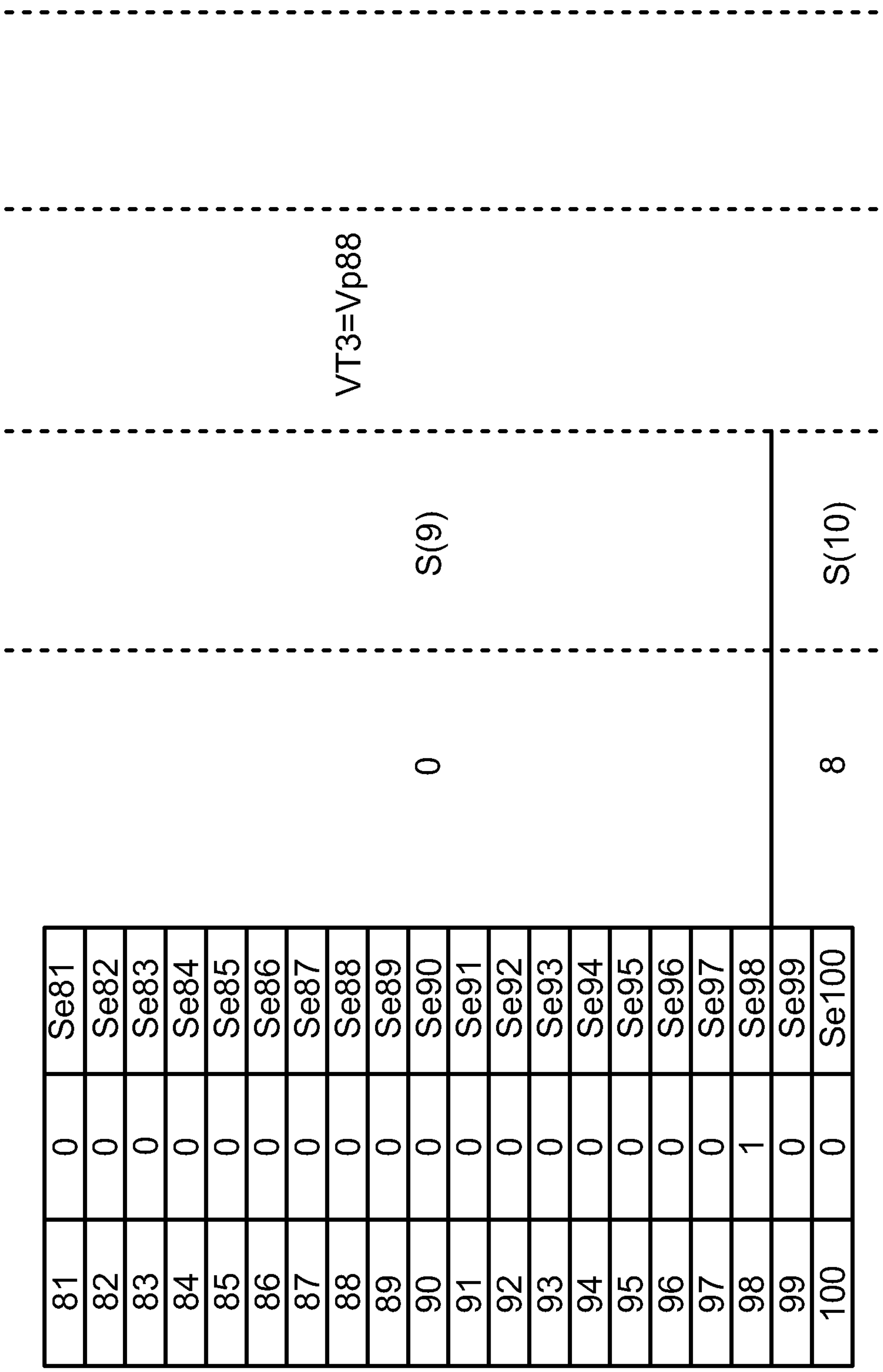
| | | |
|---|---|---|
| 81 | 0 | Se81 |
| 82 | 0 | Se82 |
| 83 | 0 | Se83 |
| 84 | 0 | Se84 |
| 85 | 0 | Se85 |
| 86 | 0 | Se86 |
| 87 | 0 | Se87 |
| 88 | 0 | Se88 |
| 89 | 0 | Se89 |
| 90 | 0 | Se90 |
| 91 | 0 | Se91 |
| 92 | 0 | Se92 |
| 93 | 0 | Se93 |
| 94 | 0 | Se94 |
| 95 | 0 | Se95 |
| 96 | 0 | Se96 |
| 97 | 0 | Se97 |
| 98 | 1 | Se98 |
| 99 | 0 | Se99 |
| 100 | 0 | Se100 |
FIG. 8 Part 5

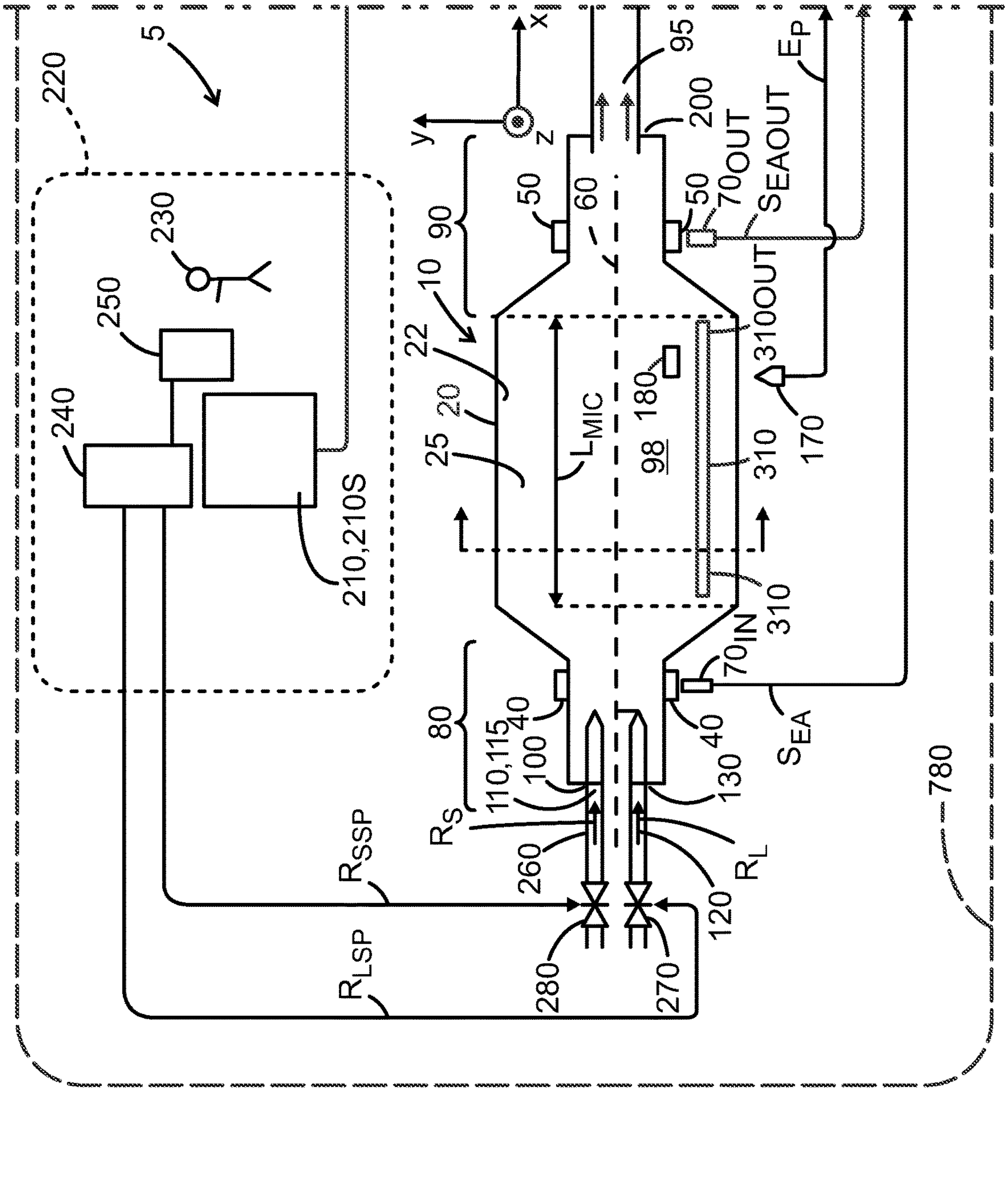
FIG. 27 Part 1

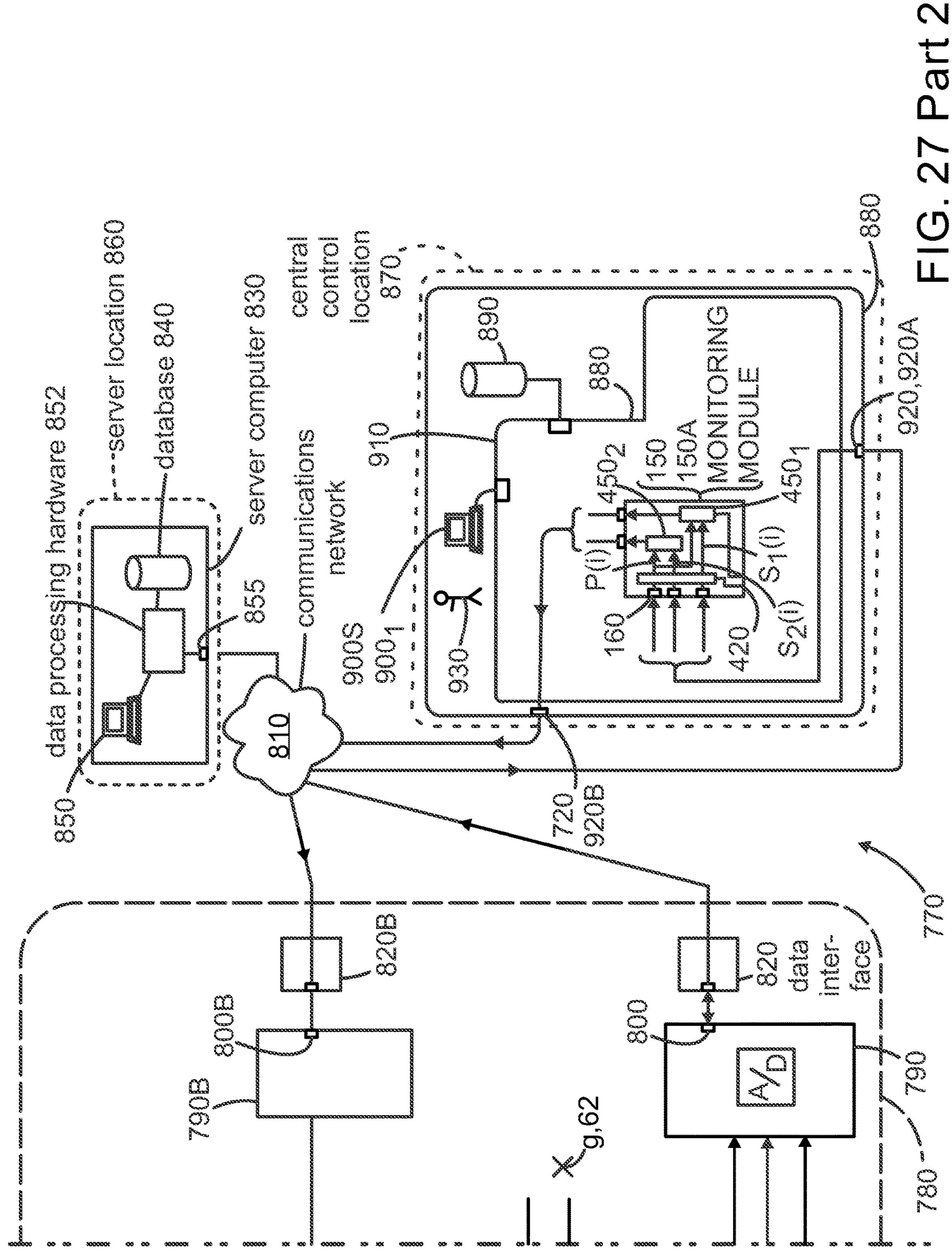
FIG. 27 Part 2

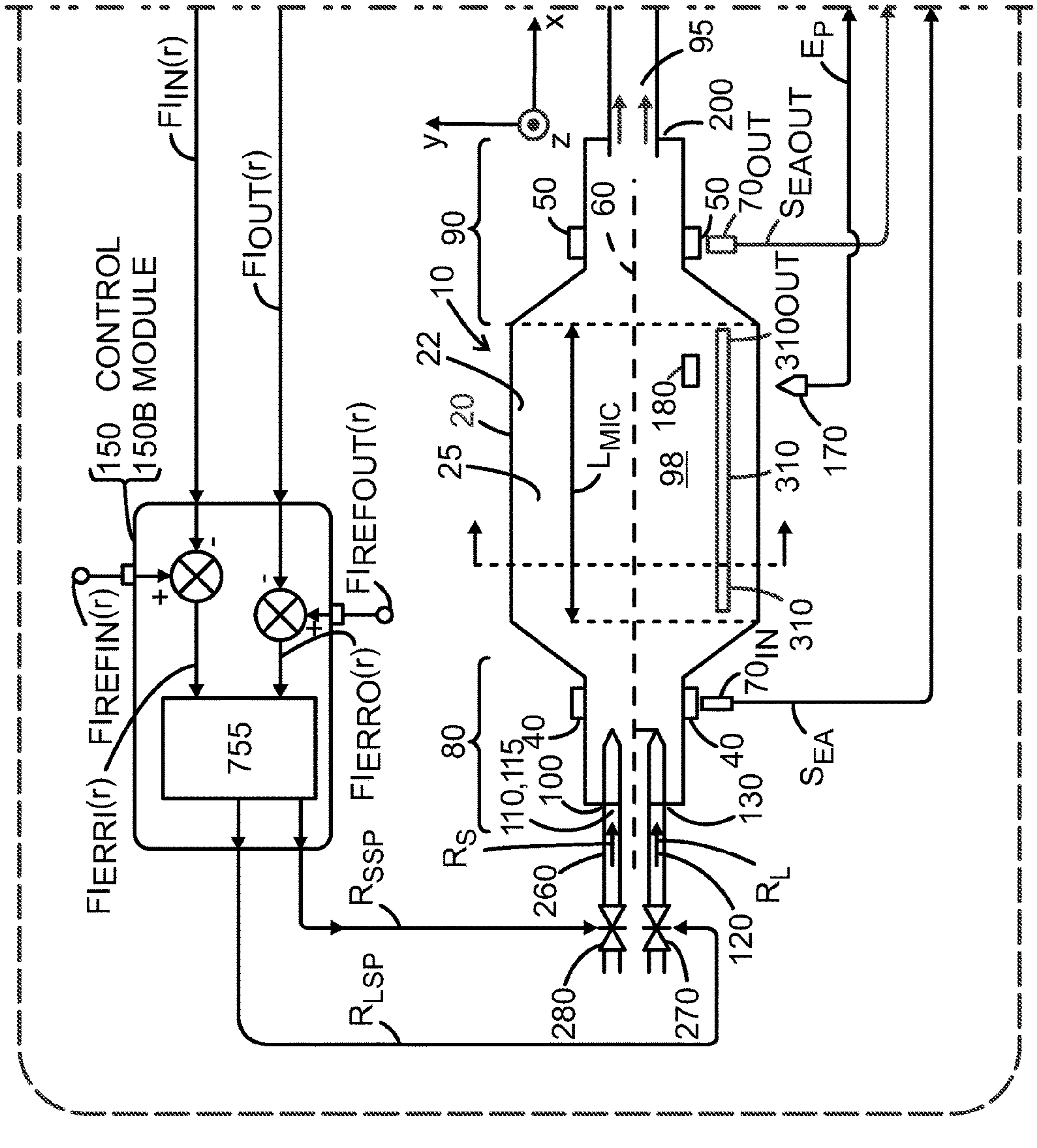
FIG. 28 Part 1

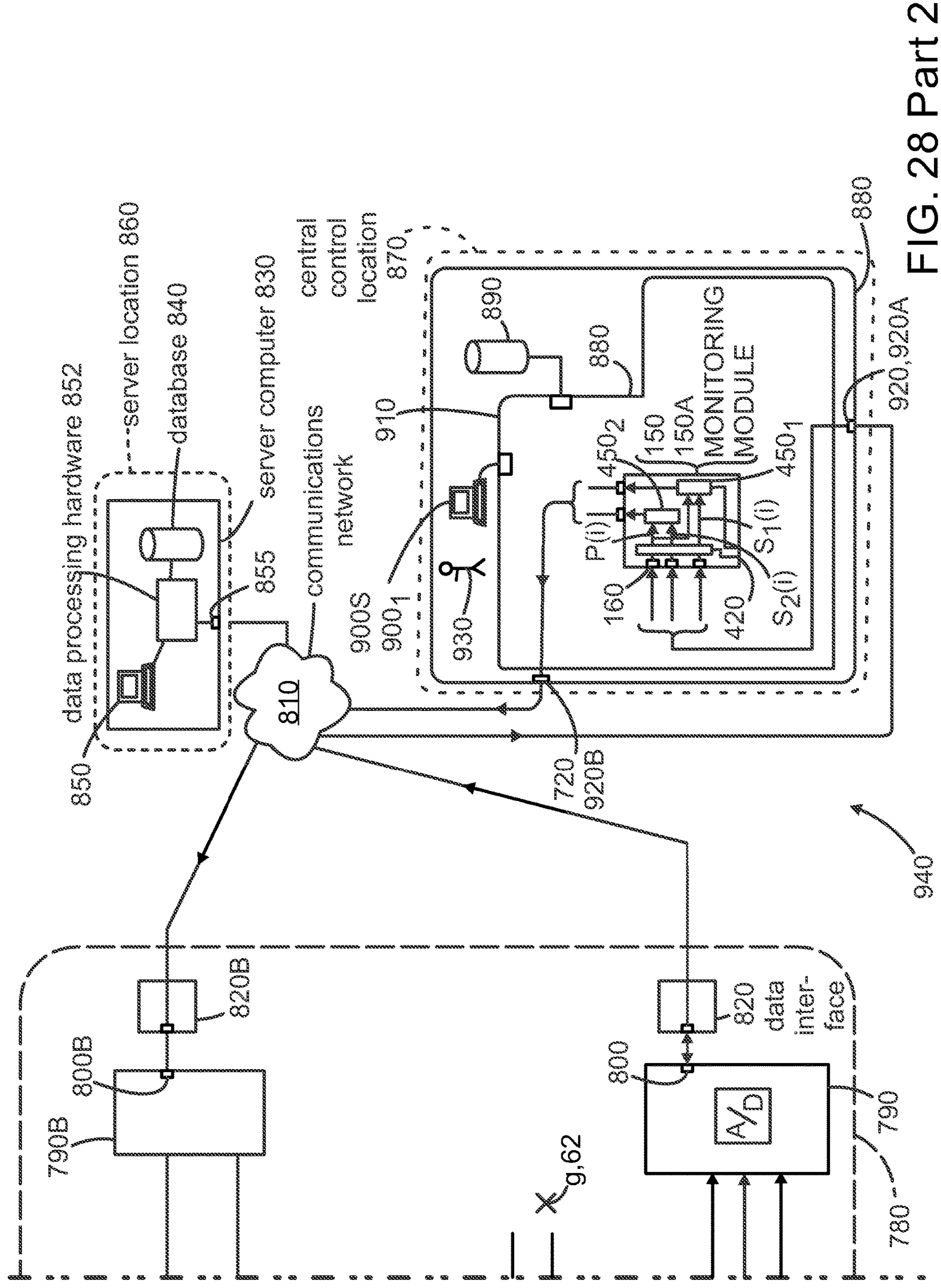
FIG. 28 Part 2

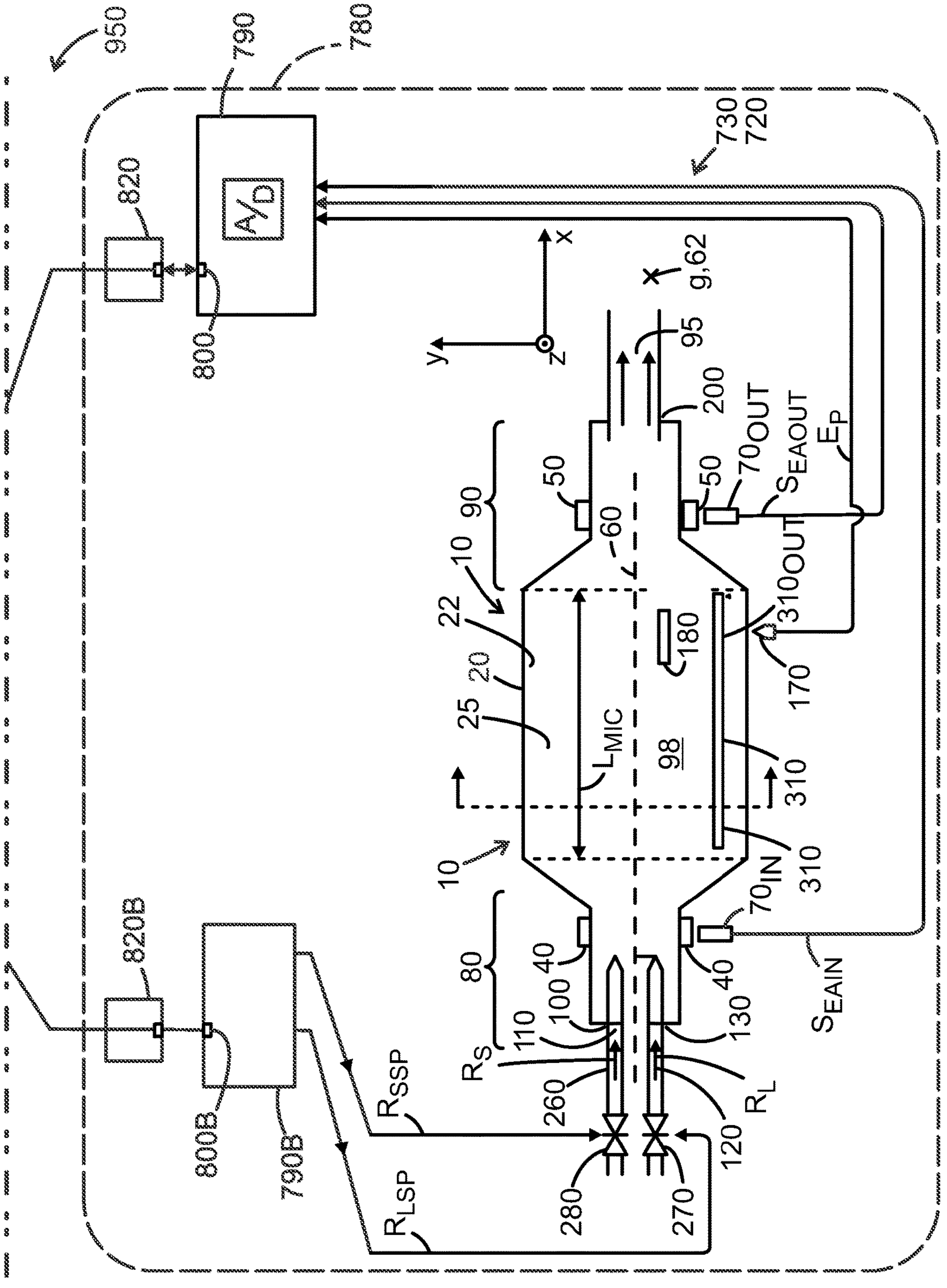
FIG. 29 Part 1

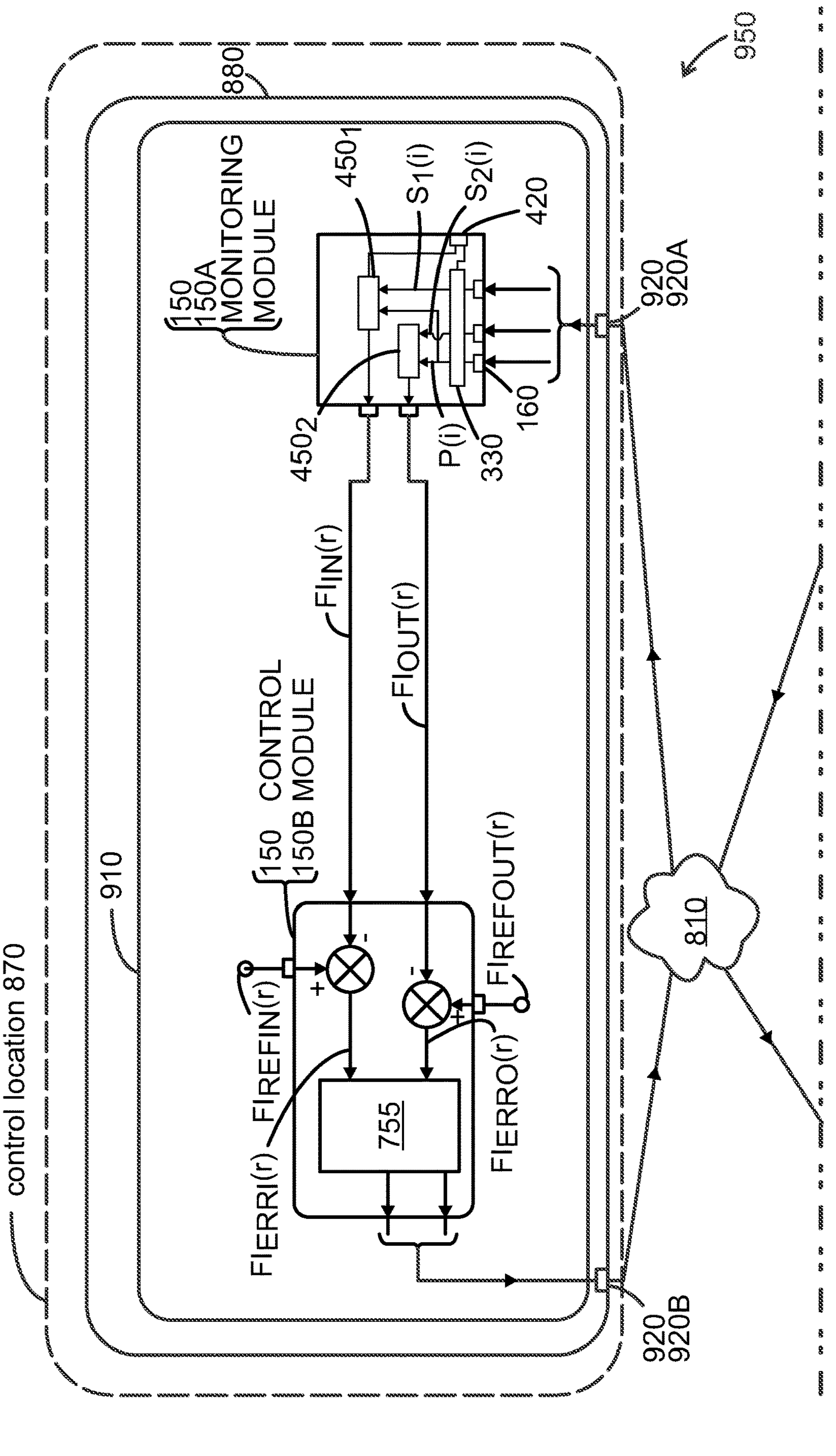
FIG. 29 Part 2

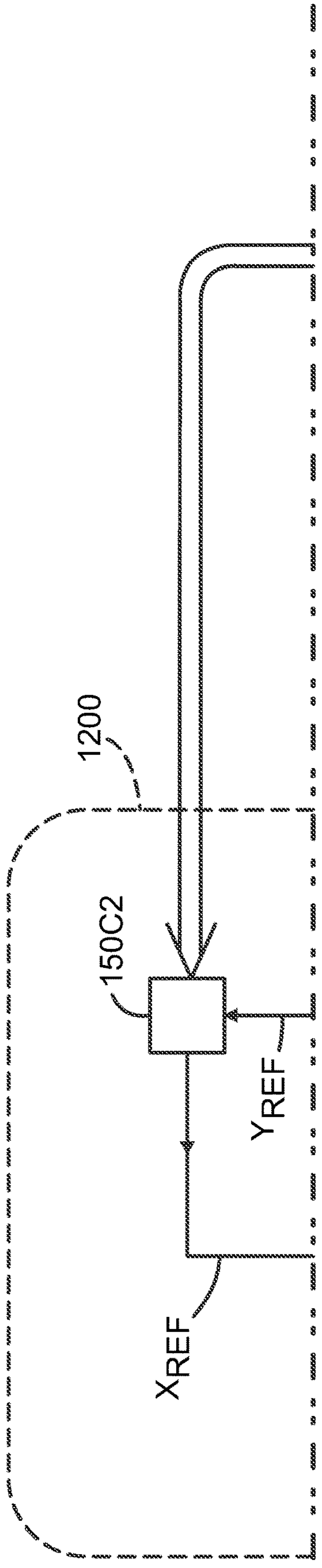
FIG. 34 Part 1

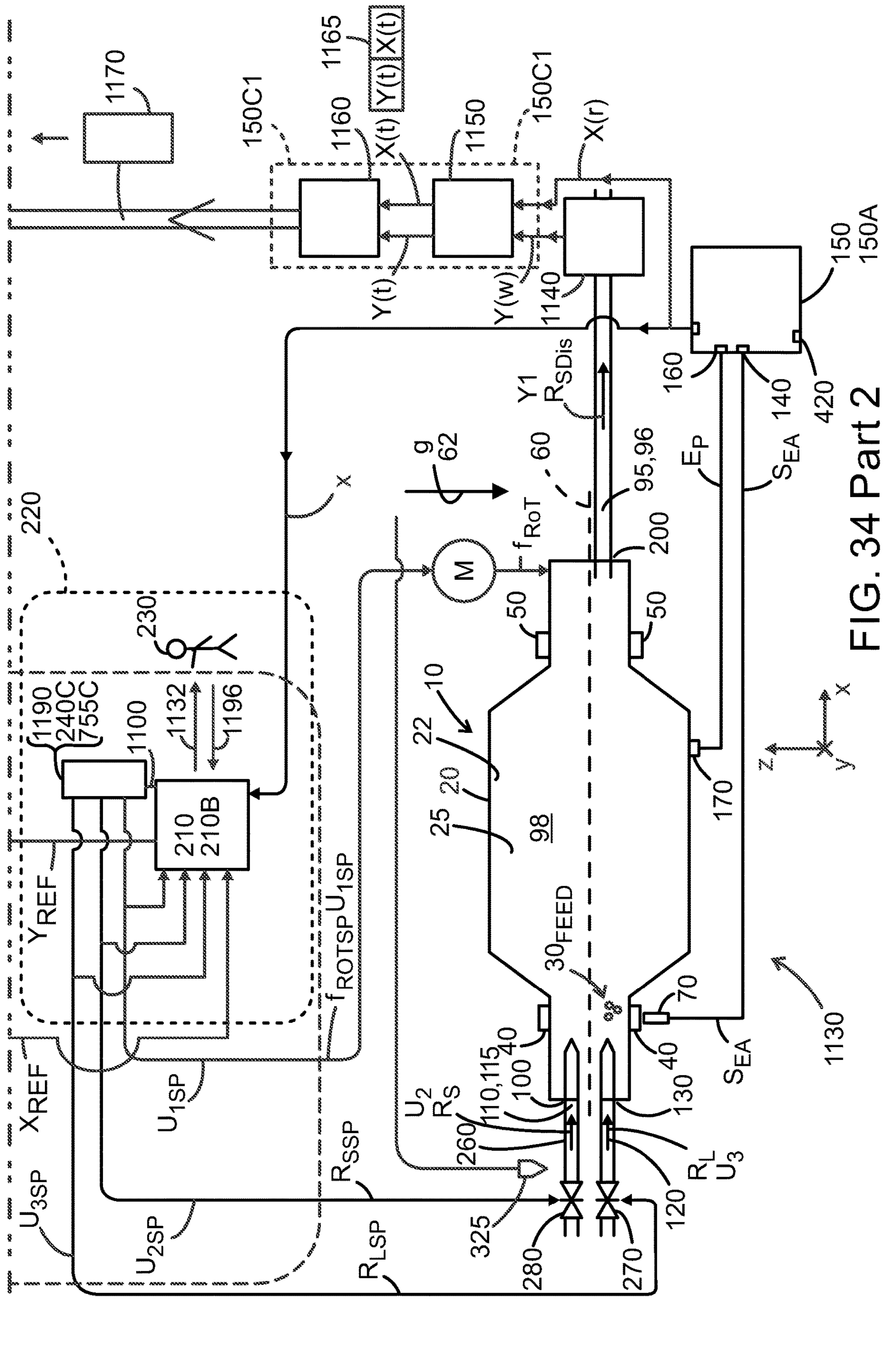
FIG. 34 Part 2

METHOD AND SYSTEM FOR OPERATING A COMMINUTION PROCESS IN A BALL MILL

TECHNICAL FIELD

The present invention relates to the field of a tumbling mill and to the monitoring of a tumbling mill. The present invention also relates to a method for generating information relating to an internal state of a tumbling mill, and to the field of control of a tumbling mill. The present invention also relates to a method of operating a comminution process in a tumbling mill, and to an apparatus for monitoring of an internal state of a tumbling mill. The present invention also relates to an apparatus for controlling an internal state of a tumbling mill. The present invention also relates to a computer program for monitoring of an internal state of a tumbling mill. The present invention also relates to a computer program for controlling an internal state of a tumbling mill.

DESCRIPTION OF RELATED ART

In some industries, such as in the mining industry, there is a need to grind material that comes in large pieces to reduce the size of individual pieces of the received material. A tumbling mill can achieve grinding of material.

A tumbling mill includes a shell that contains a charge of material to be tumbled and ground when the shell rotates. US 2017/0225172 A1 discloses that grinding in tumbling mills may be inefficient particularly where energy is wasted by impact that does not break particles, and that autogenous (AG) and semi-autogenous (SAG) mills sometimes operate in an unstable state because of difficulty in balancing the rate of feed of large particles into the tumbling mill with the consumption of the charge. According to US 2017/0225172 A1 it is essential that real-time information be provided as to the current state of the charge in the tumbler in order to control this process. US 2017/0225172 A1 discloses using rotor dynamics to determine characteristics of the moving charge within the tumbling mill. According to US 2017/0225172 A1 a monitoring apparatus is provided for monitoring a tumble mill. The apparatus includes vibration sensors mounted on the two main bearings of the tumble mill and on a thrust bearing of the mill producing vibration signals corresponding to the bearings on which the sensors are mounted. These vibration signals are transmitted to an analyzer that analyzes the signals and displays an operating condition of the tumble mill either numerically or graphically.

In FIG. 5 of US 2017/0225172 A1 there is disclosure of two orbit plots, one orbit plot generated at time 1 and another orbit plot generated at time 2. By observing the change in the orbit plot from time 1 to time 2, the operator of the mill will observe that the magnitude of vibrations has decreased dramatically and that orbit parameters or frequencies or phases or precessions or other characteristic changes in orbit plots has likewise decreased dramatically, according to US 2017/0225172 A1. This information will, according to US 2017/0225172 A1, tell the operator that something very significant has changed regarding overall operation of the mill rotor and the composite material charge being processed.

SUMMARY

In view of the state of the art, a problem to be addressed is how to generate improved information relating to an internal state of a tumbling mill and/or how to obtain an improved method of operating a comminution process in a tumbling mill.

This problem is addressed by examples presented herein.

BRIEF DESCRIPTION OF THE DRAWINGS

For simple understanding of the present invention, it will be described by means of examples and with reference to the accompanying drawings, of which

FIG. 8 is a simplified illustration of an example of a memory and its contents.

FIG. 27 shows a somewhat diagrammatic and schematic top view of yet another embodiment of a system including a tumbling mill.

FIG. 28 shows a somewhat diagrammatic and schematic top view of yet another embodiment of a system including a tumbling mill.

FIG. 29 shows a somewhat diagrammatic and schematic top view of yet another embodiment of a system including a tumbling mill.

FIG. 34 shows another somewhat diagrammatic view of a system including a tumbling mill. Note that FIG. 34 is provided on two pages as FIG. 34 Part 1 and FIG. 34 Part 2.

DETAILED DESCRIPTION

Figure 1A:
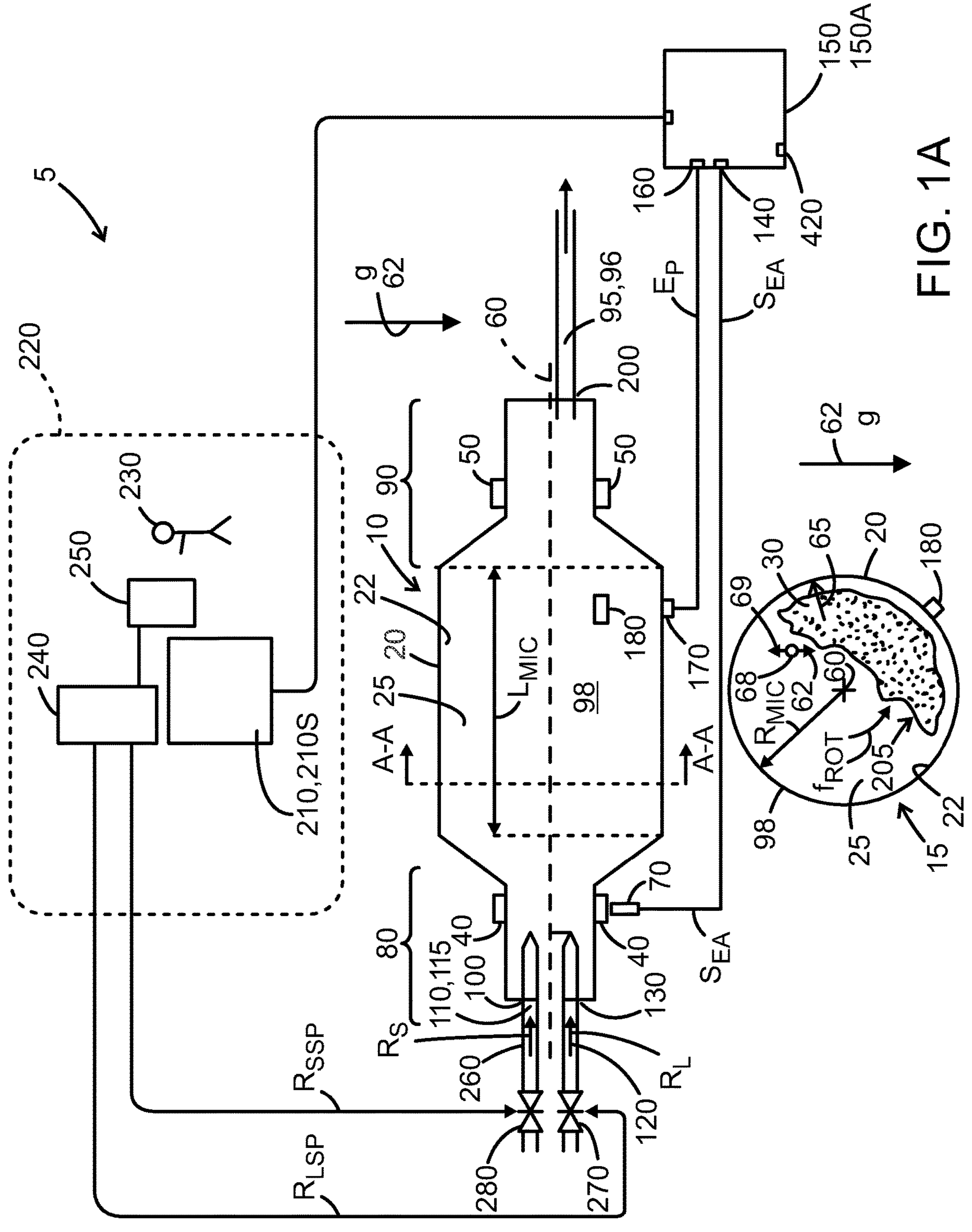
FIG. 1A shows a somewhat diagrammatic and schematic side view of a system including a tumbling mill.

In the following text similar features in different examples will be indicated by the same reference numerals.

FIG. 1A shows a somewhat diagrammatic and schematic side view of a system 5 including a tumbling mill 10. The tumbling mill 10 may be an autogenous (AG) mill, for example. Alternatively, the tumbling mill 10 may be a semi-autogenous (SAG) mill, for example. Another example tumbling mill 10 is a ball mill 10.

FIG. 1A also shows a sectional view, section A-A. Section view A-A is also is also identified by the reference 15. The tumbling mill 10 includes a shell 20 having an internal shell surface 22 that forms a chamber 25 for grinding material. In the section view identified by the reference 15 in FIG. 1A, the shell 20 is illustrated as revolving at a rotational speed $f_{ROT}$ in a counterclockwise direction, as indicated by the curved arrow $f_{ROT}$.

The tumbling mill chamber 25, in operation, contains a charge 30 of material to be tumbled and ground. The charge material has a material surface 33, i.e. a boundary between air, in the rotatable shell 20, and material 30 (See FIG. 2). Grinding in a tumbling mill serves the purpose of reducing the size of particles of solid material. This may be achieved e.g. by causing pieces of solid material to fall onto other pieces of solid material. Hence, a tumbling mill utilizes a force of nature, gravity, for accelerating particles of the charge against other particles of the charge. According to some embodiments, the walls of the shell 20 comprise a sturdy material, such as for example steel, so as to withstand impact of heavy particles, e.g. large pieces of ore that are tumbled in the chamber 25. According to some embodiments, a wall of the shell 20 comprises an elastic material so as to reduce wear of the wall. According to some embodiments, the elastic material comprises rubber.

According to some embodiments, the elastic material comprises a polymer such as polyurethane. According to some embodiments, the internal shell surface 22 includes a surface coating of an elastic material, such as e.g rubber or polyurethane.

According to some embodiments, the shell 10 is supported on at least two bearings 40 and 50. The shell 20 is rotatable around an axis of rotation 60. In this connection it is noted that an axis is an imaginary line around which an object spins (an axis of rotation). The rotation of the shell is utilized to lift a part of the charge, including particles of solid material, so that some of the solid particles can fall back down, under the influence of gravity, onto another part of the charge. Hence, it is desirable to select the speed of rotation $f_{ROT}$ of the shell 20 to a suitable value in order to obtain a balance between the lifting action and the falling action of the charge 30. With reference to the sectional view 15 of FIG. 1A, an arrow 62 indicates the direction of the force of gravity g in connection with the rotating shell 20 and its charge 30. Hence, an internal state of the tumbling mill 10 depends, in part, on a balance between the force of gravity 62 and a centripetal force 65 acting to press that part of the charge 30 that is immobile with respect to the internal shell surface 22, in a radial direction from the center, i.e. from the axis of rotation 60. In other words, during operation of the tumbling mill 10, the centripetal force acts to press a part of the charge 30 towards the internal shell surface 22, the centripetal force being dependent on the speed of rotation $f_{ROT}$ of the shell 20. In this connection it is noted that the centripetal force, acting on a piece of solid material being in contact with the internal shell surface 22, is dependent on the inner radius of the shell 20. When the force of gravity 62, acting on a particular piece 68 of solid material, is larger than a part 69 of the centripetal force, acting on that piece 68 of solid material in the direction opposite to the direction of gravity, then that piece 68 of solid material will fall.

A vibration sensor 70 may be provided for producing a measuring signal $S_{EA}$. The measuring signal $S_{EA}$ may be dependent on mechanical vibrations or shock pulses generated when the shell 20 rotates.

An example of the system 5 is operative when a vibration sensor 70 is firmly mounted on or at a measuring point on the tumbling mill 10. The measuring point can comprise a connection coupling to which the sensor 70 is firmly attached, or removably attachable. In the example illustrated by FIG. 1A, the sensor 70 is mounted on the bearing 40.

Alternatively, the sensor 70 may be mounted elsewhere on the tumbling mill where the sensor 70 is capable of generating the measuring signal $S_{EA}$ dependent on mechanical vibrations or shock pulses generated when the shell 20 rotates.

The tumbling mill 10 has an input side 80 for receiving pieces of solid material, and an output side 90 for delivery of output material 95 that has passed through the tumbling mill 10.

The shell 20 may have a mid-portion 98 having a substantially cylindrical shape, the chamber 25 at the mid portion having an internal radius $R_{MIC}$. The internal radius $R_{MIC}$ may, for example, be in excess of 0.5 meter. Alternatively, the internal radius $R_{MIC}$ may, for example, be in excess of 3 meters. The tumbling mill 10 may alternatively have a chamber mid portion internal radius $R_{MIC}$ in excess of 8 meters. The mid-portion of the shell 20 has a length $L_{MIC}$ from the input side 80 to the output side 90. The mid-portion shell length $L_{MIC}$ may, for example, be in excess of 1 meter. According to an embodiment, the mid-portion shell length $L_{MIC}$ may be in excess of 8 meters. It is noted that any herein exemplified internal radius $R_{MIC}$ may be combined with any herein exemplified shell length $L_{MIC}$. Moreover, it is noted that the shell 20 may have a mid-portion 98 having a polygonal shape. An example of such a polygonal shell shape is a shell that exhibits at least three shell wall portions that are joined to form the chamber 25 of the tumbling mill. In this context it is noted that, for the purpose of this disclosure, a tumbling mill shell having a mid-portion 98 having at least six shell wall portions that are joined to form the chamber 25*a* may be considered to have a substantially cylindrical shape.

Thus, for the purpose of this disclosure, a tumbling mill shell having a mid-portion 98 having a hexagonal shape may be considered to have a substantially cylindrical shape.

In the example illustrated by FIG. 1A, the input side 80 includes a first input 100 for pieces of solid material 110. The solid material 110, also referred to as feed material 110, may include pieces 115 of rock and ore, the pieces 115 having a variety of sizes. However, the solid material 110 fed into the first input 100 may have been treated so that there is a maximum solid material particle size. In other words, the feed material 110 may include pieces 115 of rock and ore, the pieces 115 having a feed particle size distribution. For example, the feed particle size distribution may be such that there is a certain maximum input solid particle volume $V_{ISPM}$, and/or a certain maximum input solid particle diameter $D_{ISPM}$. Hence, the maximum solid material particle size in the feed material may be a certain maximum input solid particle volume $V_{ISPM}$. The solid material 110 may, for example include pieces 115 of ore having a particle volume of up to ten (10) cubic decimeters, i.e. an individual input solid particle 115 has a maximum input solid particle volume $V_{ISP}$ of less than, or at most, ten (10) cubic decimeters. Alternatively, the maximum solid material particle size may be a certain maximum input solid particle diameter $D_{ISPM}$. Hence, an individual input solid particle 115 has a maximum input solid particle diameter $D_{ISP}$ of less than, or at most 250 mm.

The infeed particles 115 may include useful minerals as well as minerals considered less useful. The less useful minerals may be referred to as waste minerals. In order to enable separation of the useful minerals from the waste minerals the solid feed material 110 is ground in the tumbling mill 10. The ground output material 95 delivered from the tumbling mill 10 may include particles 96 whose diameter is around 0.1 mm or less than 0.1 mm. The particles 96 delivered from the tumbling mill 10 may be referred to as product particles 96.

According to some embodiments, the tumbling mill 10 operates to perform dry grinding. According to an embodiment the tumbling mill 10 is a ball mill operating to perform dry grinding. The ball mill 10 includes a number of balls 117 for enhancing the grinding of the feed particles of the solid feed material 110 into ground solid product particles 96.

According to an embodiment the balls 117 of the ball mill include steel balls. According to an embodiment the tumbling mill 10 is a ball mill which is used for grinding feed particles 115 of a hard substance into a powder 95 referred to as cement. In this connection it is noted that Portland cement, a form of hydraulic cement, is made by heating limestone, i.e. calcium carbonate, with other materials, such as clay, in a process known as calcination that liberates a molecule of carbon dioxide from the calcium carbonate to form calcium oxide, or quicklime, which then chemically combines with the other materials in the mix to form calcium silicates and other cementitious compounds. According to an embodiment the resulting hard substance is then ground, with an amount of gypsum, into a powder, using the above mentioned ball mill 10 for dry grinding, to make cement.

According to some embodiments, the tumbling mill 10 operates to perform grinding of solid material 110. An example of a grinding process employing a tumbling mill 10 that operates to perform grinding of solid material 110 is a tumbling mill 10 in the mining industry. According to some embodiments, the mining industry tumbling mill 10 operates to perform grinding of solid material 110 including a mix of useful minerals and minerals considered less useful. According to some embodiments, the mining industry tumbling mill 10 is an autogenous (AG) mill. Alternatively, the mining industry tumbling mill 10 is a semi-autogenous (SAG) mill. According to some embodiments, the mining industry tumbling mill 10 is a ball mill 10.

According to some embodiments, the solid material 110 is an ore having a metal content. The average metal content in the solid material 110 may be, for example, higher than 0.1%. According to some embodiments, the solid material 110 has an average metal content of more than 5% of a desired metal.

Alternatively, the average metal content in the solid material 110 may be, for example, 50%. According to some embodiments, the solid material 110 has a content of more than 40% of a desired metal. According to some embodiments, the solid material 110 has a content of more than 40% of a desired metal, the desired metal being iron. In this context it is noted that the content of a desired metal, in the solid material 110, may affect the density of the charge in the tumbling mill 10. Thus, according to some embodiments, the density of the charge in the tumbling mill 10 may be indicative of a relation between a desired metal and waste minerals in the charge in the tumbling mill 10.

According to some embodiments, the grinding process may be facilitated by providing a liquid 120. An example of a grinding process facilitated by providing a liquid 120 is a tumbling mill for use in the mining industry. According to some embodiments, the liquid 120 enters the tumbling mill 10 at a second input 130 at the input side 80 of the tumbling mill 10.

In the rotating shell 20, the input pieces of solid material 110 are mixed with the input liquid 120 to form the charge 30.

When the density of the input liquid 120 differs from the density of the input solid material 110, the density of the charge 30 can be controlled by controlling the proportion of input liquid 120 and input solid material 110. Thus, when the input liquid 120 has a lower density than the density of the input solid material 110, the density of the charge 30 can be lowered by increasing the amount of input liquid 120.

The input liquid 120 may comprise water. Water has a density of about 997 kg per cubic metre. The pieces of input solid material typically has a higher density than the density of the input liquid. The pieces of input solid material typically has a density in excess of 1500 kg per cubic metre. The input solid material 110 may comprise ore that holds useful minerals mixed with other minerals.

An example of a useful mineral is a mineral that contains a metal, such as e.g. aluminium or iron. Aluminium has a density of about 2700 kg per cubic metre. Iron has a density of about 7870 kg per cubic metre. The "other mineral" mentioned above, may include e.g. granite or other pieces of rock. Granite has a density of about 2700 kg per cubic metre.

Table 1 provides some examples of solid material and corresponding material properties.

TABLE

| Solid material | Density (kg per cubic metre) | Tenacity | Compressive strength (MPa) |
|---|---|---|---|
| Aluminium | 2700 | Malleable | 30-280 |
| Granite | 2700 | Brittle | Above 200 |
| Hematite ($Fe_2O_3$) | 5150 | Brittle | Appr 155 |
| Magnetite ($Fe_3(_4)$) | 5180 | Brittle | Appr 100 |
| Zinc | 7130 | Brittle | 75-160 |
| Iron | 7870 | Malleable | 110-220 |
| Silver | 10500 | Malleable | 45-300 |
| Gold | 19320 | Ductile | 20-205 |
| Chrome Steel (e.g in ball for ball mill) | 7850 | | |
| Stainless Steel (e.g in ball for ball mill) | 7500 | | |

In the field of mineralogy, the term tenacity describes a mineral's resistance to breaking, beading, cutting, or other forms of deformation.

A material is brittle if, when subjected to stress, it breaks with little elastic deformation and without significant plastic deformation. Brittle materials absorb relatively little energy prior to fracture, even those of high strength.

A malleable material is capable of being extended or shaped by beating or by pressure. A ductile material is capable of being pulled or stretched by mechanical force without breaking.

Compressive strength or compression strength is the capacity of a material or structure to withstand loads tending to reduce size. By contrast, tensile strength is the capacity of a material or structure to withstand loads tending to elongate. In other words, compressive strength resists compression (being pushed together), whereas tensile strength resists tension (being pulled apart).

It is noted that gold has a density of 19320 kg per cubic metre, which is significantly higher than that of the other solid materials listed in table 1 above. In this connection it is also noted that gold content in ore comprising some gold is usually low in comparison to the content of other solids that are used as feed material 110 to a tumbling mill.

The output side 90 of tumbling mill 10 may include a separator for delivery of output material 95 on an output 200 and for retaining pieces of material whose particle size exceeds a limit value. The separator may include a screen configured to sift out pieces of material that have a particle size smaller than a certain limit value for delivery as output material 95 on the output 200. The ground output material 95 delivered from the tumbling mill 10 may include particles whose diameter is smaller than a certain limit output particle diameter. The limit output particle diameter may be 0.1 mm.

One measure of a production quality of the tumbling mill 10 may be the proportion of output particles having an output particle diameter less than 45 μm (here μm means micrometre), or the amount per hour of output particles having an output particle diameter less than 45 μm.

Moreover, it is desirable to obtain a high degree of efficiency of the grinding process. One aspect of grinding process efficiency is the amount of ground material per time unit. Hence, it is desirable to improve or optimize the number of kg/hour of ground solid material having a particle size smaller than a limit value. However, the magnitude is usually metric tons per hour of solid material being fed into a tumbling mill 10.

Another aspect of grinding process efficiency is the amount of ground material per energy unit, in order to minimize grinding process energy consumption. Hence, it is desirable to improve or optimize the throughput in terms of kg/kilowatt-hour of ground solid material, the ground solid material having a particle size smaller than a limit value. In this context it is noted that a tumbling mill typically may have a power consumption of more than 4 Megawatt. Some tumbling mills have a mean power consumption of 10 Megawatt, and some may require 20 Megawatt as peak consumption. In this context it is noted that when a tumbling mill has a mean power consumption of 10 Megawatt, then the energy consumption is 10 000 kWh per hour. Thus, when that tumbling mill is in operation 24 hours a day for a year, then even a small improvement of grinding process energy efficiency, such as a one percent (1%) improvement would render energy savings in the range of six million kWh per year.

The efficiency of the grinding process in a tumbling mill 10 depends on a number of variables affecting the internal state of the tumbling mill 10. One variable that has an impact on the efficiency of the grinding process in a tumbling mill 10 is the filling degree of the tumbling mill 10. Hence, it is desirable to control the inflow of input solid material 110 so as to achieve an optimal filling degree.

In order to maximise the amount of output material 95 from the tumbling mill 10 it is therefore desirable to control the inflow of input material 110 so as to maintain an optimal state of the tumbling mill process. The optimal internal state of the tumbling mill process may include a certain filling degree of the shell 20, i.e. a certain charge volume. Hence, one variable that has an impact on the efficiency of the grinding process in a tumbling mill 10 is the solid feed rate $R_S$, i.e. the amount of solid material particles per time unit that is fed into the tumbling mill 10.

Another variable that has an impact on the efficiency of the grinding process in a tumbling mill 10 is the mineralogical properties of the input solid material particles 110. In this connection, it is noted that mineralogy is a subject of geology specializing in the scientific study of physical properties of minerals as well as the chemistry, and crystal structure of minerals. Moreover, the mineralogical properties of the particles in the charge 30 are not constant over time, since the composition of solid material 110, such as ore from a mine, typically varies over time. The variation of the mineralogical properties of the particles in the charge 30 may affect the efficiency of the grinding process of the tumbling mill 10. Hence, the efficiency of the grinding process may be variable over time due to the variation of the mineralogical properties of the particles in the charge 30.

Thus, a decreased efficiency of the grinding process, during a certain time span, may lead to an increase of the charge volume in the mill 10 if the infeed of material is kept constant. Thus, unless an operator of the tumbling mill is adequately informed about the current charge volume in the mill 10 there is also a risk of overload which may, in a worst case, lead to a complete stop of the grinding process.

Yet another variable that has an impact on the efficiency of the grinding process is the size distribution of the solid material particles 110 that are fed into the tumbling mill 10. According to some embodiments the infeed of solid material particles 110 is controlled so that a certain proportion of the solid material particles 110 provided on the first input 100 have individual volumes of more than one cubic decimeter so as to increase the efficiency of the grinding process. It has been concluded that control of the infeed of solid material particles 110 so that a certain proportion of the solid material particles 110 provided on the first input 100 have individual volumes of more than one cubic decimeter increases the efficiency of the grinding process, in particular when the tumbling mill is an AG mill or an SAG mill.

The shell 20 is typically opaque, i.e. it is not possible to visually inspect the charge in the shell during operation of the tumbling mill 10. Moreover, the movement of heavy ore that is tumbled during operation of the tumbling mill 10 prevents placing cameras or other sensitive detectors on the inside of the shell 20.

It is an object of this document to describe methods and systems for an improved monitoring of an internal state in a tumbling mill during operation. It is also an object of this document to describe methods and systems for an improved Human Computer Interface (HCI) relating to internal state in a tumbling mill during operation. It is also an object of this document to describe methods and systems for an improved Graphical User Interface relating to the grinding process in a tumbling mill 10.

The inventor realized that there may exist a mechanical vibration $V_{IMP}$ indicative of an impact between a protrusion, such as a lifter, on an internal surface of the rotating shell 20 and at least one particle in a toe portion 205 of the material charge 30 during operation of the tumbling mill 10. The inventor also contemplated that such a mechanical vibration $V_{IMP}$ may be indicative of a current internal state of the tumbling mill 10 and/or a current state of the grinding process. A mechanical vibration $V_{IMP}$ may be generated when a protrusion, such as a lifter, interacts with a particle in a toe portion 205 of a material charge 30 in the chamber 25. The impact force $F_{IMP}$ of the interaction between the rotationally moving lifter and the material charge 30 causes an acceleration of the at least one particle in the toe portion 205 of the material charge 30, the impact causing the mechanical impact vibration $V_{IMP}$. In fact, the impact force $F_{IMP}$ may cause a mechanical impact vibration $V_{IMP}$ which is indicative of a current internal state of the tumbling mill 10 and/or indicative of a current state of the grinding process.

The sensor 70 placed outside the chamber 25 may detect vibrations caused by interaction involving particles of the charge 30 in the chamber 25 during operation of the tumbling mill 10. Hence, with reference to FIG. 1A, the sensor 70 is capable of generating the measuring signal $S_{EA}$ dependent on mechanical vibrations or shock pulses generated when the shell 20 rotates. Thus, the measuring signal $S_{EA}$ may be dependent on, and indicative of, the impact force $F_{IMP}$ between a protrusion, such as a lifter, and at least one particle in a toe portion 205 of the material charge 30 during operation of the tumbling mill 10.

The sensor 70 may, for example, be an accelerometer 70 configured to generate the measuring signal $S_{EA}$ having an amplitude that depends on the impact force $F_{IMP}$.

The inventor concluded that there may exist a mechanical vibration $V_{IMP}$ indicative of a current internal state of the tumbling mill 10 and/or of a current state of the grinding process, but that conventional methods for measuring vibrations and/or for analysing and/or for visualising such vibrations may hitherto have been inadequate.

An analysis apparatus 150 is provided for monitoring of the tumbling mill process. The analysis apparatus 150 may also be referred to as monitoring module 150A.

The analysis apparatus 150 may generate information indicative of the internal state of the tumbling mill process dependent on the measuring signal $S_{EA}$. The sensor 70, generating the measuring signal $S_{EA}$, is coupled to an input 140 of the analysis apparatus 150 so as to deliver the measuring signal $S_{EA}$ to the analysis apparatus 150. The analysis apparatus 150 also has a second input 160 for receiving a position signal Ep dependent on the rotational position of the shell 20.

A position sensor 170 is provided to generate the position signal Ep dependent on the rotational position of the shell 20. As mentioned above, the shell 20 is rotatable around the axis of rotation 60, and thus the position sensor 170 may generate a position signal Ep having a sequence of shell position signal values $P_S$ for indicating momentary rotational positions of the shell 20. A position marker 180 may be provided on an outer surface of the shell 20 such that, when the shell 20 rotates around the axis of rotation 60, the position marker 180 passes by the position sensor 170 once per revolution of the shell, thereby causing the position sensor 170 to generate a revolution marker signal $P_S$. Such a revolution marker signal PS may be in the form of an electric pulse having an edge that can be accurately detected and indicative of a certain rotational position of the monitored shell 20. The analysis apparatus 150 may generate information indicative of a rotational speed $f_{ROT}$ of the shell 20 dependent on the position signal Ep, e.g. by detecting a temporal duration between revolution marker signals PS. The position marker 180 may be e.g. an optical device 180, such as a reflex 180, when the position sensor 170 is an optical device, such as e.g. a laser transceiver configured to generate a revolution marker signal $P_S$ when the intensity of laser reflection changes due to a laser beam impinging the reflex 180.

Alternatively, the position marker 180 may be e.g. a magnetic device 180, such as strong magnet 180, when the position sensor 170 is a device 170 configured to detect a changed magnetic field. An example of a device configured to detect a changed magnetic field is a device including an inductive coil which will generate an electric current in response to a changed magnetic field. Thus, the device 170 configured to detect a changed magnetic field is configured to generate a revolution marker signal $P_S$ when passing by the magnetic device 180. Alternatively, the position sensor 170 may be embodied by an encoder 170 which is mechanically coupled to the rotating mill shell 20 such that the encoder generates e.g. one marker signal $P_S$ per revolution the rotating mill shell 20.

The system 5 may include a control room 220 allowing a mill operator 230 to operate the tumbling mill 10. The analysis apparatus 150 may be configured to generate information indicative of an internal state of the tumbling mill 10. The analysis apparatus 150 also includes an apparatus Human Computer Interface (HCI) 210 for enabling user input and user output. The HCI 210 may include a display, or screen, 210S for providing a visual indication of an analysis result. The analysis result displayed may include information indicative of an internal state of the tumbling mill process for enabling the operator 230 to control the tumbling mill.

A tumbling mill controller 240 is configured to deliver a solid material feed rate set point $R_{SSP}$, and it may also, optionally, deliver a liquid feed rate set point $R_{LSP}$. According to some embodiments, the set point value $R_{SSP}$ is set by the operator 230. According to some embodiments, also the set point value $R_{LSP}$ is set by the operator 230. Thus, the tumbling mill controller 240 may include a mill user input/output interface 250 enabling to operator to regulate a solid material feed rate $R_S$ and/or a liquid feed rate $R_L$.

As mentioned above, the input side 80 of the tumbling mill includes a first input 100 for pieces of solid material 110, and optionally the input side 80 may also have a second input 130 for entry of liquid 120, such as e.g. water, into the chamber 25. The solid material 110 may be transported to the first input 100 by a conveyer belt 260. The conveyer belt 260 runs at a conveyer belt speed to transport a solid material 110 to the first input 100 at the solid material feed rate $R_S$.

The solid material feed rate $R_S$ may be for example 10 000 kg per minute during operation of the tumbling mill 10 at a certain internal state of the tumbling mill 10. Similarly, the liquid feed rate $R_L$ may be for example 1000 kg per minute during operation of the tumbling mill 10 at the certain internal state of the tumbling mill 10.

Figure 1B:
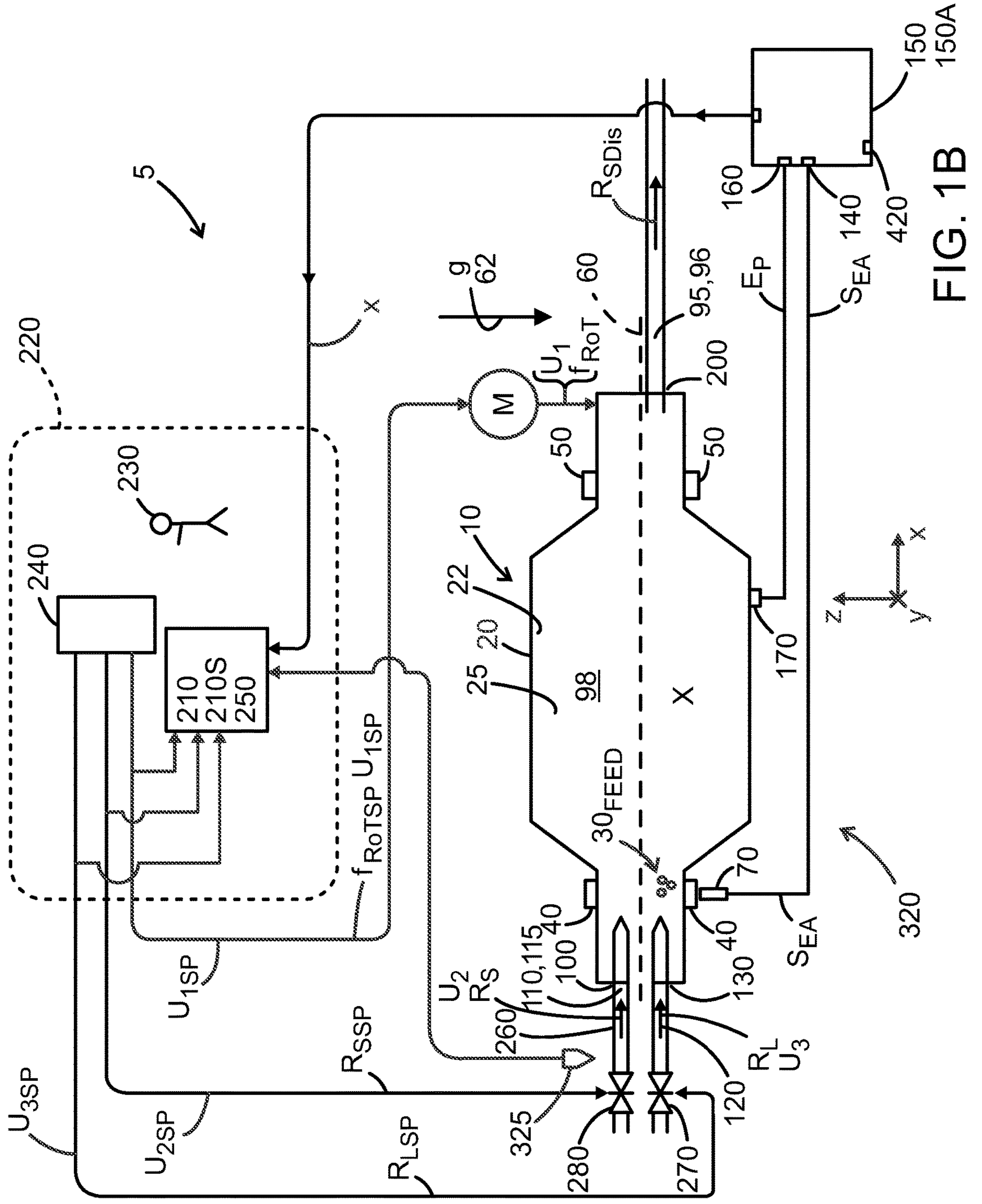
FIG. 1B shows another somewhat diagrammatic view of a system including a tumbling mill.

Control of the liquid feed rate $R_L$ is diagrammatically shown in FIG. 1A and/or FIG. 1B by the symbol of a controllable valve 270, receiving the liquid feed rate set point $R_{LSP}$ from the tumbling mill controller 240. Similarly, control of the solid material feed rate $R_{SF}$ is diagrammatically shown in FIG. 1A and/or FIG. 1B by the symbol of a controllable valve 280, receiving the solid material feed rate set point $R_{SSP}$ from the tumbling mill controller 240.

According to some embodiments, the tumbling mill controller 240 may also generate a set point value $f_{ROT\_SP}$ for the rotational speed $f_{ROT}$ of the mill shell. The rotational speed set point value $f_{ROT\_SP}$ may also be referred to as $U1_{SP}$. The rotational speed set point value $f_{ROT\_SP}$, also referred to as $U1_{SP}$, may be generated in response to user input, from operator 230, via user input/output interface 250, as illustrated in FIG. 1B.

As illustrated in FIG. 1B, the tumbling mill controller 240 may also generate set point values $U2_{SP}$, and $U3_{SP}$, wherein $U2_{SP}$ is the above mentioned $R_{SSP}$, and $U3_{SP}$ is the above mentioned $R_{LSP}$.

Moreover, the tumbling mill controller 240 may also generate a ball feed rate set point value $U4_{SP}$, $R_{BFSP}$ for setting a ball feed rate U4, $R_{BF}$. The ball feed rate U4, $R_{BF}$ is a number of grinding balls per time unit that is being fed into said ball mill for enhancing the comminution process. Thus, this set point value may be relevant when the mill 10 is a ball mill, i.e a tumbling including grinding balls 1168 (See FIG. 36).

Balls for use in a ball mill may comprise chrome steel or stainless steel. Alternatively, a ball mill may use balls made of a ceramic material. In some examples, a ball mill may use balls comprising a rubber material.

The mill user input/output interface 250, in the example illustrated in FIG. 1A, is coupled to the regulator 240 and the HCI 210 is coupled to the analysis apparatus 150, or monitoring module 150A, configured to generate information indicative of an internal state of the tumbling mill 10. Thus, when coupled only to monitoring module 150A as shown in FIG. 1A, the HCI 210 is advantageously possible to add, in a control room 220, without any need to modify any previously existing input/output interface 250 and regulator 240 used by a mill operator 230 to operate the tumbling mill 10.

An object to be addressed by solutions and examples disclosed in this document is to describe methods and systems for an improved monitoring of an internal state X in a tumbling mill 10 during operation. It is also an object, to be addressed by solutions and examples disclosed in this document, to describe methods and systems for an improved control of an internal state X in a tumbling mill 10 during operation. Moreover, an object to be addressed by solutions and examples disclosed in this document is to describe methods and systems for an improved Human Computer Interface (HCI) relating to conveying useful information about the internal state X in a tumbling mill during operation. Another object to be addressed by this document is to describe methods and systems for an improved Graphical User Interface relating to the grinding process in a tumbling mill 10.

Another object to be addressed by solutions and examples disclosed in this document is to describe methods and systems for an improved control of an output Y from a tumbling mill 10 during operation. Yet another object to be addressed by solutions and examples disclosed in this document is to describe methods and systems for an improved Human Computer Interface (HCI) relating to conveying useful information about an output Y from a tumbling mill 10 during operation and/or also conveying useful information about a corresponding internal state X in a tumbling mill during operation.

FIG. 1B shows another somewhat diagrammatic view of a system 320 including a tumbling mill 10. Thus, reference numeral 320 relates to a system including a mill 10 having a rotatable shell 20, as discussed in this document. The system 320 of FIG. 1B may include parts, and be configured, as described above in relation to FIGS. 1A and 2 and/or as described elsewhere in this document.

Whereas the mill user input/output interface 250, in the example illustrated in FIG. 1A, is coupled to the regulator 240 and the HCI 210 is a separate input/output interface coupled to the analysis apparatus 150, or monitoring module 150A, the system illustrated in FIG. 1B may provide an integrated HCI 210, 250, 210S. Thus, the input/output interface 210 of FIG. 1B may be configured to enable all the input and/or output described above in conjunction with interfaces 210 and 250.

Figure 1C:
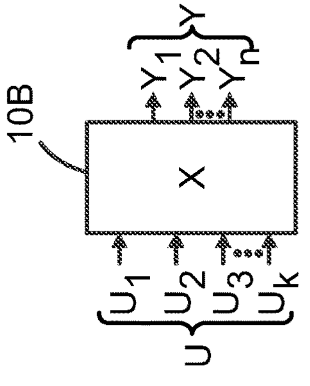
FIG. 1C is a block diagram illustrating a tumbling mill as a box receiving a number of inputs and generating a number of outputs.

FIG. 1C is a block diagram illustrating a tumbling mill as a box 10B receiving a number of inputs U1, . . . Uk, and generating a number of outputs Y1, . . . Yn. With reference to FIG. 1C it is noted that, for the purpose of analysis, a tumbling mill 10 may be regarded as a black box 10B having a number of input variables, referred to as input parameters U1, U2, U3, . . . Uk, where the index k is a positive integer. During operation of the black box tumbling mill 10B, the black box tumbling mill 10B has an internal state X, and it produces a number of output variables, also referred to as output parameters Y1, Y2, Y3, . . . Yn, where the index n is a positive integer.

The internal state X of the mill may be described, or indicated, by a number of internal state parameters X1, X2, X3, . . . , Xm, where the index m is a positive integer.

Using the terminology of linear algebra, the input variables U1, U2, U3, . . . Uk may be collectively referred to as an input vector U; the internal state parameters X1, X2, X3, . . . , Xm may be collectively referred to as an internal state vector X; and the output parameters Y1, Y2, Y3, . . . Yn may be collectively referred to as an output vector Y.

The internal state X of the mill 10, at a point in time termed r, can be referred to as X(r). That internal state X(r) can be described, or indicated, by a number of parameter values, the parameter values defining different aspects of the internal state X(r) of the mill 10 at time r.

The internal state X(r) of the black box tumbling mill 10B depends on the input vector U(r), and the output vector Y(r) depends on the internal state vector X(r). An aspect of the internal state X is the total amount of material 30 in the shell 20, and that total amount does not change instantly. Thus, during operation of the mill 10, the internal state X(r) can be regarded as a function of an earlier internal state X(r−1) and of the input U(r):

$X(r)=f_1(X(r-1), U(r))$, wherein X(r−1) denotes the internal state X of the mill 10 at a point in time preceding the point in time termed r.

Likewise, the output Y of the black box 10B can be regarded as a function of the internal state X:

$$Y(r)=f_2(X(r))$$

Figure 2:
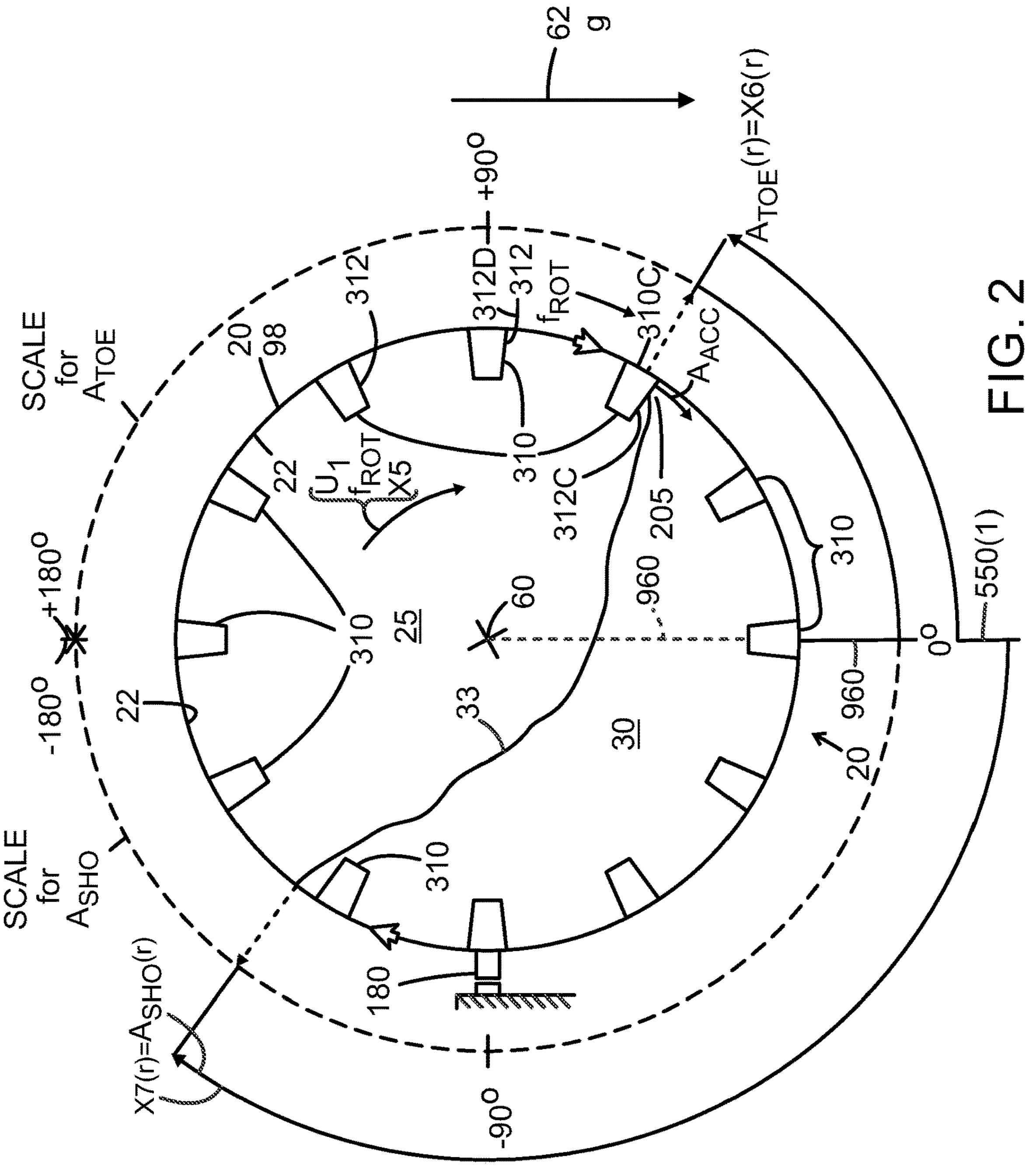
FIG. 2, shows another example of a cross-sectional view taken along line A-A of FIG. 1A

FIG. 2, being another example of a cross-sectional view taken along line A-A of FIG. 1A, shows a more detailed example of the mid-portion 98 of the shell 20. The shell 20 has an internal shell surface 22 facing the chamber 25, said internal shell surface 22 including a number of protrusions 310. According to some embodiments, there are provided at least two protrusions 310. The example shell 20, shown in FIG. 2, includes twelve protrusions 310 that are placed at equal distances from each other on the internal shell surface 22 of the shell 20. The protrusions 310 may be configured to engage and lift material 30 as the shell rotates about the axis 60. Thus, the protrusions 310 may be referred to as lifters 310. The charge material has a material surface 33, i.e. a boundary between air, in the rotatable shell 20, and material 30.

In FIG. 2, the shell 20 is shown during rotation in a clockwise direction at a speed of rotation $f_{ROT}$. Lifters 310 comprise structures such as internal formations, veins, bars, projections and the like which project from internal shell surface 22 towards a center of shell 20. A lifter 310, also referred to as protrusion 310, has a leading edge 312 that engages and lifts the material charge 30 as tumbling mill 10 is rotated about axis 60 such that the material falls upon itself within the interior chamber 25. In one example, lifters 310 comprise elongate bars which are mounted to internal shell surface wall 22 so as to at least partially line the interior shell surface 22 of mill 10. In other examples, lifters 310 are integrally formed as part of a single unitary body with internal shell surface wall 22. According to some embodiments, the leading edges 312 of the protrusions 310 are equidistant. Thus, referring to the example shell 20 shown in FIG. 2, including twelve protrusions 310 wherein each protrusion 310 has a leading edge 312, the angular distance between any two adjacent leading edges 312 is 30 degrees. In this context it is noted that, when there are L protrusions 310 on an internal shell surface 22, the L protrusions 310 being positioned such that the leading edges 312 of the protrusions 310 are equidistant, then the angular distance between any two adjacent leading edges 312 is 360/L degrees. Thus, when there are L protrusions 310 at angular positions on the internal shell surface 22, the L protrusions 310 being positioned in a mutually equidistant manner, then the angular distance between any two adjacent protrusions 310 is 360/L degrees.

In the example shown in FIG. 2, the position sensor 170 is mounted in a stationary manner so that it generates a position signal Ep having a sequence of position signal values PS for indicating momentary rotational positions of the shell 20. The position marker device 180 may be provided on an outer wall surface of the shell 20 such that, when the shell 20 rotates around the axis of rotation 60, the position marker 180 passes by the position sensor 170 once per revolution of the shell, thereby causing the position sensor 170 to generate a revolution marker signal value PS. The position sensor 170 may comprise a tachometer 170 that delivers e.g. one position signal pulse Ep per revolution.

The position marker device 180 may comprise a metal object. The metal object may be a bolt or a metal bracket, for example.

With reference to FIG. 1B, solid material particles 115 enter the shell 20 of the mill via the material feed inlet 100 and are subjected to breakage from collision with other particles 115, 30 and/or the internal shell surface 22 and/or balls during operation of the mill 10. The breakage results in solid material product particles 96, also referred to as solid material products or product particles 96. The solid material products exit the mill shell 20 via the output 200.

An important aspect of the grinding process is the breakage rate. The breakage rate depends e.g. on the collision frequency that solid feed material particles 115 are subjected to after entry into the rotating shell 20.

Another important aspect of the grinding process is the size distribution of the solid material product particles 96 resulting from collision. The size distribution may also be referred to as the appearance distribution function.

Yet another important aspect of the grinding process is the flow rate of solid material product particles 96 out of the mill shell 20. The particle transport out of the mill shell 20 may also be referred to as the product discharge rate.

Thus, in summary: Solid feed particles 115 enter the chamber 25 of mill 10 at a solid material feed rate $R_S$. The feed particles 115 have a first particle size distribution, also referred to as feed size distribution. The solid feed material may be measured as it is being fed into mill 10. A feed material analyzer 325 may be provided for generating a measurement value indicative of at least one feed material property U4. The at least one feed material property U4 may include a solid feed material size distribution. Thus a feed material size distribution may be estimated, e.g. by measurement. Alternatively, a solid feed material size distribution U4 may be predetermined. In some examples, the solid feed material size distribution U4 is known because of treatment and/or sorting before delivery of the solid feed material 110 to the conveyer belt 260.

Once received in the mill chamber 25 the received particles may be collectively referred to as charge material 30. While being in the mill chamber 25 the solid material particles 30 are subjected to breakage resulting in solid product particles 96 that are discharged from the chamber 25 via the output 200. The breakage causes a change of the size distribution of the particles.

Solid material product particles 96 flow out of the mill chamber 25 at a product discharge rate $R_{SDis}$. The product discharge rate $R_{SDis}$ may be measured, and it may be regarded as an output parameter Y1.

The discharged solid product particles 96 have a second particle size distribution, also referred to as product size distribution. The product size distribution may be measured, and values indicative of the product size distribution may be provided, e.g. as output parameter values Y2, Y3 etc.

Thus, feed particles 115, having a first particle size distribution or feed size distribution U4, are fed into the mill 10 at a solid material feed rate $R_S$, and product particles 96, having a product size distribution Y2 or second particle size distribution Y2, are discharged from the mill 10 at a product discharge rate $Y1=R_{SDis}$.

During transport of a feed particle 115 from the inlet 100 to the outlet 200, the feed particle 115 is transformed into a number of smaller product particles 96. This transformation is due to a comminution process that occurs during operation of the tumbling mill 10.

It is believed that the product size distribution depends on the feed size distribution, and the internal state(s) X of the mill 10 during the transport of received feed particles 115 from the feed input 100 until the discharge of output material 95 from the mill output 200 in the form of solid product particles 96.

Thus, the amount of breakage of a solid feed material particle 115 depends on the above mentioned breakage rate and the internal state X of the mill 10. The internal state X of the mill 10 determines i.a. the duration $T_C$ of the transport of received feed particles 115 from the feed input 100 until the discharge of output material 95 from the mill output 200. An average temporal duration of transport from feed input 100 to mill output 200 may be referred to as a duration $T_C$.

With reference to FIG. 1B, there is shown a cartesian co-ordinate system having three mutually perpendicular axes x, y and z. It is to be understood that, during operation of the mill 10, the material 30 travels in the positive direction of the x-axis from the input side 80 of the mill to the output side 90. Thus, whereas the material 30 is tumbled in the mill 10, the material 30 gradually also travels in a direction parallel to the axis of rotation of the mill, from the input side of the mill to the output side of the mill. However, different individual particles may travel that distance at mutually different speed. A mass of a small feed particle may be transported from the input side of the mill to the output side of the mill to thereafter be discharged via the mill output 200 comparatively fast e.g. because it will be small enough to pass through an exit grid after a shorter time, whereas the largest feed particles need more time in the mill to be ground into product particles small enough to pass through that same exit grid. Thus, a certain proportion of a large feed particle will remain in the mill for longer than a corresponding proportion of a small feed particle. During steady state operating conditions however, the mass flow into, through, and out of the mill 10 will be constant, or substantially constant. Thus, the transport of material 30 through the mill 10 may be discussed in terms of mass per time unit, e.g as measured in kilograms per minute or in metric tons per hour.

In this connection it is noted that the average temporal duration of the transport of feed particles 115 from feed input 100 to mill output 200, and the simultaneous transformation of those feed particles 115 into a number of smaller product particles 96, depends on the average speed of flow $v_{xA}$, in the direction of the x-axis, in the mill chamber 25.

Accordingly, at least under steady state conditions of the mill process, the average temporal duration of the transport of particles from feed input 100 to mill output 200 depends on the length of the mill chamber 25, in the x-direction, and the average speed of flow $v_{xA}$.

Figure 3:
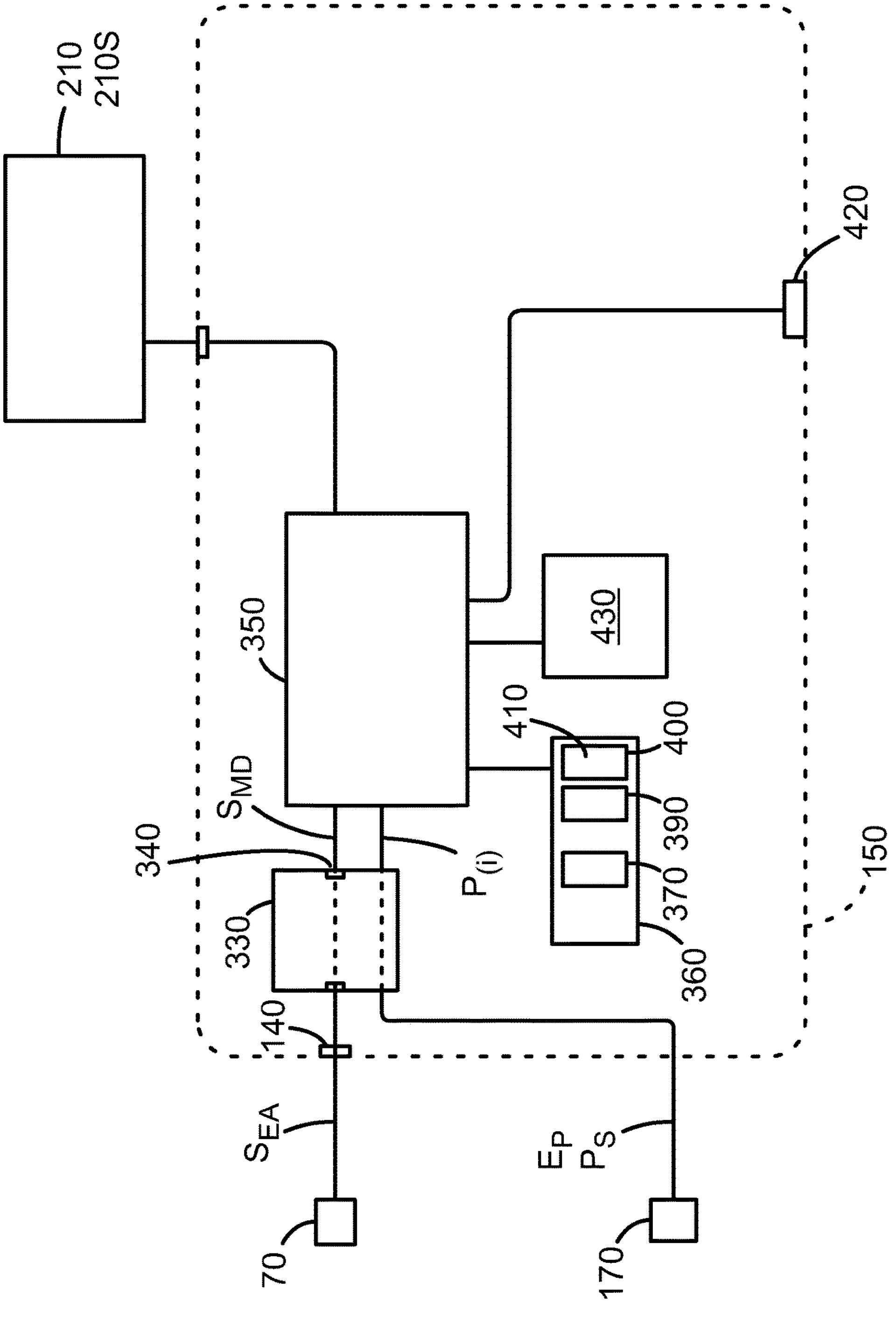
FIG. 3 is a schematic block diagram of an example of the analysis apparatus shown in FIG. 1.

FIG. 3 is a schematic block diagram of an example of the analysis apparatus 150 shown in FIG. 1. The analysis apparatus 150 has an input 140 for receiving the analogue vibration signal $S_{EA}$, from the vibration sensor 70. The input 140 is connected to an analogue-to-digital (A/D) converter 330. The A/D converter 330 samples the received analogue vibration signal $S_{EA}$ with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling. The digital measurement data signal $S_{MD}$ is delivered on a digital output 340 which is coupled to a data processing device 350.

With reference to FIG. 3, the data processing device 350 is coupled to a computer readable medium 360 for storing program code. A computer readable medium 360 may also be referred to as a memory 360. The program memory 360 is preferably a non-volatile memory. The memory 360 may be a read/write memory, i.e. enabling both reading data from the memory and writing new data onto the memory 360. According to an example, the program memory 360 is embodied by a FLASH memory. The program memory 360 may comprise a first memory segment 370 for storing a first set of program code 380 which is executable so as to control the analysis apparatus 150 to perform basic operations. The program memory 360 may also comprise a second memory segment 390 for storing a second set of program code 394. The second set of program code in the second memory segment 390 may include program code for causing the analysis apparatus 150 to process a detected signal. The signal processing may include processing for generating information indicative of an internal state of a tumbling mill, as discussed elsewhere in this document. Moreover, the signal processing may include control of the internal state of a tumbling mill, as discussed elsewhere in this document. Thus, the signal processing may include generating data indicative of an internal state of a tumbling mill, as disclosed in connection with embodiments of status parameter extractor 450 of e.g. FIGS. 5, 15 and/or 24.

The memory 360 may also include a third memory segment 400 for storing a third set of program code 410. The set of program code 410 in the third memory segment 400 may include program code for causing the analysis apparatus to perform a selected analysis function. When an analysis function is executed, it may cause the analysis apparatus to present a corresponding analysis result on user interface 210, 210S or to deliver the analysis result on a port 420.

The data processing device 350 is also coupled to a read/write memory 430 for data storage. Hence, the analysis apparatus 150 comprises the data processor 350 and program code for causing the data processor 350 to perform certain functions, including digital signal processing functions. When it is stated, in this document, that the apparatus 150 performs a certain function or a certain method, that statement may mean that the computer program runs in the data processing device 350 to cause the apparatus 150 to carry out a method or function of the kind described in this document.

The processor 350 may be a Digital Signal Processor. The Digital Signal Processor 350 may also be referred to as a DSP. Alternatively the processor 350 may be a Field Programmable Gate Array circuit (FPGA). Hence, the computer program may be executed by a Field Programmable Gate Array circuit (FPGA). Alternatively, the processor 350 may comprise a combination of a processor and an FPGA. Thus, the processor may be configured to control the operation of the FPGA.

Figure 4:
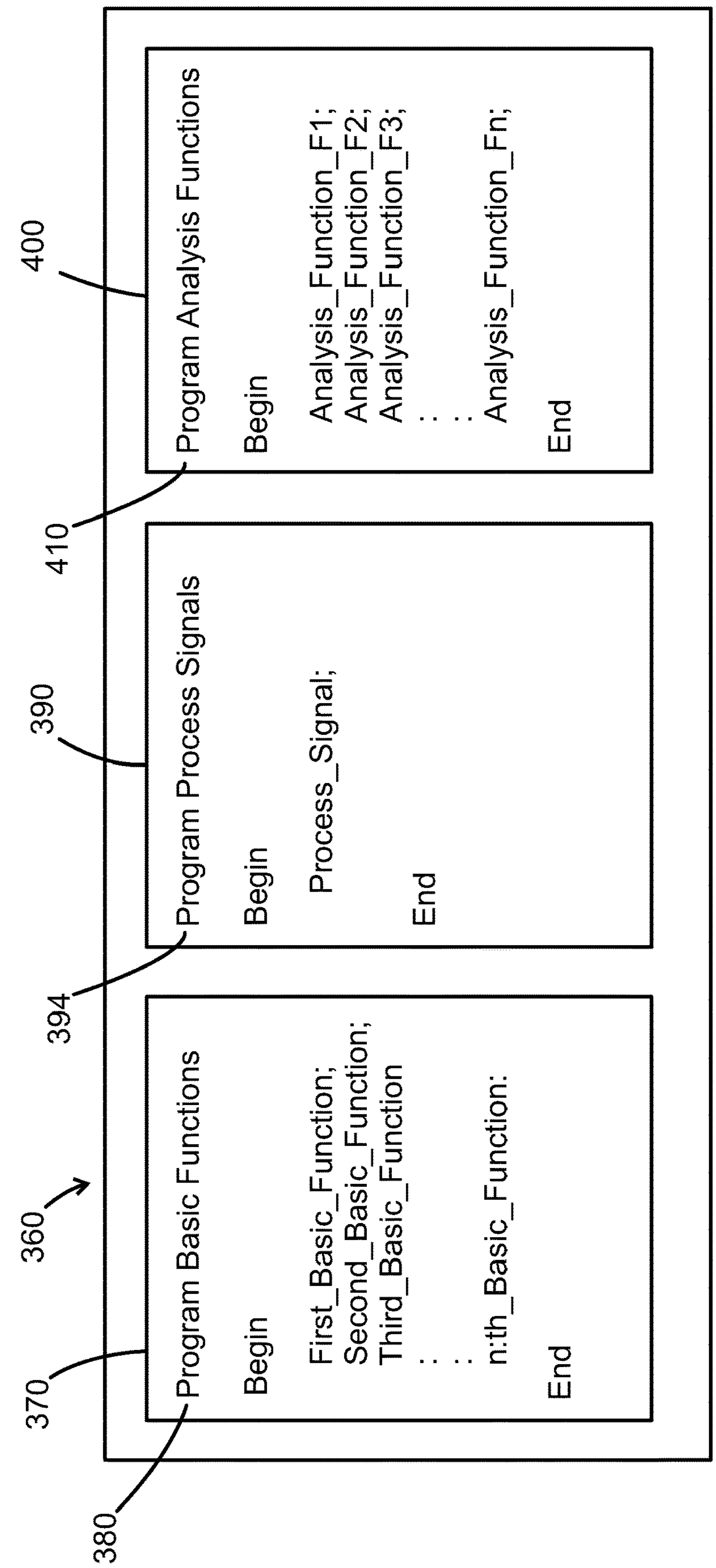
FIG. 4 is a simplified illustration of the program memory and its contents.

FIG. 4 is a simplified illustration of the program memory 360 and its contents. The simplified illustration is intended to convey understanding of the general idea of storing different program functions in memory 360, and it is not necessarily a correct technical teaching of the way in which a program would be stored in a real memory circuit. The first memory segment 370 stores program code for controlling the analysis apparatus 150 to perform basic operations. Although the simplified illustration of FIG. 4 shows pseudo code, it is to be understood that the program code may be constituted by machine code, or any level program code that can be executed or interpreted by the data processing device 350 (FIG. 3).

The second memory segment 390, illustrated in FIG. 4, stores a second set of program code 394. The program code 394 in segment 390, when run on the data processing device 350, will cause the analysis apparatus 150 to perform a function, such as a digital signal processing function. The function may comprise an advanced mathematical processing of the digital measurement data signal $S_{MD}$.

A computer program for controlling the function of the analysis apparatus 150 may be downloaded from a server computer. This means that the program-to-be-downloaded is transmitted to over a communications network. This can be done by modulating a carrier wave to carry the program over the communications network. Accordingly the downloaded program may be loaded into a digital memory, such as memory 360 (See FIGS. 3 and 4). Hence, a program 380 and/or a signal processing program 394 and/or an analysis function program 410 may be received via a communications port, such as port 420 (FIG. 1A and/or FIG. 1B & FIG. 3), so as to load it into program memory 360.

Accordingly, this document also relates to a computer program product, such as program code 380 and/or program code 394 and/or program code 410 loadable into a digital memory of an apparatus. The computer program product comprises software code portions for performing signal processing methods and/or analysis functions when said product is run on a data processing unit 350 of an apparatus 150. The term "run on a data processing unit" means that the computer program plus the data processing device 350 carries out a method of the kind described in this document.

The wording "a computer program product, loadable into a digital memory of a analysis apparatus" means that a computer program can be introduced into a digital memory of an analysis apparatus 150 so as achieve an analysis apparatus 150 programmed to be capable of, or adapted to, carrying out a method of a kind described in this document. The term "loaded into a digital memory of an apparatus" means that the apparatus programmed in this way is capable of, or adapted to, carrying out a function described in this document, and/or a method described in this document. The above mentioned computer program product may also be a program 380, 394, 410 loadable onto a computer readable medium, such as a compact disc or DVD. Such a computer readable medium may be used for delivery of the program 380, 394, 410 to a client. As indicated above, the computer program product may, alternatively, comprise a carrier wave which is modulated to carry the computer program 380, 394, 410 over a communications network. Thus, the computer program 380, 394, 410 may be delivered from a supplier server to a client having an analysis apparatus 150 by downloading over the Internet.

Figure 5:
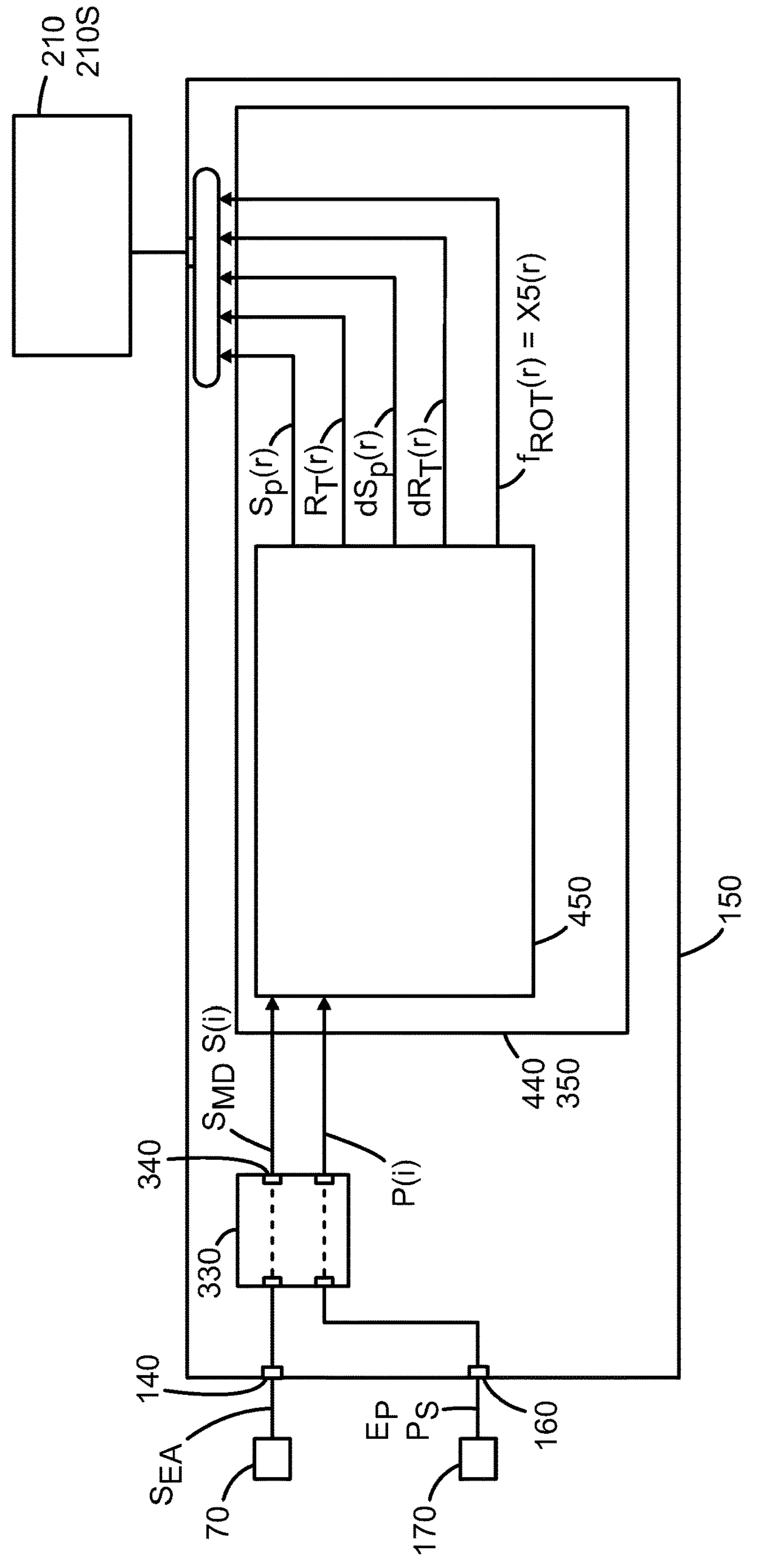
FIG. 5 is a block diagram illustrating an example of the analysis apparatus.

FIG. 5 is a block diagram illustrating an example of the analysis apparatus 150. In the FIG. 5 example, some of the functional blocks represent hardware and some of the functional blocks either may represent hardware, or may represent functions that are achieved by running program code on the data processing device 350, as discussed in connection with FIGS. 3 and 4.

The apparatus 150 in FIG. 5 shows an example of the analysis apparatus 150 shown in FIG. 1A and/or FIG. 1B and/or FIG. 3. For the purpose of simplifying understanding, FIG. 5 also shows some peripheral devices coupled to the apparatus 150. The vibration sensor 70 is coupled to the input 140 of the analysis apparatus 150 to deliver an analogue measuring signal $S_{EA}$, also referred to as vibration signal $S_{EA}$, to the analysis apparatus 150. Moreover, the position sensor 170 is coupled to the second input 160. Thus, the position sensor 170 delivers the position signal Ep, dependent on the rotational position of the shell 20, to the second input 160 of the analysis apparatus 150.

The input 140 is connected to an analogue-to-digital (A/D) converter 330. The A/D converter 330 samples the received analogue vibration signal $S_{EA}$ with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling. The digital measurement data signal $S_{MD}$ is delivered on a digital output 340, which is coupled to a data processing unit 440. The data processing unit 440 comprises functional blocks illustrating functions that are performed. In terms of hardware, the data processing unit 440 may comprise the data processing unit 350, the program memory 360, and the read/write memory 430 as described in connection with FIGS. 3 and 4 above. Hence, the analysis apparatus 150 of FIG. 5 may comprise the data processing unit 440 and program code for causing the analysis apparatus 150 to perform certain functions.

The digital measurement data signal $S_{MD}$ is processed in parallel with the position signal Ep. Hence, the A/D converter 330 may be configured to sample the position signal Ep simultaneously with the sampling of the analogue vibration signal $S_{EA}$. The sampling of the position signal Ep may be performed using that same sampling frequency $f_S$ so as to generate a digital position signal $E_{PD}$ wherein the amplitude of each sample P(i) depends on the amplitude of the received analogue position signal Ep at the moment of sampling. As mentioned above, the analogue position signal Ep may have a marker signal value $P_S$, e.g. in the form of an electric pulse having an amplitude edge that can be accurately detected and indicative of a certain rotational position of the monitored shell 20. Thus, whereas the analogue position marker signal $P_S$ has an amplitude edge that can be accurately detected, the digital position signal $E_{PD}$ will switch from a first value, e.g. "0" (zero), to a second value, e.g. "1" (one), at a distinct time.

Hence, the A/D converter 330 may be configured to deliver a sequence of pairs of measurement values S(i) associated with corresponding position signal values P(i). The letter "i" in S(i) and P(i) denotes a point in time, i.e. a sample number. Hence, the time of occurrence of a rotational reference position of said rotating shell can be detected by analysing a time sequence of the position signal values P(i) and identifying the sample P(i) indicating that the digital position signal $E_{PD}$ has switched from the first value, e.g. "0" (zero), to the second value, e.g. "1" (one).

Figure 6B:
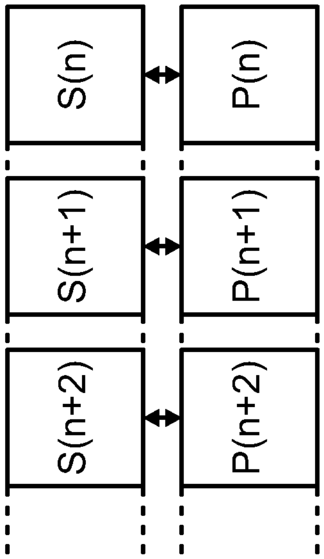
FIG. 6B is an illustration of a sequence of the signal pair S(i) and P(i) as delivered by the A/D converter.
Figure 6A:
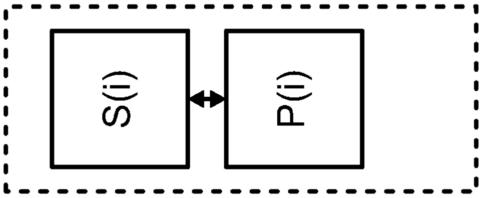
FIG. 6A is an illustration of a signal pair S(i) and P(i) as delivered by an A/D converter.

FIG. 6A is an illustration of a signal pair S(i) and P(i) as delivered by the A/D converter 330.

FIG. 6B is an illustration of a sequence of the signal pair S(i) and P(i) as delivered by the A/D converter 330. A first signal pair comprises a first vibration signal amplitude value S(n), associated with the sample moment "n", being delivered simultaneously with a first position signal value P(n), associated with the sample moment "n". It is followed by a second signal pair comprising a second vibration signal amplitude value S(n+1), associated with the sample moment "n+1", which is delivered simultaneously with a second position signal value P(n+1), associated with the sample moment "n+1", and so on.

With reference to FIG. 5, the signal pair S(i) and P(i) is delivered to a status parameter extractor 450. The status parameter extractor 450 is configured to generate an amplitude peak value $S_P(r)$ based on a time sequence of measurement sample values S(i). The amplitude peak value $S_P(r)$ may be dependent on an impact force $F_{IMP}$ generated when a projection 310 on an internal shell surface of the rotating shell interacts with a toe portion 205 of the charge material 30 (See FIG. 2). In this connection, it is noted that the surface 33 of material 30 will deviate from a horizontal orientation due to a combination of centrifugal force and gravitational force when the shell 20 rotates. The toe portion 205 of the charge material 30 is at the lower edge of the surface 33, as illustrated in FIG. 2.

The status parameter extractor 450 is also configured to generate a temporal relation value $R_T(j)$, also referred to as $R_T(r)$, based on a temporal duration ($T_D$) between time of occurrence of the amplitude peak value $S_P(r)$ and time of occurrence of a rotational reference position of said rotating shell. As mentioned above, the time of occurrence of a rotational reference position of said rotating shell can be detected by analysing a time sequence of the position signal values P(i) and identifying a sample P(i) indicating that the digital position signal $E_{PD}$ has switched from the first value, e.g. "0" (zero), to the second value, e.g. "1" (one).

Figure 7:
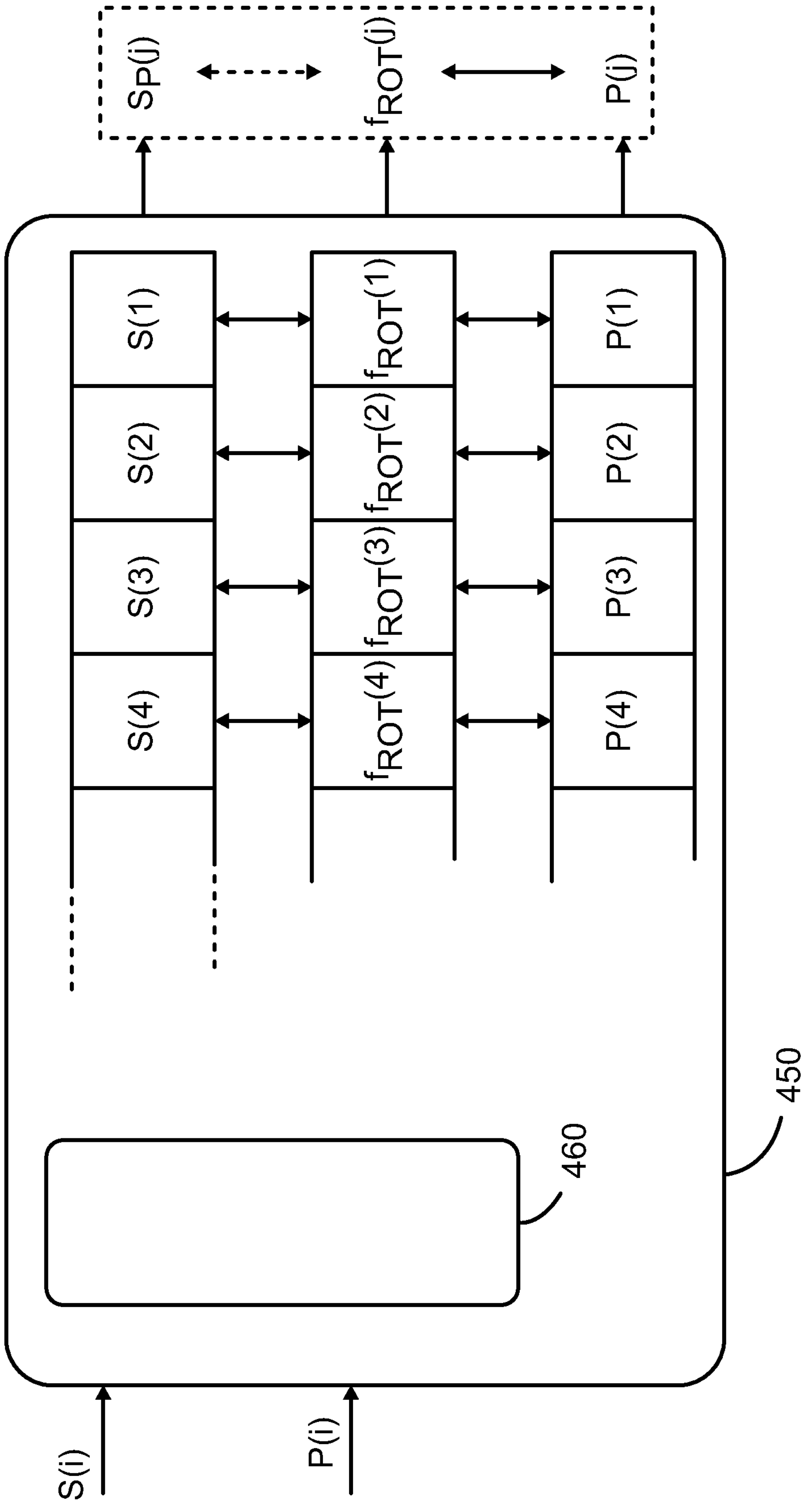
FIG. 7 is a block diagram that illustrates an example of a part of a status parameter extractor.

FIG. 7 is a block diagram that illustrates an example of a part of a status parameter extractor 450. According to an example the status parameter extractor 450 comprises a memory 460. The status parameter extractor 450 is adapted to receive a sequence of measurement values S(i) and a sequence of positional signals P(i), together with temporal relations there-between, and the status parameter extractor 450 is adapted to provide a sequence of temporally coupled values S(i), $f_{ROT}(i)$, and P(i). Thus, an individual measurement value S(i) is associated with a corresponding speed value $f_{ROT}(i)$, the speed value $f_{ROT}(i)$ being indicative of the rotational speed of the shell 20 at the time of detection of the associated individual measurement value S(i). This is described in detail below with reference to FIGS. 8-13.

FIG. 8 is a simplified illustration of an example of the memory 460 and its contents, and columns #01, #02, #03, #04 and #05, on the left hand side of the memory 460 illustration, provide an explanatory image intended to illustrate the temporal relation between the time of detection of the encoder pulse signals P(i) (See column #02) and the corresponding vibration measurement values S(i) (See column #03).

As mentioned above, the analogue-to-digital converter 330 samples the analogue electric measurement signal $S_{EA}$ at an initial sampling frequency $f_S$ so as to generate a digital measurement data signal $S_{MD}$. The encoder signal P may also be detected with substantially the same initial temporal resolution $f_S$, as illustrated in the column #02 of FIG. 8.

Column #01 illustrates the progression of time as a series of time slots, each time slot having a duration $dt=1/f_{Sample}$; wherein $f_{Sample}$ is a sample frequency having an integer relation to the initial sample frequency $f_S$ with which the analogue electric measurement signal $S_{EA}$ is sampled. According to a preferred example, the sample frequency $f_{Sample}$ is the initial sample frequency $f_S$. According to another example the sample frequency $f_{Sample}$ is a first reduced sampling frequency $f_{SR1}$, which is reduced by an integer factor M as compared to the initial sampling frequency $f_S$.

In column #02 of FIG. 8 each positive edge of the encoder signal P is indicated by a "1". In this example a positive edge of the encoder signal P is detected in the 3:rd, the 45:th, the 78:th time slot and in the 98:th time slot, as indicated in column #02. According to another example, the negative edges of the positional signal are detected, which provides an equivalent result to detecting the positive edges. According to yet another example both the positive and the negative edges of the positional signal are detected, so as to obtain redundancy by enabling the later selection of whether to use the positive or the negative edge.

Column #03 illustrates a sequence of vibration sample values S(i). Column #05 illustrates the corresponding sequence of vibration sample values S(j), when an integer decimation is performed. Hence, when integer decimation is performed by this stage, it may e.g. be set up to provide an integer decimation factor M=10, and as illustrated in FIG. 8, there will be provided one vibration sample value S(j) (See column #05 in FIG. 8) for every ten samples S(i) (See column #03 in FIG. 8). According to an example, a very accurate position and time information PT, relating to the decimated vibration sample value S(j), is maintained by setting the PositionTime signal in column #04 to value PT=3, so as to indicate that the positive edge (see col #02) was detected in time slot #03. Hence, the value of the PositionTime signal, after the integer decimation is indicative of the time of detection of the position signal edge P in relation to sample value S(1).

In the example of FIG. 8, the amplitude value of the PositionTime signal at sample i=3 is PT=3, and since decimation factor M=10 so that the sample S(1) is delivered in time slot 10, this means that the edge was detected M−PT=10−3=7 slots before the slot of sample S(1).

Accordingly, the apparatus 150 may operate to process the information about the positive edges of encoder signal P(i) in parallel with the vibration samples S(i) in a manner so as to maintain the time relation between positive edges of the encoder signal P(i) and corresponding vibration sample values S(i), and/or integer decimated vibration sample values S(j), through the above mentioned signal processing from detection of the analogue signals to the establishing of the speed values $f_{ROT}$.

Figure 9:
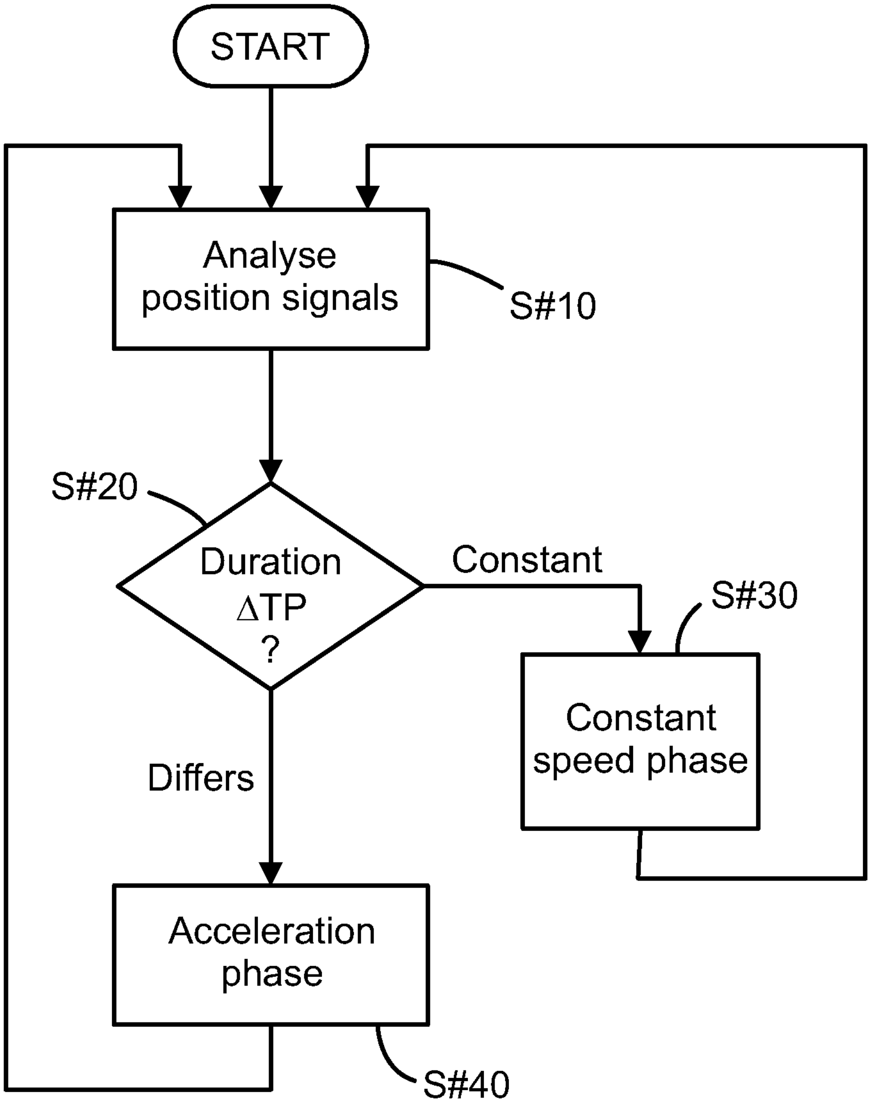
FIG. 9 is a flow chart illustrating an example of a method of operating the status parameter extractor of FIG. 7.

FIG. 9 is a flow chart illustrating an example of a method of operating the status parameter extractor 450 of FIG. 7.

According to an example, the status parameter extractor 450 analyses (Step S #10) the temporal relation between three successively received position signals, in order to establish whether the monitored rotational shell 20 is in a constant speed phase or in an acceleration phase. This analysis may be performed on the basis of information in memory 460, as described above (See FIG. 8).

If the analysis reveals that there is an identical number of time slots between the position signals, status parameter extractor 450 concludes (in step #20) that the speed is constant, in which case step S #30 is performed.

In step S #30, the status parameter extractor 450 may calculate the duration between two successive position signals, by multiplication of the duration of a time slot dt=1/fs with the number of time slots between the two successive position signals. When the position signal is provided once per full revolution of the monitored shell 20, the speed of revolution may be calculated as $$V=1/(n_{diff}*dt),$$

wherein $n_{diff}$=the number of time slots between the two successive position signals. During constant speed phase, all of the sample values S(j) (see column #05 in FIG. 8)

associated with the three analyzed position signals may be assigned the same speed value $f_{ROT}$=V=1/($n_{diff}$*dt), as defined above. Thereafter, step S #10 may be performed again on the next three successively received position signals. Alternatively, when step S #10 is repeated, the previously third position signal P3 will be used as the first position signal P1 (i.e. P1:=P3), so that it is ascertained whether any change of speed is at hand.

If the analysis (Step S #10) reveals that the number of time slots between the 1:st and the 2:nd position signals differs from the number of time slots between the 2:nd and 3:rd position signals, the status parameter extractor 450 concludes, in step S #20) that the monitored rotational shell 20 is in an acceleration phase. The acceleration may be positive, i.e. an increase in rotational speed, or the acceleration may be negative, i.e. a decrease in rotational speed also referred to as retardation.

In a next step S #40, the status parameter extractor 450 operates to establish momentary speed values during acceleration phase, and to associate each one of the measurement data values S(j) with a momentary speed value Vp which is indicative of the speed of rotation of the monitored mill shell at the time of detection of the sensor signal (SEA) value corresponding to that data value S(j).

According to an example the status parameter extractor 450 operates to establish momentary speed values by linear interpolation. According to another example the status parameter extractor 450 operates to establish momentary speed values by non-linear interpolation.

Figure 10:
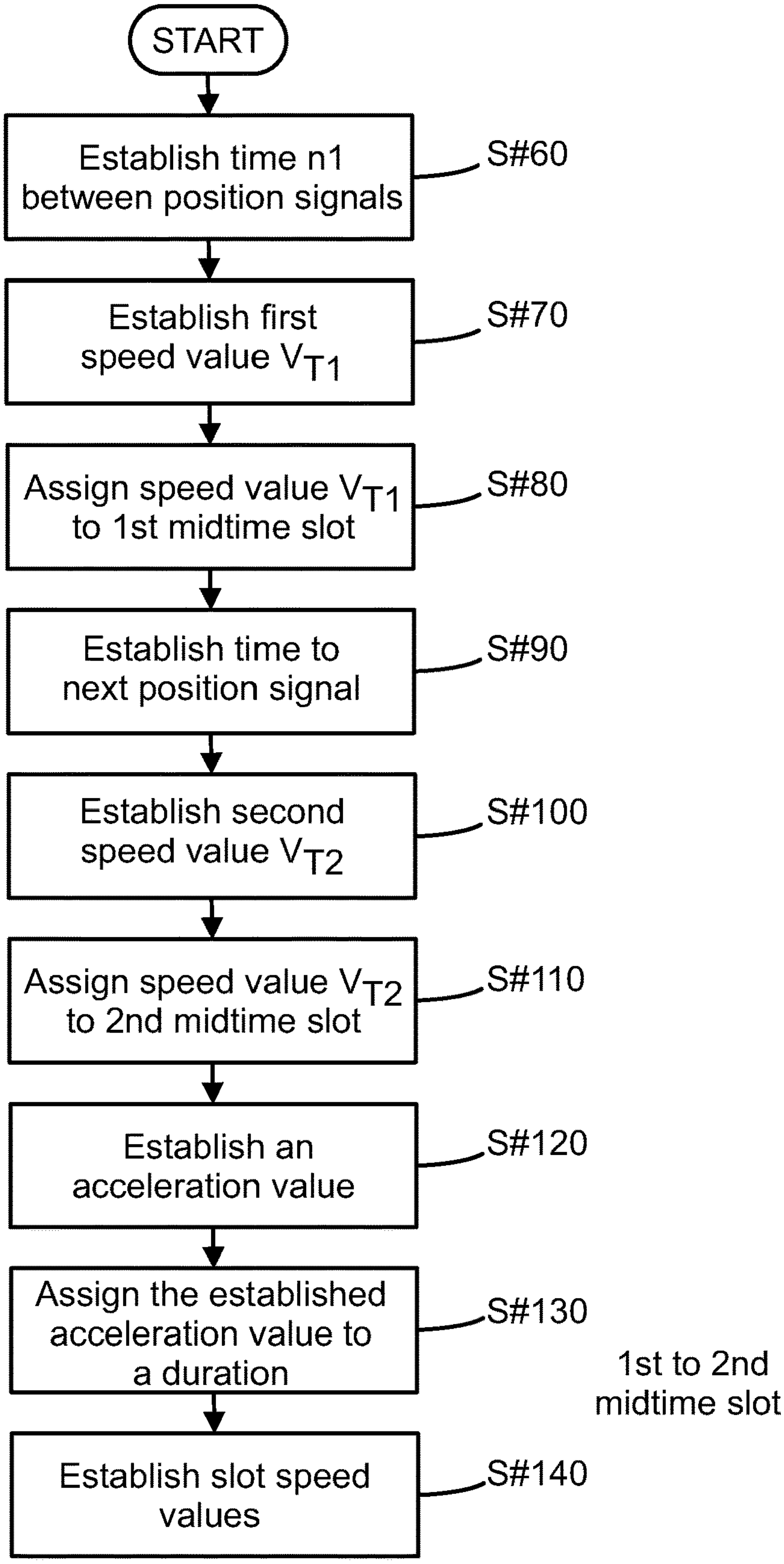
FIG. 10 is a flow chart illustrating an example of a method for performing step S #40 of FIG. 9.

FIG. 10 is a flow chart illustrating an example of a method for performing step S #40 of FIG. 9. According to an example, the acceleration is assumed to have a constant value for the duration between two mutually adjacent position indicators P (See column #02 in FIG. 8). Hence, when the position indicator P is delivered once per revolution, and the gear ratio is 1/1: then the angular distance travelled by the rotating shell 20 between two mutually adjacent position indicators P is one (1) revolution, which may also be expressed as 360 degrees, and the duration is T=$n_{diff}$*dt, where $n_{diff}$ is the number of slots of duration dt between the two mutually adjacent position indicators P.

With reference to FIG. 8, a first position indicator P was detected in slot i1=#03 and the next position indicator P was detected in slot i2=#45. Hence, the duration was $n_{diff1}$=i2−i1=45−3=42 time slots.

Hence, in step S #60 (See FIG. 10 in conjunction with FIG. 8), the status parameter extractor 450 operates to establish a first number of slots $n_{diff1}$ between the first two successive position signals P1 and P2, i.e. between position signal P(i=3) and position signal P(i=45).

In step S #70, the status parameter extractor 450 operates to calculate a first speed of revolution value VT1. The first speed of revolution value VT1 may be calculated as $$VT1=1/(n_{diff1}*dt),$$

wherein VT1 is the speed expressed as revolutions per second, $n_{diff1}$=the number of time slots between the two successive position signals; and dt is the duration of a time slot, expressed in seconds.

Since the acceleration is assumed to have a constant value for the duration between two mutually adjacent position indicators P, the calculated first speed value VT1 is assigned to the time slot in the middle between the two successive position signals (step S #80).

Hence, in this example wherein first position indicator P1 was detected in slot $i_{P1}$=#03 and the next position indicator P2 was detected in slot $i_{P2}$=#45; the first mid time slot is slot $i_{P1\text{-}2}=i_{P1}+(i_{P2}-i_{P1})/2=3+(45-3)/2=3+21)=24$.

Hence, in step S #80 the first speed of revolution value VT1 may be assigned to a time slot (e.g. time slot i=24) representing a time point which is earlier than the time point of detection of the second position signal edge P(i=45), see FIG. 8.

The retro-active assigning of a speed value to a time slot representing a point in time between two successive position signals advantageously enables a significant reduction of the inaccuracy of the speed value. Whereas state of the art methods of attaining a momentary rotational speed value of a tumbling mill shell 20 may have been satisfactory for establishing constant speed values at several mutually different speeds of rotation, the state of the art solutions appear to be unsatisfactory when used for establishing speed values for a rotational tumbling mill shell 20 during an acceleration phase.

By contrast, the methods according to examples disclosed in this document enable the establishment of speed values with an advantageously small level of inaccuracy even during an acceleration phase.

In a subsequent step S #90, the status parameter extractor 450 operates to establish a second number of slots $n_{diff2}$ between the next two successive position signals. In the example of FIG. 8, that is the number of slots $n_{diff2}$ between slot 45 and slot 78, i.e. $n_{diff2}$=78−45=33.

In step S #100, the status parameter extractor 450 operates to calculate a second speed of revolution value VT2. The second speed of revolution value VT2 may be calculated as $$VT2=Vp61=1/(n_{diff2}*dt),$$

wherein $n_{diff2}$=the number of time slots between the next two successive position signals P2 and P3. Hence, in the example of FIG. 8, $n_{diff2}$=33 i.e. the number of time slots between slot 45 and slot 78.

Since the acceleration may be assumed to have a constant value for the duration between two mutually adjacent position indicators P, the calculated second speed value VT2 is assigned (Step S #110) to the time slot in the middle between the two successive position signals.

Hence, in the example of FIG. 8, the calculated second speed value VT2 is assigned to slot 61, since 45+(78−45)/2=61.5. Hence the speed at slot 61 is set to $$V(61):=VT2.$$

Hence, in this example wherein one position indicator P was detected in slot i2=#45 and the next position indicator P was detected in slot i3=#78; the second mid time slot is the integer part of:

$$i_{P2\text{-}3}=i_{P2}+(i_{P3}-i_{P2})/2=45+(78-45)/2=45+33/2-61.5$$

Hence, slot 61 is the second mid time slot $i_{P2\text{-}3}$.

Hence, in step S #110 the second speed value VT2 may advantageously be assigned to a time slot (e.g. time slot i=61) representing a time point which is earlier than the time point of detection of the third position signal edge P(i=78), see FIG. 8. This feature enables a somewhat delayed real-time monitoring of the rotational speed while achieving an improved accuracy of the detected speed.

In the next step S #120, a first acceleration value is calculated for the relevant time period. The first acceleration value may be calculated as:

$$a12=(VT2-VT1)/((i_{VT2}-i_{VT1})*dt)$$

In the example of FIG. 8, the second speed value VT2 was assigned to slot 61, so $i_{VT2}$=61 and first speed value VT1 was assigned to slot 24, so $i_{VT1}$=24.

Hence, since dt=1/fs, the acceleration value may be set to $$a12=fs*(VT2-VT1)/(i_{VT2}-i_{VT1})$$

for the time period between slot 24 and slot 60, in the example of FIG. 8.

In the next step S #130, the status parameter extractor 450 operates to associate the established first acceleration value a12 with the time slots for which the established acceleration value a12 is valid. This may be all the time slots between the slot of the first speed value VT1 and the slot of the second speed value VT2. Hence, the established first acceleration value a12 may be associated with each time slot of the duration between the slot of the first speed value VT1 and the slot of the second speed value VT2. In the example of FIG. 8 it is slots 25 to 60. This is illustrated in column #07 of FIG. 8.

In the next step S #140, the status parameter extractor 450 operates to establish speed values for measurement values s(j) associated with the duration for which the established acceleration value is valid. Hence speed values are established for each time slot which is associated with a measurement value s(j), and associated with the established first acceleration value a12.

During linear acceleration, i.e. when the acceleration a is constant, the speed at any given point in time is given by the equation:

$$V(i)=V(i-1)+a*dt,$$

wherein

V(i) is the momentary speed at the point of time of slot i

V(i−1) is the momentary speed at the point of time of the slot immediately preceding slot i a is the acceleration dt is the duration of a time slot According to an example, the speed for each slot from slot 25 to slot 60 may be calculated successively in this manner, as illustrated in column #08 in FIG. 8. Hence, momentary speed values Vp to be associated with the detected measurement values Se(25), Se(26), Se(27) . . . Se(59), and Se(60) associated with the acceleration value a12 may be established in this manner (See time slots 25 to 60 in column #08 in conjunction with column #03 and in conjunction with column #07 in FIG. 8).

Hence, momentary speed values S(j) [See column #05] to be associated with the detected measurement values S(3), S(4), S(5), and S(6) associated with the acceleration value a12 may be established in this manner.

According to another example, the momentary speed for the slot 30 relating to the first measurement value s(j)=S(3) may be calculated as:

$$V(i=30)=Vp30=VT1+a*(30-24)*dt=Vp24+a*6*dt$$

The momentary speed for the slot 40 relating to the first measurement value s(j)=S(4) may be calculated as:

$$V(i=40)=Vp40=VT1+a*(40-24)*dt=Vp40+a*16*dt$$

or as:

$$V(i=40)=Vp40=V(30)+(40-30)*dt=Vp30+a*10*dt$$

The momentary speed for the slot 50 relating to the first measurement value s(j)=S(5) may then subsequently be calculated as:

$$V(i=50)=Vp50=V(40)+(50-40)*dt=Vp40+a*10*dt$$

and the momentary speed for the slot 60 relating to the first measurement value s(j)=S(6) may then subsequently be calculated as:

$$V(i=60)=Vp50+a*10*dt$$

When measurement sample values S(i) [See column #03 in FIG. 8] associated with the established acceleration value have been associated with a momentary speed value, as described above, an array of data including a time sequence of measurement sample values S(i), each value being associated with a speed value V(i), $f_{ROT}$(i), may be delivered on an output of said status parameter extractor 450

Alternatively, if a decimation of sample rate is desired, it is possible to do as follows: When measurement sample values S(j) [See column #05 in FIG. 8] associated with the established acceleration value have been associated with a momentary speed value, as described above, an array of data including a time sequence of measurement sample values S(j), each value being associated with a speed value V(j), $f_{ROT}$(j), may be delivered on an output of said status parameter extractor 450

Figure 11:
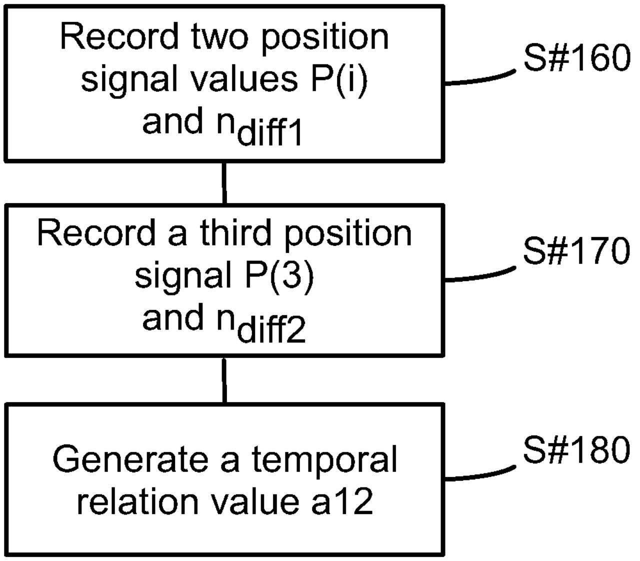
FIG. 11 is a flow chart illustrating another example of a method.

With reference to FIG. 11, another example of a method is described. According to this example, the status parameter extractor 450 operates to record (see step S #160 in FIG. 11) a time sequence of position signal values P(i) of said position signal (Ep) such that there is a first temporal relation $n_{diff1}$ between at least some of the recorded position signal values (P(i)), such as e.g. between a first position signal value P1(i) and a second position signal value P2(i). According to an example, the second position signal value P2(i) is received and recorded in a time slot (i) which arrives $n_{diff1}$ slots after the reception of the first position signal value P1(i) (see step S #160 in FIG. 11). Then the third position signal value P3(i) is received and recorded (see step S #170 in FIG. 11) in a time slot (i) which arrives $n_{diff2}$ slots after the reception of the second position signal value P2(i).

As illustrated by step S #180 in FIG. 11, the status parameter extractor 450 may operate to calculate a relation value $$a12=n\text{diff1}/n\text{diff2}$$

If the relation value a12 equals unity, or substantially unity, then the status parameter extractor 450 operates to establish that the speed is constant, and it may proceed with calculation of speed according to a constant speed phase method.

If the relation value a12 is higher than unity, the relation value is indicative of a percentual speed increase.

If the relation value a12 is lower than unity, the relation value is indicative of a percentual speed decrease.

The relation value a12 may be used for calculating a speed V2 at the end of the time sequence based on a speed V1 at the start of the time sequence, e.g. as $$V2=a12*V1$$

Figure 12:
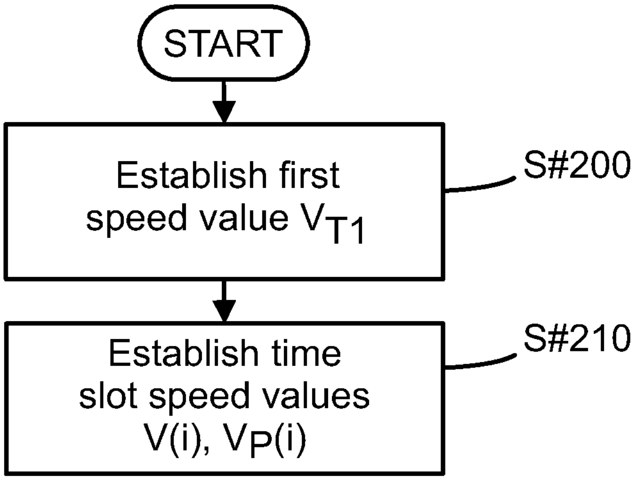
FIG. 12 is a flow chart illustrating another example of a method for performing step S #40 of FIG. 9.

FIG. 12 is a flow chart illustrating an example of a method for performing step S #40 of FIG. 9. According to an example, the acceleration is assumed to have a constant value for the duration between two mutually adjacent position indicators P (See column #02 in FIG. 8). Hence, when the position indicator P is delivered once per revolution, and the gear ratio is 1/1: then the angular distance travelled between two mutually adjacent position indicators P is 1 revolution, which may also be expressed as 360 degrees, and the duration is T=n*dt, where n is the number of slots of duration dt between the first two mutually adjacent position indicators P1 and P2.

In a step S #200, the first speed of revolution value VT1 may be calculated as $$VT1=1/(n_{diff1}*dt),$$

wherein VT1 is the speed expressed as revolutions per second, ndiff1=the number of time slots between the two successive position signals; and dt is the duration of a time slot, expressed in seconds. The value of dt may e.g be the inverse of the initial sample frequency fs.

Since the acceleration is assumed to have a constant value for the duration between two mutually adjacent position indicators P, the calculated first speed value VT1 is assigned to the first mid time slot in the middle between the two successive position signals P(i) and P(i+ndiff1).

In a step S #210, a second speed value VT2 may be calculated as $$VT2=1/(n\mathrm{diff}2*dt),$$

wherein VT2 is the speed expressed as revolutions per second, ndiff2=the number of time slots between the two successive position signals; and dt is the duration of a time slot, expressed in seconds. The value of dt may e.g. be the inverse of the initial sample frequency fs.

Since the acceleration is assumed to have a constant value for the duration between two mutually adjacent position indicators P, the calculated second speed value VT2 is assigned to the second mid time slot in the middle between the two successive position signals P(i+ndiff1) and P(i+ndiff1+ndiff2).

Thereafter, the speed difference $V_{Delta}$ may calculated as $$V_{Delta}=VT-VT1$$

This differential speed $V_{Delta}$ value may be divided by the number of time slots between the second mid time slot and the first mid time slot. The resulting value is indicative of a speed difference dV between adjacent slots. This, of course, assumes a constant acceleration, as mentioned above.

The momentary speed value to be associated with selected time slots may then be calculated in dependence on said first speed of revolution value VT1, and the value indicative of the speed difference between adjacent slots.

When the measurement sample values S(i), associated with time slots between the first mid time slot and the second mid time slot, have been associated with a momentary speed value, as described above, an array of data including a time sequence of measurement sample values S(i), each value being associated with a speed value V(i) is delivered on an output of said status parameter extractor 450. The momentary speed value V(i) may also be referred to as $f_{ROT}(i)$.

In summary, according to some examples, a first momentary speed value VT1 may be established in dependence of the angular distance delta-$FI_{p1-p2}$ between a first positional signal P1 and a second positional signal P2, and in dependence of the corresponding duration delta-$T_{p1-p2}=t_{P2}-t_{P1}$.

Thereafter, a second momentary speed value VT2 may be established in dependence of the angular distance delta-$FI_{p2-p3}$ between the second positional signal P2 and a third positional signal P3, and in dependence of the corresponding duration delta-$T_{p2-p3}=t_{P2}-t_{P1}$.

Thereafter, momentary speed values for the rotational shell 20 may be established by interpolation between the first momentary speed value VT1 and the second momentary speed value VT2.

In other words, according to examples, two momentary speed values VT1 and VT2 may be established based on the angular distances delta-$FI_{p1-p2}$, delta-$FI_{p2-p3}$ and the corresponding durations between three consecutive position signals, and thereafter momentary speed values for the rotational shell 20 may be established by interpolation between the first momentary speed value VT1 and the second momentary speed value VT2.

Figure 13:
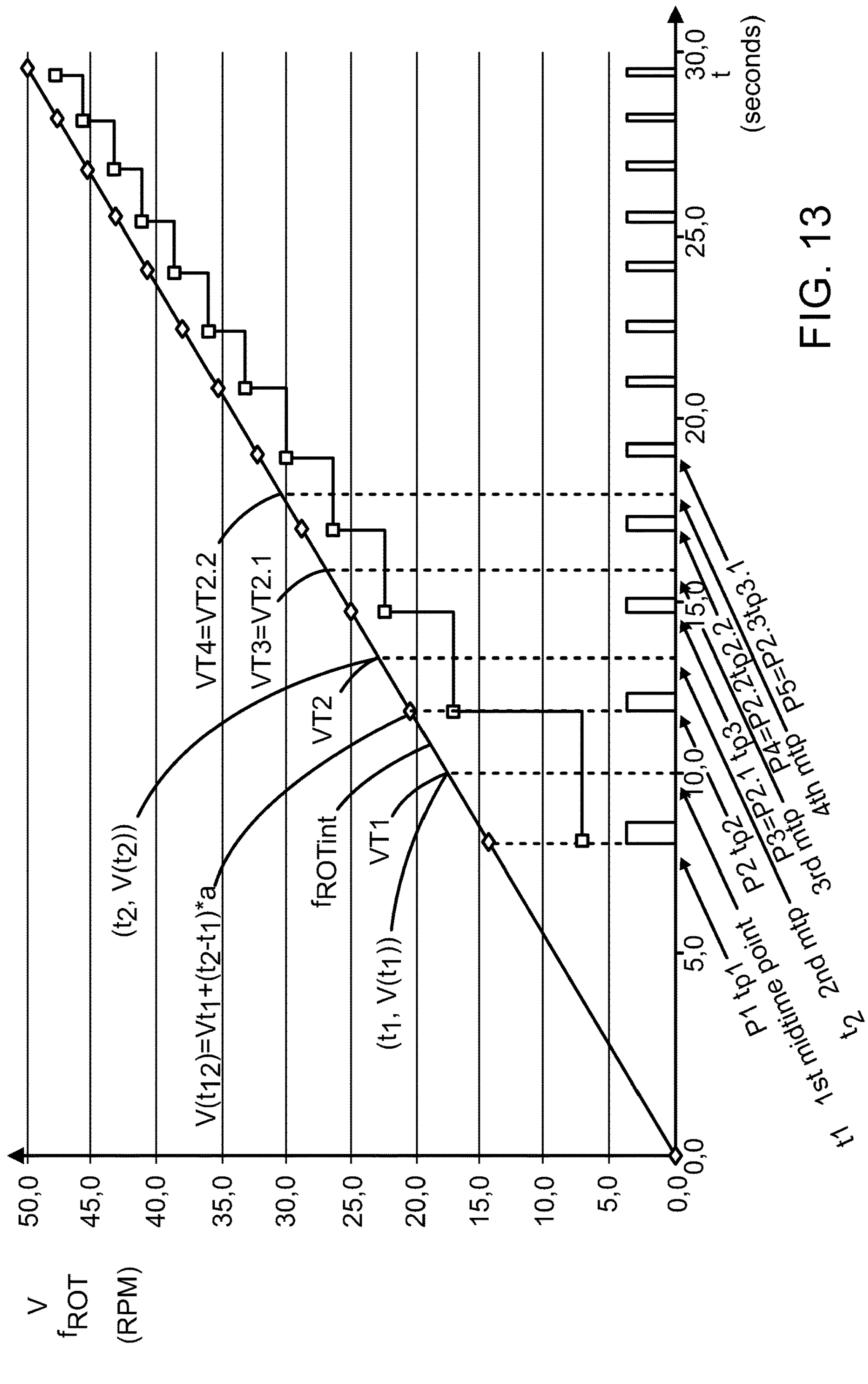
FIG. 13 is a graph illustrating a series of temporally consecutive position signals P1, P2, P3, . . . , each position signal P being indicative of a full revolution of the monitored shell.

FIG. 13 is a graph illustrating a series of temporally consecutive position signals P1, P2, P3, . . . , each position signal P being indicative of a full revolution of the monitored shell 20. Hence, the time value, counted in seconds, increases along the horizontal axis towards the right.

The vertical axis is indicative of speed of rotation, graded in revolutions per minute (RPM). With reference to FIG. 13, effects of the method according to an example are illustrated. A first momentary speed value $V(t_1)$=VT1 may be established in dependence of the angular distance delta-$FI_{p1-p2}$ between the first positional signal P1 and the second positional signal P2, and in dependence of the corresponding duration delta-$T_{1-2}=t_{P2}-t_{P1}$. The speed value attained by dividing the angular distance delta-$FI_{p1-p2}$ by the corresponding duration $(t_{P2}-t_{P1})$ represents the speed $V(t_1)$ of the rotational shell 20 at the first mid time point $t_1$, also referred to as mtp (mid time point), as illustrated in FIG. 13.

Thereafter, a second momentary speed value $V(t_2)$=VT2 may be established in dependence of the angular distance delta-FI between the second positional signal P2 and a third positional signal P3, and in dependence of the corresponding duration delta-T2-3=$t_{P3}-t_{P2}$.

The speed value attained by dividing the angular distance delta-FI by the corresponding duration $(t_{P3}-t_{P2})$ represents the speed $V(t_2)$ of the rotational shell 20 at the 2:nd mid time point $t_2$ (2:nd mtp), as illustrated in FIG. 13.

Thereafter, momentary speed values for time values between the first mid time point and the 2:nd mid time point may be established by interpolation between the first momentary speed value VT1 and the second momentary speed value VT2, as illustrated by the curve $f_{ROTint}$.

Mathematically, this may be expressed by the following equation:

$$V(t12)=V(t1)+a*(t12-t1)$$

Hence, if the speed of the shell 20 can be detected at two points of time (t1 and t2), and the acceleration a is constant, then the momentary speed at any point of time can be calculated. In particular, the speed V(t12) of the shell at time t12, being a point in time after $t_1$ and before $t_2$, can be calculated by $$V(t12)=V(t_1)+a*(t12-t_1)$$

wherein a is the acceleration, and $t_1$ is the first mid time point $t_1$ (See FIG. 13).

The establishing of a speed value as described above, as well as the compensatory decimation as described with reference to FIGS. 20, 21, and 22, may be attained by performing the corresponding method steps, and this may be achieved by means of a computer program 94 stored in memory 60, as described above. The computer program may be executed by a DSP 50. Alternatively the computer program may be executed by a Field Programmable Gate Array circuit (FPGA).

The establishing of a speed value $f_{ROT}(i)$ as described above may be performed by the analysis apparatus 150 when a processor 350 executes the corresponding program code 380, 394, 410 as discussed in conjunction with FIG. 4 above. The data processor 350 may include a central processing unit 350 for controlling the operation of the analysis apparatus 14. Alternatively, the processor 50 may include a Digital Signal Processor (DSP) 350. According to another example the processor 350 includes a Field programmable Gate Array circuit (FPGA). The operation of the Field programmable Gate Array circuit (FPGA), may be controlled by a central processing unit 350 which may include a Digital Signal Processor (DSP) 350.

Identification of Data Relating to the Toe of the Charge in a Tumbling Mill

As mentioned above, the tumbling mill shell 20 has an internal shell surface 22 facing the chamber 25, the internal shell surface 22 including a number of protrusions 310, also referred to as lifters, that may be configured to engage and lift material 30 as the shell rotates about the axis 60 (See e.g. FIG. 2). The number of protrusions 310 provided on the internal shell surface 22 facing the chamber 25 is herein termed with the variable L. Whereas FIG. 2 illustrates a case when there are twelve protrusions 310, i.e. L=12, the number L of protrusions 310 may be higher or lower. According to some embodiments the number L of protrusions 310 may be at least one, i.e. the number L of protrusions 310 may be L=1. According to some embodiments the number L of protrusions 310 may be any number higher than L=1. According to some embodiments the number L of protrusions 310 may be anywhere in the range from L=2 to L=60. According to some embodiments the number L of protrusions 310 may be anywhere in the range from L=2 to L=35.

The number L of protrusions 310 is an important factor in relation to analysis of the vibrations resulting from rotation of the mill shell 20. The inventor realized that the interaction of a protrusion 310 with the toe of the charge, forcing the material of the charge to accelerate in the direction of movement of the protrusion 310 causes a mechanical vibration $V_{IMP}$. The inventor also realized that this mechanical vibration $V_{IMP}$, caused by the interaction of protrusions 310 with the toe of the charge, will be repetitive, i.e. there will be a repetition frequency $f_R$. With reference to FIG. 2, it is noted that it illustrates the rotating mill shell 20 at the moment in time when a protrusion 310C impacts the toe 205 of the charge material 30. The impact of the protrusion 310C against the mass of material in the toe portion 205 causes a mass of toe portion material to accelerate in the direction $A_{ACC}$ of movement of the protrusion 310C, this acceleration causing a force $F_{IMP}$ against the leading edge surface of the protrusion 310C. Incidentally, this impact force $F_{IMP}$ may be estimated to be of a magnitude:

$$F_{IMP}=m_{205}*a_{205}$$

wherein $m_{205}$ is the mass of the portion of the toe that is accelerated, $a_{205}$ is the amount of acceleration of that portion of the toe Hence, the measurement signal $S_{MD}$ (See e.g. FIG. 5) may include at least one vibration signal signature $S_{FIMP}$ dependent on a vibration movement of the rotationally moving tumbling mill shell 20; wherein said vibration signal signature $S_{FIMP}$ has a repetition frequency $f_R$ which depends on the speed of rotation $f_{ROT}$ of the rotationally moving tumbling mill shell 20.

Moreover, the magnitude of the peak amplitude of the vibration signal signature $S_{FIMP}$ appears to depend on the magnitude of the impact force $F_{IMP}$.

Accordingly, the inventor concluded that a measure of the energy, or of the amplitude, of the vibration signal signature $S_{FIMP}$ appears to be indicative of the magnitude of the impact force $F_{IMP}$.

The existence of a vibration signal signature $S_{FIMP}$ which is dependent on the vibration movement of the rotationally moving mill shell 20 may therefore provide an indication of a toe portion 205 of the charge in of the monitored tumbling mill shell 20. In fact, the vibration signal signature $S_{FIMP}$ which is dependent on the vibration movement of the rotationally moving mill shell 20 may provide an indication of a position of a toe portion 205 of the charge in of the monitored tumbling mill shell 20, the position being indicated in relation to a reference position value.

The inventor concluded that the repetition frequency $f_R$ of the mechanical vibration $V_{IMP}$, caused by the interaction of protrusions 310 with the toe of the charge, depends on the number L of protrusions 310 provided on the internal shell surface 22 and on the speed of rotation $f_{ROT}$ of the shell 20.

When the monitored tumbling mill shell 20 rotates at a constant rotational speed such a repetition frequency $f_R$ may be discussed either in terms of repetition per time unit or in terms of repetition per revolution of the shell being monitored, without distinguishing between the two. However, if the tumbling mill shell 20 rotates at a variable rotational speed the matter is further complicated, as discussed elsewhere in this disclosure, e.g. in connection with FIGS. 20, 21, 22A, 22B, and 22C. In fact, it appears as though even very small variations in rotational speed of the mill shell may have a large adverse effect on detected signal quality in terms of smearing of detected vibration signals. Hence, a very accurate detection of the rotational speed $f_{ROT}$ of the mill shell 20 appears to be of essence.

Moreover, the inventor realized that, not only the amplitude of the mechanical vibration $V_{IMP}$ but also the time of occurrence of the mechanical vibration $V_{IMP}$ may be indicative of data relating a toe portion 205 of the charge in a tumbling mill. Thus, the measurement signal $S_{MD}$ (See e.g. FIG. 5) may include at least one vibration signal amplitude component $S_{FIMP}$ dependent on a vibration movement of the rotationally moving tumbling mill shell 20;

wherein said vibration signal amplitude component $S_{FIMP}$ has a repetition frequency $f_R$ which depends on the speed of rotation $f_{ROT}$ of the rotationally moving tumbling mill shell 20 and that also depends on the number L of protrusions 310 provided on the internal shell surface 22 of the mill shell 20; and wherein there is a temporal relation between the occurrence of the repetitive vibration signal amplitude component $S_{FIMP}$ and the occurrence of a position signal P(i) which has a second repetition frequency $f_P$ dependent on the speed of rotation $f_{ROT}$ of the rotationally moving tumbling mill shell 20.

As regards constant rotational speed, the inventor concluded that if the speed of rotation $f_{ROT}$ is constant, the digital measurement signal $S_{MD}$, comprising a temporal sequence of vibration sample values S(i), has a repetition frequency $f_R$, that depends on the number L of protrusions 310 provided on the internal shell surface 22.

Figure 15:
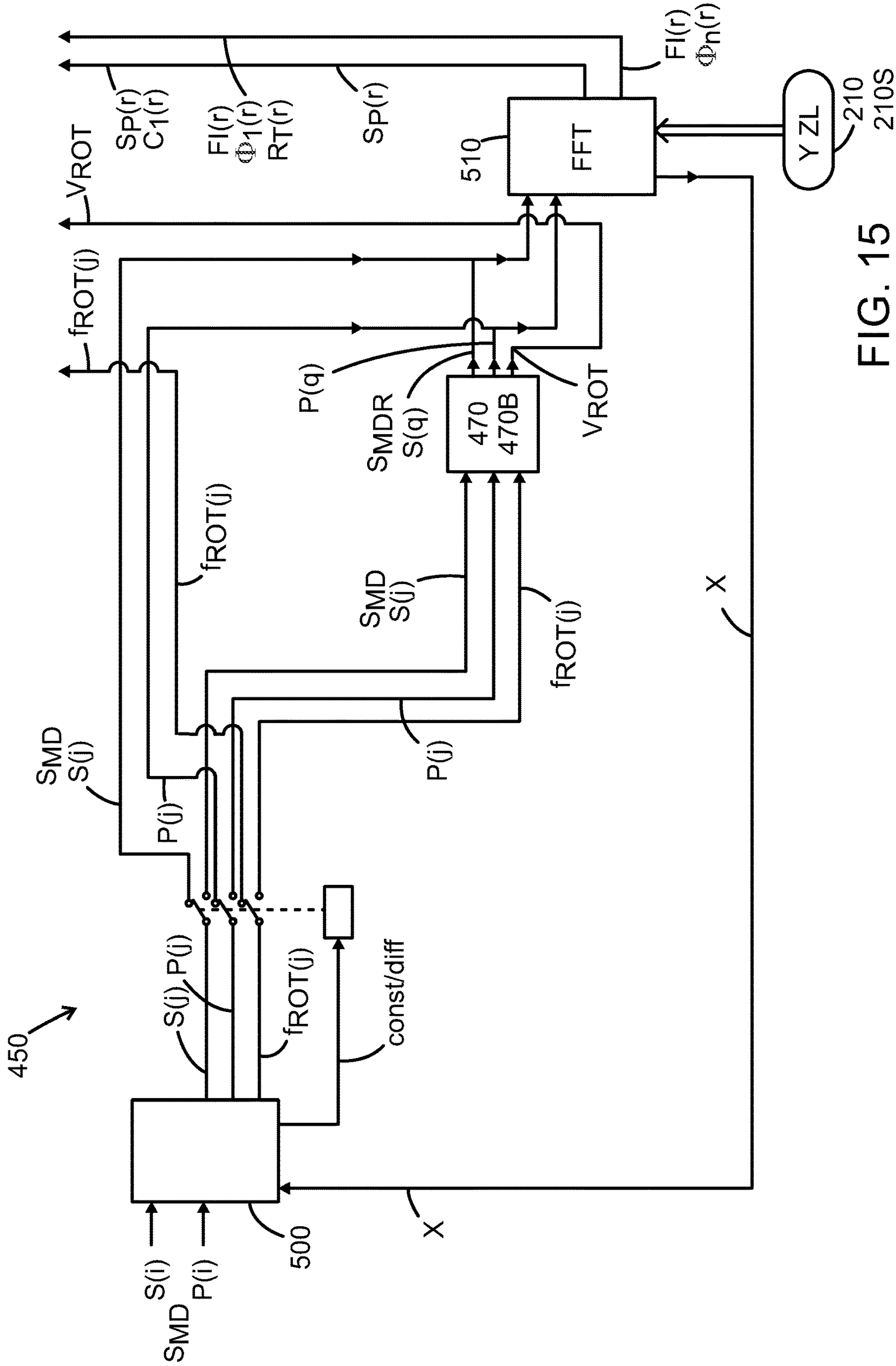
FIG. 15 is a block diagram illustrating an example of a status parameter extractor.

The status parameter extractor 450 may optionally include a Fast Fourier Transformer (FFT) coupled to receive the digital measurement signal $S_{MD}$, or a signal dependent on the digital measurement signal $S_{MD}$ (See FIG. 15). In connection with the analysis of a tumbling mill, having a rotating shell 20, it may be interesting to analyse signal frequencies that are higher than the rotation frequency $f_{ROT}$ of the rotating shell 20. In this context, the rotation frequency $f_{ROT}$ of the shell 20 may be referred to as "order 1". If a signal of interest occurs at, say ten times per revolution of the shell, that frequency may be referred to as Order 10, i.e. a repetition frequency $f_R$ (measured in Hz) divided by rotational speed $f_{ROT}$ (measured in revolutions per second, rps) equals 10 Hz/rps, i.e. order $Oi=f_R/f_{ROT}=10$ Referring to a maximum order as Y, and the total number of frequency bins in the FFT to be used as Z, the inventor concluded that the following applies according to an example:

$$Oi*Z=X*Y.$$

Conversely, X=Oi*Z/Y, wherein

Y is a maximum order; and

Z is the number of bins in the frequency spectrum produced by the FFT, and

Oi is the number L of protrusions 310 in the monitored tumbling mill shell.

The above variables Y, Z, and Oi, should be set so as to render the variable X a positive integer. In connection with the above example it is noted that the FFT analyzer is configured to receive a reference signal, i.e. a position marker signal value PS, once per revolution of the rotating shell 20. As mentioned in connection with FIG. 2, a position marker device 180 may be provided on an outer wall surface of the shell 20 such that, when the shell 20 rotates around the axis of rotation 60, the position marker 180 passes by the position sensor 170 once per revolution of the shell, thereby causing the position sensor 170 to generate a revolution marker signal value PS.

Incidentally, referring to the above example of FFT analyzer settings, the resulting integer number X may indicate the number of revolutions of the monitored tumbling mill shell 20 during which the digital signal $S_{MD}$ is analysed. According to an example, the above variables Y, Z, and Oi, may be set by means of the Human Computer Interface, HCI, 210, 210S (See e.g. FIG. 1 and/or FIG. 5 and/or FIG. 15).

As mentioned above, the protrusions 310 may be also be referred to as lifters 310. Consider a case when the digital measurement signal $S_{MD}$ is delivered to an FFT analyzer: In such a case, when the FFT analyzer is set for ten protrusions, i.e. L=10, and Z=160 frequency bins, and the user is interested in analysing frequencies up to order Y=100, then the value for X becomes X=Oi*Z/Y=10*160/100=16.

Hence, it is necessary to measure during sixteen shell revolutions (X=16) when Z=160 frequency bins is desired, the number of protrusions is L=10; and the user is interested in analysing frequencies up to order Y=100. In connection with settings for an FFT analyzer, the order value Y may indicate a highest frequency to be analyzed in the digital measurement signal $S_{MD}$.

According to some embodiments, the setting of the FFT analyzer should fulfill the following criteria when the FFT analyzer is configured to receive a reference signal, i.e. a position marker signal value PS, once per revolution of the rotating shell 20:

The integer value Oi is set to equal L, i.e. the number of protrusions in the shell 20, and the settable variables Y, and Z are selected such that the mathematical expression Oi*Z/Y becomes a positive integer. Differently expressed: When integer value Oi is set to equal L, then settable variables Y and Z should be set to integer values so as to render the variable X a positive integer, wherein X=Oi*Z/Y According to an example, the number of bins Z is settable by selecting one value Z from a group of values. The group of selectable values for the frequency resolution Z may include

Z=200

Z=400

Z=800

Z=1600

Z=3200

An Example of Constant Speed Phase

As mentioned in connection with step S #30 in FIG. 9, the status parameter extractor 450 may identify a constant speed phase, i.e. a status of constant rotational speed $f_{ROT}$ of the shell 20.

Figure 14A:
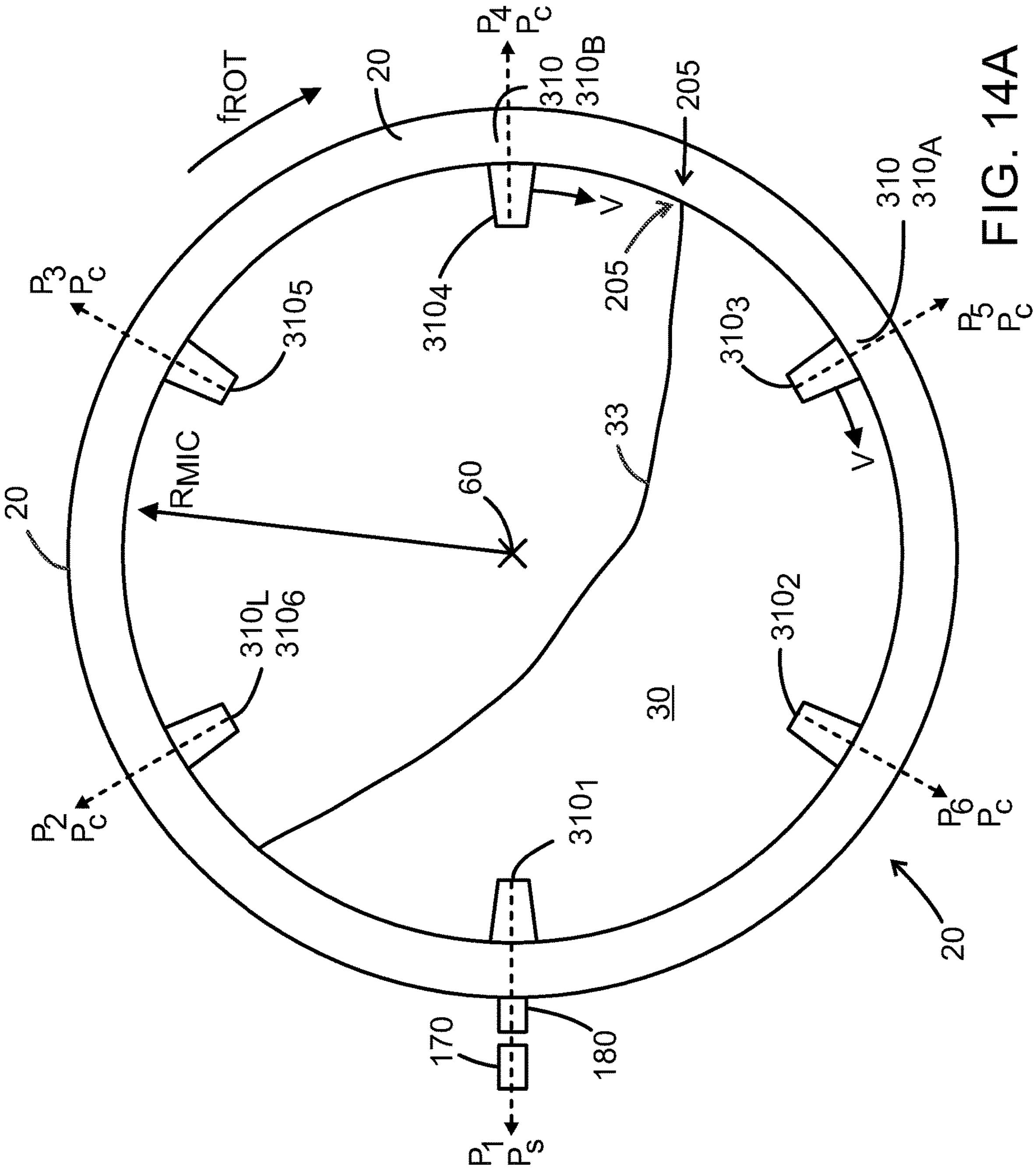
FIG. 14A shows another example of a cross-sectional view of the mid-portion 98 of a rotating mill shell during operation.
Figure 14B:
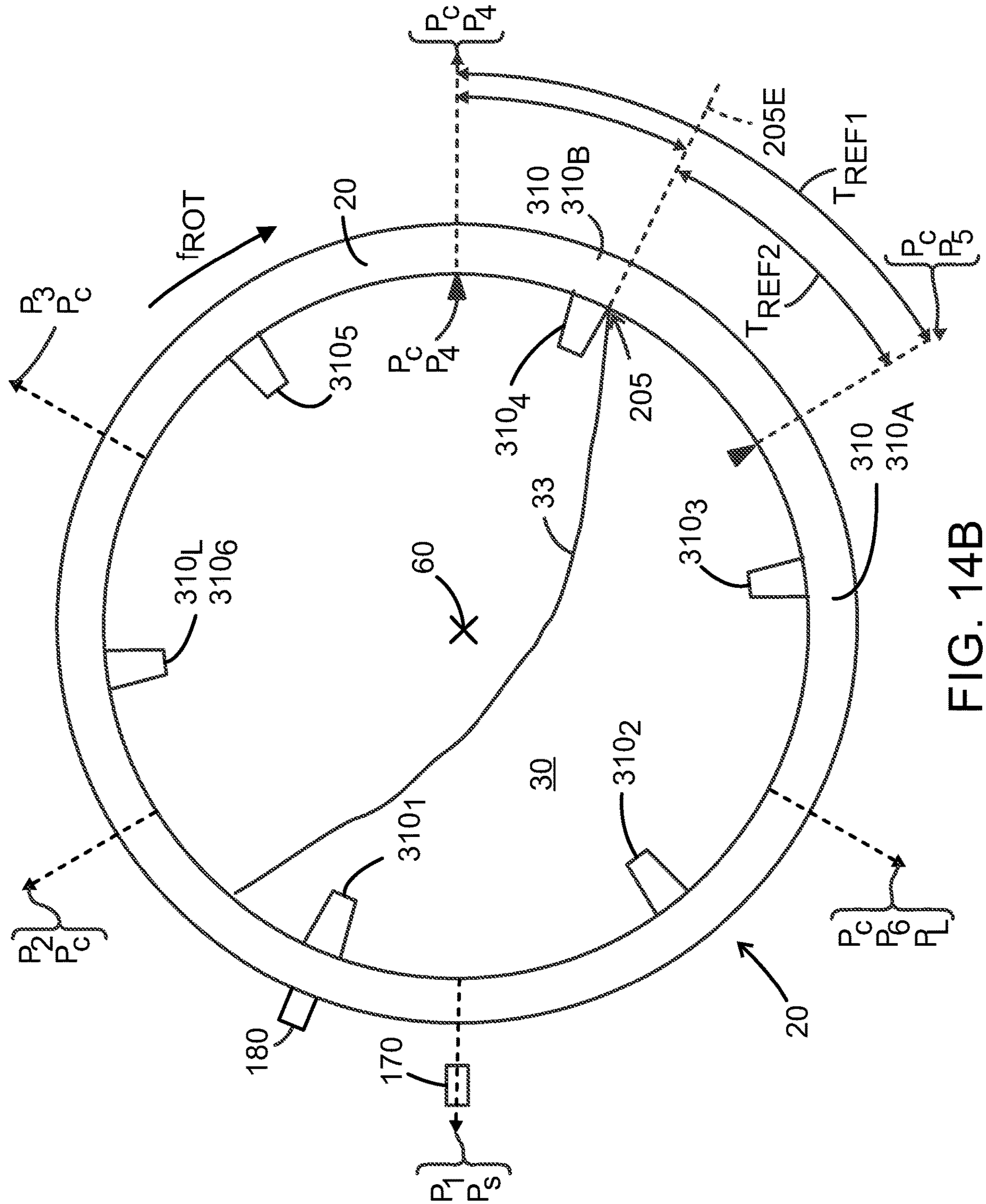
FIG. 14B illustrates another rotational position of the rotating shell 20, a short time later than the position shown in FIG. 14A.

FIGS. 14A and 14B show another example of a cross-sectional view of the mid-portion 98 of a rotating mill shell 20 during operation. This view could be taken e.g. along line A-A of FIG. 1A. According to the example of FIG. 14A, the tumbling mill shell 20 has six protrusions 310 configured to engage the charge material 30 as the shell rotates about the axis 60, i.e. the number L=6.

The inner diameter of the shell 20 may be e.g. 600 cm, and the speed of rotation may be constant, at e.g. 13.6 revolutions per minute. For the purpose of this example, the sample frequency is such that there are n=7680 samples per revolution at that. rotational speed $f_{ROT}$ of the shell 20.

As mentioned above, the shell 20 is rotatable around the axis of rotation 60, and thus the position sensor 170 may generate a position signal Ep for indicating momentary rotational positions of the shell 20. A position marker 180 may be provided on an outer surface of the shell 20 such that, when the shell 20 rotates around the axis of rotation 60, the position marker 180 passes by the position sensor 170 once per revolution of the shell, thereby causing the position signal Ep to exhibit a position marker signal value $P_S$. Each such position marker signal value $P_S$ is indicative of a stationary position, i.e. a position of the immobile stator.

FIG. 14A illustrates a rotational position of the rotating shell 20 wherein the position marker 180 is located at the same rotational position as the static position sensor 170, and a protrusion 310A has passed through the toe portion 205. The protrusion 310A is followed by an adjacent protrusion 310B.

FIG. 14B illustrates another rotational position of the rotating shell 20, a short time later than the position shown in FIG. 14A. In FIG. 14B the adjacent protrusion 310B is located at the position of impact with the toe 205. The time of impact causes a vibration $V_{IMP}$ which leads to a signal signature event in the vibration signal. Thus, the rotational position illustrated in FIG. 14B is an event position 205E of the rotating shell 20. The event position 205E is a rotational position of the rotating shell 20 at the time of protrusion impact with the toe 205. Thus, the event position 205E is indicative of the toe position 205. Accordingly, the position 205E of the toe 205, can be expressed as a percentage of the distance between two adjacent static positions P3 and P4, as illustrated in FIG. 14B.

When there is one position marker signal value $P_S$ per revolution and the rotational speed $f_{ROT}$ is constant, or substantially constant, there will be a constant, or substantially constant, number of vibration sample values S(i) for every revolution of the mill shell 20. For the purpose of this example, the position signal P(0) is indicative of the vibration sample i=0, as shown in table 2 (See below). For the purpose of an example, the position of the position signal P(0) in relation to the shell 20 may not be important, as long as the repetition frequency $f_P$ is dependent on the speed of rotation $f_{ROT}$ of the rotationally moving tumbling mill shell 20. Hence, if the position signal Ep has one pulse Ps per revolution of the shell 20, the digital position signal will also have one Position signal value P(i)=1 per revolution, the remaining Position signal values being zero.

TABLE 2

| #01 Time slot dt i, j | #02 Position P(i) | #03 S(i) | #04 $f_{ROT}$(i) |
|---|---|---|---|
| 0 | 1 | S(0) | const |
| 427 | 0 | S(427) | const |
| 853 | 0 | S(853) | const |
| 1280 | 0 | S(1280) | const |
| 1707 | 0 | S(1707) | const |
| 2133 | 0 | S(2133) | const |
| 2560 | 0 | S(2560) | const |
| 2987 | 0 | S(2987) | const |
| 3413 | 0 | S(3413) | const |
| 3840 | 0 | S(3840) | const |
| 4267 | 0 | S(4267) | const |
| 4693 | 0 | S(4693) | const |
| 5120 | 0 | S(5120) | const |
| 5547 | 0 | S(5547) | const |
| 5973 | 0 | S(5973) | const |
| 6400 | 0 | S(6400) | const |
| 6827 | 0 | S(6827) | const |
| 7253 | 0 | S(7253) | const |
| 7680 | 1 | S(7680) | const |

Thus, at a certain constant speed $f_{ROT}$ there may be n time slots per revolution, as indicated by table 2, and n may be a positive integer. In the example of table 2, n=7680.

Having one position signal Ps per revolution, we know that the position signal will be repetitive every n slots since the rotational speed $f_{ROT}$ is constant. Thus, a number of virtual position signals $P_C$ may be generated by calculation. In an example, consider that virtual position signals $P_C$ are generated. The provision of one virtual position signal $P_C$ per protrusion 310 may be used for establishing a temporal relation between the occurrence of the repetitive vibration signal amplitude component $S_{FIMP}$ and the occurrence of a position signal P(i) which has a second repetition frequency $f_P$ dependent on the speed of rotation $f_{ROT}$ of the rotationally moving tumbling mill shell 20.

Having L equidistant protrusions 310 in the mill shell and one position signal Ps per revolution and a constant speed of rotation $f_{ROT}$ it is possible to generate one virtual position signal $P_C$ per protrusion, so that the total number of position signals Ps, $P_C$ are evenly distributed. Each such position marker signal value $P_S$ and Pc is indicative of a stationary position, i.e. a position of the immobile stator, as illustrated by "Ps" and "Pc" in FIGS. 14A and 14B.

Thus, a position signal Ps or $P_C$ will occur at every n/L sample value position, as indicated in Table 3, when there are provided n time slots per revolution. In table 3, n=7680, and L=6, and thus there is provided a position signal $P_C$ at every 1280 sample, the calculated position signals being indicated as 1C.

As illustrated in the FIG. 14 example, the position marker signal value $P_S$ and Pc are indicative of L stationary positions P1, P2, P3, P4, P5 and PL, where L=6, since there are 6 protrusions 310 in the illustrated shell 20.

It may be assumed that the position of the toe portion 205 of the mill is substantially constant during a single revolution of the mill shell 20. In other words, the position of the toe portion 205 is substantially immobile.

Since the vibration signal amplitude component $S_{FIMP}$, $S_P$ is generated by interaction of a protrusion and the toe of the charge (See FIG. 14B), it will be repetitive with the frequency of one vibration signal amplitude component $S_{FIMP}$, $S_P$ per protrusion 310. Thus, it can be assumed that the temporal relation between the occurrence of the repetitive vibration signal amplitude component $S_{FIMP}$, $S_P$ and the occurrence of a position signal P, PC will be substantially constant for each of the L data blocks, L being L=6 in this example.

Table 3 illustrates the principle of a temporal progression of position signal values P(i) with calculated Positions signal values P(i) being indicated as "1C".

TABLE 3

| #00 | #01 Time slot dt i (*1000) | #02 Position P(i) | #03 S(i) | #04 $f_{ROT}$(i) |
|---|---|---|---|---|
| | 0 | 1 | S(0) | const |
| Block I | 427 | 0 | S(427) | const |
| Block I | 853 | 0 | S(853) | const |
| Block I | 1280 | 1C | S(1280) | const |
| Block II | 1707 | 0 | S(1707) | const |
| Block II | 2133 | 0 | S(2133) | const |
| Block II | 2560 | 1C | S(2560) | const |
| Block III | 2987 | 0 | S(2987) | const |
| Block III | 3413 | 0 | S(3413) | const |
| Block III | 3840 | 1C | S(3840) | const |
| Block IV | 4267 | 0 | S(4267) | const |
| Block IV | 4693 | 0 | S(4693) | const |
| Block IV | 5120 | 1C | S(5120) | const |
| Block V | 5547 | 0 | S(5547) | const |
| Block V | 5973 | 0 | S(5973) | const |
| Block V | 6400 | 1C | S(6400) | const |
| Block VI | 6827 | 0 | S(6827) | const |
| Block VI | 7253 | 0 | S(7253) | const |
| Block VI | 7680 | 1 | S(7680) | const |

TABLE 4

| #00 | #01 Time slot dt i, j | #02 Position P(i) | #03 S(i) | #04 $f_{ROT}$(i) |
|---|---|---|---|---|
| | 0 | 1 | S(0) | const |
| Block I | 40 | 0 | S(40) | const |
| Block I | 80 | 0 | S(80) | const |
| Block I | 120 | 0 | S(120) | const |

TABLE 4-continued

| #00 | #01 Time slot dt i, j | #02 Position P(i) | #03 S(i) | #04 $f_{ROT}$(i) |
|---|---|---|---|---|
| Block I | 160 | 0 | S(160) | const |
| Block I | 200 | 0 | S(200) | const |
| Block I | 240 | 0 | S(240) | const |
| Block I | 280 | 0 | S(280) | const |
| Block I | 320 | 0 | S(320) | const |
| Block I | 360 | 0 | S(360) | const |
| Block I | 400 | 0 | S(400) | const |
| Block I | 440 | 0 | S(440) | const |
| Block I | 480 | 0 | S(480) | const |
| Block I | 520 | 0 | S(520) | const |
| Block I | 560 | 0 | S(560) | const |
| Block I | 600 | 0 | S(600) | const |
| Block I | 640 | 0 | S(640) | const |
| Block I | 680 | 0 | S(680) | const |
| Block I | 720 | 0 | S(720) | const |
| Block I | 760 | 0 | S(760) | const |
| Block I | 800 | 0 | S(800) | const |
| Block I | 840 | 0 | S(840) | const |
| Block I | 880 | 0 | S(880) | const |
| Block I | 920 | 0 | S(920) | const |
| Block I | 960 | 0 | S(960) | const |
| Block I | 1000 | 0 | S(1000) | const |
| Block I | 1040 | 0 | S(1040) | const |
| Block I | 1080 | 0 | S(1080) | const |
| Block I | 1120 | 0 | S(1120) | const |
| Block I | 1160 | 0 | S(1160) | const |
| Block I | 1200 | 0 | S(1200) | const |
| Block I | 1240 | 0 | S(1240) | const |
| Block I | 1280 | 1C | S(1280) | const |

TABLE 5

| #00 | #01 Time slot dt i, j | #02 Position % | #03 S(i) | #04 $f_{ROT}$(i) |
|---|---|---|---|---|
| | 0 = $N_0$ | 0% | | const |
| Block I | 40 | 3% | | const |
| Block I | 80 | 6% | | const |
| Block I | 120 | 9% | | const |
| Block I | 160 | 13% | | const |
| Block I | 200 | 16% | | const |
| Block I | 240 | 19% | | const |
| Block I | 280 | 22% | | const |
| Block I | 320 | 25% | | const |
| Block I | 360 | 28% | | const |
| Block I | 400 | 31% | | const |
| Block I | 440 | 34% | | const |
| Block I | 480 | 38% | | const |
| Block I | 520 | 41% | | const |
| Block I | 560 | 44% | | const |
| Block I | 600 | 47% | | const |
| Block I | 640 | 50% | | const |
| Block I | 680 | 53% | | const |
| Block I | 720 | 56% | | const |
| Block I | 760 = $N_P$ | 59% | S(760) = Sp | const |
| Block I | 800 | 63% | | const |
| Block I | 840 | 66% | | const |
| Block I | 880 | 69% | | const |
| Block I | 920 | 72% | | const |
| Block I | 960 | 75% | | const |
| Block I | 1000 | 78% | | const |
| Block I | 1040 | 81% | | const |
| Block I | 1080 | 84% | | const |
| Block I | 1120 | 88% | | const |
| Block I | 1160 | 91% | | const |
| Block I | 1200 | 94% | | const |
| Block I | 1240 | 97% | | const |
| Block I | 1280 = $N_B$ | 100% | | const |

Figure 23:
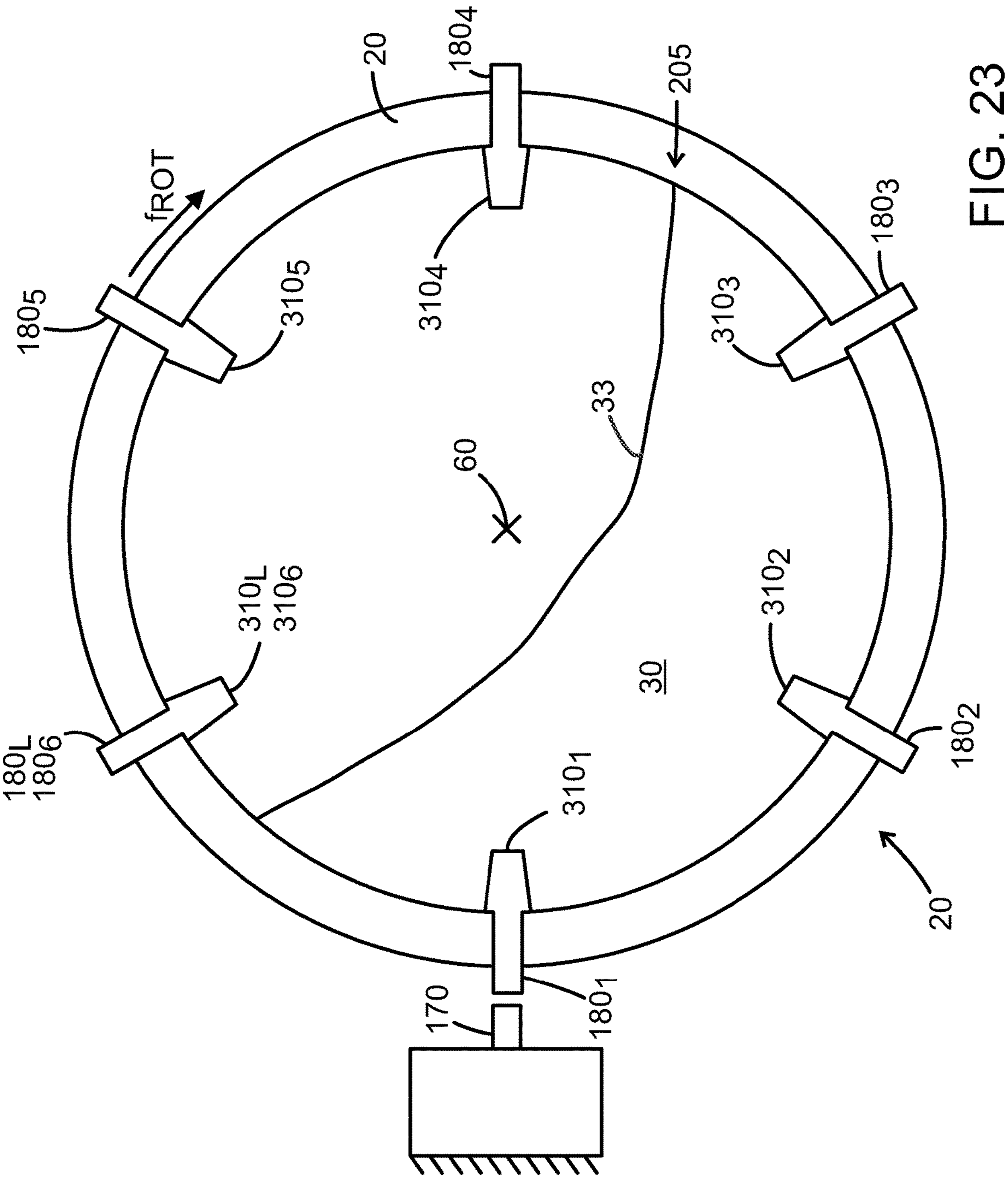
FIG. 23 shows another example of a cross-sectional view of the mid-portion of a rotating mill shell during operation.

As mentioned above, the shell 20 is rotatable around the axis of rotation 60, and thus the position sensor 170, being mounted in an immobile manner, may generate a position signal Ep having a sequence of shell position signal values $P_S$ for indicating momentary rotational positions of the shell 20. As shown in FIG. 23 a position marker 180 may be provided on an outer surface of the shell 20 such that, when the shell 20 rotates around the axis of rotation 60, the position marker 180 passes by the position sensor 170 during one revolution of the shell 20, thereby causing the position sensor 170 to generate a revolution marker signal value $P_S$.

As mentioned above, the position sensor 170 may generate a position signal Ep having a sequence of shell position signal values $P_S$ for indicating momentary rotational positions of the shell 20 when the shell 20 rotates. With reference to tables 2-4 in this document, such a marker signal value $P_S$ is illustrated as "1" in column #2 in tables 2-4.

When the rotating shell is provided with one position marker device 180, the marker signal value $P_S$ will be provided once per revolution. The marker signal value $P_S$ is illustrated as "1" in column #2 in tables 2-4. Having L equidistant protrusions 310 in the mill shell and one position signal P per revolution and a constant speed of rotation $f_{ROT}$ it is possible to generate one virtual position signal $P_C$ per protrusion, so that the total number of position signals P, $P_C$ are evenly distributed, as discussed above. Thus, a position signal P or $P_C$ will occur at every n/L sample value position, as indicated in Table 3, when there are provided n time slots per revolution. In table 3, n=7680, and L=6, and thus there is provided a position signal $P_C$ at every 1280 sample, the calculated position signals being indicated as 1C.

It is believed that the mutually equidistant positions of the protrusions 310 is of importance when the marker signal value $P_S$, illustrated as "1" in column #2 in tables 2-4, is provided once per revolution and virtual position signal values $P_C$ are generated in an evenly distributed manner such that a position signal P or $P_C$ will occur at every n/L sample value position, as indicated in Table 3, when there are provided n time slots per revolution in a sequence of shell position signal values for indicating momentary rotational positions of the shell 20. In table 3 an actually detected revolution marker signal value $P_S$ is reflected as "1" (see column #2, time slot "0" and time slot "7680" in table 3), and virtual position signal values $P_C$ are reflected as "1C" (see column #2, time slot "0" and time slot "7680" in table 3).

This is believed to be of importance for some embodiments of this disclosure since the position markers 180 cause the generation of position reference signal values, and the protrusions 310, when engaging material in the charge of a rotating mill, cause the generation of a signal event, such as e.g. an amplitude peak value, in the vibration signal (See references $S_{EA}$, $S_{MD}$, Se(i), S(j), S(q) e.g. in FIGS. 1 and 15). Moreover, the temporal duration between the occurrence of a position reference signal value and the occurrence of a signal event in the vibration signal, caused by a protrusion 310 engaging material in the charge of the rotating mill shell may be indicative of an internal state of the operating mill, as discussed elsewhere in this disclosure Table 4 is an illustration of the first block, i.e. Block I, having n/L=7680/6=1280 consecutive time slots. It is to be understood that if there is a constant speed phase (See FIG. 9) for the duration of a complete revolution of the shell 20, then each of the blocks I to VI (See table 3) will have the same appearance as Block I being illustrated in table 4.

According to embodiments of this disclosure, with reference to column #03 in table 4, the vibration sample values S(i) are analyzed for detection of a vibration signal signature $S_{FIMP}$. The vibration signal signature $S_{FIMP}$ may be manifested as a peak amplitude sample value Sp. According to an example, with reference to column #03 in table 4, the vibration sample values S(i) are analyzed by a peak value detector for detection of a peak sample value Sp. With reference to table 5, the peak value analysis leads to the detection of a highest vibration sample amplitude value S(i). In the illustrated example, the vibration sample amplitude value S(i=760) is detected to hold a highest peak value Sp.

Having detected the peak value Sp to be located in time slot 760, a temporal relation between the occurrence of the repetitive vibration signal amplitude component Sp and the occurrence of a position signal P(i) can be established. In table 5 the time slots carrying position signals P(i) are indicated as 0% and 100%, respectively, and all the slots in between may be labelled with their respective locations, as illustrated in column #02 in table 5. As illustrated in the example in col. #02 of table 5, the temporal location of slot number i=760 is at a position 59% of the temporal distance between slot i=0 and slot i=1280. Differently expressed, 760/1280=0.59=59%

Consequently, the inventor concluded that the temporal relation between the occurrence of the repetitive vibration signal amplitude component $S_{FIMP}$ and the occurrence of a position signal P(i)

may be used as an indication of the relative physical position of the toe portion 205 of the charge between two consecutive protrusions 310 in the rotating shell 20.

Accordingly, a position of the toe 205, expressed as a percentage of the distance between two adjacent leading edges (see 312C and 312D in FIG. 2 in conjunction with table 5), can be obtained by:

Counting a total number of samples ($N_B-N_0=N_B-0=N_B=1280$) from the first reference signal occurrence in sample number $N_0=0$ to the second reference signal occurrence in sample number $N_B=1280$, and Counting another number of samples ($N_P-N_0=N_P-0=N_P$) from the first reference signal occurrence at $N_0=0$ to the occurrence of the peak amplitude value Sp at sample number $N_P$, and generating said first temporal relation ($R_T(r)$; $T_D$; FI(r)) based on said another number $N_P$ and said total number $N_B$. This can be summarized as:

$$R_T(r)=R_T(760)=(N_P-N_0)/(N_B-N_0)=(760-0)/(1280-0)=0.59=59\%$$

Thus, a relative toe position may be generated by:

Counting a total number of samples ($N_B$) from the first reference signal occurrence to the second reference signal occurrence, and Counting another number of samples ($N_P$) from the first reference signal occurrence to the occurrence of the peak amplitude value Sp at sample number $N_P$, and generating said first temporal relation ($R_T(r)$; $T_D$; FI(r)) based on a relation between said sample number $N_P$ and said total number of samples i.e. $N_B$.

With reference to FIG. 14, it is noted that, at the point in time illustrated, the position marker 180 is depicted just as it passes by the position by the position sensor 170. Thus, the point in time illustrated may be the point in time indicated by time slot 1280, i.e. when the position signal P(i=1280) is generated. Since the shell rotates in a clockwise direction, the most recent peak sample value Sp was generated by the impact of protrusion 310A with the toe portion 205 (See FIGS. 14A and 14B in conjunction with table 5). Thus, the vibration sample amplitude value S(i=760), detected to hold a highest peak value Sp, occurred at a time $T_{SP}$=dt*(1280−760) before the occurrence of the position signal P(i=1280).

Since S=v*t, wherein S=distance, v=a constant speed, and t is time, the temporal relation can be directly translated into a distance. Consequently, col. #02 of table 5, can be regarded as indicating the physical location of the toe portion 205 at a position 59% of the distance between protrusion 310A and protrusion 310B (see FIG. 14 in conjunction with col. #02 of table 5).

According to another example, with reference to table 6, the temporal relation between the occurrence of the repetitive vibration signal amplitude component Sp and the occurrence of a position signal P(i) can be regarded as a phase deviation, expressed in degrees.

TABLE 6

| #00 | #01 Time slot dt i | #02 phase FI degrees | #03 S(i) | #04 $f_{ROT}$(i) |
|---|---|---|---|---|
| | 0 | 0 | | const |
| Block I | 40 | 11.25 | | const |
| Block I | 80 | 22.5 | | const |
| Block I | 120 | 33.75 | | const |
| Block I | 160 | 45 | | const |
| Block I | 200 | 56.25 | | const |
| Block I | 240 | 67.5 | | const |
| Block I | 280 | 78.75 | | const |
| Block I | 320 | 90 | | const |
| Block I | 360 | 101.25 | | const |
| Block I | 400 | 112.5 | | const |
| Block I | 440 | 123.75 | | const |
| Block I | 480 | 135 | | const |
| Block I | 520 | 146.25 | | const |
| Block I | 560 | 157.5 | | const |
| Block I | 600 | 168.75 | | const |
| Block I | 640 | 180 | | const |
| Block I | 680 | 191.25 | | const |
| Block I | 720 | 202.5 | | const |
| Block I | 760 | 213.75 | S(760) = Sp | const |
| Block I | 800 | 225 | | const |
| Block I | 840 | 236.25 | | const |
| Block I | 880 | 247.5 | | const |
| Block I | 920 | 258.75 | | const |
| Block I | 960 | 270 | | const |
| Block I | 1000 | 281.25 | | const |
| Block I | 1040 | 292.5 | | const |
| Block I | 1080 | 303.75 | | const |
| Block I | 1120 | 315 | | const |
| Block I | 1160 | 326.25 | | const |
| Block I | 1200 | 337.5 | | const |
| Block I | 1240 | 348.75 | | const |
| Block I | 1280 | 360 | | const |

Figure 16:
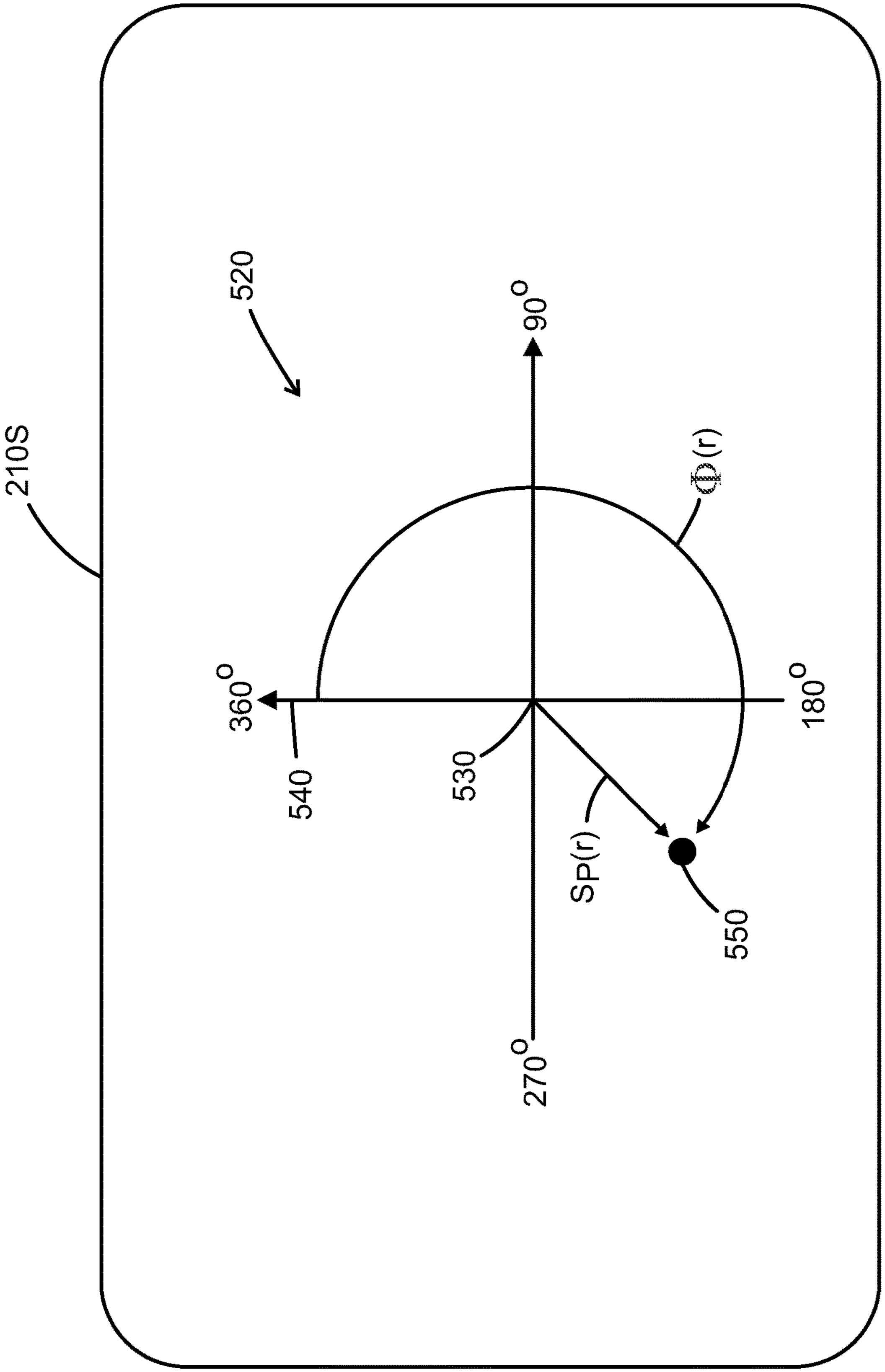
FIG. 16 is an illustration of an example of a visual indication of an analysis result.

In fact, by using the position signal as a reference signal for the digital measurement signal $S_{MD}$, S(i), S(j), and adjusting the settings of a Fast Fourier Transformer in a certain manner, the Fast Fourier Transformer may be used for extracting the amplitude top value as well as the phase value, as discussed below. Consequently, col. #02 of table 6, can be regarded as indicating the physical location of the toe portion 205 at a position 213.75 degrees of the distance between protrusion 310A and protrusion 310B when the total distance between protrusion 310A and protrusion 310B is regarded as 360 degrees (see FIG. 14 in conjunction with col. #02 of table 6). The physical location of the toe portion 205, when expressed as a part of the distance between two adjacent protrusions 310, may be referred to as a relative position of the toe 205. In other words, this disclosure provides a manner of identifying a relative toe position, for the toe 205 of a charge in a tumbling mill. Hence, this disclosure provides a manner of generating information indicative of the location of the toe portion 205, when expressed as a part of the distance between two adjacent protrusions 310 in a rotating shell 20. With reference to FIG. 15 and FIG. 16 the relative toe position may be presented as a phase angle FI(r), as discussed in connection with FIGS. 15 and 16 below. According to embodiments of this disclosure, the relative toe position can be presented as a percentage (see col. #02 of table 5 above). Moreover, according to embodiments of this disclosure, the relative toe position can be presented as a temporal duration, or as a part of a temporal duration. As discussed above, in connection with table 5, since S=v*t, wherein S=distance, v=the speed of a protrusion, and t is time, the temporal relation can be directly translated into a distance. In this context it is noted that the speed v of a protrusion depends on the angular velocity $f_{ROT}$ of the shell 20 and of the radius $R_{MIC}$ of the shell 20 (See FIG. 14).

FIG. 15 is a block diagram illustrating an example of a status parameter extractor 450. The status parameter extractor 450 of FIG. 15 includes a shell speed detector 500 that receives the digital vibration signal $S_{MD}$, S(i) and the digital position signal (Pi). The shell speed detector 500 may also be referred to as a shell speed value generator 500. The shell speed detector 500 may generate the three signals S(j), P(j) and $f_{ROT}$(j) on the basis of the received digital vibration signal $S_{MD}$, S(i) and the digital position signal (Pi). This may be achieved e.g. in the manner described above in relation to FIGS. 7 to 13. In this connection it is noted that the three signals S(j), P(j) and $f_{ROT}$(j) may be delivered simultaneously, i.e. they all relate to the same time slot j. In other words, the three signals S(j), P(j) and $f_{ROT}$(j) may be provided in a synchronized manner. The provision of signals, such as S(j), P(j) and $f_{ROT}$(j), in a synchronized manner advantageously provides accurate information about temporal relations between signal values of the individual signals. Thus, for example, a speed value $f_{ROT}$(j) delivered by the shell speed value generator 500 is indicative of a momentary rotational speed of the shell 20 at the time of detection of the amplitude value S(j).

It is noted that the signals S(j) and P(j), delivered by the shell speed value generator 500, are delayed in relation to the signals S(i) and (Pi) received by the shell speed value generator 500. It is also noted that the signals S(j) and P(j) are equally delayed in relation to the signals S(i) and (Pi), thus the temporal relation between the two has been maintained. In other words, the signals S(j) and P(j) are synchronously delayed.

The shell speed detector 500 may deliver a signal indicative of whether the speed of rotation has been constant for a sufficiently long time, in which case the signals S(j) and P(j) may be delivered to a Fast Fourier Transformer 510.

The variables Y, Z, and L, should be set so as to render the variable X a positive integer, as discussed above. According to an example, the above variables Y, Z, and L, may be set by means of the Human Computer Interface, HCI, 210, 210S (See e.g. FIG. 1 and/or FIG. 5 and/or FIG. 15). As mentioned above the resulting integer number X may indicate the number of revolutions of the monitored tumbling mill shell 20 during which the digital signals S(j) and P(j) are analysed by the FFT 510. Thus, based on the settings of the variables Y, Z, and L, the FFT 510 may generate the value X, indicative of the duration of the analysis of a measurement session, and after a measurement session, the FFT 510 delivers a set of status value Sp(r) and FI(r).

The notion "r", in status values Sp(r) and FI(r), indicates a point in time. It is to be noted that there may be a delay in time from the reception of a first pair of input signals S(j), P(j) at the inputs of the FFT 510 until the delivery of a pair of status values Sp(r) and FI(r) from the FFT 510. A pair of status values Sp(r) and FI(r) may be based on a temporal sequence of pairs of input signals S(j), P(j). The duration of the temporal sequence of pairs of input signals S(j), P(j) should include at least two successive position signal values P(j)=1 and the corresponding input signal pairs.

The status values Sp(r) and FI(r) may also be referred to as $C_L$ and $\Phi_L$, respectively, as explained below. As noted above in relation to FIG. 2, the vibration signal $S_{EA}$, $S_{MD}$, S(j), S(r) will exhibit a signal signature $S_{FIMP}$ indicative of the impact of a protrusion with the toe portion 205, and when there are L protrusions 310 in the shell 20 (See FIG. 1 in conjunction with FIG. 15 and FIG. 14) then that signal signature $S_{FIMP}$ will be repeated L times per revolution of the shell 20.

For the purpose of conveying an intuitive understanding of this signal processing it may be helpful to consider the superposition principle and repetitive signals such as sinus signals. A sinus signal may exhibit an amplitude value and a phase value. In very brief summary, the superposition principle, also known as superposition property, states that, for all linear systems, the net response at a given place and time caused by two or more stimuli is the sum of the responses which would have been caused by each stimulus individually. Acoustic waves are a species of such stimuli. Also a vibration signal, such as the vibration signal $S_{EA}$, $S_{MD}$, S(j), S(r) including the signal signature $S_{FIMP}$ indicative of the impact of a protrusion with the toe portion 205 is a species of such stimuli. In fact, the vibration signal $S_{EA}$, $S_{MD}$, S(j), S(r) including the signal signature $S_{FIMP}$ may be regarded as a sum of sinus signals, each sinus signal exhibiting an amplitude value and a phase value. In this connection, reference is made to the Fourier series (See Equation 1 below):

$$F(t) = \sum_{n=0}^{n=\infty} C_n \sin(n\omega t + \Phi_n) \quad \text{(Eq. 1)}$$

wherein n=0 the average value of the signal during a period of time (it may be zero, but need not be zero), n=1 corresponds to the fundamental frequency of the signal F(t), n=2 corresponds to the first harmonic partial of the signal F(t)

ω=the angular frequency i.e. $(2*\pi*f_{ROT})$, $f_{ROT}$=the shell speed of rotation expressed as periods per second, t=time, $\Phi_n$=phase angle for the n:th partial, and $C_n$=Amplitude for the n:th partial It follows from the above Fourier series that a time signal may be regarded as composed of a superposition of a number of sinus signals.

An overtone is any frequency greater than the fundamental frequency of a signal.

In the above example, it is noted that the fundamental frequency will be $f_{ROT}$, i.e. the shell speed of rotation, since the FFT 510 receives a marker signal value P(j)=1 only one time per revolution of the shell 20 (See e.g. FIG. 14).

Using the model of Fourier analysis, the fundamental and the overtones together are called partials. Harmonics, or more precisely, harmonic partials, are partials whose frequencies are numerical integer multiples of the fundamental (including the fundamental, which is 1 times itself).

With reference to FIG. 15 and equation 1 above, the FFT 510 may deliver the amplitude value $C_n(r)$ for n=L, i.e. $C_L(r)$=Sp(r). The FFT 510 may also deliver phase angle for the partial (n=L), i.e. ΦL(r)=FI(r).

Now consider an example when a mill shell rotates at a speed of 10 revolutions per minute (rpm), the shell having ten (10) protrusions 310. A speed of 10 rpm renders one revolution every 6 seconds, i.e. $f_{ROT}$=0.1667 rev/sec. The shell having ten protrusions (i.e. L=10) and running at a speed of $f_{ROT}$=0.1667 rev/sec renders a repetition frequency $f_R$ of 1,667 Hz for the signal relating to the protrusions 310, since the repetition frequency $f_R$ is the frequency of order 10.

The position signal P(j), P(q) (see FIG. 15) may be used as a reference signal for the digital measurement signal S(j), S(r). According to some embodiments, when the FFT analyzer is configured to receive a reference signal, i.e. the position signal P(j), P(q), once per revolution of the rotating shell 20, the setting of the FFT analyzer should fulfill the following criteria:

- The integer value Oi is set to equal L, i.e. the number of protrusions in the shell 20, and
- the settable variables Y, and Z are selected such that the mathematical expression Oi*Z/Y becomes a positive integer. Differently expressed: When integer value Oi is set to equal L, then settable variables Y and Z should be set to integer values so as to render the variable X a positive integer,
- wherein X=Oi*Z/Y
- Y is a maximum order; and
- Z is the number of bins in the frequency spectrum produced by the FFT, and Oi is a frequency of interest, expressed as an integer in orders, and wherein $f_{ROT}$ is the frequency of order 1, i.e. the fundamental frequency. In other words, the speed of rotation $f_{ROT}$ of the shell 20 is the fundamental frequency and L is the number of protrusions in the shell 20

Using the above setting, i.e. integer value Oi is set to equal L, and with reference to FIG. 15 and equation 1 above, the FFT 510 may deliver the amplitude value $C_n$ for n=L, i.e. $C_L$=Sp(r). The FFT 510 may also deliver phase angle for the partial (n=L), i.e. $\Phi_L$=FI(r). Thus, according to embodiments of this disclosure, when the FFT 510 receives a position reference signal P(j), P(q) once per revolution of the rotating shell 20, then the FFT analyzer can be configured to generate a peak amplitude value $C_L$ for a signal whose repetition frequency $f_R$ is the frequency of order L, wherein L is the number of equidistantly positioned protrusions 310 in the rotating shell 20.

With reference to the discussion about equation 1 above in this disclosure, the amplitude of the signal whose repetition frequency $f_R$ is the frequency of order L may be termed $C_n$ for n=L, i.e. $C_L$. Referring to equation 1 and FIG. 15, the amplitude value $C_L$ may be delivered as a peak amplitude value indicated as Sp(r) in FIG. 15.

Again with reference to equation 1, above in this disclosure, the phase angle value $\Phi_L$ for the signal whose repetition frequency $f_R$ is the frequency of order L may be delivered as a temporal indicator value, the temporal indicator value being indicative of a temporal duration $T_{D1}$ between occurrence of an impact force $F_{IMP}$ and occurrence of a rotational reference position of said rotating shell.

Hence, according to embodiments of this disclosure, when the FFT 510 receives a position reference signal P(j), P(q) once per revolution of the rotating shell 20, then the FFT analyzer can be configured to generate a phase angle value $\Phi_L$ for a signal whose repetition frequency $f_R$ is the frequency of order L, wherein L is the number of equidistantly positioned protrusions 310 in the rotating shell 20.

Hence, using the above setting, i.e. integer value Oi being set to equal L, and with reference to FIG. 15 and equation 1 above, the FFT 510 may generate the phase angle value $\Phi_L$.

With reference to FIG. 15 in conjunction with FIG. 1A, the status values Sp(r)=$C_L$ and FI(r)=$\Phi_L$ may be delivered to the Human Computer Interface (HCI) 210 for providing a visual indication of the analysis result. As mentioned above, the analysis result displayed may include information indicative of an internal state of the tumbling mill process for enabling the operator 230 to control the tumbling mill.

FIG. 16 is an illustration of an example of a visual indication of an analysis result. According to an example, the visual indication of the analysis result may include the provision of a polar coordinate system 520. A polar coordinate system is a two-dimensional coordinate system in which each point on a plane is determined by a distance from a reference point 530 and an angle from a reference direction 540. The reference point 530 (analogous to the origin of a Cartesian coordinate system) is called the pole 530, and the ray from the pole in the reference direction is the polar axis. The distance from the pole is called the radial coordinate, radial distance or simply radius, and the angle is called the angular coordinate, polar angle, or azimuth.

According to an example, the amplitude value Sp(r) is used as the radius, and the temporal relation value FI(r), Φ(r), $T_D$ is used as the angular coordinate.

In this manner an internal status of the monitored tumbling mill may be illustrated by providing an internal status indicator object 550, on the display 210S (FIG. 16 in conjunction with FIG. 1A and/or FIG. 1B). FIG. 16 in conjunction with FIG. 1A and/or FIG. 1B and FIG. 14 may be useful for understanding the following example. Hence, an example relates to an electronic tumbling mill monitoring system 150, 210S for generating and displaying information relating to a grinding process in a tumbling mill 10 having a shell 20 that rotates around an axis 60 at a speed of rotation $f_{ROT}$ for grinding charge material 30 by tumbling the charge material in the rotating shell. The example monitoring system 150 includes:

- a computer implemented method of representing an internal state of said grinding process in said tumbling mill on a screen display 210S, the method comprising:

- displaying on said screen display 210S
  - a polar coordinate system 520, said polar coordinate system 520 having
    - a reference point (O, 530), and
    - a reference direction (0°, 360°, 540); and
  - a first internal status indicator object (550, $S_{P1}$, $T_{D1}$), indicative of said internal state of said grinding process, at a first radius (Sp(r), $S_{P1}$) from said reference point (O) and at a first polar angle (FI(r), Φ(r), $T_D$, $T_{D1}$) in relation to said reference direction (0°, 360°, 540),
- said first radius (Sp(r), $S_{P1}$) being indicative of an impact force ($F_{IMP}$) generated when a projection (310) on an internal shell surface of the rotating shell interacts with a toe portion 205 of the charge material (30), and said first polar angle (FI(r), Φ(r), $T_D$, $T_{D1}$) being indicative of a position of the toe portion 205 between two protrusions 310 in the rotating shell 20.

As mentioned above, the status parameter extractor 450 may be configured to generate successive pairs of the status values Sp(r) and FI(r). The status parameter extractor 450 may also generate time derivative values of the status values Sp(r) and FI(r), respectively. This may be done e.g. by subtracting a most recent previous status value Sp(r−1) from the most recent status value Sp(r) divided by the temporal duration between the two values. Similarly a numerical derivative of the internal status value FI may be achieved. Thus, derivative values dSp(r) and dFI(r) may be generated. The derivative values dSp(r) and dFI(r) may be used for indicating movement of the first internal status indicator object (550, $S_{P1}$, $T_{D1}$).

Figure 17:
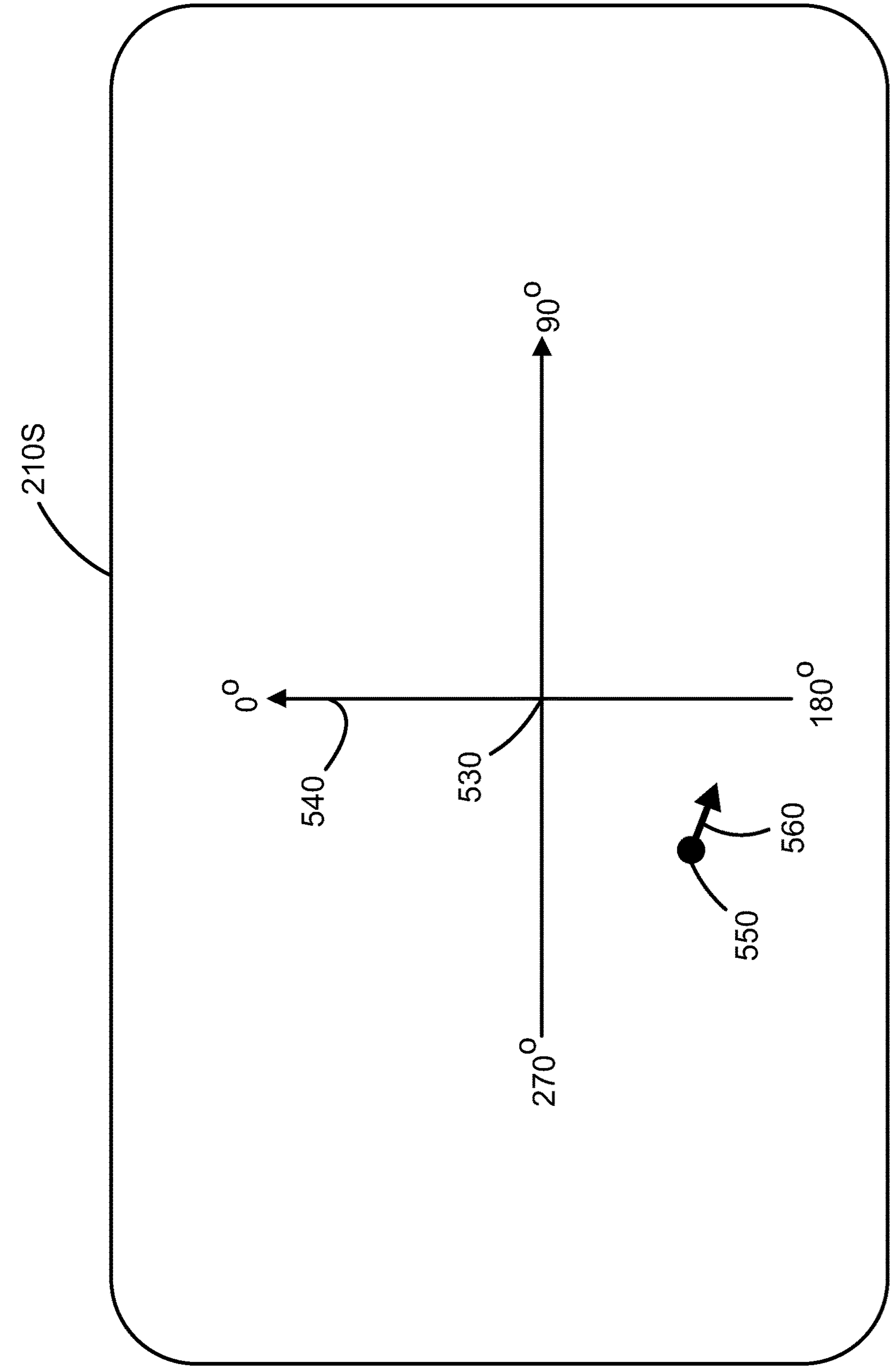
FIG. 17 is an illustrations of another example of a visual indication of an analysis result.
Figure 18:
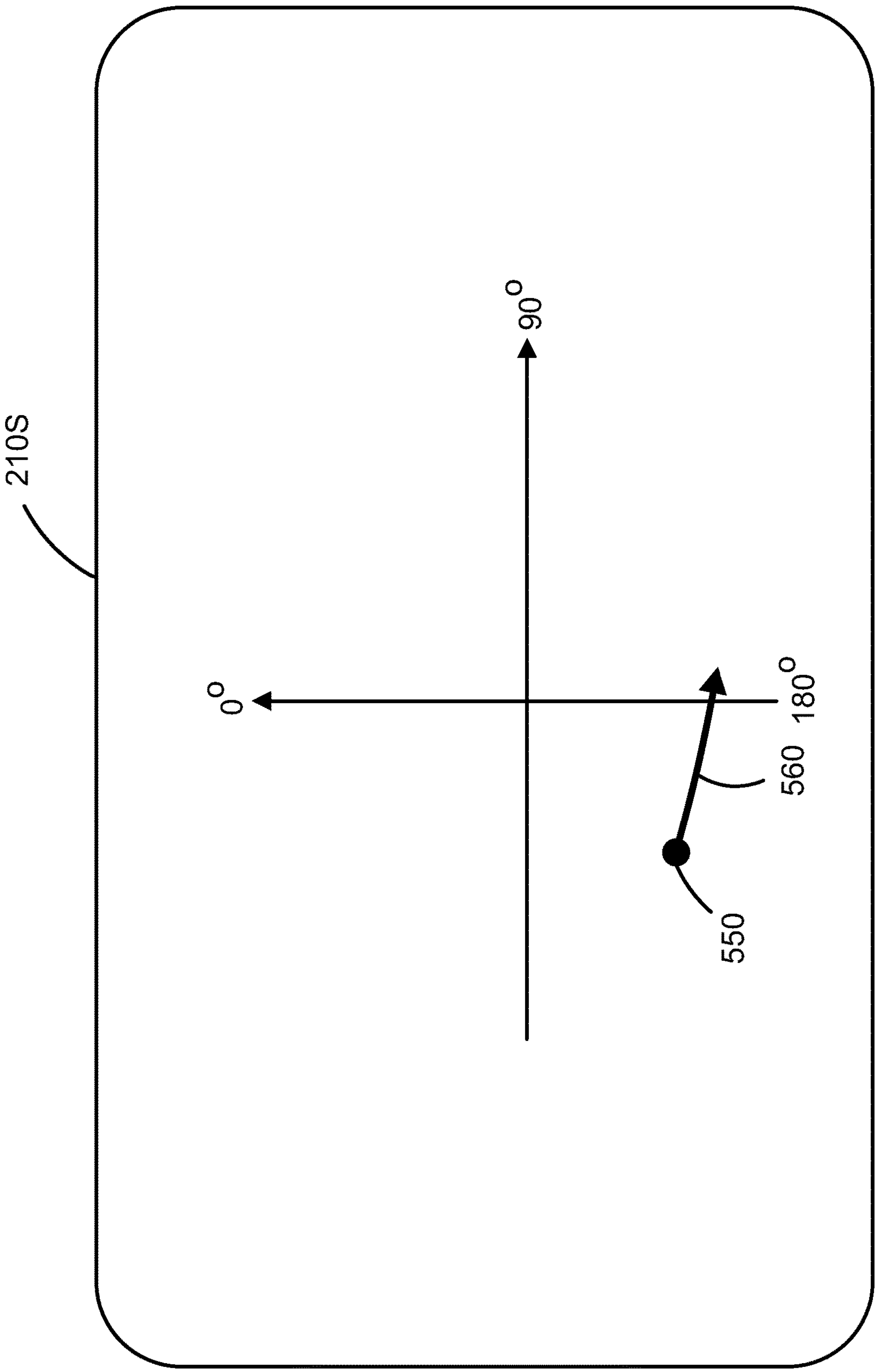
FIG. 18 is an illustration of another example of a visual indication of an analysis result.

FIGS. 17 and 18 are illustrations of another example of a visual indication of an analysis result. With reference to FIGS. 17 and 18 the above mentioned derivative values may be used for displaying, on said screen display 210S, an arrow 560 originating at the position of the first internal status indicator object (550, $S_{P1}$, $T_{D1}$) and having an extension that depends on the magnitude of the derivative values. In other words, the absence of an arrow 560 means that the internal status is stable, not having changed for the temporal duration. The arrow 560 in FIG. 18 is longer than the arrow 560 in FIG. 17, thereby indicating a faster ongoing change of the internal status of the mill represented in FIG. 18 than that of the mill represented in FIG. 17.

Figure 19A:
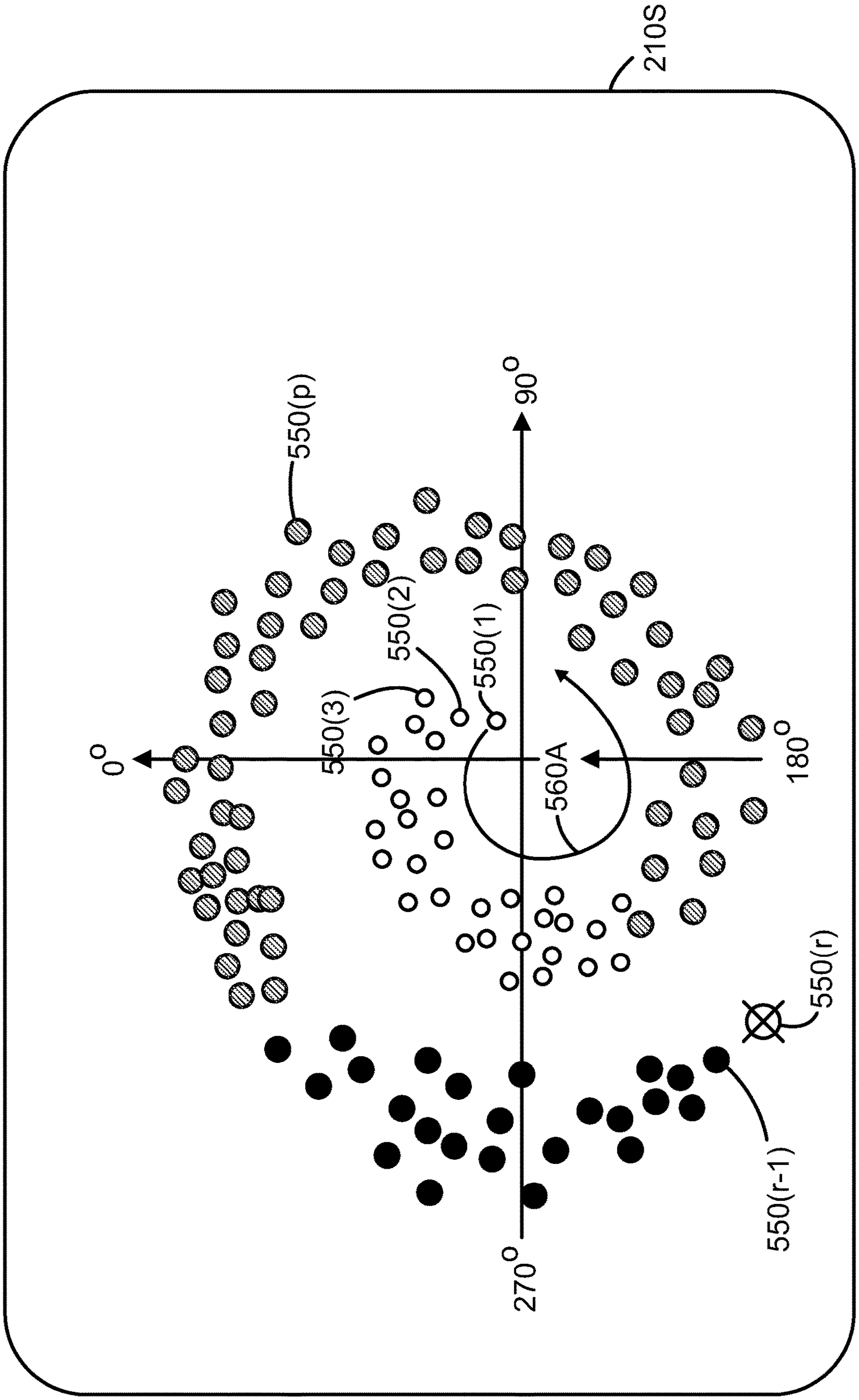
FIGS. 19A and 19B are illustrations of yet another example of a visual indication of an analysis result in terms of internal status of the tumbling mill.
Figure 19B:
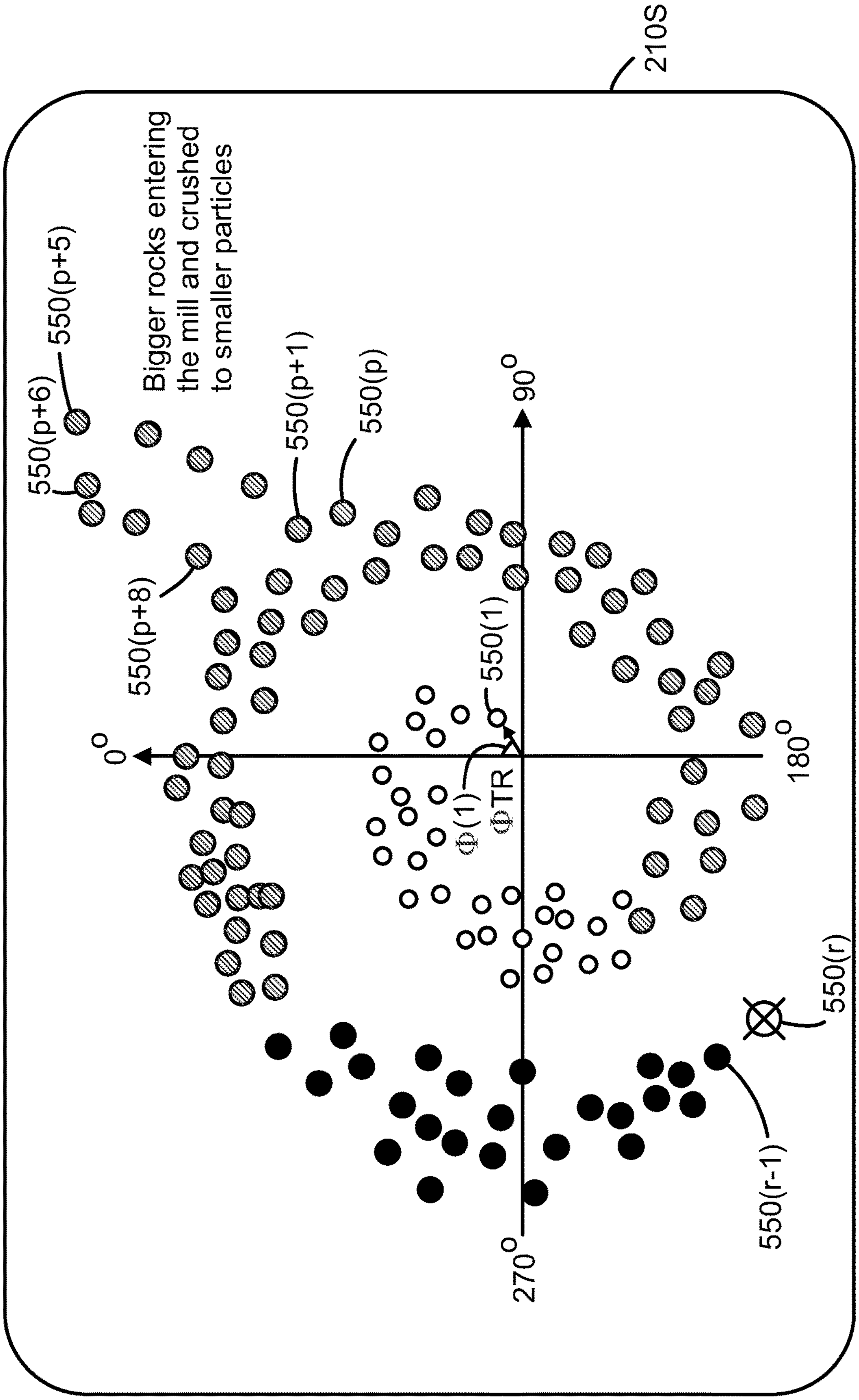

FIGS. 19A and 19B are illustrations of yet another example of a visual indication of an analysis result in terms of internal status of the tumbling mill 10. A most recent internal status indicator object 550(*r*) indicates a current internal status of the mill 10. Another internal status indicator object 550(*r*−1) indicates a most recent previous internal status of the mill 10.

An internal status indicator object 550(1), shown as a small empty circle, indicates an internal status of the mill 10 at a nearly empty degree of filling. It is noted that when starting up a tumbling mill from an empty state, the initial internal status indicator object appears at an initial polar angle Φ(1) that represents a very first detected toe position of the mill. In FIGS. 19A and 19B the first thirty-one (31) detected toe positions are indicated as empty circles, starting with the small empty circle 550(1). Based on experimental measurements, it appears as though the initial polar angle Φ(1) may be used as a reference toe position value. Hence, the initial polar angle Φ(1) may thus be termed reference toe position value $\Phi_{TR}$. For the particular tumbling mill whose internal state is represented by the display 210S illustrated by FIGS. 19A and 19B, the reference toe position corresponds to an angular value $\Phi_{TR}$ of about 47 degrees, as can be seen in FIGS. 19A and 19B. Whereas the first thirty-one (31) detected toe positions are indicated as empty circles, a thereafter following sequence of toe positions are indicated as shaded circles, one of the shaded circles being indicated as 550(*p*) in FIG. 19A. The shaded circles in FIG. 19A represent higher filling degrees of the mill shell 20 than the filling degrees indicated by empty circles. The full, black, circles in FIG. 19A represent higher filling degrees of the mill shell 20 than the filling degrees indicated by shaded circles. Hence, it is noted that an initial, lowest detected, filling degree appears to be represented by a comparatively small radius, i.e. a low peak amplitude value Sp, at an initial polar angle Φ(1).

With reference to FIG. 19A, a gradually increasing detected toe position FI(r), and in a corresponding manner a gradually increasing filling degree of the mill shell 20, renders an image of a spiral arm that whirls outwards in a counter-clockwise direction, as indicated by a curved arrow 560A in FIG. 19A, starting from the first internal status indicator object 550(1).

In this manner, the current internal status of the tumbling mill 20 may be represented and visualized such that it intuitively makes sense to an operator 230 of the mill system 5. It is to be noted that, whereas the display of a single internal status indicator object 550, as shown in FIG. 17, represents a current internal status, or a latest detected internal status of the mill 10, the display of a temporal progression of internal status indicator objects ranging from an initial status 550(1) via intermediate states, such as 550(*p*) and 550(*r*−1) to 550(*r*), as shown in FIG. 19A, represents a current internal status 550(*r*) as well as a history of several earlier internal states 550(*p*), 550(*p*+1), 550(*r*−1), of the mill 10.

In other words, a gradually increasing polar angle FI(r) in combination with a gradually increasing radius value $S_P$(r) renders an image of a spiral arm that whirls outwards, as indicated by a curved arrow 560A in FIG. 19A, starting from the first internal status indicator object 550(1). An “angular length” X6(r) of the spiral arm, from the initial polar angle Φ(1) of the first internal status indicator object 550(1) up to the current, or latest detected, toe position FI(r), appears to be indicative of an absolute position X6(r) of the toe portion 205 (see e.g. FIG. 2 and FIG. 14). In this connection, it is noted that 360 degrees in the polar coordinate system 520 of FIG. 19A corresponds to 100% of the distance between the leading edges of two adjacent protrusions, such as 312C and 312D in FIG. 2.

An Example of Variable Speed Phase Status Parameter Extractor

As mentioned above, the analysis of the measurements data is further complicated if the tumbling mill shell 20 rotates at a variable rotational speed $f_{ROT}$. In fact, it appears as though even very small variations in rotational speed of the mill shell may have a large adverse effect on detected signal quality in terms of smearing. Hence, a very accurate detection of the rotational speed $f_{ROT}$ of the mill shell 20 appears to be of essence, and an accurate compensation for any speed variations appears to also be of essence.

With reference to FIG. 15, the shell speed detector 500 may deliver a signal indicating when the speed of rotation varies, as discussed in connection with FIG. 9. Referring again to FIG. 15, the signals S(j) and P(j) as well as the speed value $f_{ROT}$(j) may be delivered to a speed variation compensatory decimator 470. The speed variation compensatory decimator 470 may also be referred to as a fractional decimator. The decimator 470 is configured to decimate the digital measurement signal $S_{MD}$ based on the received speed value $f_{ROT}$(j). According to an example, the decimator 470 is configured to decimate the digital measurement signal $S_{MD}$ by a variable decimation factor D, the variable decimation factor D being adjusted during a measuring session based on the variable speed value $f_{ROT}$(j). Hence, the compensatory decimator 470 is configured to generate a decimated digital vibration signal $S_{MDR}$ such that the number of sample values per revolution of said rotating shell is kept at a constant value, or at a substantially constant value, when said rotational speed varies. According to some embodiments, the number of sample values per revolution of said rotating shell is considered to be a substantially constant value when the number of sample values per revolution varies less than 5%. According to a preferred embodiment, the number of sample values per revolution of said rotating shell is considered to be a substantially constant value when the number of sample values per revolution varies less than 1%. According to a most preferred embodiment, the number of sample values per revolution of said rotating shell is considered to be a substantially constant value when the number of sample values per revolution varies by less than 0.2%.

Thus, the FIG. 15 embodiment includes the fractional decimator 470 for decimating the sampling rate by a decimation factor $D=N/U_D$, wherein both $U_D$ and N are positive integers. Hence, the fractional decimator 470 advantageously enables the decimation of the sampling rate by a fractional number. Hence, the speed variation compensatory decimator 470 may operate to decimate the signals S(j) and P(j) and $f_{ROT}(j)$ by a fractional number $D=N/U_D$. According to an embodiment the values for $U_D$ and N may be selected to be in the range from 2 to 2000. According to an embodiment the values for $U_D$ and N may be selected to be in the range from 500 to 1500. According to yet another embodiment the values for $U_D$ and N may be selected to be in the range from 900 to 1100. In this context it is noted that the background of the term "fraction" is as follows:

A fraction (from Latin fractus, "broken") represents a part of a whole or, more generally, any number of equal parts. In positive common fractions, the numerator and denominator are natural numbers. The numerator represents a number of equal parts, and the denominator indicates how many of those parts make up a unit or a whole. A common fraction is a numeral which represents a rational number. That same number can also be represented as a decimal, a percent, or with a negative exponent. For example, 0.01, 1%, and 10−2 are all equal to the fraction 1/100. Hence, the fractional number $D=N/U_D$ may be regarded as an inverted fraction.

Thus, the resulting signal $S_{MDR}$, which is delivered by fractional decimator 470, has a sample rate of $$f_{SR}=f_S/D=f_S*U_D/N$$

where $f_S$ is the sample rate of the signal $S_{RED}$ received by fractional decimator 470.

The fractional value $U_D/N$ is dependent on a rate control signal received on an input port 490. The rate control signal may be a signal indicative of the speed of rotation $f_{ROT}$ of the rotating shell.

The variable decimator value D for the decimator may be set to $D=f_S/f_{SR}$, wherein $f_S$ is the initial sample rate of the A/D converter, and $f_{SR}$ is a set point value indicating a number of samples per revolution in the decimated digital vibration signal $S_{MDR}$. For example, when there are twelve (12) protrusions in the mill shell to be monitored, the set point value $f_{SR}$ may be set to 768 samples per revolution, i.e. the number of samples per revolution is set to fsr in the decimated digital vibration signal $S_{MDR}$. The compensatory decimator 470 is configured to generate a position signal P(q) at a regular interval of the decimated digital vibration signal $S_{MDR}$, the regular interval being dependent on the set point value $f_{SR}$. For example, when $f_{SR}$ is set to 768 samples per revolution, a position signal P(q) may be delivered once with every 768 sample of the decimated vibration signal S(q).

Hence, the sampling frequency $f_{SR}$, also referred to as $f_{SR2}$, for the output data values R(q) is lower than input sampling frequency $f_S$ by a factor D. The factor D can be set to an arbitrary number larger than 1, and it may be a fractional number, as discussed elsewhere in this disclosure. According to preferred embodiments the factor D is settable to values between 1.0 to 20.0. In a preferred embodiment the factor D is a fractional number settable to a value between about 1.3 and about 3.0. The factor D may be obtained by setting the integers $U_D$ and N to suitable values. The factor D equals N divided by $U_D$:

$$D=N/U_D$$

According to an embodiment, the integers $U_D$ and N are settable to large integers in order to enable the factor $D=N/U_D$ to follow speed variations with a minimum of inaccuracy. Selection of variables $U_D$ and N to be integers larger than 1000 renders an advantageously high accuracy in adapting the output sample frequency to tracking changes in the rotational speed of the shell 20. So, for example, setting N to 500 and $U_D$ to 1001 renders D=2,002.

The variable D is set to a suitable value at the beginning of a measurement and that value is associated with a certain speed of rotation of a rotating part to be monitored. Thereafter, during measuring session, the fractional value D is automatically adjusted in response to the speed of rotation of the rotating part to be monitored so that the output signal $S_{MDR}$ provides a substantially constant number of sample values per revolution of the rotating shell.

Figure 20:
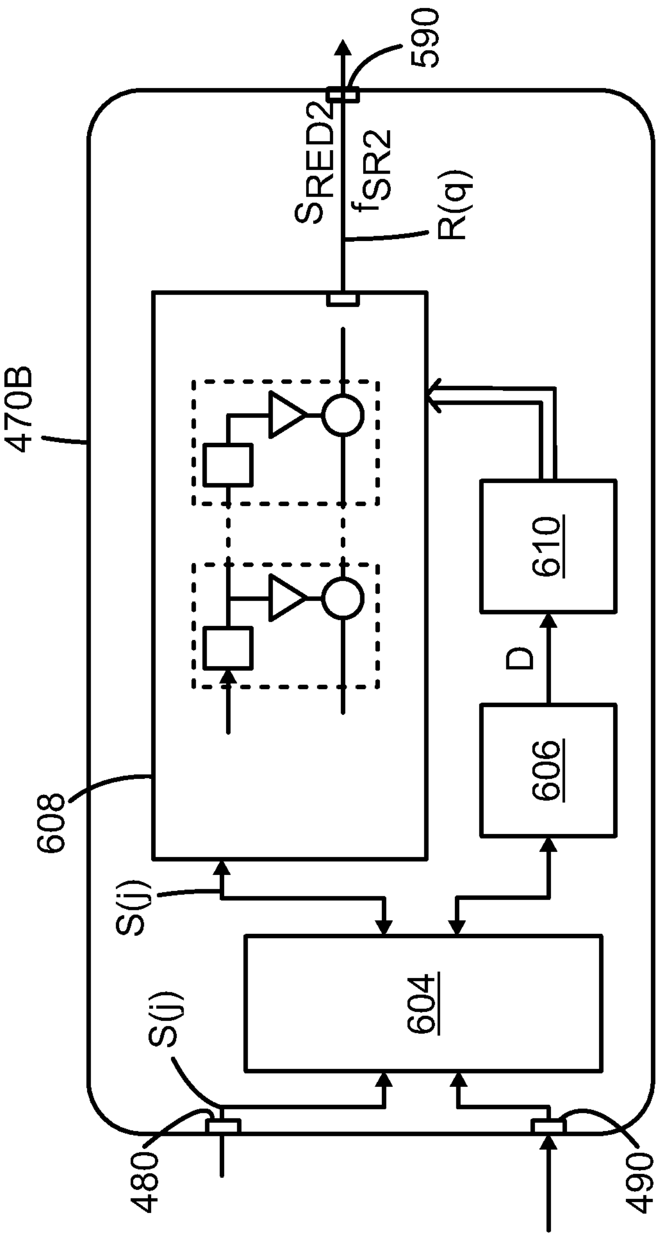
FIG. 20 is a block diagram of an example of compensatory decimator.

FIG. 20 is a block diagram of an example of compensatory decimator 470. This compensatory decimator example is denoted 470B.

Compensatory decimator 470B may include a memory 604 adapted to receive and store the data values S(j) as well as information indicative of the corresponding speed of rotation $f_{ROT}$ of the monitored rotating mill shell. Hence the memory 604 may store each data value S(j) so that it is associated with a value indicative of the speed of rotation $f_{ROT}(j)$ of the monitored mill shell at time of detection of the sensor signal $S_{EA}$ value corresponding to the data value S(j). The provision of data values S(j) associated with corresponding speed of rotation values $f_{ROT}(j)$ is described with reference to FIGS. 7-13 above.

Compensatory decimator 470B receives the signal $S_{MD}$, having a sampling frequency $f_{SR1}$, as a sequence of data values S(j), and it delivers an output signal $S_{MDR}$, having a reduced sampling frequency $f_{SR}$, as another sequence of data values R(q) on its output 590.

Compensatory decimator 470B may include a memory 604 adapted to receive and store the data values S(j) as well as information indicative of the corresponding speed of rotation $f_{ROT}$ of the monitored rotating mill shell. Memory 604 may store data values S(j) in blocks so that each block is associated with a value indicative of a relevant speed of rotation of the monitored mill shell, as described below in connection with FIG. 21.

Compensatory decimator 470B may also include a compensatory decimation variable generator 606, which is adapted to generate a compensatory value D. The compensatory value D may be a floating number. Hence, the compensatory number can be controlled to a floating number value in response to a received speed value $f_{ROT}$ so that the floating number value is indicative of the speed value $f_{ROT}$ with a certain inaccuracy. When implemented by a suitably programmed DSP, as mentioned above, the inaccuracy of floating number value may depend on the ability of the DSP to generate floating number values.

Moreover, compensatory decimator 470B may also include a FIR filter 608. In this connection, the acronym FIR stands for Finite Impulse Response. The FIR filter 608 is a low pass FIR filter having a certain low pass cut off frequency adapted for decimation by a factor $D_{MAX}$. The factor $D_{MAX}$ may be set to a suitable value, e.g. 20,000. Moreover, compensatory decimator 470B may also include a filter parameter generator 610.

Operation of compensatory decimator 470B is described with reference to FIGS. 21 and 22 below.

Figure 21:
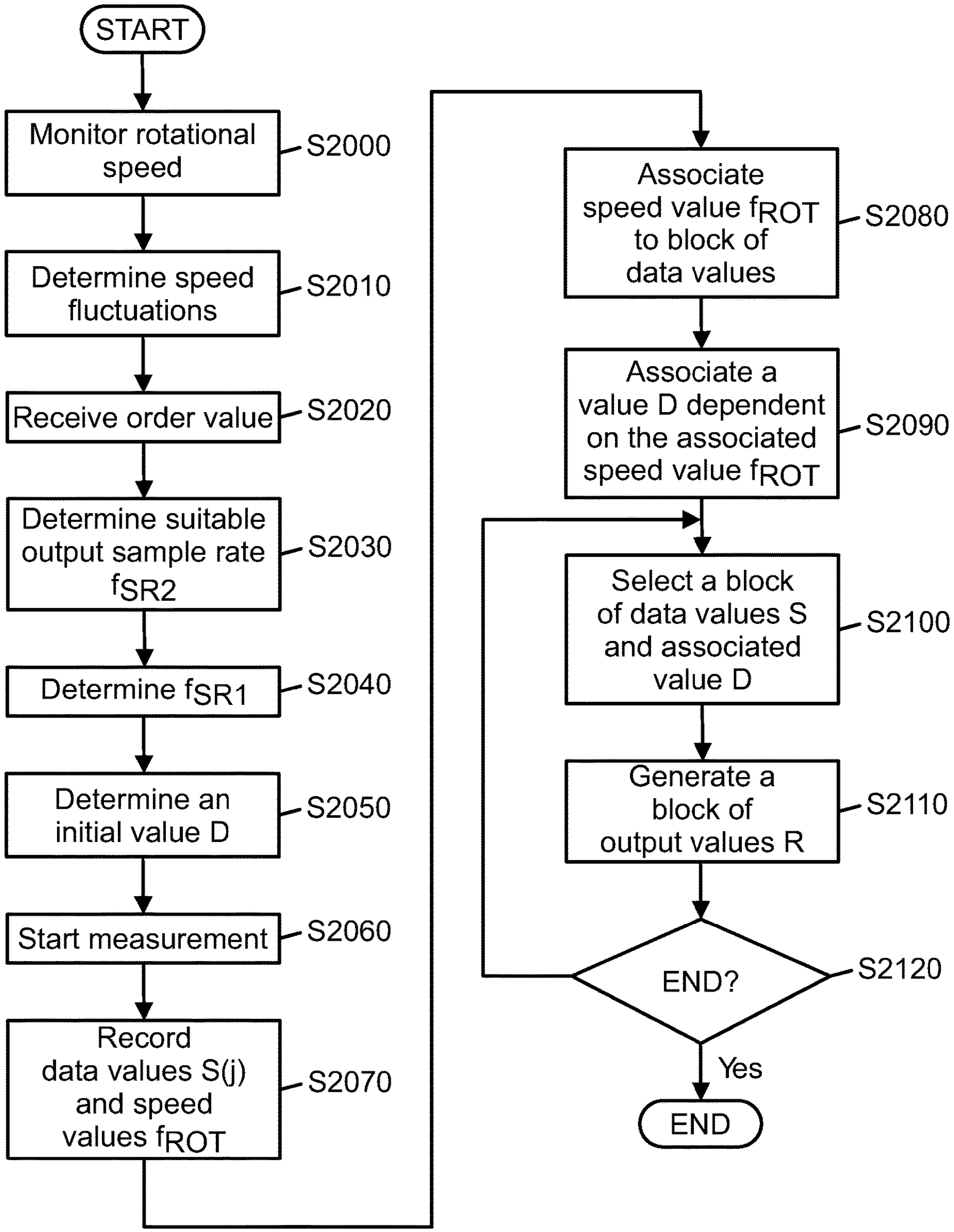
FIG. 21 is a flow chart illustrating an embodiment of a method of operating the compensatory decimator of FIG. 20.

FIG. 21 is a flow chart illustrating an embodiment of a method of operating the compensatory decimator 470B of FIG. 20.

In a first step S2000, the speed of rotation $f_{ROT}$ of the mill shell to be monitored is recorded in memory 604 (FIGS. 20 & 21), and this may be done at substantially the same time as measurement of vibrations begin. According to another example the speed of rotation of the mill shell to be monitored is surveyed for a period of time. The highest detected speed $f_{ROTmax}$ and the lowest detected speed $f_{ROTmin}$ may be recorded, e.g. in memory 604 (FIGS. 20 & 21).

In step S2010, the recorded speed values are analysed, for the purpose of establishing whether the speed of rotation varies.

In step S2020, the user interface 210, 210S displays the recorded speed value $f_{ROT}$ or speed values $f_{ROTmin}$, $f_{ROTmax}$, and requests a user to enter a desired order value Oi. As mentioned above, the mill shell rotation frequency $f_{ROT}$ is often referred to as “order 1”. The interesting signals may occur about ten times per mill shell revolution (Order 10). Moreover, it may be interesting to analyse overtones of some signals, so it may be interesting to measure up to order 100, or order 500, or even higher. Hence, a user may enter an order number Oi using user interface 210, 210S.

In step S2030, a suitable output sample rate $f_{SR}$ is determined. The output sample rate $f_{SR}$ may also be referred to as $f_{SR2}$ in this disclosure. According to an embodiment output sample rate $f_{SR}$ is set to $f_{SR}=C*Oi*f_{ROTmin}$ wherein

- C is a constant having a value higher than 2.0
- Oi is a number indicative of the relation between the speed of rotation of the monitored mill shell and the repetition frequency of the signal to be analysed.
- $f_{ROTmin}$ is a lowest speed of rotation of the monitored mill shell to expected during a forthcoming measurement session. According to an embodiment the value $f_{ROTmin}$ is a lowest speed of rotation detected in step S2020, as described above.

The constant C may be selected to a value of 2.00 (two) or higher in view of the sampling theorem. According to embodiments of the present disclosure the Constant C may be preset to a value between 2.40 and 2.70.

According to an embodiment the factor C is advantageously selected such that 100*C/2 renders an integer. According to an embodiment the factor C may be set to 2.56. Selecting C to 2.56 renders 100*C=256=2 raised to 8.

In step S2050, a compensatory decimation variable value D is determined. When the speed of rotation of the mill shell to be monitored varies, the compensatory decimation variable value D will vary in dependence on momentary detected speed value.

According to an embodiment, a maximum compensatory decimation variable value $D_{MAX}$ is set to a value of $D_{MAX}=f_{ROTmax}/f_{ROTmin}$, and a minimum compensatory decimation variable value $D_{MIN}$ is set to 1.0. Thereafter a momentary real time measurement of the actual speed value $f_{ROT}$ is made and a momentary compensatory value D is set accordingly.

- $f_{ROT}$ is value indicative of a measured speed of rotation of the rotating mill shell to be monitored In step S2060, the actual measurement is started, and a desired total duration of the measurement may be determined. The total duration of the measurement may be determined in dependence on a desired number of revolutions X of the monitored mill shell.

When measurement is started, a digital signal $S_{MD}$ is delivered to input 480 of the compensatory decimator. In the following the signal $S_{MD}$ is discussed in terms of a signal having sample values S(j), where j is an integer.

In step S2070, record data values S(j) in memory 604, and associate each vibration data value S(j) with a speed of rotation value $f_{ROT}(j)$.

In a subsequent step S2080, analyze the recorded speed of rotation values, and divide the recorded data values S(j) into blocks of data dependent on the speed of rotation values. In this manner a number of blocks of block of data values S(j) may be generated, each block of data values S(j) being associated with a speed of rotation value. The speed of rotation value indicates the speed of rotation of the monitored mill shell, when this particular block data values S(j) was recorded. The individual blocks of data may be of mutually different size, i.e. individual blocks may hold mutually different numbers of data values S(j).

If, for example, the monitored rotating mill shell first rotated at a first speed $f_{ROT1}$ during a first time period, and it thereafter changed speed to rotate at a second speed $f_{ROT2}$ during a second, shorter, time period, the recorded data values S(j) may be divided into two blocks of data, the first block of data values being associated with the first speed value $f_{ROT1}$, and the second block of data values being associated with the second speed value $f_{ROT2}$. In this case the second block of data would contain fewer data values than the first block of data since the second time period was shorter.

According to an embodiment, when all the recorded data values S(j) have been divided into blocks, and all blocks have been associated with a speed of rotation value, then the method proceeds to execute step S2090.

In step S2090, select a first block of data values S(j), and determine a compensatory decimation value D corresponding to the associated speed of rotation value $f_{ROT}$. Associate this compensatory decimation value D with the first block of data values S(j). According to an embodiment, when all blocks have been associated with a corresponding compensatory decimation value D, then the method proceeds to execute step S2100. Hence, the value of the compensatory decimation value D is adapted in dependence on the speed $f_{ROT}$.

In step S2100, select a block of data values S(j) and the associated compensatory decimation value D, as described in step S2090 above.

In step S2110, generate a block of output values R in response to the selected block of input values S and the associated compensatory decimation value D. This may be done as described with reference to FIG. 22.

In step S2120, Check if there is any remaining input data values to be processed. If there is another block of input data values to be processed, then repeat step S2100. If there is no remaining block of input data values to be processed then the measurement session is completed.

Figure 22A:
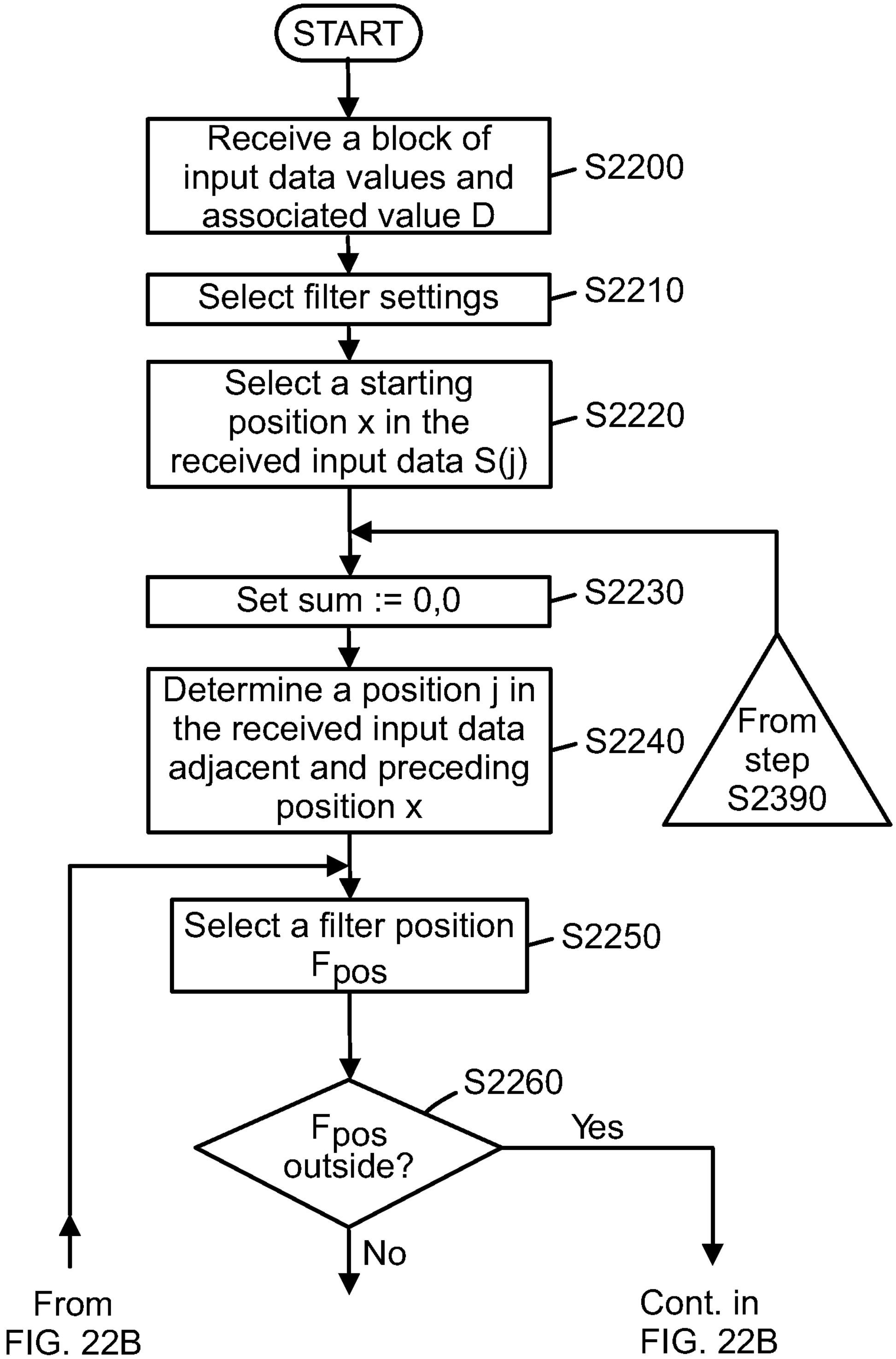
FIGS. 22A, 22B and 22C illustrate a flow chart of an embodiment of a method of operating the compensatory decimator of FIG. 20.
Figure 22B:
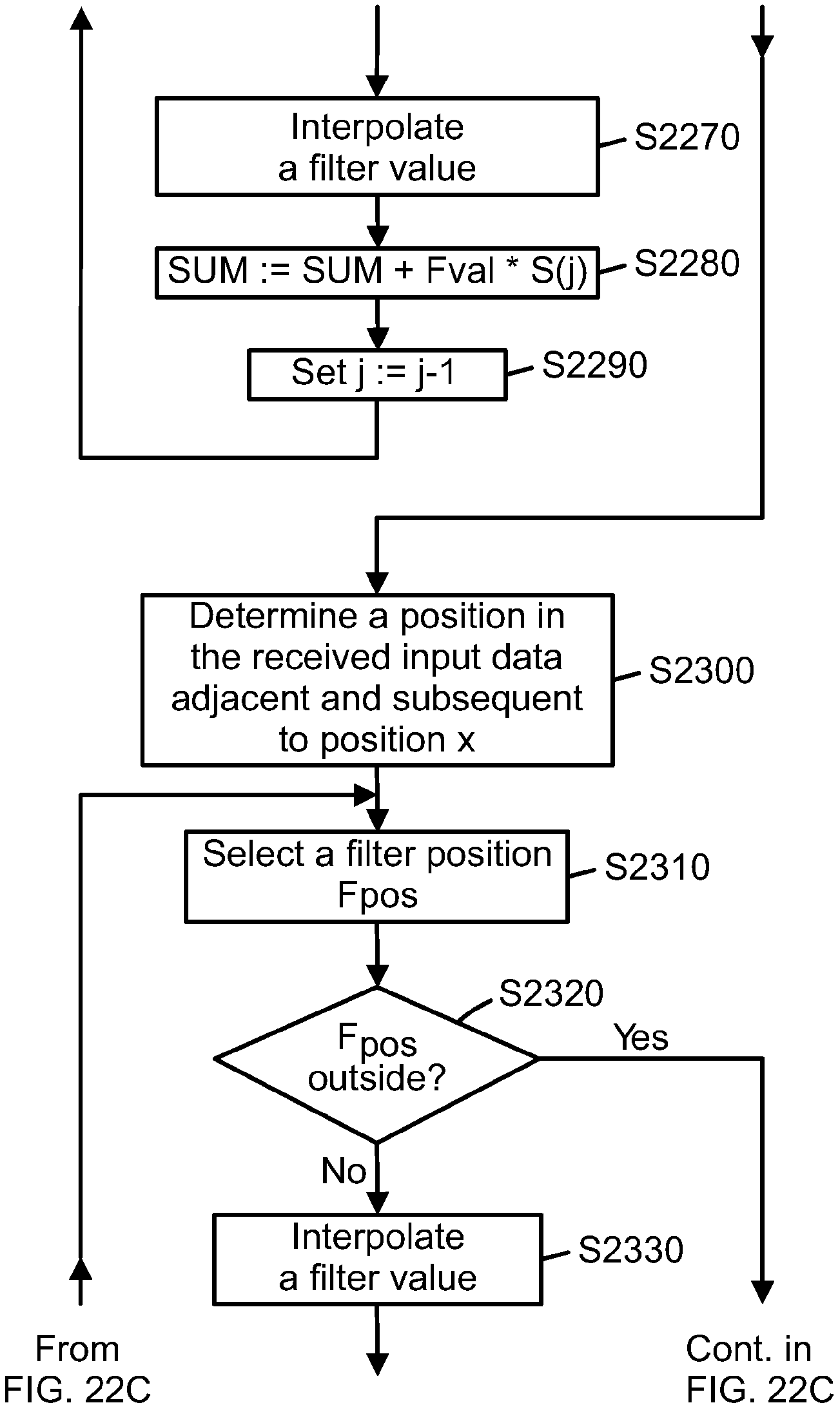
Figure 22C:
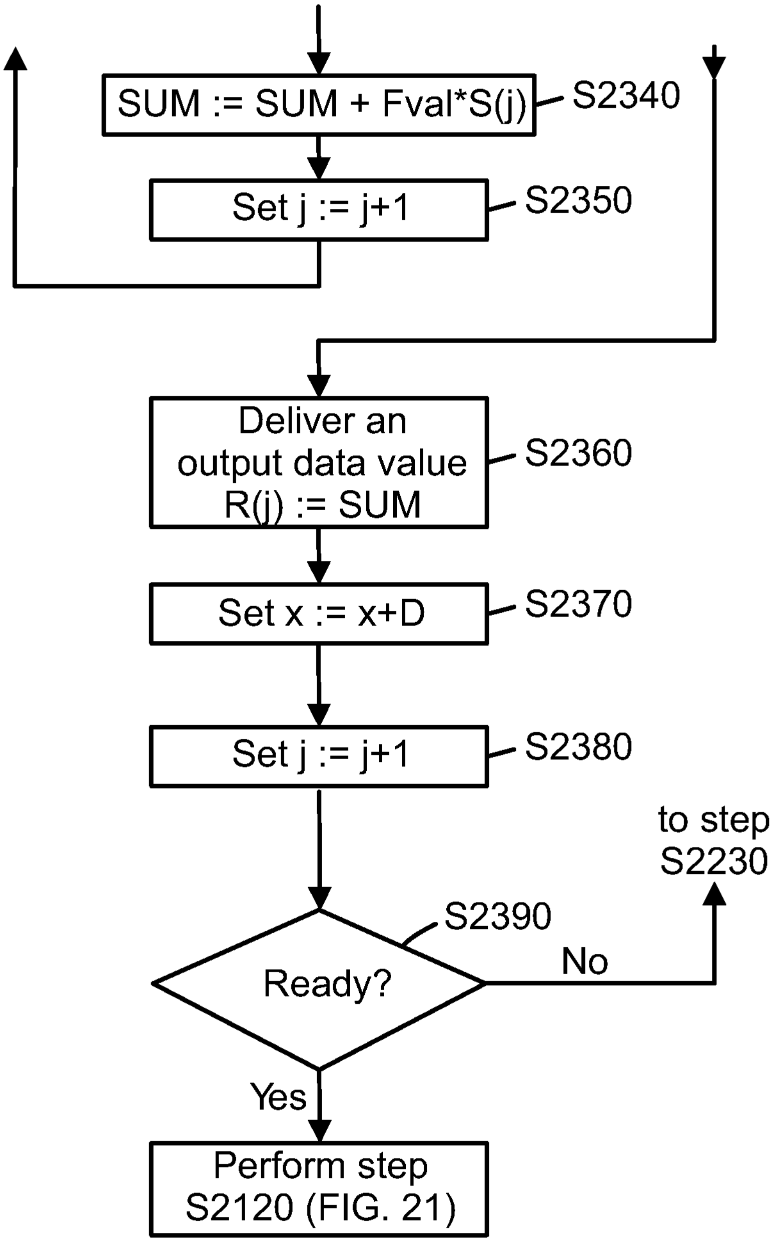

FIGS. 22A, 22B and 22C illustrate a flow chart of an embodiment of a method of operating the compensatory decimator 470B of FIG. 20.

In a step S2200, receive a block of input data values S(j) and an associated specific compensatory decimation value D. According to an embodiment, the received data is as described in step S2100 for FIG. 21 above. The input data values S(j) in the received block of input data values S are all associated with the specific compensatory decimation value D.

In steps S2210 to S2390 the FIR-filter 608 (See FIG. 20) is adapted for the specific compensatory decimation value D as received in step S2200, and a set of corresponding output signal values R(q) are generated. This is described more specifically below.

In a step S2210, filter settings suitable for the specific compensatory decimation value D are selected. As mentioned in connection with FIG. 20 above, the FIR filter 608 is a low pass FIR filter having a certain low pass cut off frequency adapted for decimation by a factor $D_{MAX}$. The factor $D_{MAX}$ may be set to a suitable value, e.g. 20.

A filter ratio value $F_R$ is set to a value dependent on factor $D_{MAX}$ and the specific compensatory decimation value D as received in step S2200. Step S2210 may be performed by filter parameter generator 610 (FIG. 20).

In a step S2220, select a starting position value x in the received input data block s(j). It is to be noted that the starting position value x does not need to be an integer. The FIR filter 608 has a length $F_{LENGTH}$ and the starting position value x will then be selected in dependence of the filter length $F_{LENGTH}$ and the filter ratio value $F_R$. The filter ratio value $F_R$ is as set in step S2210 above. According to an embodiment, the starting position value x may be set to $x:=F_{LENGTH}/F_R$.

In a step S2230 a filter sum value SUM is prepared, and set to an initial value, such as e.g. SUM:=0.0

In a step S2240 a position j in the received input data adjacent and preceding position x is selected. The position j may be selected as the integer portion of x.

In a step S2250 select a position Fpos in the FIR filter that corresponds to the selected position j in the received input data. The position Fpos may be a compensatory number. The filter position Fpos, in relation to the middle position of the filter, may be determined to be $$Fpos=[(x-j)*F_R]$$

wherein $F_R$ is the filter ratio value.

In step S2260, check if the determined filter position value Fpos is outside of allowable limit values, i.e. points at a position outside of the filter. If that happens, then proceed with step S2300 below. Otherwise proceed with step S2270.

In a step S2270, a filter value is calculated by means of interpolation. It is noted that adjacent filter coefficient values in a FIR low pass filter generally have similar numerical values. Hence, an interpolation value will be advantageously accurate. First an integer position value IFpos is calculated:

$$IFpos:=\text{Integer portion of } Fpos$$

The filter value Fval for the position Fpos will be:

$$Fval=A(IFpos)+[A(IFpos+1)-A(IFpos)]*[Fpos-IFpos]$$

wherein A(IFpos) and A(IFpos+1) are values in a reference filter, and the filter position Fpos is a position between these values.

In a step S2280, calculate an update of the filter sum value SUM in response to signal position j:

$$SUM:=SUM+Fval*S(j)$$

In a step S2290 move to another signal position:

$$\text{Set } j:=j-1$$

Thereafter, go to step S2250.

In a step 2300, a position j in the received input data adjacent and subsequent to position x is selected. This position j may be selected as the integer portion of x. plus 1 (one), i.e j:=1+Integer portion of x In a step S2310 select a position in the FIR filter that corresponds to the selected position j in the received input data. The position Fpos may be a compensatory number. The filter position Fpos, in relation to the middle position of the filter, may be determined to be $$Fpos=[(j-x)*F_R]$$

wherein $F_R$ is the filter ratio value.

In step S2320, check if the determined filter position value Fpos is outside of allowable limit values, i.e. points at a position outside of the filter. If that happens, then proceed with step S2360 below. Otherwise proceed with step S2330.

In a step S2330, a filter value is calculated by means of interpolation. It is noted that adjacent filter coefficient values in a FIR low pass filter generally have similar numerical values. Hence, an interpolation value will be advantageously accurate. First an integer position value IFpos is calculated:

$$IFpos:=\text{Integer portion of } Fpos$$

The filter value for the position Fpos will be:

$$Fval(Fpos)=A(IFpos)+[A(IFpos+1)-A(IFpos)]*[Fpos-IFpos]$$

wherein A(IFpos) and A(IFpos+1) are values in a reference filter, and the filter position Fpos is a position between these values.

In a step S2340, calculate an update of the filter sum value SUM in response to signal position j:

$$SUM:=SUM+Fval*S(j)$$

In a step S2350 move to another signal position:

$$\text{Set } j:=j+1$$

Thereafter, go to step S2310.

In a step S2360, deliver an output data value R(j). The output data value R(j) may be delivered to a memory so that consecutive output data values are stored in consecutive memory positions. The numerical value of output data value R(j) is:

$$R(j):=SUM$$

In a step S2370, update position value x:

$$x:=x+D$$

In a step S2380, update position value j $$j:=j+1$$

In a step S2390, check if desired number of output data values have been generated. If the desired number of output data values have not been generated, then go to step S2230. If the desired number of output data values have been generated, then go to step S2120 in the method described in relation to FIG. 21.

In effect, step S2390 is designed to ensure that a block of output signal values R(q), corresponding to the block of input data values S received in step S2200, is generated, and that when output signal values R corresponding to the input data values S have been generated, then step S2120 in FIG. 21 should be executed.

The method described with reference to FIG. 22 may be implemented as a computer program subroutine, and the steps S2100 and S2110 may be implemented as a main program.

FIG. 23 shows another example of a cross-sectional view of the mid-portion 98 of a rotating mill shell 20 during operation. This view could be taken e.g. along line A-A of FIG. 1A. According to the example of FIG. 23, the tumbling mill shell 20 has six protrusions 310 configured to engage the charge material 30 as the shell rotates about the axis 60, i.e. the number L=6. For the purpose of clarity, the protrusions in the example of FIG. 23 have been individually referenced as $\mathbf{310}_1$, $\mathbf{310}_2$, $\mathbf{310}_3$, $\mathbf{310}_4$, $\mathbf{310}_5$, and $\mathbf{310}_6$.

A position sensor 170 is provided to generate the position signal Ep dependent on the rotational position of the shell 20. As mentioned above, the shell 20 is rotatable around the axis of rotation 60, and thus the position sensor 170, being mounted in an immobile manner, may generate a position signal Ep having a sequence of shell position signal values $P_S$ for indicating momentary rotational positions of the shell 20. As shown in FIG. 23 a number of position markers 180 may be provided on an outer surface of the shell 20 such that, when the shell 20 rotates around the axis of rotation 60, several position markers 180 pass by the position sensor 170 during one revolution of the shell 20, each marker 180 thereby causing the position sensor 170 to generate a revolution marker signal value $P_S$. According to an embodiment, there are L position markers 180 provided on the shell 20 such that, when the shell 20 rotates around the axis of rotation 60, the position markers $\mathbf{180}_1 \ldots \mathbf{180}_L$ consecutively pass by the position sensor 170, thereby causing the position sensor 170 to generate L revolution marker signal values $P_S$ during one revolution of the shell 20. According to the embodiment shown in FIG. 23, there are six protrusions 310, i.e. L=6, and there are six position markers $\mathbf{180}_1$, $\mathbf{180}_2$, $\mathbf{180}_3$, $\mathbf{180}_4$, $\mathbf{180}_5$, and $\mathbf{180}_6$. It is believed to be important that the placement, in terms of angular positions, of the position markers 180 mirrors the placement, in terms of angular positions, of the protrusions 310 on the internal surface 22 of shell 20.

In the embodiment of FIG. 23 the L position markers 180 are positioned in a mutually equidistant manner on the perimeter of the shell 20, thereby causing the position sensor 170 to generate a marker signal $P_S$ every 360/L degrees during a revolution of the shell 20. In this context it is noted that, in the embodiment of FIG. 23, the L protrusions $\mathbf{310}_1$, $\mathbf{310}_2$, $\mathbf{310}_3$, $\mathbf{310}_4$, $\mathbf{310}_5$, and $\mathbf{310}_L$ are positioned in a mutually equidistant manner on the internal surface 22 of shell 20. It is believed that the mutually equidistant positions of the protrusions 310 and the mutually equidistant positions of the position markers 180 is of importance for some embodiments of this disclosure. This is believed to be of importance for some embodiments of this disclosure since the position markers 180 cause the generation of position reference signal values, and the protrusions 310, when engaging material in the charge of a rotating mill, cause the generation of a signal event, such as e.g. an amplitude peak value, in the vibration signal (See references $S_{EA}$, $S_{MD}$, Se(i), S(j), S(q) e.g. in FIGS. 1 and 15). Moreover, the temporal duration between the occurrence of a position reference signal value and the occurrence of a signal event in the vibration signal, caused by a protrusion 310 engaging material in the charge of the rotating mill shell may be indicative of an internal state of the operating mill, as discussed elsewhere in this disclosure. For example, the temporal duration between the occurrence of a position reference signal value and the occurrence of a signal event in the vibration signal, caused by a protrusion 310 engaging material in the charge of the rotating mill shell may be indicative of an internal state, such as e.g. the position of the toe 205.

However, the actual placing of the position markers 180 in relation to the positions of the protrusions 310 is believed to be of less importance. Thus, whereas FIG. 23 illustrate the position markers 180 being placed at the same angular positions as the protrusions 310, it is to be noted that the position markers 180 may well be displaced in terms of angular positions. However, if the position markers 180 are displaced in terms of angular positions, it is believed to be of importance that all of the position markers 180 are equally displaced so as to maintain the mutually equidistant position of the position markers 180. More particularly, it is believed to be important that the placement, in terms of angular positions, of the position markers 180 mirrors the placement, in terms of angular positions, of the protrusions 310 on the internal surface 22 of shell 20.

As noted above, in connection with FIGS. 19A and 19B, it has been observed that when starting up a tumbling mill from an empty state, the initial internal status indicator object appears at an initial polar angle Φ(1) that represents a very first detected toe position 205 of the mill. Based on experimental measurements, it appears as though the initial polar angle Φ(1) may be used as a reference toe position value. Hence, the initial polar angle Φ(1) may thus be termed reference toe position value $\Phi_{TR}$. For the particular tumbling mill whose internal state is represented by the display 210S illustrated by FIGS. 19A and 19B, the reference toe position corresponds to an angular value $\Phi_{TR}$ of about 47 degrees, as can be seen in FIGS. 19A and 19B. With reference to FIGS. 2 and 14, it is believed that the angular value of the reference toe position value $\Phi_{TR}$ would be changed to a numerically different angular value if the position marker 180 is physically moved to a different placement, in terms of angular position.

The set-up of the rotating mill shell 20, as illustrated in FIG. 23 may be used in combination with the status parameter extractors 450 as exemplified in this disclosure. With reference to FIG. 15, the set-up of the rotating mill shell 20, as illustrated in FIG. 23 may be used for generating the marker signal P(i) which is delivered to shell speed value generator 500. Thus, the shell speed value generator 500 will receive a marker signal P(i) having a position indicator signal value every 360/L degrees during a revolution of the shell 20. Thus, the Fast Fourier Transformer 510 will receive a marker signal value P(j)=1, from the speed value generator 500, every 360/L degrees during a revolution of the shell 20 when the rotational speed $f_{ROT}$ is constant. Alternatively, the Fast Fourier Transformer 510 will receive a marker signal value P(q)=1, from the decimator 470, 470B, every 360/L degrees during a revolution of the shell 20 when the rotational speed $f_{ROT}$ varies.

Moreover, the speed value generator 500 will be able to generate even more accurate speed values $f_{ROT}(j)$ when it receives a marker signal P(i) having a position indicator signal value, e.g. P(i)=1, every 360/L degrees during a revolution of the shell 20.

As for appropriate settings of the FFT 510 when it receives a marker signal value P(j)=1 every 360/L degrees during a revolution of the shell 20, this means that the fundamental frequency will be the repetition frequency $f_R$.

As noted above in relation to FIG. 2, the vibration signal $S_{EA}$, $S_{MD}$, S(j), S(q) will exhibit a signal signature $S_{FIMP}$ indicative of the impact of a protrusion with the toe portion 205, and when there are L protrusions 310 in the shell 20 (See FIG. 23 in conjunction with eq. 2 below) then that signal signature $S_{FIMP}$ will be repeated L times per revolution of the shell 20.

Again, reference is made to the Fourier series (See Equation 2 below):

$$F(t)=\sum_{n=0}^{n=\infty} C_n \sin(n\omega t+\Phi_n) \quad \text{(Eq. 2)}$$

wherein

- n=0 the average value of the signal during a period of time (it may be zero, but need not be zero)
- n=1 corresponds to the fundamental frequency of the signal F(t).
- n=2 corresponds to the first harmonic partial of the signal F(t).
- ω=the angular frequency of interest i.e. $(2*\pi*f_R)$
- $f_R$=a frequency of interest, expressed as periods per second
- t=time
- $\Phi_n$=phase angle for the n:th partial
- $C_n$=Amplitude for the n:th partial In this embodiment it is noted that the fundamental frequency will be one per protrusion 310 when the FFT 510 receives a marker signal value P(j)=1 every 360/L degrees during a revolution of the shell 20.

As noted above, the settings of the FFT 510 should be done with a consideration of the reference signal. As noted above, the position signal P(j), P(q) (see FIG. 15) may be used as a reference signal for the digital measurement signal S(j), S(q).

According to some embodiments, when the FFT analyzer is configured to receive a reference signal, i.e. the position signal P(j), P(q), once every 360/L degrees during a revolution of the shell 20 and L is the number of protrusions 310 in the shell 20, then the setting of the FFT analyzer should fulfill the following criteria:

The integer value Oi is set to unity, i.e. to equal 1, and the settable variables Y, and Z are selected such that the mathematical expression Oi*Z/Y becomes a positive integer. Differently expressed: When integer value Oi is set to equal 1, then settable variables Y and Z should be set to integer values so as to render the variable X a positive integer, wherein X=Oi*Z/Y Using the above setting, i.e. integer value Oi is set to equal unity, and with reference to FIG. 15 and equation 2 above, the FFT 510 may deliver the amplitude value $C_n$ for n=1, i.e. $C_1$=Sp(r). The FFT 510 may also deliver phase angle for the fundamental frequency (n=1), i.e. $\Phi_1$=FI(r).

With reference to FIG. 15 in conjunction with FIG. 1A and/or FIG. 1B and equation 2 above, the status values Sp(r)=$C_1$ and FI(r)=$\Phi_1$ may be delivered to the Human Computer Interface (HCI) 210 for providing a visual indication of the analysis result. As mentioned above, the analysis result displayed may include information indicative of an internal state of the tumbling mill process for enabling the operator 230 to control the tumbling mill.

With reference to FIGS. 16, 17, 18, 19A, and 19B, the example illustrations of visual indications of analysis results are valid for the set-up of the rotating mill shell 20, as illustrated in FIG. 23, whereby the FFT 510 will receive a marker signal P(i), P(j), P(q) having a position indicator signal value every 360/L degrees, wherein L is the number of protrusions 310 in the shell 20.

Whereas the above discussion in relation to settings of the FFT 510 refers to the Fourier series and equations 1 and 2 for the purpose of conveying an intuitive understanding of the background for the settings of an FFT transformer 510, it is noted that the use of digital signal processing may involve the discrete Fourier transform (See Equation 3 below):

$$F(n)=\sum_{k=0}^{N-1} f(k)e^{-j2\pi nk/N}(n=0\ \ldots\ 1:N-1) \quad \text{Equation 3}$$

Thus, according to embodiments of this disclosure the above discrete Fourier transform (DFT) may be comprised in signal processing for generating data indicative of the internal state of a tumbling mill, such as that discussed in connection with embodiments of the status parameter extractor 450. In this connection, reference is made to e.g. FIGS. 3, 4, 5, 15 and/or 24. In view of the above discussion on the subject of FFT and the Fourier series, the discrete Fourier transform will not be discussed in further detail, as the skilled reader of this disclosure is well acquainted with it.

Whereas FIG. 23 illustrates that a number of position markers 180 may be provided on an outer surface of the shell 20, each marker 180 thereby causing the position sensor 170 to generate a revolution marker signal value $P_S$, it is noted that such a position signal may alternatively be generated by an encoder 170 which is mechanically coupled to the rotating mill shell 20. Thus, the position sensor 170 may be embodied by an encoder 170 which is mechanically coupled to the rotating mill shell 20 such that the encoder generates e.g. one marker signal $P_S$ per protrusion 310 in the rotating shell 20 during rotation of the mill shell 20.

In summary, as regards appropriate settings of the FFT 510 and the above equations 1 and 2, it is noted that the phase angle for the n:th partial, i.e. $\Phi_n$, may be indicative of the relative position of the toe 205. In particular, the phase angle for the n:th partial, i.e. $\Phi_n$, may be indicative of the position of the toe 205, expressed as a part of the distance between two adjacent protrusions 310 in a rotating shell 20. With reference to table 6 above and FIG. 14, the total distance between two adjacent protrusions may be regarded as 360 degrees, and value of the phase angle for the n:th partial, i.e. On, divided by 360 may be indicative of a percentage of the total distance between the two adjacent protrusions. This can be seen e.g. by comparing col. #2 in table 5 and table 6 above. As mentioned above, $\Phi_n$=phase angle for the n:th partial, and $C_n$=Amplitude for the n:th partial. As discussed above, considering the number L of protrusions in the rotating shell 20 and the number of reference signals being generated and, as a consequence thereof, the order Oi of a signal of interest, the FFT 510 may be set so as to deliver a phase angle for the n:th partial, $\Phi_n$, and an amplitude for the n:th partial, $C_n$, so that the phase angle for the n:th partial, i.e. $\Phi_n$, may be indicative of the relative position of the toe 205. Moreover, as noted above, the FFT 510 may be set so as to render the variable X a positive integer, wherein $$X=Oi*Z/Y$$

and wherein

Oi is set to a integer value,

Y is set to a integer value,

Z is set to a integer value.

Figure 24:
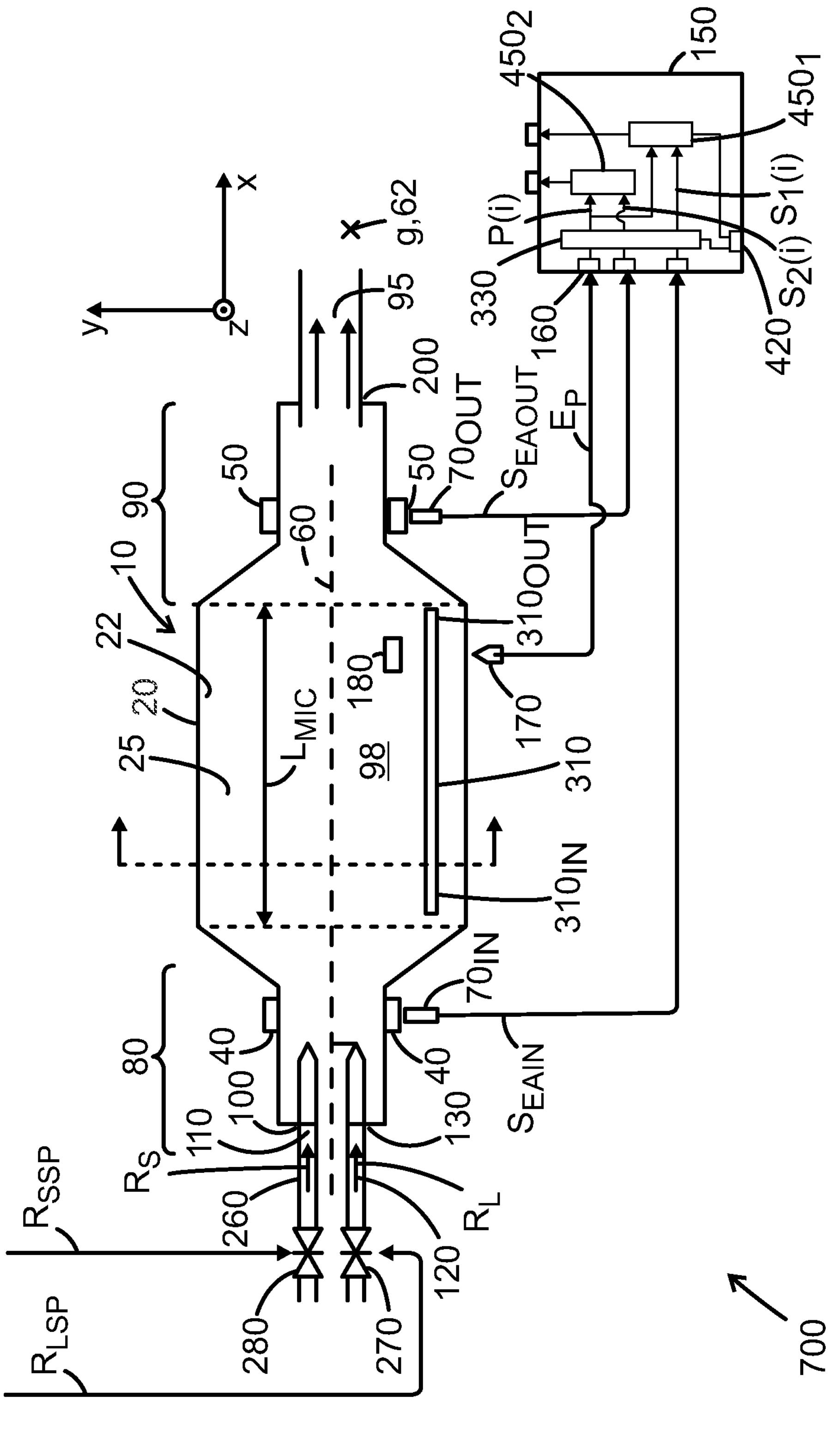
FIG. 24 shows a somewhat diagrammatic and schematic top view of another system including a tumbling mill.

FIG. 24 shows a somewhat diagrammatic and schematic top view of another system 700 including a tumbling mill 10. The tumbling mill 10 may be an autogenous (AG) mill, for example. Alternatively, the tumbling mill 10 may be a semi-autogenous (SAG) mill. Another example tumbling mill 10 is a ball mill 10. The tumbling mill 10 includes a shell 20 having an internal shell surface 22 that forms a chamber 25 for grinding material. The tumbling mill system 700 of FIG. 24 may be configured as described in any of the other embodiments described in this disclosure, e.g. in relation to FIGS. 1-31. However, whereas the tumbling mill system of FIG. 1A and/or FIG. 1B was described to have a vibration sensor 70 by the input side of the mill, it is noted that the tumbling mill system 700 of FIG. 24 may be configured to have

- a first vibration sensor $70_{IN}$ for producing a first measuring signal $S_{EAIN}$ as well as
- a second vibration sensor $70_{OUT}$ for producing a second measuring signal $S_{EAOUT}$.

The signal treatment of the first measuring signal $S_{EAIN}$ generated by the first vibration sensor $70_{IN}$ may be as described in relation to the signal $S_{EA}$ in any of the other embodiments described in this disclosure, e.g. in relation to FIGS. 1-31. Likewise, the signal treatment of the second measuring signal $S_{EAOUT}$ generated by the second vibration sensor $70_{OUT}$ may be as described in relation to the signal $S_{EA}$ in any of the other embodiments described in this disclosure, e.g. in relation to FIGS. 1-31. Thus, a difference as compared the above described embodiments is that in the system 700 there will be provided data indicative of the internal state of the input side of the tumbling mill, based on the first measuring signal $S_{EAIN}$ as well as data indicative of the internal state of the output side of the tumbling mill, based on the second measuring signal $S_{EAOUT}$. Accordingly, the tumbling mill system 700 of FIG. 24 may be configured as described in any of the described embodiments of this disclosure as regards the provision of a position signal or reference signal.

The analysis apparatus 150 shown in FIG. 24 may comprise a first status parameter extractor $450_1$ as well as a second status parameter extractor $450_2$. The status parameter extractors $450_1$ and $450_2$ may operate as described in any of the other described embodiments, e.g. with reference to FIGS. 5 and or 15 and/or as described in relation to FIG. 30-31. Thus first status parameter extractor $450_1$ may be configured to generate parameters $S_{P1}(r)$, $R_{T1}(r)$, $f_{ROT}(r)$, $dS_{P1}(r)$, and $dR_{T1}(r)$.

Similarly the second status parameter extractor $450_2$ may be configured to generate parameters $S_{P2}(r)$, $R_{T2}(r)$, $f_{ROT}(r)$, $dS_{P2}(r)$, and $dR_{T2}(r)$. However, the rotational speed $f_{ROT}(r)$ of the shell will be the same, of course, and thus it may suffice if one of the status parameter extractors delivers the rotational speed value $f_{ROT}(r)$.

With reference to FIG. 24, there is shown a cartesian co-ordinate system having three mutually perpendicular axes x, y and z. It is to be understood that, during operation of the mill 10, the material 30 travels in the positive direction of the x-axis from the input side 80 of the mill to the output side 90.

The tumbling mill system 700 of FIG. 24 advantageously provides parameters indicative of the internal state of the input side of the tumbling mill: $S_{P1}(r)$, $R_{T1}(r)$, $dS_{P1}(r)$, and $dR_{T1}(r)$, as well as parameters indicative of the internal state of the output side of the tumbling mill: $S_{P2}(r)$, $R_{T2}(r)$, $dS_{P2}(r)$, and $dR_{T2}(r)$.

A comparison of an input side parameter with the corresponding output side parameter can advantageously add yet another dimension to the understanding of internal state of the mill 10. For example, the relation between $R_{T2}(r)$ and $R_{T1}(r)$ indicates whether

- the toe position is the same at input and output side, or
- the toe position is higher at the input side, indicated when $R_{T1}(r)>R_{T2}(r)$; or
- the toe position is higher at the output side, indicated when $R_{T2}(r)>R_{T1}(r)$.

The toe position being higher at the output side may be indicative of an incipient disorder. For example, when the outflow of output material 95 is decreased, perhaps due to a blockage, while the inflow of solid material 110 continues at an unreduced pace, there will be an increased risk of overload that may lead to a decreased efficiency of the grinding process in the tumbling mill. Accordingly, tumbling mill system 700 of FIG. 24 may advantageously enable an early indication of an incipient disorder. Thus, based on a comparison of an input side parameter with the corresponding output side parameter the tumbling mill system 700 may enable adjustments of control parameters so as to avoid e.g. disorders such as overload of the mill.

With reference to FIG. 24 it is noted that the vibration sensor $70_{OUT}$ is attached to a non-rotating portion of the body of mill structure 10, and the vibration sensor $70_{OUT}$ is positioned so as to primarily detect vibrations in the horizontal direction Y (see the cartesian co-ordinate system having three mutually perpendicular axes x, y and z, wherein Y is a horizontal direction). Likewise, the vibration sensor $70_{IN}$ is attached to a non-rotating portion of the body of mill structure 10, and the vibration sensor $70_{IN}$ is positioned so as to primarily detect vibrations in the horizontal direction Y. Experimental measurements appear to indicate that an improved vibration signal quality is obtained when a vibration sensor is configured to primarily detect vibrations in a horizontal direction Y, as compared to a vibration signal quality obtained when a vibration sensor is configured to primarily detect vibrations in a vertical direction Z. As noted above, e.g. in connection with FIG. 2, the interaction of a protrusion 310 with the toe 205 of the charge, forcing material in the toe of the charge to accelerate in the direction of movement of the protrusion 310, as illustrated in FIG. 2, causes a mechanical vibration $V_{IMP}$. The impact of the protrusion 310C against the mass of material in the toe portion 205 causes a mass of toe portion material to accelerate in the direction $A_{ACC}$ of movement of the protrusion 310C, this acceleration causing a force $F_{IMP}$ against the leading edge surface of the protrusion 310C. Since the mass of solid material in charge 30 of the mill is in the magnitude of metric tons, this impact force $F_{IMP}$ is of a significant magnitude. However, since the mill structure will typically rest on a very hard floor surface that tends to mitigate vibrations in the vertical direction, it appears as though the detection of vibrations in a horizontal direction Y renders an improved vibration signal quality.

Figure 25:
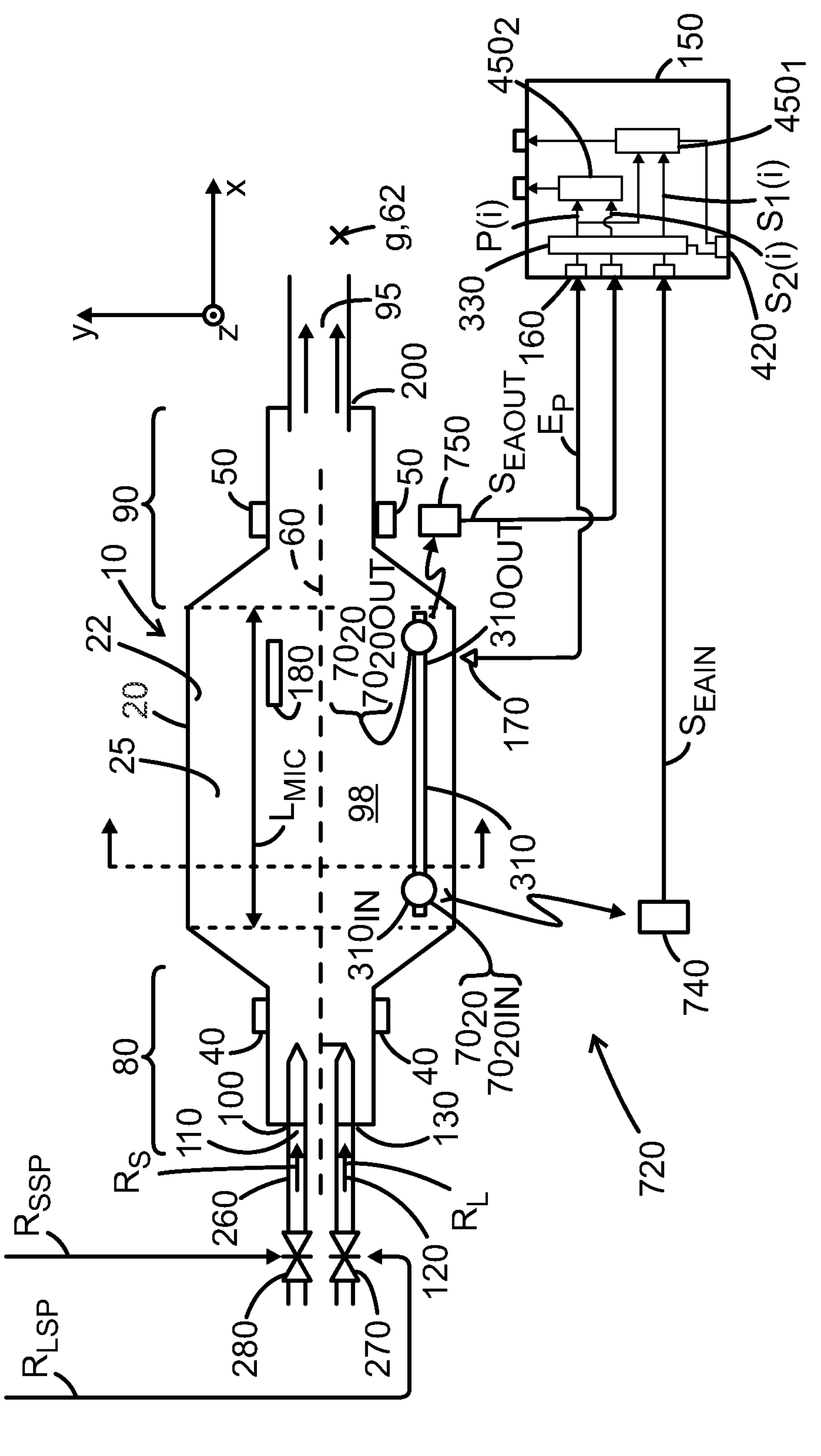
FIG. 25 shows a somewhat diagrammatic and schematic top view of yet another embodiment of a system including a tumbling mill.

FIG. 25 shows a somewhat diagrammatic and schematic top view of yet another embodiment of a system 720 including a tumbling mill 10.

The tumbling mill system 720 of FIG. 25 may be configured as described in connection with FIG. 24. However, whereas the tumbling mill system 700 of FIG. 24 was described to have a vibration sensor $70_{OUT}$ attached to a non-rotating portion of the body of mill structure 10, and a vibration sensor $70_{IN}$ attached to another non-rotating portion of the body of mill structure 10, the tumbling mill system 720 of FIG. 25 differs in that it provides a vibration sensor $70_{20}$ that is attached to the rotating shell 20 of the mill structure 10. The provision of a vibration sensor $70_{20}$ directly on the rotating shell 20 will render high vibration amplitudes, in particular when the vibration sensor $70_{20}$ is positioned on the outside of the shell directly on the opposite side of the shell wall from a projection 310, as illustrated in FIG. 25.

The tumbling mill system 720 of FIG. 25 may optionally comprise

- a first vibration sensor $\mathbf{70}_{20IN}$ for producing a first measuring signal $S_{EAIN}$ as well as
- a second vibration sensor $\mathbf{70}_{20OUT}$ for producing a second measuring signal $S_{EAOUT}$. As shown in FIG. 25, the first vibration sensor $\mathbf{70}_{20IN}$ may be firmly attached to the outer surface of the shell 20 at a measuring point position $\mathbf{310}_{IN}$ which is closer to the input side 80 than it is to the output side 90. Moreover, the second vibration sensor $\mathbf{70}_{20OUT}$ may be firmly attached to the outer surface of the shell 20 at a measuring point position $\mathbf{310}_{OUT}$ which is closer to the output side 90 than it is to the input side 80.

The first vibration sensor $\mathbf{70}_{20IN}$ and the second vibration sensor $\mathbf{70}_{20OUT}$ may be equipped to communicate in a wireless manner with the apparatus 150, e.g. via transceiver units 740 and 750, respectively. A sensor $\mathbf{70}_{20}$, $\mathbf{70}_{20IN}$, $\mathbf{70}_{20OUT}$ on the outer surface of the shell 20 may be supplied with power via a battery, or alternatively by means of an inductive device (not shown) attached to outer surface of the rotating shell 20 that operates as a generator by interaction with one or several permanent magnets that are immobile. In this manner, when the shell 20 rotates, it will repeatedly cause the inductive device to pass through the magnetic fields of the immobile one or several permanent magnets, thereby inducing electric current that may be used as power for the sensor $\mathbf{70}_{20}$, $\mathbf{70}_{20IN}$, $\mathbf{70}_{20OUT}$.

The tumbling mill system 720 of FIG. 25 may also advantageously provide parameters indicative of the internal state of the input side of the tumbling mill $S_{P1}(r)$, $R_{T1}(r)$, $dS_{P1}(r)$, and $dR_{T1}(r)$, as well as parameters indicative of the internal state of the output side of the tumbling mill: $S_{P2}(r)$, $R_{T2}(r)$, $dS_{P2}(r)$, and $dR_{T2}(r)$. Hence, the skilled reader of this disclosure directly and unambiguously derives that the tumbling mill system 720 of FIG. 25 may advantageously enable an early indication of an incipient disorder in a manner substantially similar to that of the tumbling mill system 700 of FIG. 24. In particular, the tumbling mill system 720 of FIG. 25 may advantageously enable a comparison of an input side parameter with the corresponding output side parameter in the manner described above in relation to the tumbling mill system 700. Thus also the tumbling mill system 720 of FIG. 25 may advantageously enable adjustments of control parameters so as to avoid e.g. disorders such as an overload of the mill.

Figure 26:
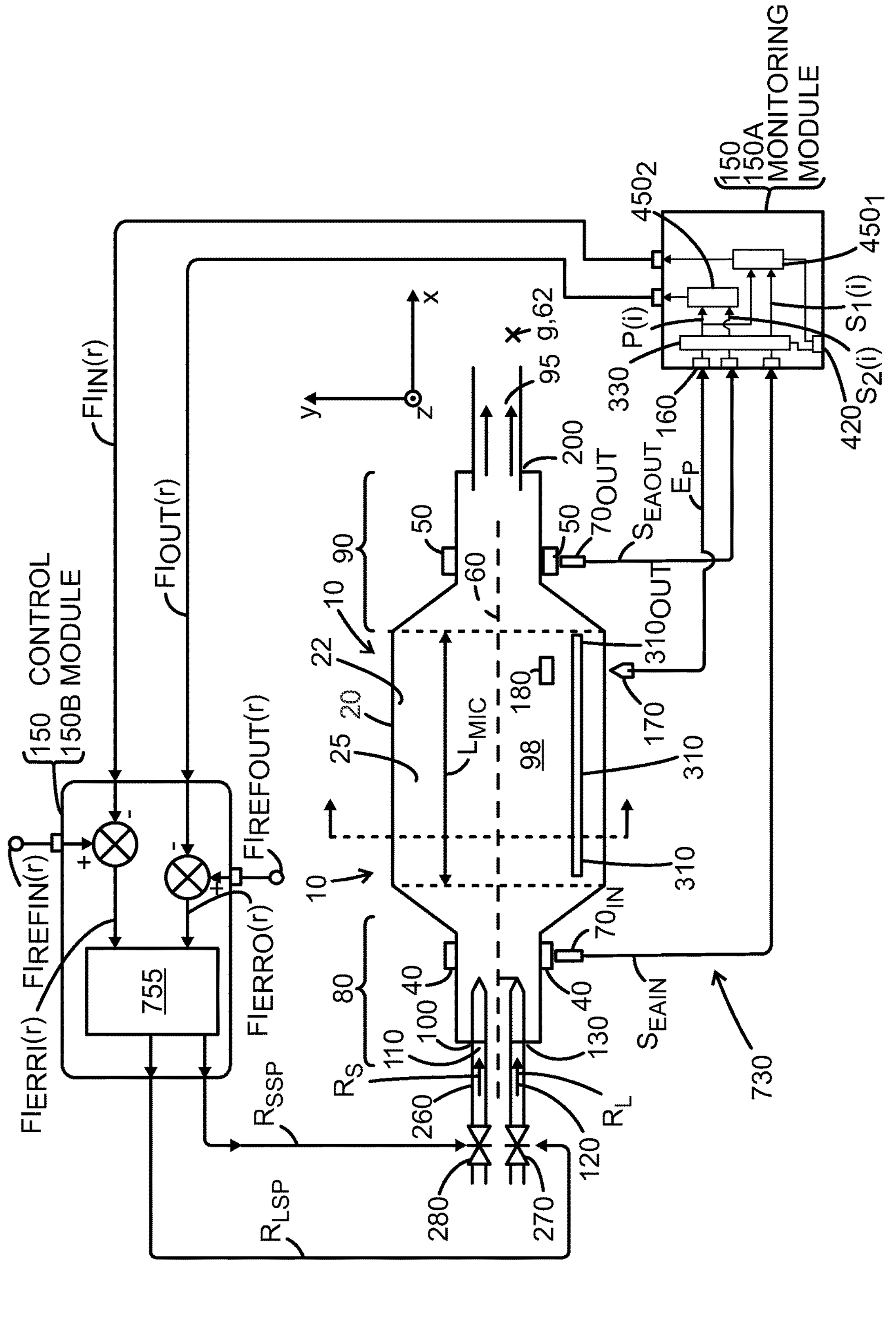
FIG. 26 shows a somewhat diagrammatic and schematic top view of yet another embodiment of a system including a tumbling mill.

FIG. 26 shows a somewhat diagrammatic and schematic top view of yet another embodiment of a system 730 including a tumbling mill 10. The tumbling mill 10 may be an autogenous (AG) mill, for example. Alternatively, the tumbling mill 10 may be a semi-autogenous (SAG) mill. Another example tumbling mill 10 is a ball mill 10. The tumbling mill 10 includes a shell 20 having an internal shell surface 22 that forms a chamber 25 for grinding material. The tumbling mill system 730 of FIG. 26 may include parts, and be configured, as described in any of the other embodiments described in this disclosure, e.g. in relation to FIGS. 1-25 and/or as described in relation to FIG. 30-31. In particular, the apparatus 150, shown in FIG. 26 may be configured as described in any of the other embodiments described in this disclosure, e.g. in relation to FIGS. 1-25 and/or as described in relation to FIG. 30-31.

However, in the embodiment of the system 730 illustrated in FIG. 26, the apparatus 150 includes a monitoring module 150A as well as a control module 150B. Although the drawing illustrates the apparatus 150 as two boxes, it is to be understood that the apparatus 150 may well be provided as a single entity 150 including a monitoring module 150A as well as a control module 150B, as indicated by the unifying reference 150.

The system 730 is configured to control an internal state of in a tumbling mill 10 having a shell 20 that rotates around an axis 60 at a speed of rotation $f_{ROT}$ for grinding a charge of material 30 by tumbling the material in the rotating shell.

The shell 20 has an internal shell surface 22 including a first number L of protrusions 310 configured to engage material as the shell 20 rotates about the axis 60. The system 730 may comprise a device 170, 180 for generating a position signal. The device 170, 180 may include the position sensor 170 and the marker 180 as described elsewhere in this disclosure. The position signal is $E_P$, P(i), P(j), P(q) indicative of a rotational position of said rotating shell 20, said position signal including a time sequence of position signal sample values P(i), P(j), P(q).

A sensor 70, $\mathbf{70}_{IN}$, $\mathbf{70}_{OUT}$, 330 is provided and it is configured to generate a vibration signal $S_{EA}$, $S_{MD}$, Se(i), S(j), S(q) dependent on mechanical vibrations $V_{IMP}$ emanating from rotation of said shell. The vibration signal $S_{EA}$, Se(i), S(j), S(q) may include a time sequence of vibration sample values Se(i), S(j), S(q).

The apparatus 150 of the system 730 may comprise a monitoring module 150A and a control module 150B. The monitoring module 150A comprises a status parameter extractor 450, $\mathbf{450}_1$, $\mathbf{450}_2$ 450C configured to detect a first occurrence of a first reference position signal value in said time sequence of position signal sample values P(i), P(j), P(q) (See tables 2, 3 and 4 above, wherein column #2 illustrates the position signal having values 1; 1C).

The status parameter extractor 450 may be configured to detect a second occurrence of a second reference position signal value 1; 1C; 100% in said time sequence of position signal sample values P(i), P(j), P(q)). The status parameter extractor 450 may also be configured to detect an occurrence of an event signature $S_P(r)$; Sp in said time sequence of vibration sample values Se(i), S(j), S(q). The event may be caused by the impact of a protrusion 310 into the toe portion 205 of the charge 30, causing an impact vibration that may cause a vibration signal signature, as discussed elsewhere in this disclosure. The status parameter extractor 450 may be configured to generate data indicative of a first temporal relation $R_T(r)$; $T_D$; FI(r), X1(r) between the event signature occurrence, and the first and second occurrences.

As mentioned above, the system 730 includes a control module 150B configured to receive data indicative of an internal state of the mill 10 from the mill monitoring module 150, 150A. The data indicative of an internal state can include any of the information generated or delivered by the status parameter extractor 450, as described in relation to any of the FIGS. 1-31 in this disclosure. With reference to FIG. 26, the control module 150B includes a regulator 755 for controlling an angular toe position FI(r), $A_{TOE}$ (See FIG. 26 in conjunction with FIG. 2) based on

- a toe position reference value $FI_{REF}(r)$ (See FIG. 26),
- said first temporal relation $R_T(r)$; $T_D$; FI(r); X1(r) (See FIGS. 1-31), and
- a toe position error value $FI_{ERR}(r)$ (see FIG. 26).

The toe position error value ($FI_{ERR}(r)$) depends on said toe position reference value $FI_{REF}(r)$, and said first temporal relation $R_T(r)$; $T_D$; FI(r) (See FIGS. 3-26). The toe position reference value $FI_{REF}(r)$ may be generated by manual input (not shown in FIG. 26, but it may be done as discussed e.g. in connection with FIG. 1A and/or FIG. 1B above.

As shown in FIG. 26, the said toe position error value ($FI_{ERR}$(r)) may depend on a difference between said toe position reference value $FI_{REF}$(r)), and the first temporal relation $R_T$(r); $T_D$; FI(r); X1(r).

The regulator 755 may be configured to control the solid material feed rate set point $R_{SSP}$ in dependence on the toe position reference value $FI_{REF}$(r). The solid material feed rate $R_S$, discussed in connection with FIG. 1A, depends on the solid material feed rate set point $R_{SSP}$ (See FIG. 26). As mentioned in connection with FIG. 1A, the solid material feed rate $R_S$ is an amount of solid material per time unit that is fed into the input 100 of said tumbling mill 10.

The regulator may also be configured to control a liquid feed rate set point $R_{LSP}$ in dependence on said toe position reference value $FI_{REF}$(r). The liquid feed rate $R_L$ may depend on said liquid feed rate set point $R_{LSP}$. As mentioned in connection with FIG. 1A, the liquid feed rate $R_L$ may be an amount of liquid per time unit that is being fed into an input 130 of the tumbling mill 10.

The event signature may be indicative of an impact force $F_{IMP}$ generated when a projection 310 on an internal shell surface 22 of the rotating shell 20 interacts with a toe portion 205 of the charge material 30.

The status parameter extractor 450 may be configured to generate said first temporal relation $R_T$(r); $T_D$; FI(r); X1(r) as a phase angle (FI(r).

The first temporal relation $R_T$(r); $T_D$; FI(r); X1(r) is indicative of a toe position 205, $A_{TOE}$(r) (See FIG. 2 in conjunction with FIG. 26). The first temporal relation $R_T$(r); $T_D$; FI(r); X1(r) may be indicative of a proportion of a distance between two adjacent of said protrusions 310 in the mill shell.

Alternatively, the relation value X1(r) may be indicative of a relative position of the toe portion 205, i.e. the position of the toe portion 205 in relation to two predetermined stator positions separated from each other in a manner corresponding to the positions of two adjacent protrusions 310.

Moreover, the relation value X1(r) may be indicative of an absolute toe position.

An absolute toe position may be generated based on a combination of the relation value X1(r) and the second internal status parameter X2(r), also referred to as Sp(r). In particular, an absolute toe position may be generated based on a temporal progression of the combination of the first internal status parameter X1(r) and the second internal status parameter X2(r), as discussed e.g. in connection with FIGS. 16, 17, 18, 19A and 19B. As illustrated in FIG. 19A, an initial data set 550(*r*)=550(1), corresponding to X1(r=1) and X2(r−1), represents an empty, or near empty state of the mill. As the filling degree of the mill increases, in the direction of arrow 560A, the absolute toe position increases. In FIGS. 19A and 19B, the “angular length”, from the initial angle $FI_{TR}$, to the current indicator 550(*r*) is indicative of the absolute toe position. With reference to FIG. 19B in conjunction with FIG. 2, the toe angle 0 degrees at the vertical line 960 in FIG. 2 may correspond to the initial angle $FI_{TR}$ in FIG. 19B. An increase in the value X2(r), as r increases is shown as an increased distance from origo i FIG. 19B, and it is indicative of an increased mass of the toe portion 205, as discussed elsewhere in this document. When the value of the parameter X1(r) increases to a value equal to 360 degrees, it is indicative of the toe position 205 being at an angular distance 360/L from the initial angle $FI_{TR}$.

When the value of the parameter X1(r) increases to a value exceeding 360 degrees, it is indicative of the absolute toe position 205 being at an angular distance 360/L+X1(r) from the initial angle $FI_{TR}$.

The status parameter extractor 450 may be configured to generate said event signature as an amplitude value $S_P$(r); Sp; $C_L$(r); $C_1$(r); X2(r).

The status parameter extractor 450 may comprise a Fourier Transformer 510 (see FIG. 15) configured to generate said first temporal relation $R_T$(r); $T_D$; FI(r) X1(r).

As discussed in connection with table 5, the status parameter extractor 450 may be configured to count a total number of samples $N_B$ from the first occurrence to the second occurrence. Moreover, the status parameter extractor 450 may be configured to count another number of samples $N_P$ from the first occurrence to the occurrence of the event, and said status parameter extractor 450 may be configured to generate said first temporal relation $R_T$(r); $T_D$; FI(r) X1(r) based on said another number and said total number.

The status parameter extractor 450 may be configured to count a total number of samples $N_B$ from the first occurrence to the second occurrence, and the status parameter extractor 450 may be configured to count another number of samples $N_P$ from the first occurrence to the occurrence of the event. Moreover, the status parameter extractor 450 may be configured to generate said first temporal relation $R_T$(r); $T_D$; FI(r) based on a relation between said another number and said total number, wherein said relation between said another number and said total number may be indicative of a toe position 205.

According to one embodiment, the regulator 755 operates to control the toe position on the input side ($FI_{IN}$(r), $A_{TOE\_IN}$) based on
a toe position reference value ($FI_{REFIN}$(r)),
said first temporal relation ($FI_{IN}$(r)), and
a toe position error value ($FI_{ERRI}$(r)), wherein
said toe position error value ($FI_{ERRI}$(r)) depends on
said toe position reference value ($FI_{REFIN}$(r)), and
said first temporal relation ($R_T$(r); $T_D$; $FI_{IN}$(r)).

According to one embodiment, the regulator 755 operates to control the solid material feed rate set point $R_{SSP}$ in dependence on the toe position reference value $FI_{REFIN}$(r)

According to one embodiment, the regulator 755 operates to control the solid material feed rate set point $R_{SSP}$ based on
a toe position reference value ($FI_{REFIN}$(r)),
said first temporal relation ($FI_{IN}$(r)), and
a toe position error value ($FI_{ERRI}$(r)), wherein
said toe position error value ($FI_{ERRI}$(r)) depends on
said toe position reference value ($FI_{REFIN}$(r)), and
said first temporal relation ($FI_{IN}$(r)).

Although FIGS. 26, 28 and 29 illustrate two feedback signals, i.e. first temporal relation $FI_{IN}$(r) relating to an input side of the mill 10, and first temporal relation $FI_{OUT}$(r) relating to an output side of the mill 10, it is to be understood that the system may operate with a single feedback signal. Thus, for example, the regulator may be provided with a single input, e.g. for receiving the first temporal relation $FI_{IN}$(r) relating to the status at the input side of the mill.

According to one embodiment, the regulator 755 operates to control the solid material feed rate set point $R_{SSP}$ based on
a toe position reference value ($FI_{REFOUT}$(r)),
said first temporal relation ($FI_{OUT}$(r)), and
a toe position error value ($FI_{ERRO}$(r)), wherein
said toe position error value ($FI_{ERRO}$(r)) depends on
said toe position reference value ($FI_{REFOUT}$(r)), and
said first temporal relation ($FI_{OUT}$(r)).

The regulator 755 may be configured to include a proportional-integral-derivative controller (PID controller). Alternatively, the regulator 755 may be configured to include a proportional-integral controller (PI controller). Alternatively, the regulator 755 may be configured to include a proportional controller (P controller).

Alternatively, the regulator 755 may be configured to include Kalman filtering, also known as linear quadratic estimation (LQE). Kalman filtering is an algorithm that uses a series of measurements observed over time, including statistical noise and other inaccuracies, and produces estimates of unknown variables that tend to be more accurate than those based on a single measurement alone, by estimating a joint probability distribution over the variables for each timeframe.

FIG. 27 shows a schematic block diagram of a distributed process monitoring system 770. Reference numeral 780 relates to a client location with a mill 10 having a rotatable shell 20, as discussed above in relation to preceding drawings in this document. The client location 780, which may also be referred to as client part or mill location 780, may for example be the premises of a mining company, or the premises of an ore mill plant, or e.g. a manufacturing plant for the manufacture of cement.

The distributed process monitoring system 770 is operative when one sensor 70 is, or several sensors 70, $\mathbf{70}_{IN}$, $\mathbf{70}_{OUT}$ are, attached on or at measuring points related to the shell 20. As mentioned above such measuring points may be e.g. at a bearing 40, 50 (See FIGS. 26 & 27) or at a measuring point position $\mathbf{310}_{IN}$, $\mathbf{310}_{OUT}$ (See FIG. 25).

The measuring signals $S_{EA}$, $S_{EAIN}$, $S_{EAOUT}$, and $E_P$ (See e.g. FIGS. 1, 27, 26, 25) may be coupled to input ports of a mill location communications device 790. The mill location communications device 790 may include an Analogue-to-Digital converter 795 for A/D-conversion of the measuring signals $S_{EA}$, $S_{EAIN}$, $S_{EAOUT}$, and $E_P$. The A/D converter 975 may operate as disclosed in relation to A/D converter 330 elsewhere in this document, e.g. in connection with FIGS. 3 and 5. The mill location communications device 790 has a communication port 800 for bi-directional data exchange. The communication port 800 is connectable to a communications network 810, e.g. via a data interface 820, for enabling delivery of digital data corresponding to the measuring signals $S_{EA}$, $S_{EAIN}$, $S_{EAOUT}$, and $E_P$. The communications network 810 may be the world wide internet, also known as the Internet. The communications network 810 may also comprise a public switched telephone network.

A server computer 830 is connected to the communications network 810. The server 830 may comprise a database 840, user input/output interfaces 850 and data processing hardware 852, and a communications port 855. The server computer 830 is located on a server location 860, which is geographically separate from the mill location 780. The server location 860 may be in a first city, such as the Swedish capital Stockholm, and the mill location 780 may be on the countryside near a mill, and/or in another country such as for example in Norway, Australia or in the USA. Alternatively, the server location 860 may be in a first part of a county and the mill location 780 may be in another part of the same county. The server location 860 may also be referred to as supplier part 860, or supplier location 860.

According to an example a central control location 870 comprises a monitoring computer 880 having data processing hardware and software for monitoring and/or controlling an internal state of a mill 10 at a remote mill location 780. The monitoring computer 880 may also be referred to as a control computer 880. The control computer 880 may comprise a database 890, user input/output interfaces 900 and data processing hardware 910, and a communications port 920, 920A, or several communications ports 920, 920A, 920B. The central control location 870 may be separated from the mill location 780 by a geographic distance. The central control location 870 may be in a first city, such as the Swedish capital Stockholm, and the mill location 780 may be on the countryside near a mill, and/or in another country such as for example in Norway, Australia or in the USA. Alternatively, the central control location 870 may be in a first part of a county and the mill location 780 may be in another part of the same county. By means of communications port 920, 920A the control computer 880 can be coupled to communicate with the mill location communications device 790. Hence, the control computer 880 can receive the measuring signals $S_{EA}$, $S_{EAIN}$, $S_{EAOUT}$, and $E_P$ (See e.g. FIGS. 1, 27, 26, 25) from the mill location communications device 790 via the communications network 810.

The system 770 may be configured to enable the reception of measuring signals $S_{EA}$, $S_{EAIN}$, $S_{EAOUT}$, and $E_P$ in real time, or substantially in real time or enabling real time monitoring and/or real time control of the mill 10 from the location 870. Moreover, the control computer 880 may include a monitoring module 150, 150A as disclosed in any of the examples in this document, e.g. as disclosed in connection with any of the drawings 1-26 above.

A supplier company may occupy the server location 860. The supplier company may sell and deliver apparatuses 150 and/or monitoring modules 150A and/or software for use in an such apparatuses 150 and/or monitoring modules 150A. Hence, supplier company may sell and deliver software for use in the control computer 880 at the central control location 870. Such software 370, 390, 400 is discussed e.g. in connection with FIG. 4. Such software 370, 390, 400 may be delivered by transmission over said communications network 810. Alternatively such software 370, 390, 400 may be delivered as a computer readable medium 360 for storing program code. Thus the computer program 370, 390, 400 may be provided as an article of manufacture comprising a computer storage medium having a computer program encoded therein.

According to an example embodiment of the system 770 the monitoring computer 880 may substantially continuously receive measurement signals measuring signals $S_{EA}$, $S_{EAIN}$, $S_{EAOUT}$, and $E_P$ (See e.g. FIGS. 1, 27, 26, 25) from the mill location communications device 790, e.g via the communications network 810, so as to enable continuous or substantially continuous monitoring of the internal state of the mill 10. The user input/output interfaces 900 at the central control location 870 may comprise a screen 900S for displaying images and data as discussed in connection with HCI 210 elsewhere in this document. Thus, user input/output interfaces 900 may include a display, or screen, 900S, 210S for providing a visual indication of an analysis result. The analysis result displayed may include information indicative of an internal state of the tumbling mill process for enabling an operator 930 at the central control location 870 to control the tumbling mill 10.

Moreover, the monitoring computer 880 at the central control location 870 may be configured to deliver information indicative of an internal state of the tumbling mill process to the HCI 210, via the communications port 920, 920B and via the communications network 810. In this manner, the monitoring computer 880 at the central control location 870 may be configured to enable an operator 230 at the client location 780 to control the tumbling mill. The local operator 230 at the client location 780 may be placed in the control room 220 (See FIG. 1A and/or FIG. 1B and/or FIG. 27). Thus, the client location 780, 220 may include a second mill location communications device 790B. The second mill location communications device 790B has a communication port 800B for bi-directional data exchange, and the communication port 800B is connectable to the communications network 810, e.g. via a data interface 820B.

Although it has, for the purpose of clarity, been described as two location communications devices 790, 790B, there may, alternatively, be provided a single mill location communications device 790, 790B, and/or a single communications port 800, 800B for bi-directional data exchange. Thus, the items 790 and 790B may be integrated as one unit at the mill location 780, and likewise, the items 820 and 820B may be integrated as one unit at the mill location 780.

FIG. 28 shows a schematic block diagram of yet another embodiment of a distributed process monitoring system 940. Reference numeral 780 relates to a mill location with a mill 10 having a rotatable shell 20, as discussed above in relation to preceding drawings in this document. The distributed process monitoring system 940 of FIG. 28 may include parts, and be configured, as described in any of the other embodiments described in this disclosure, e.g. in relation to FIGS. 1-31. In particular, the monitoring apparatus 150, also referred to as monitoring module 150A, shown in FIG. 28 may be configured as described in any of the other embodiments described in this disclosure, e.g. in relation to FIGS. 1-31. In particular, the process monitoring system 940 illustrated in FIG. 28, may be configured to include a monitoring module 150A, as disclosed in connection with FIG. 27, but located at the central control location 870.

Moreover, in the process monitoring system 940 illustrated in FIG. 28, the mill location 780 includes a control module 150B, as described above e.g. in connection with FIG. 26.

Thus, the internal state of the mill 10 may be automatically controlled by control module 150B located at or near the mill location 780, whereas the monitoring computer 880 at the central control location 870 may be configured to deliver information indicative of an internal state of the tumbling mill process to the HCI 900, 900S for enabling an operator 930 at the central control location 870 to monitor the internal state of the tumbling mill 10.

The measuring signals $S_{EA}$, $S_{EAIN}$, $S_{EAOUT}$, and $E_P$ (See e.g. FIGS. 1, 27, 26, 25) may be coupled to input ports of the mill location communications device 790. The mill location communications device 790 may include an Analogue-to-Digital converter 795 for A/D-conversion of the measuring signals $S_{EA}$, $S_{EAIN}$, $S_{EAOUT}$, and $E_P$. The A/D converter 975 may operate as disclosed in relation to A/D converter 330 elsewhere in this document, e.g. in connection with FIGS. 3 and 5. The mill location communications device 790 has a communication port 800 for bi-directional data exchange. The communication port 800 is connectable to the communications network 810, e.g. via a data interface 820. The communication port 800 is connectable to a communications network 810, e.g. via a data interface 820, for enabling delivery of digital data corresponding to the measuring signals $S_{EA}$, $S_{EAIN}$, $S_{EAOUT}$, and $E_P$.

Moreover, the client location 780 may include a second mill location communications device 790B. The second mill location communications device 790B has a communication port 800B for bi-directional data exchange, and the communication port 800B is connectable to the communications network 810, e.g. via a data interface 820B so as to enable reception, by the control module 150B, of data indicative of an internal state of the mill 10.

As illustrated in FIG. 28, data indicative of an internal state of the mill 10 may be generated by the monitoring module 150A at the central location 870.

Although FIG. 28, for the purpose of clarity, describes two location communications devices 790, 790B, there may, alternatively, be provided a single mill location communications device 790, 790B, and/or a single communications port 800, 800B for bi-directional data exchange. Thus, the items 790 and 790B may be integrated as one unit at the mill location 780, and likewise, the items 820 and 820B may be integrated as one unit at the mill location 780.

FIG. 29 shows a schematic block diagram of yet another embodiment of a distributed process control system 950. Again, reference numeral 780 relates to a mill location with a mill 10 having a rotatable shell 20, as discussed above in relation to preceding drawings in this document. The distributed process monitoring system 950 of FIG. 29 may include parts, and be configured, as described in any of the other embodiments described in this disclosure, e.g. in relation to FIGS. 1-31. In particular, the monitoring apparatus 150, also referred to as monitoring module 150A, shown in FIGS. 28 and 29 may be configured as described in any of the other embodiments described in this disclosure, e.g. as discussed in relation to FIGS. 1-31. Moreover, the process monitoring system 950 illustrated in FIG. 29, may be configured to include a control module 150B, as described above e.g. in connection with FIG. 26 as well as a monitoring module 150A, as disclosed in connection with FIG. 27.

In the example of FIG. 29, the monitoring module 150A and the control module 150B are provided at the control location 870. The control location 870 may be remote from the mill location 780. Communication of data between the control location 870 and the mill location 780 may be provided via data ports 820 and 920 and their communications network 810, as discussed above in connection with preceding figures.

Figure 30:
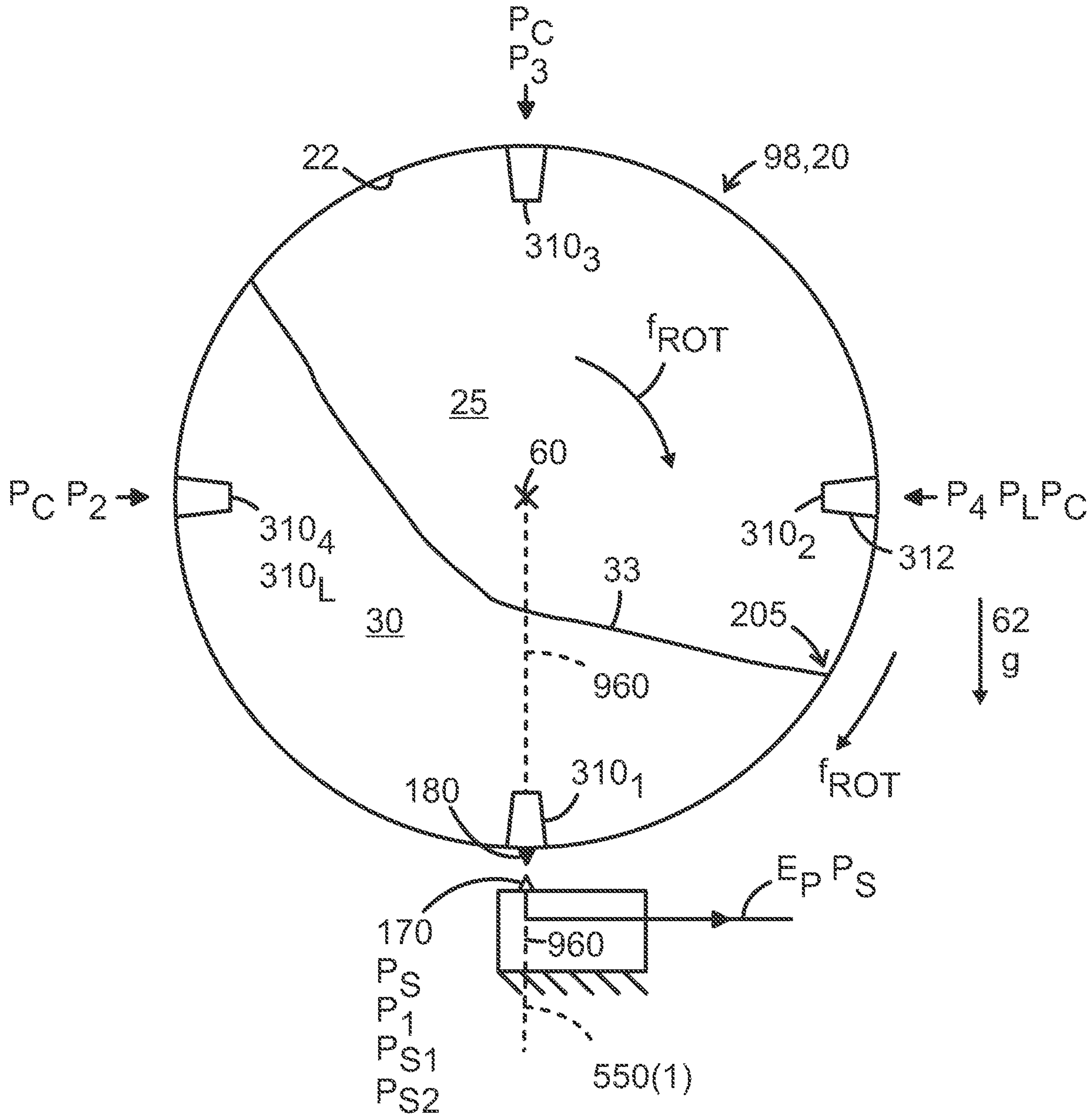
FIG. 30 shows another example of a cross-sectional view of the mid-portion of a rotating mill shell during operation.

FIG. 30 shows another example of a cross-sectional view of the mid-portion 98 of a rotating mill shell 20 during operation. This view could be taken e.g. along line A-A of FIG. 1A. According to the example of FIG. 30, the tumbling mill shell 20 has four protrusions 310 configured to engage the charge material 30 as the shell rotates about the axis 60, i.e. the number L=4. For the purpose of clarity, the protrusions in the example of FIG. 23 have been individually referenced as $310_1$, $310_2$, $310_3$, and $310_4$.

A position sensor 170 is provided to generate the position signal Ep dependent on the rotational position of the shell 20. As illustrated in FIG. 30, the position sensor 170 is positioned along a vertical line 960 from the axis of rotation 60, around which the shell 20 is rotatable. Moreover, the position marker 180 is provided on an outer surface of the shell 20 such that, when a protrusion 310 passes by the vertical line 960, then the position sensor 170 generates a marker signal $P_S$. When the tumbling mill shell 20 has four protrusions 310, as illustrated in FIG. 30, and there is provided a single static position sensor 170, the method according to an example may receive a first static position signal Ps1, P1 in response to a first passage of the position marker 180, and the method may receive a second static position signal Ps2 in response to a second passage of the position marker 180, and the method may then generate virtual static position signals PC in a recorded time sequence of position signal sample values. The generated virtual static position signals PC are inserted so as to be evenly distributed in the recorded time sequence of position signal sample values when the protrusions are evenly distributed on the inner circumference of shell 20. This advantageously leads to, a recorded time sequence of position signal sample values indicative of L static positions that are evenly distributed, as shown in FIG. 30. In the FIG. 30 example, there are four protrusions, i.e. L=4, so the recorded time sequence of position signal sample values are indicative of four static positions P1, P2, P3, and P4=PL. The L static position signals Ps, Pc can thereafter be used as reference position signals. The event signal signatures will also occur L times per revolution in a time sequence of vibration signal sample values, and the occurrence of an event signal signature can be analysed in relation to one static position signal Ps, Pc or two static position signal Ps, Pc.

As noted above, in connection with FIGS. 19A and 19B, it has been observed that when starting up a tumbling mill from an empty state, the initial internal status indicator object appears at an initial polar angle Φ(1) that represents a very first detected toe position 205 of the mill. Based on experimental measurements, it appears as though the initial polar angle Φ(1) may be used as a reference toe position value. Hence, the initial polar angle Φ(1) may thus be termed reference toe position value $\angle_{TR}$. For the particular tumbling mill whose internal state is represented by the display 210S illustrated by FIGS. 19A and 19B, the reference toe position corresponds to an angular value $\Phi_{TR}$ of about 47 degrees, as can be seen in FIGS. 19A and 19B. With reference to FIGS. 2 and 14, it is believed that the angular value of the reference toe position value $\Phi_{TR}$ would be changed to a numerically different angular value if the position marker 180 is physically moved to a different placement, in terms of angular position.

With reference to FIG. 30, it is believed that the position marker 180 being provided on an outer surface of the shell 20 such that, when a protrusion 310 passes by the vertical line 960, then the position sensor 170 generates a revolution marker signal value $P_S$ that will cause the reference toe position value $\Phi_{TR}$ to have a very small value, or a zero value, since the initial polar angle $\Phi(1)=\Phi_{TR}$ represents a very first detected toe position of the mill when starting up a tumbling mill from an empty state.

In this connection, a zero degree absolute toe position X6 can be represented when the toe is at a lowest part of the shell 20, at the position indicated by the vertical line 960 from the axis of rotation 60 (See FIG. 30 in conjunction with FIG. 2).

With reference to FIGS. 30, 2 and 14A and 14B, it is believed that the angular value of the reference toe position value $\Phi_{TR}$ would be changed to a numerically different angular value if the position marker 180 is physically moved to a different placement, in terms of angular position.

Figure 31:
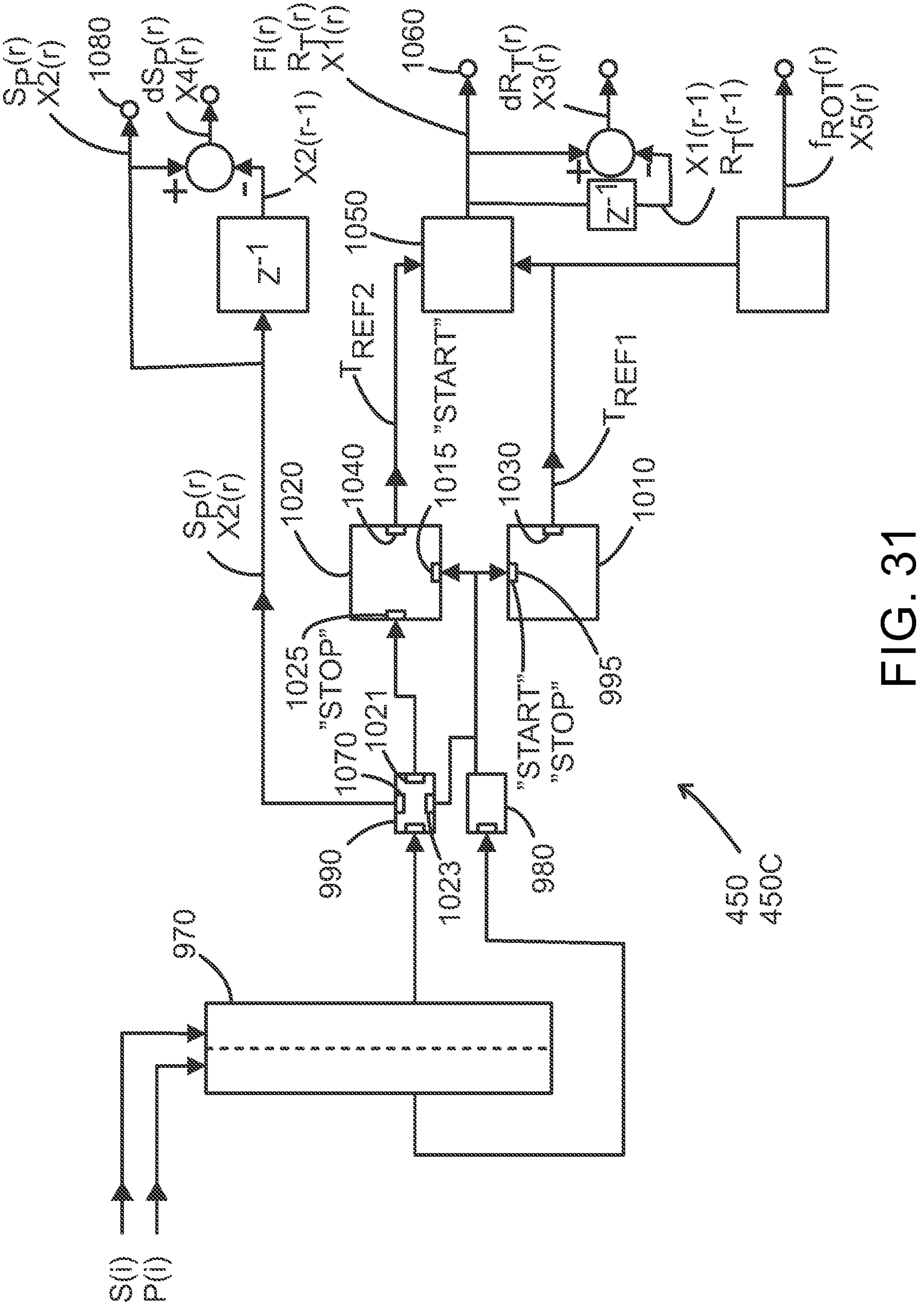
FIG. 31 is a block diagram that illustrates another example of a status parameter extractor.

FIG. 31 is a block diagram that illustrates another example of a status parameter extractor 450, referred to as status parameter extractor 450C. The status parameter extractor 450C may include i.a. a vibration event signature detector and position signal value detector and a relation generator, as discussed below. The vibration event signature detector may be embodied by a peak detector, as discussed below.

According to aspects of the solution disclosed in this document, reference position signal values Ep, 1,1C are generated at L predetermined rotational positions of the rotatable shell 20, the L predetermined rotational positions following a pattern that reflects the angular positions of the L protrusions 310 in the shell 20. The provision of such reference position signal values Ep, 1,1C together with the provision of vibration event signature detection in a manner as herein disclosed, makes it possible to generate data indicative of a position of a toe portion 205 in an advantageously accurate manner.

Although it has been exemplified with protrusions 310 that are positioned in an equidistant pattern, i.e. evenly distributed in the shell 20, this solution is also operable with other patterns of angular positions of the L protrusions 310 in the shell 20. When other patterns of angular positions of the L protrusions 310 in the shell is used, it is of importance that the reference position signal values Ep, 1,1C are generated at L predetermined rotational positions of the rotatable shell 20, the L predetermined rotational positions following a pattern that reflects the angular positions of the L protrusions 310 in the shell 20.

With reference to FIG. 5, the A/D converter 330 may be configured to deliver a sequence of pairs of vibration measurement values S(i) associated with corresponding position signal values P(i) to the status parameter extractor 450.

The status parameter extractor 450C, of FIG. 31, is adapted to receive a sequence of measurement values S(i) and a sequence of positional signals P(i), together with temporal relations there-between.

Thus, an individual measurement value S(i) is associated with a corresponding position value P(i). Such a signal pair S(i) and P(i) are delivered to a memory 970. With reference to FIG. 31, the status parameter extractor 450C comprises a memory 970.

The memory 970 may operate to receive data, in the form of a signal pair S(i) and P(i), so as to enable analysis of temporal relations between occurrences of events in the received signals. Columns #2 and #3 in Table 3 provide an illustration of an example of the data collected in the memory 970 during one full revolution of a shell, when a position signal 1, 1C is provided six times per revolution, since there are L=6 protrusions 310 in the shell 20. Table 4 and table 5 provide more detailed information about example signal values in the first 1280 time slots of table 3.

The position signal 1, 1C may be generated by physical marker devices 180 and/or some position signals 1C may be virtual position signals. The time sequence of position signal sample values P(i), P(j), P(q)) should be provided at an occurrence pattern that reflects the angular positions of the protrusions 310 in the shell 20.

For example, when there are six (L=6) equidistant protrusions 310 in the shell 20, the angular distance between any two adjacent protrusions 310 is 60 degrees. This is since 360 degrees is one full revolution and, when L=6, the angular distance between any two adjacent protrusions is 360/L=360/6=60. Accordingly, the corresponding time sequence of position signal sample values P(i), representing a full revolution of the shell 20, should include six (L=6) position signal values 1, 1C with a corresponding occurrence pattern, as illustrated in table 3.

The status parameter extractor 450C further comprises a position signal value detector 980 and vibration event signature detector 990. The vibration event signature detector 990 may be configured to detect a vibration signal event such as an amplitude peak value in the received sequence of measurement values S(i).

The output of the position signal value detector 980 is coupled to a START/STOP input 995 of a reference signal time counter 1010, and to a START input 1015 of an event signature time counter 1020. The output of the position signal value detector 980 may also coupled to a START/STOP input 1023 of vibration event signature detector 990 for indicating the start and the stop of the duration to be analyzed. Detector 990 transmits on its output when a position signal value 1, 1C is detected.

The vibration event signature detector 990 is configured to analyse all the sample values S(i) between two consecutive position signal values 1, 1C for detecting a highest peak amplitude value Sp therein. The vibration event signature detector 990 has a first output 1021 which is coupled to a STOP input 1025 of the event signature time counter 1020.

The reference signal time counter 1010 is configured to count the duration between two consecutive position signal values 1, 1C, thereby generating a first reference duration value $T_{REF1}$ on an output 1030. This may be achieved, e.g. by reference signal time counter 1010 being a clock timer that counts the temporal duration between two consecutive position signal values 1, 1C. With reference to FIG. 14B, the first reference duration value $T_{REF1}$ may in this manner be indicative of the temporal duration between static position signal P4 and static position signal P5.

Alternatively, the reference signal time counter 1010 may count the number of time slots (See column #01 in table 3) between two consecutive position signal values 1, 1C.

The event signature time counter 1020 is configured to count the duration from the occurrence of a position signal value 1, 1C to the occurrence of a vibration signal event such as an amplitude peak value. This may be attained in the following manner:

- The event signature time counter 1020 starts counting when receiving, on START input 1015, information that position signal value detector 980 detected an occurrence of a position signal value 1, 1C.
- The event signature time counter 1020 stops counting when receiving, on STOP input 1025, information that vibration event signature detector 990 detected a vibration signal event such as an amplitude peak value in the received sequence of measurement values S(i).

In this manner, the event signature time counter 1020 may be configured to count the temporal duration from the occurrence of a position signal value 1, 1C to the occurrence of a an amplitude peak value. The temporal duration from the occurrence of a position signal value 1, 1C to the occurrence of a an amplitude peak value is here referred to as a second reference duration value $T_{REF2}$. The second reference duration value $T_{REF2}$ may be delivered on an output 1040. With reference to FIG. 14B, the second reference duration value $T_{REF2}$ may in this manner be indicative of the temporal duration between the occurrence of static position signal P4 and the occurrence of an amplitude peak value.

With reference to FIG. 31, the output 1040 is coupled to an input of a relation generator 1050 so as to provide the second reference duration value $T_{REF2}$ to the relation generator 1050.

The relation generator 1050 also has an input coupled to receive the first reference duration value $T_{REF1}$ from the output 1030 of reference signal time counter 1010. The relation generator 1050 is configured to generate a relation value X1 based on the received second reference duration value $T_{REF2}$ and the received first reference duration value $T_{REF1}$. The relation value X1 may also be referred to as $R_T(r)$; $T_D$; FI(r). The relation value X1 may be generated L times per revolution of the shell 20. Moreover, the L times generated relation values X1 from a single revolution of the shell may be averaged to generate one value X1(r) per revolution of the shell 20. In this manner, the status parameter extractor 450C may be configured to deliver an updated value X1(r) once per revolution.

For the purpose of clarity, an example of a relation value X1 is generated in the following manner: Please refer to column #03 in table 4 in conjunction with FIG. 31: The vibration sample values S(i) are analyzed, by vibration event signature detector 990, for the detection of a vibration signal signature $S_{FIMP}$.

The vibration signal signature $S_{FIMP}$ may be manifested as a peak amplitude sample value Sp. With reference to table 5, the peak value analysis leads to the detection of a highest vibration sample amplitude value S(i). In the illustrated example, the vibration sample amplitude value S(i=760) is detected to hold a highest peak value Sp.

Having detected the peak value Sp to be located in time slot 760, a temporal relation value X1 can be established.

In table 5 the time slots, in a time sequence of position signal sample values P(i), carrying position signal values 1, 1C are indicated as 0% and 100%, respectively.

As illustrated in the example in col. #02 of table 5, the temporal location of slot number i=760 is at a position 59% of the temporal distance between slot i=0 and slot i=1280. Differently expressed, 760/1280=0.59=59%

Accordingly, a position of the toe 205, expressed as a percentage of the distance between two adjacent static positions PC, (see static positions P4 and P5 in FIG. 14B in conjunction with table 5), can be obtained by:

- Counting a total number of samples ($N_B-N_0=N_B-0=N_B=1280$) from the first reference signal occurrence in sample number $N_0=0$ to the second reference signal occurrence in sample number $N_B=1280$, and
- Counting another number of samples ($N_P-N_0=N_P-0=N_P$) from the first reference signal occurrence at $N_0=0$ to the occurrence of the peak amplitude value Sp at sample number $N_P$, and
- generating said first temporal relation (X1, $R_T(r)$; $T_D$; FI(r)) based on said another number $N_P$ and said total number $N_B$. This can be summarized as:

$$X1(r)=R_T(r)=R_T(760)=(N_P-N_0)/(N_B-N_0)=(760-0)/(1280-0)=0.59=59\%$$

Thus, a relative toe position X1, $R_T$ may be generated by:

- Counting a total number of samples ($N_B$) from the first reference signal occurrence to the second reference signal occurrence, and
- Counting another number of samples ($N_P$) from the first reference signal occurrence to the occurrence of the peak amplitude value Sp at sample number $N_P$, and
- generating said first temporal relation (X1; $R_T(r)$; $T_D$; FI(r)) based on a relation between said sample number $N_P$ and said total number of samples i.e. $N_B$.

The relation generator 1050 may generate an update of relation value X1 with a delivery frequency that depends on the rotational speed of the shell 20.

As noted above, the status parameter extractor 450C may be configured to deliver an updated value X1(r) once per revolution. In this manner a delivered updated value X1(r) may be based on L values generated during one revolution. The latest update, number r, of the first internal status parameter X1(r) may be delivered on a first status parameter extractor output 1060.

With reference to FIG. 31, the vibration event signature detector 990 may be configured to detect a peak amplitude sample value Sp. The vibration event signature detector 990 has an output 1070 for delivering a detected vibration signal amplitude peak value Sp. The detected vibration signal amplitude peak value Sp may be delivered from the output 1070 of vibration signal peak amplitude detector 990 to an output 1080 of status parameter extractor 450C. The output 1080 constitutes a second status parameter extractor output for delivery of a second internal status parameter X2(r), also referred to as Sp(r). The second internal status parameter X2(r) is delivered at the same delivery frequency as the first internal status parameter X1(r).

Moreover, the first internal status parameter X1(r) and the second internal status parameter X2(r) are preferably delivered simultaneously, as a set of internal status parameter data (X1(r); X2(r)). In the notation X1(r), the "r" is a sample number indicating a time slot, i.e. increasing number value of "r" indicates temporal progression, in the same manner as the number "i" in column #01 in table 3.

As mentioned elsewhere in this document, the magnitude of the peak amplitude sample value Sp of the vibration signal signature $S_{FIMP}$ appears to depend on the magnitude of the impact force $F_{IMP}$. The impact force $F_{IMP}$ of the interaction between a rotationally moving protrusion 310 and the material charge 30 causes an acceleration of the at least one particle in the toe portion 205 of the material charge 30, the impact causing the mechanical impact vibration $V_{IMP}$. With reference to FIG. 2, it is noted that the impact of the protrusion 310C against the mass of material in the toe portion 205 causes a mass of toe portion material to accelerate in the direction $A_{ACC}$. The direction $A_{ACC}$ is the direction in which the protrusion 310C moves. The acceleration causes a force $F_{IMP}$ against the leading edge surface 312C of the protrusion 310C. This impact force $F_{IMP}$ may be estimated to be of a magnitude:

$$F_{IMP}=m_{205}*a_{205}$$

wherein $m_{205}$ is the mass of the portion of the toe that is accelerated, $a_{205}$ is the amount of acceleration of that portion of the toe In view of the above, the inventor concluded that the magnitude of a detected peak amplitude sample value Sp may advantageously be indicative of the density of the charge in the tumbling mill 10.

In this context it is noted that the content of a desired metal, in the solid material 110 of the charge material 30, affects the density of the charge in the tumbling mill 10, as discussed in connection with table 1 in this document. Thus, the density of the charge in the tumbling mill 10 may be indicative of a relation between a desired metal and waste minerals in the charge in the tumbling mill 10.

Accordingly, the inventor concluded that the magnitude of a detected peak amplitude sample value Sp may advantageously be indicative of a relation between a desired metal and waste minerals in the charge in the tumbling mill 10.

Moreover, the inventor concluded that the magnitude Sp of a detected peak amplitude sample value, in combination with data indicative of the toe position i.e. the above discussed relation value X1 may advantageously be indicative of the filling degree of the tumbling mill 10.

In this connection, it is noted that the filling degree of the tumbling mill 10 has an impact on the efficiency of the grinding process. In order to maximise the amount of output material 95 from the tumbling mill 10 it is therefore desirable to control the inflow of input material 110 so as to maintain an optimal state of the tumbling mill process, including an optimized filling degree. The optimal internal state of the tumbling mill process may include a certain filling degree of the shell 20, i.e. a certain charge volume.

Accordingly, the solid material feed rate set point $R_{SSP}$ may be controlled in dependence on the combination of the relation value X1(r) and the magnitude of a detected peak amplitude sample value X2(r).

Moreover, the inventor concluded that the magnitude Sp(r)=X2(r) of a detected peak amplitude sample value, in combination with data indicative of the toe position i.e. the above discussed relation value X1(r) may advantageously be indicative of the absolute toe position value X6(r) of the tumbling mill 10.

| X1(r) | X2(r) | X6(r-1) | => | X6(r) |
|---|---|---|---|---|

It can be seen, in FIGS. 19A and 19B, that a gradually increasing polar angle X1(r)=FI(r) in combination with a gradually increasing radius value X2(r)–$S_P$(r) renders an image of a spiral arm that whirls outwards, as indicated by a curved arrow 560A in FIG. 19A, starting from the first internal status indicator object 550(1). An "angular length" X6(r) of the spiral arm, from the initial polar angle Φ(1) of the first internal status indicator object 550(1) up to the current, or latest detected, toe position FI(r), appears to be indicative of an absolute position X6(r) of the toe portion 205 (see e.g. FIG. 2 and FIG. 14). In this connection, it is noted that 360 degrees in the polar coordinate system 520 of FIG. 19A corresponds to the relative toe position value X1 indicating 100% of the distance between two adjacent static reference positions, as discussed in relation to FIG. 14B.

In particular it is noted, with reference to FIGS. 19A and 19B there is a certain slowness in the change of the absolute toe position X6.

Figure 32:
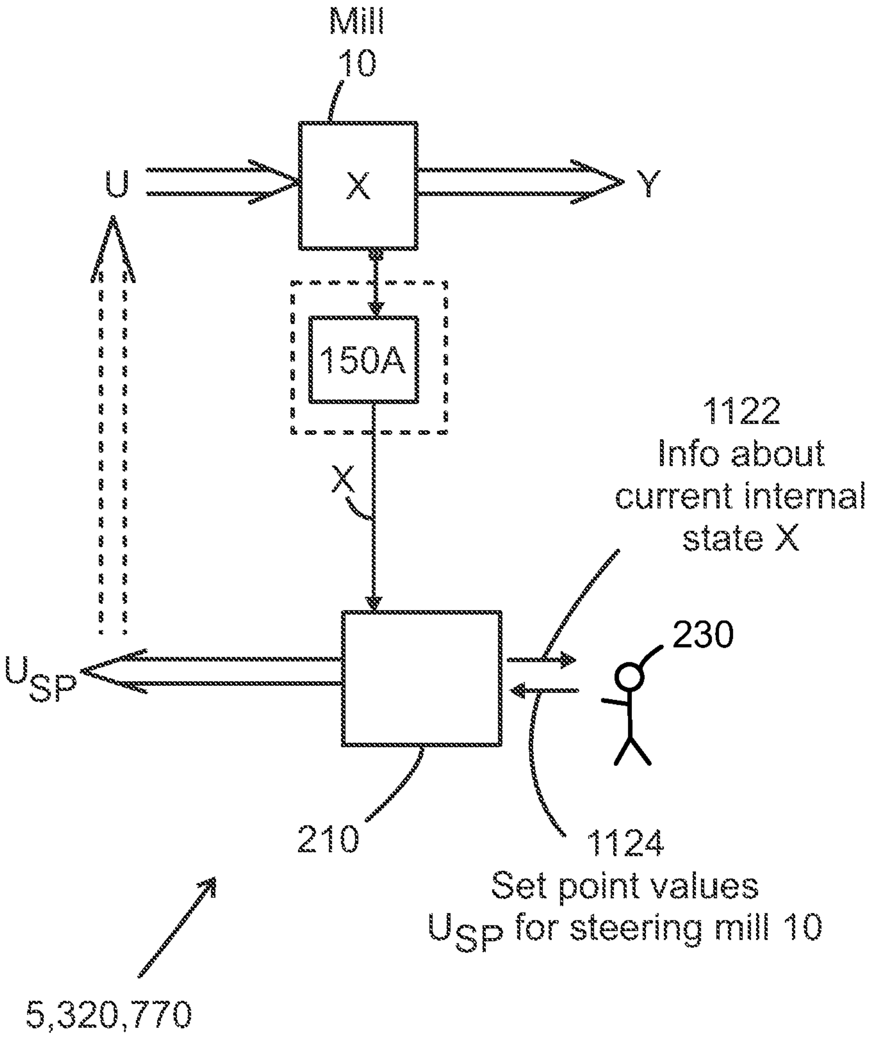
FIG. 32 is a block diagram of a system including a tumbling mill illustrated as a box receiving a number of inputs and generating a number of outputs.

FIG. 32 is a block diagram of the system 5, 320, 770 including a tumbling mill illustrated as a box 10 receiving a number of inputs U1, . . . Uk, and generating a number of outputs Y1, . . . Yn. With reference to FIG. 32 and FIG. 1C it is noted that, for the purpose of analysis, a tumbling mill 10 may be regarded as a black box 10B having a number of input variables, referred to as input parameters U1, U2, U3, . . . Uk, where the index k is a positive integer. During operation of the tumbling mill 10, 10B, the tumbling mill has an internal state X, and for the purpose of analysis, the tumbling mill 10 may be regarded as the black box 10B having a number of output variables, also referred to as output parameters Y1, Y2, Y3, . . . Yn, where the index n is a positive integer.

The internal state X of the mill may be described, or indicated, by a number of internal state parameters X1, X2, X3, . . . , Xm, where the index m is a positive integer.

Using the terminology of linear algebra, the input variables U1, U2, U3, . . . Uk may be collectively referred to as an input vector U. Thus, the dimension of input vector U is k:

$$\text{Input vector } U\text{:Dim}(U)=k$$

Likewise, the internal state parameters X1, X2, X3, . . . , Xm may be collectively referred to as an internal state vector X.

The dimension of internal state vector X is m:

Internal state vector X: Dim (X)=m

The output parameters Y1, Y2, Y3, . . . Yn may be collectively referred to as an output vector Y.

The dimension of output vector Y is n:

$$\text{Output vector } Y\text{:Dim}(Y)=n$$

The internal state X of the mill 10, at a point in time termed r, can be referred to as X(r). That internal state X(r) can be described, or indicated, by a number of internal state parameters X1, X2, X3, . . . , Xm, as discussed above. These internal state parameters define different aspects of the internal state X(r) of the mill 10 at time r.

The internal state X(r) of the tumbling mill 10 depends on the input vector U(r). An aspect of the internal state X is the total amount of material 30 in the shell 20, and that total amount does not change instantly. Thus, during operation of the mill 10, the internal state X(r) can be regarded as a function of an earlier internal state X(r−1) and of the input U(r):

$$X(r)=f_1(X(r-1),U(r)), \qquad \text{(eq.4)}$$

wherein X(r−1) denotes the internal state X of the mill 10 at a point in time preceding the point in time termed r.

The output Y of the tumbling mill 10 can be regarded as a function of the internal state X. Thus, using the terminology of linear algebra, the output vector Y(r) depends on the internal state vector X(r):

$$Y(r)=f_2(X(r)) \qquad \text{(eq.5)}$$

It is an object of an aspect of this document to address the problem of how to maintain the internal comminution process of the mill 10 at a suitable operating point. Thus, during operation of the mill 10 it may be desirable to counteract deviations from such a suitable operating point. This problem may be addressed by providing a linearized model of the comminution process at an operating point. When regarding the above functions $f_1$ and $f_2$, respectively, at operating points near a suitable operating point, the functions may be linear. Accordingly, at a selected operating point, the internal state X(r) can be regarded as a function of an earlier internal state X(r−1) and of the input U(r) in accordance with a linear model which may be written as follows:

$$X(r)=A*X(r-1)+B*U(r), \qquad \text{(eq.6)}$$

wherein A and B are coefficient matrices.

In this connection it is noted that in linear algebra, a coefficient matrix is a matrix consisting of the coefficients of the variables in a set of linear equations. As the skilled reader of this document knows, the coefficient matrix is used in solving systems of linear equations.

In this connection it is noted that the coefficients in matrices A and B, respectively, may be constants.

Similarly, at a selected operating point, the output vector Y(r) depends on the internal state vector X(r) in accordance with a linear model which may be written as follows:

$$Y(r)=C*X(r) \qquad \text{(eq.7)}$$

wherein C is a coefficient matrix.

However, equation 7 does not mean that a change in the state X must be immediately conveyed into a change of the state Y, since there may, perhaps sometimes, be a delay from the occurrence of a changed internal state X to the occurrence of a corresponding change of the state Y(r) of the product material 95,96. When operating at a steady state, however, there appears to be a causal link between the internal state X in the comminution process occurring in the mill 10 at time r and the state Y(r) of the product material 95,96 at the same time r. Thus Equation 7 is valid, at least when operating the tumbling mill 10 at steady state.

Referring to equation 7, the coefficients in matrix C may be constants. The constant values for the coefficients in matrix C may be set to the derivatives C=dY/dX at a selected operating point $X_{OP}$.

With reference to FIG. 32, the system comprises a monitoring module 150A for generating an internal state vector X of dimension m, wherein m is a positive integer. In an example Dim(X) is at least 2. The values in the internal state vector X may be generated in a manner as disclosed in relation to any of FIGS. 1A to 31 above.

The Monitoring Module 150A may be adapted to convey 1122 information describing the internal state X of the mill during operation of the mill 10, e.g via a user interface 210, as indicated by arrow 1122. Thus, one or several values in the internal state vector X may be conveyed to an operator 230 via user interface 210. This advantageously simplifies for the operator 230 of the mill 10 to make suitable adjustments 1124 to set point values (indexed SP) for influencing the input vector U. Thus, by adjusting e.g. the speed set point value $U1_{SP}$ (See FIG. 32 in conjunction with FIG. 1B) the operator 230 can adjust the speed $f_{ROT}$, U1.

In this manner the operator, by adjusting the relevant set point value(s) $U_{SP}$ can adjust the corresponding input variable(s) U1, U2, U3, . . . Uk.

The set point values $U1_{SP}$, $U2_{SP}$, $U3_{SP}$, . . . Uk may be collectively referred to as a set point vector $U_{SP}$. Thus, the dimension of set point vector $U_{SP}$ is k:

$$\text{set point vector } U_{SP}\text{:Dim}(U_{SP})=k$$

The system 5,320,770 of FIG. 32 may include a Monitoring Module 150A as described in any of the other embodiments described in this disclosure, e.g. in relation to any of FIGS. 1-31.

Figure 33:
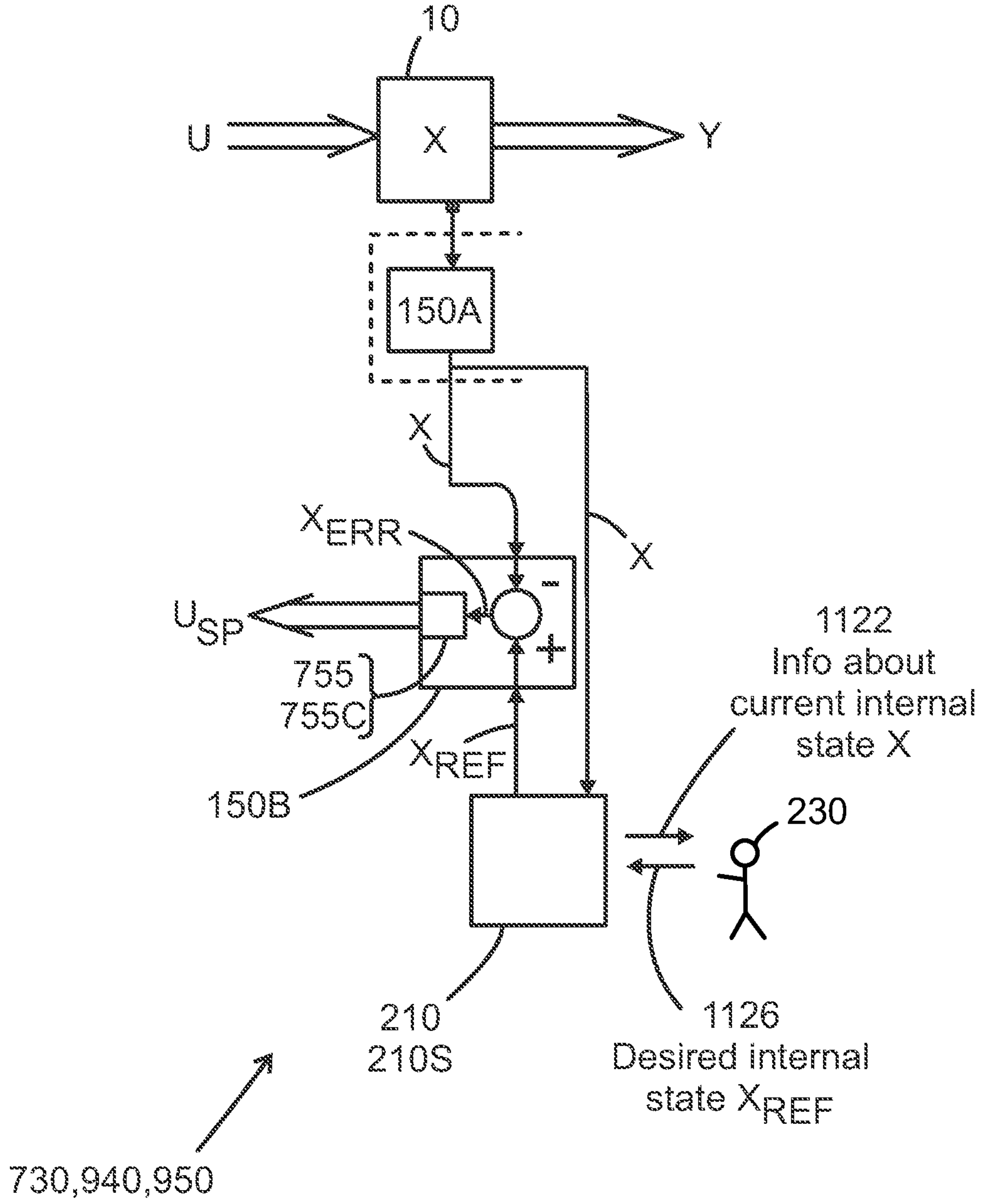
FIG. 33 is a block diagram of another system including a tumbling mill illustrated as a box receiving a number of inputs, and generating a number of outputs.

FIG. 33 is a block diagram of another system 730, 940, 950 including a tumbling mill illustrated as a box 10 receiving a number of inputs U1, . . . Uk, and generating a number of outputs Y1, . . . Yn.

The system 940 of FIG. 33 may include a Monitoring Module 150A as described in any of the other embodiments described in this disclosure, e.g. in relation to any of FIGS. 1-31. Moreover, the system 940 of FIG. 33 may include a control module 150B as described in any of the other embodiments described in this disclosure, e.g. in relation to FIG. 28.

The Monitoring Module 150A of FIG. 33 may be adapted to convey information describing the internal state X of the mill during operation of the mill 10, e.g via a user interface 210. Thus, one or several values in the internal state vector X may be conveyed 1122 to an operator 230 via user interface 210, as indicated by arrow 1122. This advantageously simplifies for the operator 230 of the mill 10 to make suitable adjustments 1126 to mill set point values U and/or internal state reference values $X_{REF}$ (indexed REF) for influencing the internal state X of the mill during operation of the mill 10. Arrow 1126 indicates user input relating e.g. to a desired internal state $X_{REF}$. The internal state reference parameters $X1_{REF}$, $X2_{REF}$, $X3_{REF}$, . . . , $Xm_{REF}$ may be collectively referred to as an internal state reference vector $X_{REF}$.

The dimension of internal state reference vector $X_{REF}$ is m:

$$\text{Internal state reference vector } X_{REF}\text{:Dim}(X_{REF})=m$$

In this manner the operator 230, by adjusting mill set point values U and/or relevant internal state reference parameter value(s) $X1_{REF}$, $X2_{REF}$, $X3_{REF}$, . . . , $Xm_{REF}$ can influence the internal state X of the mill during operation of the mill 10. Thus, the user interface 210, in response to user input, may be configured to generate values for the internal state reference vector $X_{REF}$.

The internal state reference vector $X_{REF}$ is delivered to a reference input of a Control Module 150B, as illustrated in FIG. 33. Referring to FIG. 33 in conjunction with FIG. 26, the Control Module 150B is a multivariable Control Module that also receives, from the Monitoring Module 150A, the above described internal state vector X.

In this connection, the internal state vector X may be indicative of a current state of a comminution process in the mill 10, and the internal state reference vector $X_{REF}$ is indicative of a desired state of the comminution process.

The multivariable Control Module 150B may be adapted to generate, based on the received internal state reference vector $X_{REF}$ and the received internal state vector X, an internal state error vector $X_{ERR}$.

The internal state error vector $X_{ERR}$ includes internal state error values $X1_{ERR}$, $X2_{ERR}$, $X3_{ERR}$, . . . , $Xm_{ERR}$ The dimension of internal state error vector $X_{ERR}$ is m:

$$\text{Internal state error vector } X_{ERR}\text{:Dim}(X_{ERR})=m$$

The error vector is delivered to regulator 755, 755C. The regulator 755, 755C of FIG. 33 is a multivariable regulator adapted to generate a set point vector $U_{SP}$. Accordingly, the set point vector $U_{SP}$ includes the above described set point value(s) for controlling or adjusting corresponding input variable(s) U1, U2, U3, . . . Uk (See FIG. 33 in conjunction with FIG. 34).

Thus, the system described in relation to FIG. 33 advantageously simplifies for the operator 230 of the mill 10 by conveying 1122 information indicative of the internal state X of the mill during operation, while also allowing the operator to provide 1126 information describing a desired internal state, e.g. in the form of reference values for the above described internal state reference vector $X_{REF}$.

The regulator 755, 755C may be a multi-variable regulator configured to include a multi-variable proportional-integral-derivative controller (PID controller). Alternatively, the regulator 755, 755C may be configured to include a multi-variable proportional-integral controller (PI controller). Alternatively, the regulator 755, 755C may be configured to include a multi-variable proportional controller (P controller).

Alternatively, the regulator 755, 755C may be configured to include Kalman filtering, also known as linear quadratic estimation (LQE). Kalman filtering is an algorithm that uses a series of measurements observed over time, including statistical noise and other inaccuracies, and produces estimates of unknown variables that tend to be more accurate than those based on a single measurement alone, by estimating a joint probability distribution over the variables for each timeframe.

FIG. 34 shows another somewhat diagrammatic view of a system 1130 including a tumbling mill 10. Thus, reference numeral 1130 relates to a system including a mill 10 having a rotatable shell 20, as discussed in this document. The system 1130 of FIG. 34 may include parts, and be configured, as described above in relation to FIG. 1A and/or FIG. 1B and/or as described in any of the other examples described in this disclosure, e.g. in relation to FIGS. 1-33.

The Monitoring Module 150A may include status parameter extractor functionality as described elsewhere in this document for generating internal state parameter values X1, X2, X3, . . . , Xm. It is to be noted that the internal state X of the mill 10, at a point in time termed r, can be referred to as X(r). That internal state X(r) can be described, or indicated, by a number of parameter values, the parameter values defining different aspects of the internal state X(r) of the mill 10 at time r. Thus, values of the internal state parameters X1, X2, X3, . . . , Xm at the time r may be collectively referred to as an internal state vector X(r).

The system illustrated in FIG. 34 may provide an integrated HCI 210, 250, 210S. Thus, the input/output interface 210 of FIG. 34 may be configured to enable all the input and/or output described above. Additionally, the input/output interface 210 of FIG. 34 may be configured to provide 1132 information relating to a state of the output material. The state of the output material may be described by the output parameters Y1, Y2, Y3, . . . Yn, collectively referred to as output vector Y. As mentioned above, the dimension of output vector Y is n:

$$\text{Output vector } Y\text{:Dim}(Y)=n$$

The vector Y may also be referred to as discharge material state vector Y.

System 1130 of FIG. 34 includes a regulator 1190. The regulator 1190 may be configured to enable all functions described with reference to regulator 240, which is described elsewhere in this document. Alternatively, regulator 1190 may be configured to enable all functions described with reference to regulator 755, which is described elsewhere in this document. In addition to functions described in regulator 240 and/or regulator 755 the regulator 1190 may be configured to perform additional functions, such as e.g. to convey and/or receive information relating to the output material 95, 96, e.g. in the form of output parameters Y1, Y2, Y3, . . . Yn. Thus regulator 1190 may also be referred to by reference number 240C and/or 755C.

Thus, regulator 1190 may be configured to convey information relating to the output material 95, 96 to a mill operator 230, as indicated by arrow 1132. Moreover, regulator 1190 may be configured to receive, from a mill operator 230, information relating to the output material 95, 96, as indicated by arrow 1196.

Figure 35:
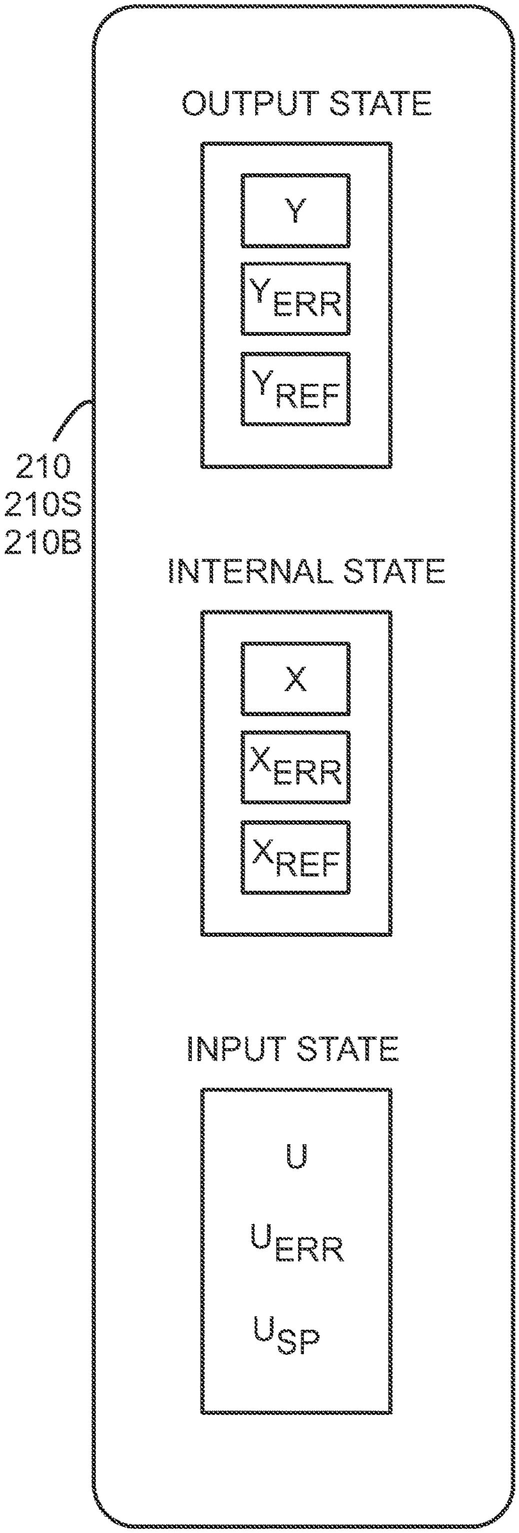
FIG. 35 is a schematic general overview of information that may be conveyed by input/output interface of FIG. 34.

FIG. 35 is a schematic general overview of information that may be conveyed by input/output interface 210 of FIG. 34. With reference to FIGS. 34 and 35 it is noted that the regulator 1190, 755C of FIG. 34 is coupled, via coupling 1100, for data exchange with input/output interface 210. Information to be transferred via coupling 1100 includes reference values for the above described internal state reference vector $X_{REF}$.

Referring to FIG. 34, the system 1130 comprises a product analyzer 1140 configured to analyze at least a portion of said product particles 96. The analyzer 1140 is configured to generate at least one product measurement value Y1, Y2, Y3, . . . Yn based on said product particle analysis.

In effect, the at least one output material measurement value Y1, Y2, Y3, . . . Yn may be indicative of a discharge material state Y, the discharge material state Y being a momentary state of the output material 95. When analyzer 1140 provides two or more output material measurement values, these values may be provided in the form of the above mentioned output vector Y.

The at least one product measurement value may, for example, include a value indicative of a product discharge rate $R_{SDis}$. The product discharge rate $R_{SDis}$ may also be referred to as output parameter Y1.

The momentary state of the output material 95, i.e. the discharge material state Y, may be identified by measurement of at least one output material measurement value Y1, Y2, Y3, . . . Yn. In practice it may be desirable to generate more than one output material measurement value in order to obtain information indicative of the discharge material state (Y).

The at least one output material measurement value may be one or many selected from the group:

- a value Y1; Y2 indicative of a mass per time unit of said output material 95;

a value Y1; Y2 indicative of a mass per time unit of said product particles 96;
a value Y1; Y2 indicative of a median particle size;
a value Y1; Y2 indicative of a mass per time unit of said product particles 96 having a size that falls below a predetermined product particle size limit;
a value Y1; Y2 indicative of a proportion, or a percentage share, of said product particles that have a product particle size in a range between a lower product particle size limit and an upper product particle size limit;
a value Y1; Y2 indicative of a count, i.e. a number of product particles, of said product particles with product particle size in a range between a lower product particle size limit and an upper product particle size limit;
a value Y1; Y2 indicative of a product particle size distribution Y, such as a standard deviation; and
a value Y1; Y2 indicative of a product particle size Y1; Y2.

Said product particle size Y1; Y2 may be at least one selected from the group:
a product particle median size value;
a product particle mean size value;
a product particle median diameter value; and
a product particle mean diameter value.

Said product particle size limit values may be at least one selected from the group:
a product particle diameter value; and
a product particle maximum width value.

Said value Y1; Y2 indicative of a product particle size distribution Y may be at least one selected from the group:
a standard deviation value;
a variance value;
range between the highest and lowest size;
interquartile range.

Said range between a smallest particle size value and a largest particle size value may be between
30 micrometres and 20 millimetres;
150 micrometres and 300 micrometres;
200 micrometres and 220 micrometres; and/or
0 millimetres and 40 millimetres.

The product analyzer 1140 may thus be configured to analyze at least a portion of said product particles 96 so as to generate at least one product measurement value Y1, Y2, Y3, . . . Yn based on said product particle analysis. The at least one product measurement value Y1, Y2, Y3, . . . Yn may be provided with information indicative of a point in time when the at least one product measurement value Y1, Y2, Y3, . . . Yn was generated.

Moreover, the discharge material state Y, at a point in time termed w, can be referred to as Y(w). That discharge material state Y(w) can be described, or indicated, by a number of parameter values Y1(w), Y2(w), Y3(w), . . . Yn(w), the parameter values defining different aspects of the material 95,96 discharged from of the mill 10 at time w. Thus, values of the discharge material parameter values Y1, Y2, Y3, . . . Yn at time w may be collectively referred to as discharge material state vector Y(w), also referred to as output vector Y(w).

As noted above, there is a causal relationship between a certain internal state X(r) and a certain output Y(r), and thus the output Y of the tumbling mill 10 can be regarded as a function of the internal state X.

Referring to FIG. 34, the output vector Y may be delivered to a first input of a correlator 150C1. Moreover, the internal state vector X may be delivered by the module 150A to a second input of the correlator 150C1. The correlator 150C1 is configured to identify a correspondence between the internal state X and the corresponding output Y.

However, in order to perform a correlation it is desirable to ensure that a measured value of the output Y(w) refers to, at least, approximately, the same point in time as the internal state X(r). In other words, the values in the internal state vector X(r) may need to be synchronized with the values in the corresponding output vector Y(w). Referring to FIG. 34, the output vector Y(w) may be delivered to a first input of an optional synchronizer 1150. The synchronizer 1150 is optional because it may not be needed, e.g. when the internal state vector X(r) and the corresponding output vector Y(w) are generated in a synchronized manner such that
the point in time w is the same point in time as the point in time r, or
such that the point in time w is at least approximately the same point in time as the point in time r.

Temporally Synchronized vectors X(t) and Y(t) are received by a correlation data generator 1160, as illustrated in FIG. 34.

The correlation data generator 1160 generates a correlation data set 1170. According to an example, the correlation data generator 1160 generates a correlation data set by performing correlation of
a received at least one status parameter value, such as e.g. X1(t) and
a received at least one corresponding product measurement value, such as e.g. Y2(t).

The correlation data generator 1160 may receive a number of time stamped internal state vectors X(r) and a number of time stamped corresponding output vector Y(w). The received information vectors may be received in a temporally interleaved fashion such as X(10), Y(12), X(14), Y(16), X(18), Y(20), X(22), Y(24), wherein the synchronizer 1150 receives a vector X in a time period between the reception of two consecutive vectors Y. That is the case e.g. when vector X(18) is time stamped in the time period between t=20 and t=16, and the Y-vectors Y(16) and Y(20), respectively, are time stamped at the points in time t=16 and t=20. When operating the mill 10 at a steady state condition, i.e. when all the values in vectors X and Y are stable over time, the synchronizer 1150 may generate pairs of vectors X and Y by adjusting the time stamps so that a generated pair of vectors X and Y have the same time stamp. That same time stamp may e.g. be an intermediate time stamp. For example, the synchronizer 1150 when receiving the above mentioned vectors X(18) and Y(20) may arrange them as a vector pair stamped with an intermediate time t=19. Thus, the synchronizer 1150 may, in response to reception of vectors X(t) and Y(t+2) generate a vector pair X(t+1) and Y(t+1) for delivery to correlation data generator 1160.

Moreover, the delivery frequency of the X-vectors and the Y-vectors may be different. This problem may be addressed, for example, by configuring the synchronizer 1150 to deliver, to correlation data generator 1160:
pairs of received vectors X and Y such that each time stamped vector Y is associated with that vector X having the closest earlier time stamp. As a consequence, the synchronizer 1150 may have to discard or reject some vectors.

Thus, for example, when the delivery frequency of the X-vector lower than the delivery frequency of the Y-vector, the synchronizer 1150 may receive vectors as follows:
vector X(34),
vector Y(36),
vector X(37),
vector Y(38), vector X(40),
vector Y(40),
vector Y(42)
vector X(43),
vector Y(44),
then the synchronizer 1150 may deliver, to correlation data generator 1160, pairs 1165 of vectors X and Y such that each time stamped vector Y is associated with that vector X having the closest earlier time stamp. In the above example, the following pairs could be delivered by synchronizer 1150:
vector X(34) vector Y(36),
vector X(37), vector Y(38),
vector X(40), vector Y(40),
vector X(43), vector Y(44), and as a consequence vector Y(42) may be discarded.

Table 7 below is an example of successive pairs 1165 of vectors X and Y arranged in temporal order.

TABLE 7

Successive pairs 1165 of vectors X and Y arranged in temporal order.

| t | X1 | Y2 |
|---|---|---|
| t1 | 62 | 195 |
| t2 | 63 | 198 |
| t3 | 64 | 201 |
| t4 | 65 | 204 |
| t5 | 66 | 207 |
| t6 | 67 | 210 |
| t7 | 68 | 213 |
| t8 | 69 | 216 |
| t9 | 70 | 219 |
| t10 | 71 | 222 |
| t11 | 72 | 225 |
| t12 | 73 | 228 |
| t13 | 74 | 231 |
| t14 | 75 | 234 |

The example of successive pairs 1165 of vectors X and Y, illustrated by table 7, includes information indicative of a toe position X1, and information indicative of a corresponding output parameter Y2. The output parameter Y2 is indicative of a median size of particles produced by a tumbling mill.

The correlation data generator 1160, may be configured to perform a correlation based on received pairs 1165 of vectors X and Y. According to an example the correlation data generator 1160 may be configured to perform a regression analysis based on a large number of received pairs 1165 of vectors X and Y.

The regression analysis may use one or several statistical processes for estimating the relationships between the dependent variable, i.e the values in the vector Y and one or more independent variables, i.e. the values in the vector X.

Figure 36:
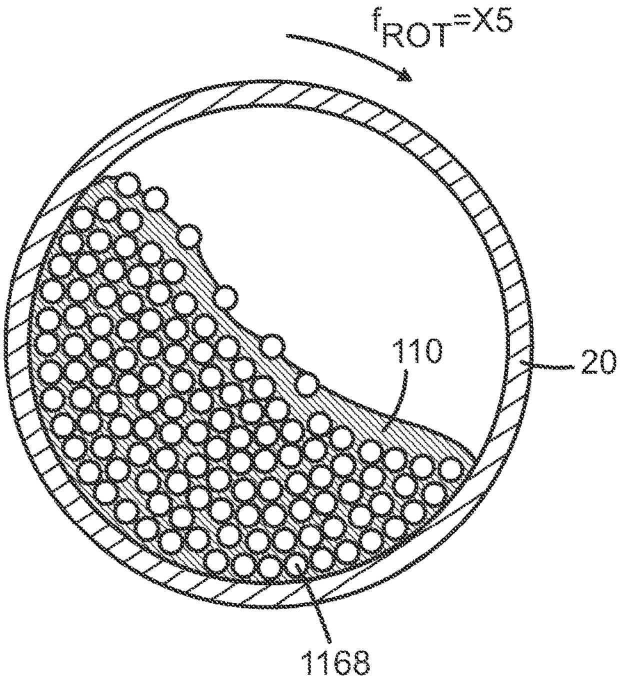
FIG. 36 is of a cross-sectional view of the shell of a ball mill during operation at a speed of rotation.

FIG. 36 is of a cross-sectional view of the shell 20 of a ball mill 10 during operation at a sped of rotation $f_{ROT}$. Thus, FIG. 36 is comparable to the cross-sectional views of FIGS. 1A, 2, 14A, 14B, 23, and 30 above. The tumbling mill 10 of FIG. 36 operates as a ball mill, and thus the charge material 30 comprises a number of grinding balls 1168 as well as solid feed material 110, 115. The charge material 30 may, in some examples, also include liquid feed material, such as water.

Figure 37:
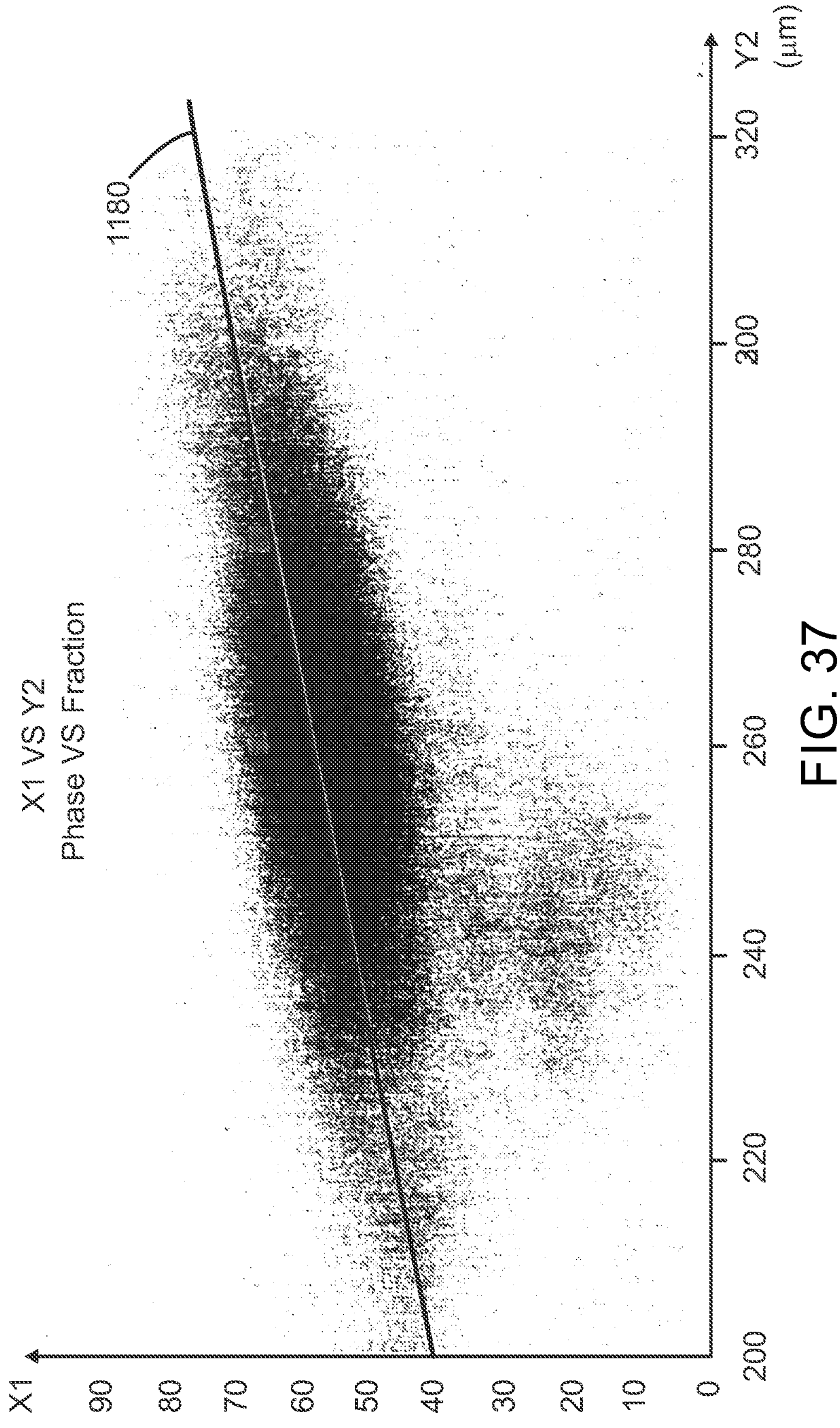
FIG. 37 is a plot of a large number of successive pairs of vectors for a ball mill, like the one illustrated in FIG. 36, running at a constant, or substantially constant speed of rotation.

FIG. 37 is a plot of a large number of successive pairs 1165 of vectors X1 and Y2, for a ball mill, like the one illustrated in FIG. 36, running at a constant, or substantially constant speed of rotation $U1=f_{ROT}=18$ rpm. In FIG. 37, the density of black dots, each dot representing a pair of values X1-Y1, that density is very high at values around X1=60 degrees. The high density of black dots at values around X1=60 degrees indicates that the mill operated very often at Operating Points of X1 being on or near 60 degrees. It can be seen that X1=60 corresponds to a median particle size Y1 of about 260 micrometers. The density of black dots is lower at around X1=40 to 50 degrees, indicating that the mill operated less often at operating points of X1 being between 40 and 50 degrees.

With reference to FIG. 1A in conjunction with FIG. 36, the ball mill had a radius of $R_{MIC}=1930$ millimetres and it had 28 protrusions 310 (not shown in FIG. 36). During operation of the ball mill 10, there may be a grinding ball feed rate U4 set or selected so that the amount of grinding balls remains constant, or substantially constant.

Referring to FIG. 34, the correlation data generator 1160 may be configured to perform a regression analysis, also referred to as correlation analysis, based on received pairs 1165 of values X1 and Y2 as illustrated in FIG. 37.

The regression analysis may, for example, employ linear regression. The linear regression analysis, when applied to a single dependent variable Y2 and a single independent variable, such as X1 or X6, will operate to identify a linear relation, i.e a line, 1180 that most closely fits the data according to a specific mathematical criterion. For example, the method of ordinary least squares computes the unique line 1180 that minimizes the sum of squared differences between the true data and that line. Thus the line 1180 in FIG. 37 is an illustration of a result of linear regression based on received pairs of values X1-Y1, as discussed above.

Accordingly, the correlation data set 1170, generated by correlator 150C1 may include a table of data, or alternatively a linear equation.

Figure 38:
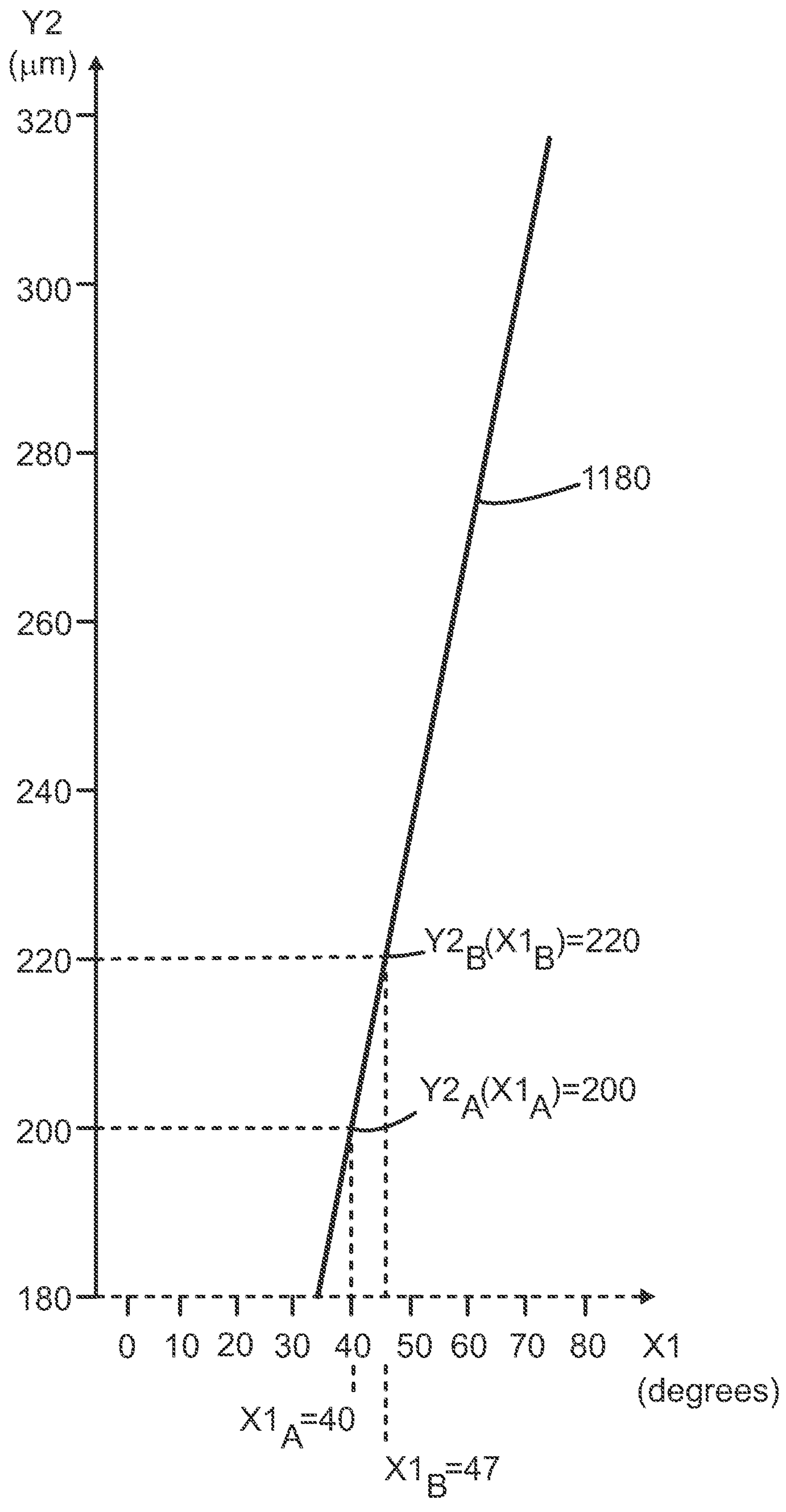
FIG. 38 is a plot of a generated linear regression result.

FIG. 38 is a plot of a generated linear regression result. Thus, the plot of figure shows the line identified line 1180 that illustrates the relation between X1 and Y1, at least when that ball mill operates at Operating Points of $0<X1<80$ degrees, at a constant, or substantially constant speed of rotation $f_{ROT}=18$ rpm. Thus, the correlation data generator 1160 may deliver correlation data 1170 indicative of the linear relation 1180 when the linear regression analysis was applied to a single dependent variable Y2 and a single independent variable.

With reference to FIG. 34, the correlation data set 1170, generated by correlator 150C1 may be delivered to an internal state reference value generator **150*c*2**.

The internal state reference value generator **150*c*2 may be configured to use the received correlation data 1170** for transforming a desired value $Y_{REF}$ into a corresponding internal state reference value $X_{REF}$. Table 8 is an illustration of an example of a data transformation table for transforming a desired value $Y2_{REF}$ into a corresponding internal state reference value $X1_{REF}$. In fact, table 8 is an example data set corresponding to the information in table 7 above.

TABLE 8

A correlation data set 1170 in the form of a correlation table for transforming a desired product property $Y2_{REF}$ into an internal state parameter reference value $X1_{REF}$

| $Y2_{REF}$ | | $X1_{REF}$ |
|---|---|---|
| 195 | => | 62 |
| 198 | => | 63 |
| 201 | => | 64 |
| 204 | => | 65 |
| 207 | => | 66 |
| 210 | => | 67 |

TABLE 8-continued

A correlation data set 1170 in the form of a correlation table for transforming a desired product property $Y2_{REF}$ into an internal state parameter reference value $X1_{REF}$

| $Y2_{REF}$ | | $X1_{REF}$ |
|---|---|---|
| 213 | => | 68 |
| 216 | => | 69 |
| 219 | => | 70 |
| 222 | => | 71 |
| 225 | => | 72 |
| 228 | => | 73 |
| 231 | => | 74 |
| 234 | => | 75 |

The example correlation data table 1170, an example of which is illustrated by table 8, indicates a correlation between internal status parameter value X1, indicative of a toe position, and output parameter Y2, indicative of a median size of particles produced by a tumbling mill.

A More Complex Case of a Multi-Variable Monitoring System

FIGS. 37 and 38 serve as illustration of the function of the correlation data generator 1160 in the relatively simple case of regression analysis applied to a single dependent variable Y2 and a single independent variable X1. In fact, the ball mill inherently appears to exhibit smaller variations in toe position than do non-ball mill tumbling mills, in particular when the ball mill is also operated a constant, or substantially constant speed of rotation U1, as discussed above.

However, is also an object to be addressed by solutions and examples disclosed in this document, to describe methods and systems for improved monitoring and/or control of an internal state X in a tumbling mill 10 during operation. When the mill tumbling mill 10 runs at a variable speed of rotation X5=U1 and it also exhibits a variations in toe position X1, the above described regression analysis as applied to a single dependent variable Y2 and a single independent variable X1 may not suffice. In order to address this problem, however, the correlation data generator 1160 may apply regression analysis to a number of data pairs 1165 comprising a received internal state vector X(t) of dimension m and a received corresponding output vector Y(t) of dimension n, wherein m and n are positive integers.

Thus, when m status parameter values X1, X2, X3, . . . , Xm are to be correlated with n product measurement values Y1, Y2, Y3, . . . Yn, the correlation data generator 1160 may be configured to generate a correlation data 1170 set by performing correlation of a received internal state vector X(t)

and a received corresponding output vector Y(t)

wherein

X(t) is a m*1 vector and m is a positive integer, and

Y(t) is a n*1 vector and n is a positive integer.

Accordingly, in this case the correlation data generator 1160 may be configured to perform a regression analysis so as to identify a more complex linear combination (i.e more complex than a line) that most closely fits the data according to a specific mathematical criterion. For example, the correlation data generator 1160 may perform a method of ordinary least squares, applied to a number of received vectors X(t) of dimension m and a number of received corresponding output vectors Y(t) of dimension n, so as to compute a unique hyperplane that minimizes the sum of squared differences between the received data and that hyperplane.

Accordingly, the correlation data generator 1160, when receiving vectors X(t) of dimension m and a number of received corresponding output vectors Y(t) of dimension n, is configured to generate a multi-dimensional correlation data set 1170. According to an example, the multi-dimensional correlation data set 1170 may be delivered as data 1170 indicative of the above mentioned hyperplane. Alternatively, the multi-dimensional correlation data set 1170 may be delivered as data 1170 indicative of the coefficient matrix C, as discussed in relation to equation 7 above.

According to an example, correlation data generator 1160 may be configured to include Kalman filtering, also known as linear quadratic estimation (LQE), when generating a correlation data set 1170.

This solution advantageously enables identification and/or determination of a cause and effect relationship between the internal state X of the comminution process and the at least one output material measurement value Y.

Moreover, this solution advantageously enables identification and/or determination of a cause and effect relationship between the internal state X of the comminution process and the discharge material state Y. The discharge material state Y may also be referred to as the product material state Y.

This solution is versatile in that it allows for the defining of a desired discharge material state $Y_{REF}$, and for testing of alternative internal states, also referred to as operating points $X_{OP}$, of the comminution process in order to search and identify an internal state $X_{BEP}$ of the comminution process that causes, or produces, the desired discharge material state $Y_{REF}$ or that causes or produces a discharge material state Y as near as possible to the desired discharge material state $Y_{REF}$. Such an internal state may be referred to as a Best Operating Point, BEP. The values of the parameters at BEP may collectively be referred to as internal state BEP vector $X_{BEP}$.

Moreover, the recording of a detected momentary comminution process internal state X(r) in association with a corresponding momentary discharge material state Y(r), produces correlation data indicative of a correlation between a momentary comminution process internal state X(r) and a corresponding momentary discharge material state Y(r).

By performing repeated recording of a number of mutually different detected momentary comminution process internal states X(r) in association with momentary discharge material states Y(r) that were caused by the respective momentary comminution process internal states X(r), wherein r is a number variable indicative of a number of different points in time, a correlation data set may be produced. Such a correlation data set is indicative of a correlation between a number of momentary comminution process internal states X(r) and a number of corresponding momentary discharge material states Y(r).

The ball mill operating characteristic curve, or BMOC curve, of a ball mill is a graphical plot that illustrates the median size (Y2) of product particles generated by a ball mill when the toe position value is varied, such as FIGS. 37 and 38.

The BMOC curve is created by plotting the toe position value against the median size (Y2) of product particles at various toe positions.

The tumbling mill operating point, or $X_{OP}$ or TOP, is a specific point within the operation characteristic of a tumbling mill. It has been found that when the toe position value is varied within as certain range of toe position values around a particular tumbling mill operating point ($X_{OP}$, TOP) there is a linear relation between the toe position value and the product particle size distribution (Y). In the context of this document, the term mill operation area (MOA) may be used to describe such a certain range of toe position values.

The mill operating characteristic curve, or MOC curve, of a tumbling mill is a graphical plot that illustrates the product particle size distribution (Y) of product particles generated by a tumbling mill when at least one of the status parameter values (X1, X2, X3, X4, X5, X6,) is varied. Thus, for example, a MOC curve is created by plotting a measure of the product particle size distribution (Y) against the toe position value when e.g. the rotational speed ($f_{ROT}$) of the shell is kept constant.

It has been found that the there is a linear relation between
- the median size (Y2) of product particles generated by a ball mill and
- the toe position value, at least when the toe position value X1 is varied within as certain range of toe position values.

Referring again to FIG. 34, the internal state reference value generator 150$c$2 may be configured to use the received correlation data 1170 for transforming a desired value $Y_{REF}$ into a corresponding internal state reference value $X_{REF}$.

Use of the Correlation Data for Operating a Mill

With reference to FIG. 34, an operator 230 in the control room 220 is tasked with operation of the tumbling mill 10. The operator may use regulator 1190 for operating the mill 10. The regulator 1190 is coupled to the user interface 210, 210B also referred to as Human Computer Interface (HCI) 210B, as shown in FIG. 34.

The example control room 220, shown in FIG. 34, includes an internal state control system 1200 comprising the internal state reference value generator 150$c$2 and the user interface 210, 210B and regulator 755C or regulator 240C.

The internal state control system 1200 may be configured to perform the following steps:
- (Step S3000:) cause the user interface 210 to convey information requesting the operator to provide user input indicative of a desired discharge material state $Y_{REF}$. The user input indicative of a desired discharge material state $Y_{REF}$ may be indicative of at least one desired output material measurement value, such as Y1 and/or Y2, as discussed above. For example, the user input may be indicative of a desired product particle median size $Y2_{REF}$, and/or desired product particle size distribution $Y3_{REF}$, $Y4_{REF}$, or a desired amount of output material per time unit $Y1_{REF}$.

This request, S3000, may be generated by software included in the regulator 755C, or by software included in the regulator 240C, or by software included in the internal state reference value generator 150$c$2.

The internal state control system 1200 may also be configured to:
- (Step S3005:) receive, e.g. via user interface 210, data indicative of a desired discharge material state $Y_{REF}$ and/or desired product particle median size $Y2_{REF}$ and/or desired product particle size distribution Y2, Y3, Y4.

Moreover, the internal state control system 1200 may be configured to perform a method comprising the following steps:
- S3010: generate a toe position reference value ($X1_{REF}$; $FI_{REF}$) based on
  - said data indicative of said desired discharge material state $Y_{REF}$ and/or said desired product particle median size ($Y2_{REF}$) and/or desired product particle size distribution $Y2_{REF}$, $Y3_{REF}$, $Y4_{REF}$, and
  - a correlation data set (1170); said correlation data set (1170) being
  - indicative of a causal relationship between
  - a certain toe position value (X1(r), FI(r), $T_D$, $R_T$(r); X6, $A_{TOE}$(r)) and
  - a corresponding certain product particle median size (Y2),
  - at said speed of shell rotation (U1, $f_{ROT}$);
  - and/or indicative of a causal relationship between
  - a certain internal state $X_{REF}$ and
  - a corresponding certain discharge material state $Y_{REF}$.

The corresponding certain discharge material state $Y_{REF}$ may include a certain product particle size distribution (Y2, Y3, Y4).

Figure 39:
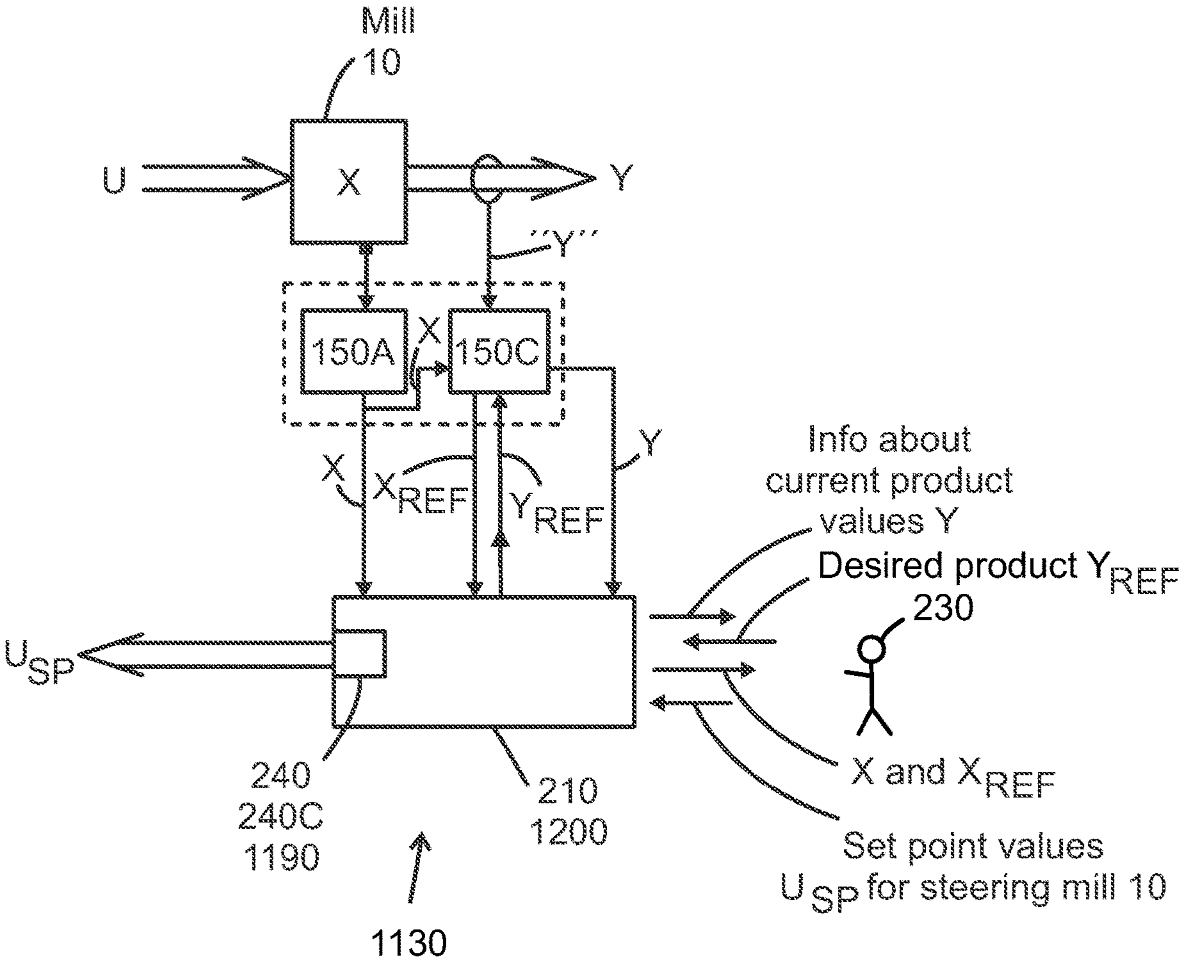
FIG. 39 is a block diagram of a system for monitoring of an internal state of a mill and for providing improved information content to an operator of the mill.

The step S3010 may involve the delivery of the received data, from the user interface 210 to the internal state reference value generator 150$c$2 (See FIG. 34 and/or FIG. 35 and/or FIG. 39).

The internal state reference value generator 150$c$2 is configured to transform data relating to desired discharge material state $Y_{REF}$ into data indicative of a corresponding desired internal state $X_{REF}$ and/or data indicative of a corresponding desired toe position reference value $X1_{REF}$ (r), $FI_{REF}$ (r), as discussed above.

With reference to FIG. 34 in conjunction with FIG. 35, the internal state control system 1200 may also be configured to:
- S3020: cause the user interface (210, 210S, 240, 250) to convey information indicative of the corresponding desired internal state $X_{REF}$ and/or data indicative of the corresponding desired toe position reference value ($X1_{REF}$ (r), $FI_{REF}$ (r), and
- S3020: causing a user interface (210, 210S, 240, 250) to convey information indicative of an actual toe position value (X1(r), FI(r), $T_D$, $R_T$(r); X6, $A_{TOE}$(r)), e.g. received from the monitoring module 150A,
- S3020: receiving, via a user interface (210, 210S, 240, 250), first user input relating to said solid material feed rate (U2, $R_S$);
- S3020: generating a solid material feed rate set point value ($U2_{SP}$, $R_{SSP}$) thereby influencing said internal state (X) for controlling or affecting said
- desired discharge material state $Y_{REF}$
- product particle median size (Y2); wherein
- said generated solid material feed rate set point value ($U2_{SP}$, $R_{SSP}$) is based on said received first user input.

According to an example, the generated solid material feed rate set point value $U2_{SP}$, being based on said received first user input, causes the material in the rotating shell (20) to be tumbled at said influenced internal state (X) for causing the product particles to be generated with a product particle median size (Y2) corresponding to said influenced internal state (X) of said comminution process.

System for Monitoring and Providing Improved Comminution Process Information Content to an Operator FIG. 39 is a block diagram of the system 1130 for monitoring of an internal state X of a mill 10 and for providing improved information content to an operator 230 of the mill 10.

The system 1130 includes a tumbling mill 10, as discussed in connection with FIGS. 34 to 38 above. In FIG. 39 the system 1130 is shown as a block diagram including a tumbling mill illustrated as a box 10 receiving a number of inputs U1, . . . Uk, and generating a number of outputs Y1, . . . Yn. Thus, in terms of signal processing and analysis, the mill 10 receives an input vector U, and it generates an output vector Y, in the manner discussed elsewhere in this document. The system 1130 of FIG. 39 may include parts, and be configured, as described above in relation to FIG. 1A and/or FIG. 1B and/or as described in any of the other examples described in this disclosure, e.g. in relation to FIGS. 1-38.

The system 1130 includes a Monitoring Module 150A and/or a Correlation Module 150C, as shown in FIG. 39. The Correlation Module 150C may operate to generate the correlation data set 1170 during operation of the mill 10, as described above, and/or Correlation Module 150C may operate to transform data relating to desired discharge material state $Y_{REF}$ into data indicative of a corresponding desired internal state $X_{REF}$, the transformation step being based on a correlation data set 1170 that is relevant for the mill 10 being operated.

The system 1130 shown in FIG. 39, includes an internal state control system 1200 comprising the internal state reference value generator 150$c$2 and the user interface 210, 210B and regulator 240C.

The internal state control system 1200 may be configured to perform the following steps:

(Step S3000:) cause the user interface 210 to convey information requesting the operator to provide user input indicative of a desired discharge material state $Y_{REF}$. The user input indicative of a desired discharge material state $Y_{REF}$ may be indicative of at least one desired output material measurement value, such as Y1 and/or Y2, as discussed above. For example, the user input may be indicative of a desired product particle median size $Y2_{REF}$, and/or desired product particle size distribution $Y3_{REF}$, $Y4_{REF}$, or a desired amount of output material per time unit $Y1_{REF}$.

This request, S3000, may be generated by software included in the regulator 240C.

The internal state control system 1200 may also be configured to:

(Step S3005:) receive, e.g. via user interface 210, data indicative of a desired discharge material state $Y_{REF}$ and/or desired product particle median size $Y2_{REF}$ and/or desired product particle size distribution Y2, Y3, Y4.

Moreover, the internal state control system 1200 may be configured to perform a method comprising the following steps:

S3010: generate a corresponding desired internal state $X_{REF}$ (also referred to as internal state reference vector $X_{REF}$) which may include a toe position reference value ($X1_{REF}$; $FI_{REF}$). The internal state reference vector $X_{REF}$ may be based on said data indicative of said desired discharge material state $Y_{REF}$ and/or said desired product particle median size ($Y2_{REF}$) and/or desired product particle size distribution $Y2_{REF}$, $Y3_{REF}$, $Y4_{REF}$, and a correlation data set (1170); said correlation data set (1170) being indicative of a causal relationship between a certain internal state $X_{REF}$ and a corresponding certain discharge material state $Y_{REF}$.

The corresponding certain discharge material state $Y_{REF}$ may include a certain product particle size distribution (Y2, Y3, Y4), and/or a certain product discharge rate $Y1_{REF}$.

The step S3010 may involve the delivery of the received data (i.e. indicative of a desired discharge material state $Y_{REF}$), from the user interface 210 to the Correlation Module 150C (See FIG. 39).

The Correlation Module 150C may include an internal state reference value generator 150$c$2 configured to transform data relating to desired discharge material state $Y_{REF}$ into data indicative of a corresponding desired internal state $X_{REF}$ and/or data indicative of a corresponding desired toe position reference value $X1_{REF}$ (r), $FI_{REF}$ (r), as discussed above.

With reference to FIG. 39 in conjunction with FIG. 35, the internal state control system 1200 may also be configured to:

S3020: cause the user interface (210, 210S, 240, 250) to convey information indicative of the corresponding desired internal state $X_{REF}$ and/or data indicative of the corresponding desired toe position reference value ($X1_{REF}$ (r), $FI_{REF}$ (r), and S3020: causing a user interface (210, 210S, 240, 250) to convey information indicative of an actual toe position value (X1(r), FI(r), $T_D$, $R_T$(r); X6, $A_{TOE}$(r)), e.g. received from the monitoring module 150A, S3020: receiving, via a user interface (210, 210S, 240, 250), first user input relating to said solid material feed rate (U2, $R_S$);

S3020: generating a solid material feed rate set point value ($U2_{SP}$, $R_{SSP}$) thereby influencing said internal state (X) for controlling or affecting said desired discharge material state $Y_{REF}$ product particle median size (Y2); wherein said generated solid material feed rate set point value ($U2_{SP}$, $R_{SSP}$) is based on said received first user input.

According to an example, the generated solid material feed rate set point value $U2_{SP}$, being based on said received first user input, causes the material in the rotating shell (20) to be tumbled at said influenced internal state (X) for causing the product particles to be generated with a product particle median size (Y2) corresponding to said influenced internal state (X) of said comminution process.

System for Monitoring Mill Product and Providing Improved Process Control

Figure 40:
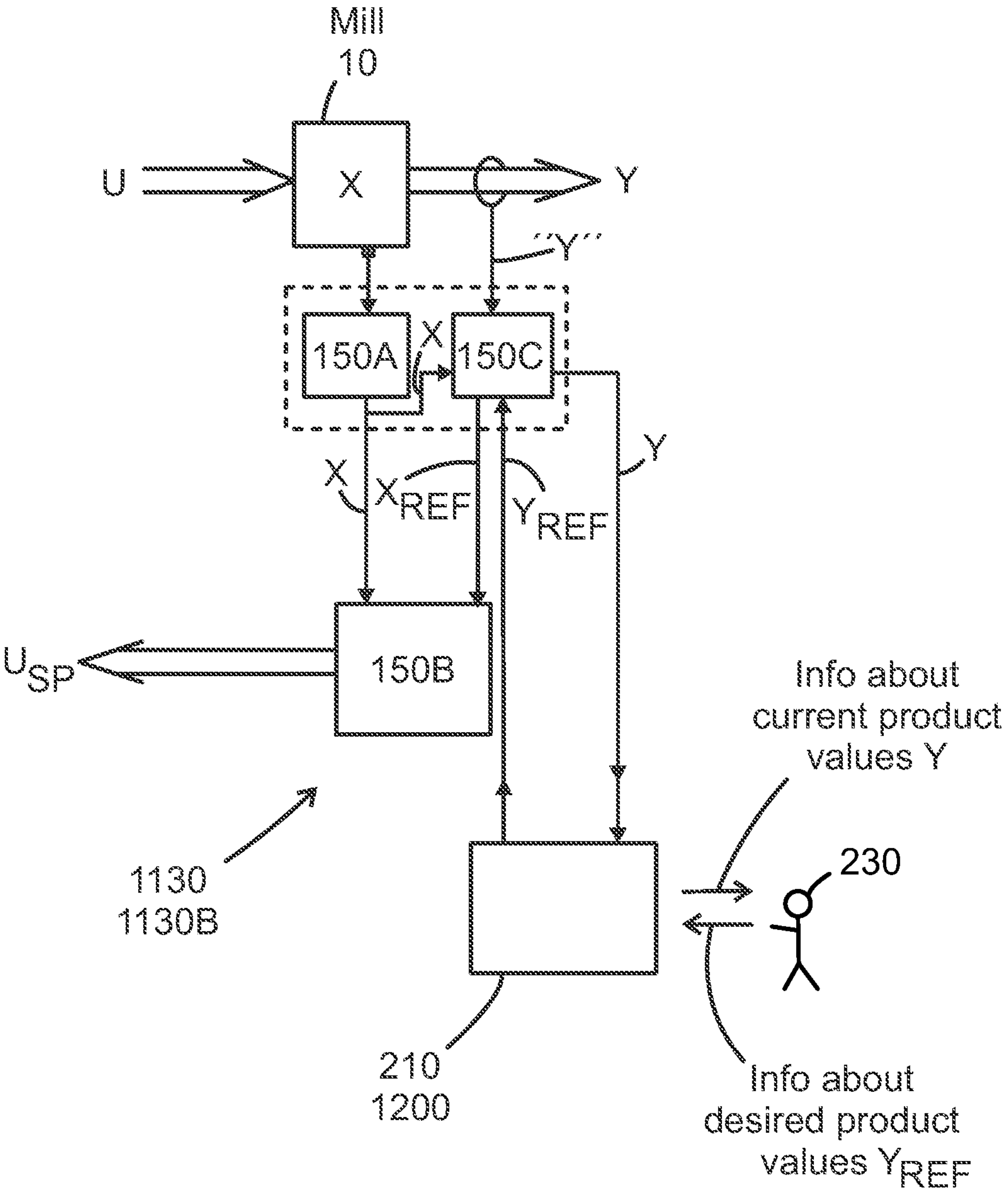
FIG. 40 is a block diagram of a system for monitoring of an internal state X of a mill and for enabling improved control of a comminution process that occurs in a mill.

FIG. 40 is a block diagram of a system 1130B for monitoring of an internal state X of a mill 10 and for enabling improved control of a comminution process that occurs in a mill 10. The system 1130B may include some, or all, of the features discussed in connection with FIG. 39. Thus, the system 1130B may include some, or all, of the features of system 1130 of FIG. 39.

The system 1130B includes a Correlation Module 150C, as shown in FIG. 39, and system 1130B may also include a Monitoring Module 150A.

The Correlation Module 150C may operate to generate the correlation data set 1170 during operation of the mill 10, as described above, and/or Correlation Module 150C may operate to transform data relating to desired discharge material state $Y_{REF}$ into data indicative of a corresponding desired internal state $X_{REF}$, the transformation step being based on a correlation data set 1170 that is relevant for the mill 10 being operated.

The system 1130 shown in FIG. 39, includes an internal state control system 1200 comprising the internal state reference value generator 150$c$2 and the user interface 210, 210B and regulator 240C.

The system 1130B may be configured to perform the following steps:

(Step S3000:) cause the user interface 210 to convey information requesting the operator to provide user input indicative of a desired discharge material state $Y_{REF}$. The user input indicative of a desired discharge material state $Y_{REF}$ may be indicative of at least one desired output material measurement value, such as Y1 and/or Y2, as discussed above. For example, the user input may be indicative of a desired product particle median size $Y2_{REF}$, and/or desired product particle size distribution $Y3_{REF}$, $Y4_{REF}$, or a desired amount of output material per time unit $Y1_{REF}$.

This request, S3000, may be generated by software included in the regulator 150B, or by software included in the Correlation Module 150C, or by internal state control system 1200.

The system 1130B may also be configured to:

(Step S3005:) receive, e.g. via user interface 210, data indicative of a desired discharge material state $Y_{REF}$ and/or desired product particle median size $Y2_{REF}$ and/or desired product particle size distribution Y2, Y3, Y4.

Moreover, the system 1130B may be configured to perform a method comprising the following steps:

S3010: generate a corresponding desired internal state $X_{REF}$, also referred to as internal state reference vector $X_{REF}$) which may include a toe position reference value ($X1_{REF}$; $FI_{REF}$). The internal state reference vector $X_{REF}$ may be based on said data indicative of said desired discharge material state $Y_{REF}$ and/or said desired product particle median size ($Y2_{REF}$) and/or desired product particle size distribution $Y2_{REF}$, $Y3_{REF}$, $Y4_{REF}$, and a correlation data set (1170); said correlation data set (1170) being indicative of a causal relationship between a certain internal state $X_{REF}$ and a corresponding certain discharge material state $Y_{REF}$.

The corresponding certain discharge material state $Y_{REF}$ may include a certain product particle size distribution (Y2, Y3, Y4), and/or a certain product discharge rate $Y1_{REF}$.

The step S3005 may involve the delivery of the received data (i.e. indicative of a desired discharge material state $Y_{REF}$), from the user interface 210 to the Correlation Module 150C (See FIG. 40).

The Correlation Module 150C may include an internal state reference value generator 150*c*2 configured to transform data relating to desired discharge material state $Y_{REF}$ into data indicative of a corresponding desired internal state $X_{REF}$ and/or data indicative of a corresponding desired toe position reference value $X1_{REF}$ (r), $FI_{REF}$ (r), as discussed above.

Moreover, the system 1130B may be configured to perform a method comprising the following steps:

controlling via a regulator 755C, 755 said discharge material state (Y) based on said at least one status parameter reference value ($X1_{REF}$; $FI_{REF}$) included in an internal state reference vector $X_{REF}$, at least one status parameter value (X1, X2, X3, X4, X5, X6, X7) or an internal state vector (X) including said at least one status parameter value indicative of a current internal state (X) of the comminution process, and at least one status parameter error value ($X1_{ERR}$, $X2_{ERR}$, $X3_{ERR}$, $X4_{ERR}$, $X5_{ERR}$, $X6_{ERR}$, $X7_{ERR}$) or an internal state error vector X ERR including said at least one status parameter error value, wherein said at least one status parameter error value ($X1_{ERR}$, $X2_{ERR}$, $X3_{ERR}$, $X4_{ERR}$, $X5_{ERR}$, $X6_{ERR}$, $X7_{ERR}$) depends on said at least one status parameter reference value ($X1_{REF}$; $FI_{REF}$), and said at least one status parameter value (X1, X2, X3, X4, X5, X6, X7).

Moreover, the system 1130B may be configured to perform a method comprising the following steps:

controlling via a regulator 755C, 755 said discharge material state (Y) based on an internal state reference vector $X_{REF}$ indicative of a current internal state (X) of the comminution process, and an internal state vector (X) indicative of a current internal state (X) of the comminution process, and an internal state error vector $X_{ERR}$ including at least one status parameter error value, wherein said internal state error vector $X_{ERR}$ depends on said internal state reference vector $X_{REF}$, and said internal state vector (X).

Moreover, the system 1130B may be configured to perform a method comprising the following steps:

receiving, via a user interface (210, 210S, 240, 250), a first user input relating to said solid material feed rate (U2, $R_S$); and generating said solid material feed rate set point value ($U2_{SP}$, $R_{SSP}$); wherein said generated data indicative of solid material feed rate set point value ($U2_{SP}$, $R_{SSP}$) is based on said received first user input.

Various examples are disclosed below, starting with example 1.

An example 1 relates to a system 5 for grinding material, the system comprising:

a tumbling mill having a shell that rotates around an axis ( ) at a speed of rotation ($f_{ROT}$) for grinding material by tumbling a charge of the material in the rotating shell; wherein said shell has an internal shell surface, said internal shell surface including at least one protrusion configured to engage material within the shell;

a vibration sensor configured to generate an analogue measurement signal ($S_{EA}$) dependent on mechanical vibrations ($V_{IMP}$) emanating from rotation of said shell;

a position sensor configured to generate a position signal indicative of a rotational position of said rotating shell;

a signal recorder adapted to record a time sequence of measurement sample values (Se(i), S(j)) of said digital measurement data signal ($S_{MD}$, $S_{ENV}$, $S_{MD}$), and a time sequence of said position signal values (P(i)), and time information (i, dt; j)

such that an individual measurement data value (S(j)) is associated with data indicative of time of occurrence of the individual measurement data value (S(j)), and such that an individual position signal value (P(i)) is associated with data indicative of time of occurrence of the individual position signal value (P(i));

a signal processor adapted to detect the occurrence of an amplitude peak value in said recorded time sequence of measurement sample values (Se(i), S(j));

said signal processor being adapted to generate data indicative of a temporal duration between said position signal value occurrence and said amplitude peak value occurrence.

2. The system of example 1, wherein said signal processor is configured to generate a shell charge data set, said shell charge data set being indicative of an internal charge state in said shell; said shell charge data set comprising said amplitude peak value and said temporal duration.

3. The system according any preceding example, wherein said shell charge data set being indicative of a speed of rotation of said rotating mill shell.

4. The system according any preceding example, wherein the rotating shell is configured to hold a charge of material exceeding 500 kg during operation of the tumbling mill.

An example 5 relates to an electronic tumbling mill monitoring system for generating and displaying information relating to an internal state of a grinding process in a tumbling mill (10) having a shell that rotates around an axis (60) at a speed of rotation ($f_{ROT}$) for grinding charge material (30) by tumbling the charge material in the rotating shell, the tumbling mill monitoring system comprising:

a status parameter extractor (450) for generating a a first internal status indicator data structure (550, $S_{P1}$, $T_{D1}$), indicative of said internal state of said grinding process, said first internal status indicator data structure (550, $S_{P1}$, $T_{D1}$) including a first impact force indicator value ($S_{P1}$) and a first temporal indicator value ($T_{D1}$);

said first impact force indicator value ($S_{P1}$) being indicative of an impact force ($F_{IMP}$) generated when a projection on an internal shell surface of the rotating shell interacts with a toe portion of the charge material, and said first temporal indicator value ($T_{D1}$) being indicative of a temporal duration ($T_{D1}$) between occurrence of said impact force ($F_{IMP}$) and occurrence of a rotational reference position of said rotating shell.

6. The tumbling mill monitoring system according to example 5, wherein said status parameter extractor (450) further generates a second internal status indicator data structure ($S_{P2}$, $T_{D2}$), indicative of said internal state of said grinding process, said second internal status indicator data structure (550, $S_{P1}$, $T_{D1}$) including a second impact force indicator value ($S_{P2}$) and a second temporal indicator value ($T_{D2}$)

said second impact force indicator value ($S_{P2}$) being indicative of an impact force ($F_{IMP}$) generated when a projection on an internal shell surface of the rotating shell interacts with a toe portion of the charge material, and said second temporal indicator value ($T_{D2}$) being indicative of a temporal duration ($T_{D1}$) between occurrence of said impact force ($F_{IMP}$) and occurrence of a rotational reference position of said rotating shell; wherein said first internal status indicator data structure ($S_{P1}$, $T_{D1}$) is indicative of said internal state of said grinding process at a first point in time, and said second internal status indicator data structure ($S_{P2}$, $T_{D2}$) is indicative of said internal state of said grinding process at a second point in time.

7. The tumbling mill monitoring system according to example 6, wherein said first internal status indicator data structure ($S_{P1}$, $T_{D1}$) in conjunction with said internal status indicator data structure ($S_{P2}$, $T_{D2}$) is indicative of a temporal progression of said internal state of said grinding process.

8. The tumbling mill monitoring system according to any preceding example, wherein said status parameter extractor (450) includes a shell speed detector (500) configured to generate a value indicative of a tumbling mill shell speed of rotation ($f_{ROT}$(j)) based on a digital position signal (P(i)), said shell speed detector (500) being configured to associate said value indicative of a tumbling mill shell speed of rotation ($f_{ROT}$(i)) with a point of time (i).

9. The tumbling mill monitoring system according to any preceding example, wherein said shell speed detector (500) is configured to associate said first impact force indicator value ($S_{P1}$; (S(i)) with said value indicative of a tumbling mill shell speed of rotation ($f_{ROT}$(j)).

10. The tumbling mill monitoring system according to any preceding example, wherein said status parameter extractor (450) is configured to maintain a synchronized temporal relation between said first impact force indicator value ($S_{P1}$; (S(i); S(j)) and said value indicative of a tumbling mill shell speed of rotation ($f_{ROT}$(i); $f_{ROT}$(j)).

Example 11: In an electronic tumbling mill monitoring system for generating and displaying information relating to a grinding process in a tumbling mill having a shell that rotates around an axis (60) at a speed of rotation ($f_{ROT}$) for grinding charge material (30) by tumbling the charge material in the rotating shell; wherein said shell has an internal shell surface, said internal shell surface including at least one projection configured to engage material as the shell rotates about the axis (60), a computer implemented method of representing an internal state of said grinding process in said tumbling mill on a screen display, the method comprising:

displaying on said screen display a polar coordinate system, said polar coordinate system having a reference point (O), and a reference direction (0,360); and a first internal status indicator object ($S_{P1}$, $T_{D1}$), indicative of said internal state of said grinding process, at a first radius ($S_{P1}$) from said reference point (O) and at a first polar angle ($T_{D1}$) in relation to said reference direction (0,360), said first radius ($S_{P1}$) being indicative of an impact force ($F_{IMP}$) generated when a projection on an internal shell surface of the rotating shell interacts with the charge material, and said first polar angle ($T_{D1}$) being indicative of a temporal duration ($T_{D1}$) between occurrence of said impact force ($F_{IMP}$) and occurrence of a rotational reference position of said rotating shell.

12. The method according to example 11, wherein the method further comprises displaying on said screen display a second internal indicator object ($S_{P2}$, $T_{D2}$) at a second radius ($S_{P2}$) from said reference point (O) and at a second polar angle ($T_{D1}$) in relation to said reference direction (0,360), said second radius ($S_{P2}$) being indicative of an impact force ($S_P$; $F_{IMP}$) generated when a projection on an internal shell surface of the rotating shell interacts with the charge material, and said second polar angle ($T_{D1}$) being indicative of a temporal duration ($T_{D1}$) between occurrence of said impact force ($F_{IMP}$) and occurrence of a rotational reference position of said rotating shell; wherein said first internal indicator object ($S_{P1}$, $T_{D1}$) is indicative of said internal state of said grinding process at a first point in time, and said second internal indicator object ($S_{P1}$, $T_{D1}$) is indicative of said internal state of said grinding process at a second point in time.

13. The method according to example 12, wherein a simultaneous displaying on said screen display of said first internal state point ($S_{P1}$, $T_{D1}$) and said second internal state point ($S_{P1}$, $T_{D1}$) is indicative of a temporal progression of said internal state of said grinding process.

An example 14 relates to an electronic tumbling mill monitoring system for generating and displaying information relating to an internal state of a grinding process in a tumbling mill (10) having a shell that rotates around an axis (60) at a speed of rotation ($f_{ROT}$) for grinding charge material (30) by tumbling the charge material in the rotating shell, the tumbling mill monitoring system comprising:

a status parameter extractor (450) for generating a first internal status indicator data structure (550, $S_{P1}$, $T_{D1}$), indicative of said internal state of said grinding process, said first internal status indicator data structure (550, $S_{P1}$, $T_{D1}$) including a first impact force indicator value ($S_{P1}$) and a first temporal indicator value (P; $T_{D1}$);

said first impact force indicator value ($S_{P1}$) being indicative of an impact force ($F_{IMP}$) generated when a projection on an internal shell surface of the rotating shell interacts with a toe portion of the charge material, and said first temporal indicator value ($T_{D1}$) being indicative of a temporal duration ($T_{D1}$) between occurrence of said impact force ($F_{IMP}$) and occurrence of a rotational reference position of said rotating shell; wherein said status parameter extractor (450) includes a shell speed detector (500) configured to generate a value indicative of a tumbling mill shell speed of rotation ($f_{ROT}$(j)) based on a digital position signal (P(i)), said shell speed detector (500) being configured to associate said value indicative of a tumbling mill shell speed of rotation ($f_{ROT}$(i)) with a point of time (i).

15. The tumbling mill monitoring system according to any preceding example, wherein said shell speed detector (500) is configured to associate said first impact force indicator value ($S_{P1}$; S(j)) with said value indicative of the tumbling mill shell speed of rotation ($f_{ROT}$(j)) so that said speed of rotation ($f_{ROT}$(j)) value indicates said tumbling mill shell speed of rotation ($f_{ROT}$(j)) at the point of time (j) of occurrence of said impact force ($F_{IMP}$).

16. The tumbling mill monitoring system according to any preceding example, wherein said status parameter extractor (450) is configured to generate a temporal progression of vibration signal values (S(i)) and a temporal progression of rotational reference position signals;

said status parameter extractor (450) further comprising a speed variation compensatory decimator (470); the decimator (470) being configured to decimate the temporal progression of vibration signal values (S(i); $S_{MD}$) based on the speed value ($f_{ROT}$(j) so as to generate a decimated vibration signal ($S_{MDR}$) comprising a decimated temporal progression of vibration signal values (R(q); $S_P$(r)).

17. The tumbling mill monitoring system according to any preceding example, wherein said status parameter extractor (450) further comprises a fast Fourier transformer (510) configured to generate said first impact force indicator value ($S_{P1}$) and said first temporal indicator value ($T_{D1}$) based on said decimated vibration signal ($S_{MDR}$).

18. The system according to any preceding example, wherein said material includes pieces of said material, said material pieces comprising a mineral.

19. The system according to any preceding example, wherein said tumbling mill (10) operates to perform dry grinding.

20. The system according to any preceding example, wherein said tumbling mill (10) operates to perform dry grinding of particles of a hard substance into a powder including cement.

An example 21 relates to a method for generating information relating to an internal state of a tumbling mill (10) having a shell (20) that rotates around an axis (60) at a speed of rotation ($f_{ROT}$) for grinding a charge of material (30) by tumbling the material in the rotating shell; said shell (20) having an internal shell surface (22) including a first number (L) of protrusions (310) configured to engage material as the shell (20) rotates about the axis (60), the method comprising generating a position signal (E, P, P(i), P(j), P(q)) indicative of a rotational position of said rotating shell (20), said position signal including a time sequence of position signal sample values (P(i), P(j), P(q));

detecting a first occurrence of a first reference position signal value (1; 1C, 0%) in said time sequence of position signal sample values (P(i), P(j), P(q));

detecting a second occurrence of a second reference position signal value (1; 1C; 100%) in said time sequence of position signal sample values (P(i), P(j), P(q));

generating a vibration signal ($S_{EA}$, Se(i), S(j), S(q)) dependent on mechanical vibrations ($V_{IMP}$) emanating from rotation of said shell, said vibration signal ($S_{EA}$, Se(i), S(j), S(q)) including a time sequence of vibration sample values (Se(i), S(j), S(q));

detecting a third occurrence of an event signature ($S_P$(r); $S_P$) in said time sequence of vibration sample values (Se(i), S(j), S(q));

generating data indicative of a first temporal relation ($R_T$(r); $T_D$; FI(r)) between said third occurrence i.e. said event signature occurrence, and said first and second occurrences.

22. The method according to any preceding example, wherein:

said first temporal relation ($R_T$(r); $T_D$; FI(r)) is indicative of a proportion of a distance between two adjacent of said protrusions (310).

23. The method according to any preceding example, wherein:

Said first temporal relation ($R_T(r)$; $T_D$; FI(r)) is indicative of a relative toe position (205).

24. The method according to any preceding example, wherein:

said event signature is indicative of an impact force ($F_{IMP}$) generated when a projection (310) on an internal shell surface (22) of the rotating shell (20) interacts with a toe portion (205) of the charge material (30).

25. The method according to any preceding example, further comprising:

generating said first temporal relation ($R_T(r)$; $T_D$; FI(r)) as a phase angle (FI(r)).

26. The method according to any preceding example, further comprising:

generating said event signature as an amplitude value ($S_P(r)$; $S_p$; $C_L(r)$; $C_1(r)$).

27. The method according to any preceding example, wherein:

Said first temporal relation ($R_T(r)$; $T_D$; FI(r)) is generated by a Fourier Transformation.

28. The method according to any preceding example, further comprising:

Counting a total number of samples ($N_B$) from the first occurrence to the second occurrence, and Counting another number of samples ($N_P$) from the first occurrence to the third occurrence, and generating said first temporal relation ($R_T(r)$; $T_D$; FI(r)) based on said another number and said total number.

29. The method according to any preceding example, further comprising:

Counting a total number of samples ($N_B$) from the first occurrence to the second occurrence, and Counting another number of samples ($N_P$) from the first occurrence to the third occurrence, and generating said first temporal relation ($R_T(r)$; $T_D$; FI(r)) based on a relation between said another number and said total number.

30. The method according to example 29, wherein:

Said relation between said another number and said total number is indicative of a relative toe position (205).

31. The method according to example 29 or 30, wherein:

Said relation between said another number and said total number is indicative of a position of a toe (205) of said charge (30) expressed as a portion of a distance between two of said protrusions (310), said two protrusions (310A, 310B) being mutually adjacent on said internal shell surface (22).

32. The method according to any preceding example, further comprising:

generating said reference position signal value (1; 1C, 0%) at least one time per revolution of said rotating shell (20).

33. The method according to example 32, further comprising:

generating said reference position signal value (1; 1C, 0%) a second number of times per revolution of said rotating shell (20); said second number being equal to said first number (L).

34. The method according to example 32, further comprising:

generating said reference position signal value (1; 1C, 0%) a second number of times per revolution of said rotating shell (20); said second number being lower than said first number (L).

35. The method according to any preceding example, further comprising:

generating said reference position signal value (PS; 1; 1C, 0%) based on detection of a rotating position marker (180), wherein the rotation of said rotating position marker (180) is indicative of the rotation of said rotating shell (20).

36. The method according to example 32, wherein said reference position signal value (1; 1C, 0%) being generated at least one time per revolution of said rotating shell (20) is based on detection of a rotating position marker (180), wherein the rotation of said rotating position marker (180) is indicative of the rotation of said rotating shell (20).

37. The method according to example 36, wherein at least one of said first reference position signal value (1; 1C, 0%) and said second reference position signal value (1; 1C; 100%) is generated by calculation based on said first number (L).

38. The method according to example 36, wherein at least one of said first reference position signal value (1; 1C, 0%) and said second reference position signal value (1; 1C; 100%) is generated at an angular position; wherein a full revolution of said shell is virtually or mathematically divided into a third number of mutually equal parts.

39. The method according to example 38, wherein

Said third number is equal to said first number; and wherein said mutually equal parts correspond to a first number of equal distances between said protrusions (310).

40. The method according to any preceding example, wherein:

Said protrusions are mutually substantially equidistant.

41. The method according to any preceding example, further comprising:

recording said time sequence of vibration sample values (Se(i), S(j), S(q));

detecting the occurrence of said event signature in said recorded time sequence of vibration sample values (Se(i), S(j), S(q)).

42. The method according to any preceding example, wherein:

Said event signature is an amplitude peak value.

43. The method according to any preceding example, further comprising:

associating an individual vibration sample value (Se(i), S(j), S(q)) with an individual position signal sample value (P(i), P(j), P(q)).

44. The method according to any preceding example, further comprising:

generating data indicative of a momentary rotational speed value based on a second temporal relation ($R_T(r)$; $T_D$; FI(r)) between said first occurrence of said first reference position signal value (1; 1C, 0%) and said second occurrence of said second reference position signal value (1; 1C; 100%);

said momentary rotational speed value ($f_{ROT}$) being indicative of said speed of rotation ($f_{ROT}$).

45. The method according to any preceding example, further comprising:

recording, in a memory, said time sequence of position signal sample values (P(i), P(j), P(q)); and recording, in said memory, said time sequence of vibration sample values (Se(i), S(j), S(q)); wherein said step of detecting the occurrence of a reference position signal value (1; 1C) involves detecting the occurrence of said reference position signal value (1; 1C) in said recorded time sequence of position signal sample values (P(i), P(j), P(q)).

46. The method according to any preceding example, wherein:

Said first temporal relation ($R_T$(r); $T_D$; FI(r)) is indicative of a first internal state of said tumbling mill.

47. The method according to any preceding example, wherein:

Said first temporal relation ($R_T$(r); $T_D$; FI(r)) is indicative of a first internal state of said tumbling mill.

48. The method according to any preceding example, further comprising:

Generating data indicative of an absolute toe position value based on said relative toe position value.

49. The method according to any preceding example, wherein:

said event signature is a peak amplitude value.

50. The method according to any preceding example, wherein:

Said speed of rotation ($f_{ROT}$) is a variable speed of rotation ($f_{ROT}$).

An example 51 relates to a system for grinding material, the system comprising:

a tumbling mill having a shell that rotates around an axis (60) at a speed of rotation ($f_{ROT}$) for grinding material by tumbling a charge of the material in the rotating shell; wherein said shell has an internal shell surface, said internal shell surface including a first number of protrusions configured to engage material within the shell, said protrusions being arranged at equal mutual distances on said internal shell surface; said first number being at least two;

a vibration sensor configured to generate an analogue measurement signal ($S_{EA}$) dependent on mechanical vibrations ($V_{IMP}$) emanating from rotation of said shell;

a position sensor configured to generate a position signal indicative of a rotational position of said rotating shell;

a signal recorder adapted to record a time sequence of measurement sample values (Se(i), S(j)) of said digital measurement data signal ($S_{MD}$, $S_{ENV}$, $S_{MD}$), and a time sequence of said position signal values (P(i)), and time information (i, dt; j)

such that an individual measurement data value (S(j)) is associated with data indicative of time of occurrence of the individual measurement data value (S(j)), and such that an individual position signal value (P(i)) is associated with data indicative of time of occurrence of the individual position signal value (P(i));

a signal processor adapted to detect the occurrence of an amplitude peak value in said recorded time sequence of measurement sample values (Se(i), S(j));

said signal processor being adapted to generate a second number of reference position signals per revolution of said shell, said second number of reference position signals being generated at equal angular distances based on said position signal; said second number being equal to said first number; and data indicative of a temporal duration between said reference position signal value occurrence and said amplitude peak value occurrence.

An example 52 relates to a system for controlling an internal state of in a tumbling mill (10) having a shell (20) that rotates around an axis (60) at a speed of rotation ($f_{ROT}$) for grinding a charge of material (30) by tumbling the material in the rotating shell; said shell (20) having an internal shell surface (22) including a first number (L) of protrusions (310) configured to engage material as the shell (20) rotates about the axis (60), the system comprising a device (170, 180) for generating a position signal ($E_P$, P(i), P(j), P(q)) indicative of a rotational position of said rotating shell (20), said position signal including a time sequence of position signal sample values (P(i), P(j), P(q));

a sensor (70, 70$_{IN}$, 70$_{OUT}$, 330) configured to generate a vibration signal ($S_{EA}$, $S_{MD}$, Se(i), S(j), S(q)) dependent on mechanical vibrations ($V_{IMP}$) emanating from rotation of said shell, said vibration signal ($S_{EA}$, Se(i), S(j), S(q)) including a time sequence of vibration sample values (Se(i), S(j), S(q));

a status parameter extractor (450) configured to detect a first occurrence of a first reference position signal value (1; 1C, 0%) in said time sequence of position signal sample values (P(i), P(j), P(q));

said status parameter extractor (450) being configured to detect a second occurrence of a second reference position signal value (1; 1C; 100%) in said time sequence of position signal sample values (P(i), P(j), P(q));

said status parameter extractor (450) being configured to detect a third occurrence of an event signature ($S_P$(r); $S_P$) in said time sequence of vibration sample values (Se(i), S(j), S(q));

said status parameter extractor (450) being configured to generate data indicative of a first temporal relation ($R_T$(r); $T_D$; FI(r)) between said third occurrence i.e. said event signature occurrence, and said first and second occurrences; and a regulator for controlling an angular toe position (FI(r), $A_{TOE}$) based on a toe position reference value ($FI_{REF}$(r)), said first temporal relation ($R_T$(r); $T_D$; FI(r)), and a toe position error value ($FI_{ERR}$(r)), wherein said toe position error value ($FI_{ERR}$(r)) depends on said toe position reference value ($FI_{REF}$(r)), and said first temporal relation ($R_T$(r); $T_D$; FI(r)).

53. The system according to example 52, wherein said toe position error value ($FI_{ERR}$(r)) depends on a difference between said toe position reference value ($FI_{REF}$(r)), and said first temporal relation ($R_T$(r); $T_D$; FI(r)).

54. The system according to example 52 or 53, wherein

Said regulator is configured to control a solid material feed rate set point ($R_SS_P$) in dependence on said toe position reference value ($FI_{REF}$(r)), and wherein a solid material feed rate ($R_S$) depends on said solid material feed rate set point ($R_SS_P$), said solid material feed rate ($R_S$) being an amount of solid material per time unit that is being fed into an input (100) of said tumbling mill (10).

55. The system according to example 52, 53, or 54, wherein

Said regulator is configured to control a liquid feed rate set point ($R_LS_P$) in dependence on said toe position reference value ($FI_{REF}$(r)), and wherein a liquid feed rate ($R_L$) depends on said liquid feed rate set point ($R_L S_P$), said liquid feed rate ($R_L$) being an amount of liquid per time unit that is being fed into an input (130) of said tumbling mill (10).

56. The system according to according to any preceding example, wherein said first temporal relation ($R_T(r)$; $T_D$; FI(r)) is indicative of a proportion of a distance between two adjacent of said protrusions (310).

57. The system according to according to any preceding example, wherein

Said first temporal relation ($R_T(r)$; $T_D$; FI(r)) is indicative of a toe position (205, $A_{TOE}(r)$).

58. The system according to according to any preceding example, wherein said event signature is indicative of an impact force ($F_{IMP}$) generated when a projection (310) on an internal shell surface (22) of the rotating shell (20) interacts with a toe portion (205) of the charge material (30).

59. The system according to according to any preceding example, wherein said status parameter extractor (450) is configured to generate said first temporal relation ($R_T(r)$; $T_D$; FI(r)) as a phase angle (FI(r)).

60. The system according to according to any preceding example, wherein said status parameter extractor (450) is configured to generate said event signature as an amplitude value ($S_P(r)$; Sp; $C_L(r)$; $C_1(r)$).

61. The system according to according to any preceding example, wherein said status parameter extractor (450) comprises a Fourier Transformer configured to generate said first temporal relation ($R_T(r)$; $T_D$; FI(r))

62. The system according to according to any preceding example, wherein said status parameter extractor (450) is configured to count a total number of samples ($N_B$) from the first occurrence to the second occurrence, and said status parameter extractor (450) is configured to count another number of samples ($N_P$) from the first occurrence to the third occurrence, and said status parameter extractor (450) is configured to generate said first temporal relation ($R_T(r)$; $T_D$; FI(r)) based on said another number and said total number.

63. The system according to according to any preceding example, wherein said status parameter extractor (450) is configured to count a total number of samples ($N_B$) from the first occurrence to the second occurrence, and said status parameter extractor (450) is configured to count another number of samples ($N_P$) from the first occurrence to the third occurrence, and said status parameter extractor (450) is configured to generate said first temporal relation ($R_T(r)$; $T_D$; FI(r)) based on a relation between said another number and said total number, wherein:

said relation between said another number and said total number is indicative of a toe position (205).

An example 64 relates to a method for determining and visualizing an internal state of in a tumbling mill (10) having a rotatable shell (20) for rotating around an axis (60) at a speed of rotation ($f_{ROT}$) for grinding charge material (30) by tumbling the charge material in the rotatable shell (20); wherein the rotatable shell (20) has an internal shell surface (22), the internal shell surface including a certain number (L) of internal projections (310) for engaging material (30) when the shell rotates, thereby causing a mechanical vibration ($V_{IMP}$) having a repetition frequency ($f_R$) dependent on the rotational speed ($f_{ROT}$) of the rotatable shell (20), the method comprises receiving a measurement signal ($E_P$, P(i), P(j), P(q)) indicative of a rotational position of said rotating shell; and receiving a signal ($S_{FIMP}$; $S_{EA}$, $S_{MD}$, Se(i), S(j), S(q)) indicative of said vibration ($V_{IMP}$);

determining a value ($R_T(r)$; $T_D$; FI(r)) indicative of a position of a toe (205) of a charge of said material (30) based on said vibration signal and said position signal, 65. The method according to example 64, wherein receiving a signal ($E_P$, P(i), P(j), P(q)) indicative of a rotational position of said rotating shell comprises measuring rotation at said rotatable shell (20) utilizing at least one sensor 170.

66. The method according to example 64 or 65, wherein receiving a signal ($S_{FIMP}$; $S_{EA}$, $S_{MD}$, Se(i), S(j), S(q)) indicative of said vibration ($V_{IMP}$) comprises measuring vibrations at said rotatable shell (20) utilizing at least one sensor 70.

67. The method according to any preceding example, further comprising controlling said tumbling mill (10) based on said value ($R_T(r)$; $T_D$; FI(r)) indicative of a position of a toe (205) of a charge of said material (30).

68. The method according to any preceding example, further comprising providing a visual representation of said value ($R_T(r)$; $T_D$; FI(r)) indicative of a position of a toe (205) of a charge of said material (30).

69. The method according to example 68, wherein providing a visual representation comprises providing a polar diagram representing a time-series of values ($R_T(r)$; $T_D$; FI(r)) indicative of a position of a toe (205) of a charge of said material (30).

70. An example computer program for performing the method according to any preceding example, the computer program comprising computer program code means adapted to perform the steps of the method according to any preceding example when said computer program is run on a computer.

71. The computer program according to any preceding example, the computer program being embodied on a computer readable medium.

An example 72 relates to a system for monitoring an internal state of a tumbling mill (10) having a rotatable shell (20) including an internal shell surface (22) having a number (L) of protrusions (310) for engaging material when the shell rotates, thereby causing a vibration ($V_{IMP}$) having a repetition frequency ($f_R$) dependent on a speed of rotation ($f_{ROT}$) of said shell (20);

said system (150) comprising:

a monitoring unit (150A) for receiving a signal ($E_P$, P(i), P(j), P(q)) indicative of a rotational position of said rotating shell, and a signal ($S_{FIMP}$; $S_{EA}$, $S_{MD}$, Se(i), S(j), S(q)) indicative of said vibration ($V_{IMP}$), said monitoring unit being configured to extract, from said vibration signal and said position signal, a value ($R_T(r)$; $T_D$; FI(r)) indicative of a position of a toe (205) of a charge of said material (30).

73. The system according to example 72, wherein said monitoring unit is arranged to receive a signal ($E_P$, P(i), P(j), P(q)) comprising a time sequence of vibration sample values (Se(i), S(j), S(q)) indicative of vibration indicative of a rotational position of said rotating shell; and a signal ($S_{FIMP}$; $S_{EA}$, $S_{MD}$, Se(i), S(j), S(q)) comprising a time sequence of vibration sample values (Se(i), S(j), S(q)) indicative of vibration; and wherein said monitoring unit is arranged to detect a first occurrence of a first reference position signal value in said time sequence of position signal sample values (P(i), P(j), P(q)), a second occurrence of a second reference position signal value in said time sequence of position signal sample values (P(i), P(j), P(q)), and an occurrence of an event signature ($S_P$(r); $S_P$) in said time sequence of vibration sample values (Se(i), S(j), S(q)).

74. The system according to example 73, wherein said monitoring unit is arranged to determine said value ($R_T$(r); $T_D$; FI(r)) indicative of the position of the toe (205) of the charge of said material (30) based on a temporal relationship between said detected first and second occurrence of said first reference position signal value, and said occurrence of an event signature.

75. The system according to example 73 or 74, wherein said monitoring unit is arranged to determine a first duration between said first and second occurrence of said first reference position signal value, a second between occurrence of said event signature and said first and/or second occurrence of said first reference position signal value, and wherein said monitoring unit is arranged to generate data indicative of a first temporal relation ($R_T$(r); $T_D$; FI(r)) between said first duration and second duration.

76. The system according to example 75, wherein said monitoring unit is arranged to determine an internal state of said tumbling mill (10) based on an operating point reference value ($FI_{REF}$(r)), said first temporal relation ($R_T$(r); $T_D$; FI(r)), and a operating point error value ($FI_{ERR}$(r)), wherein said operating point error value ($FI_{ERR}$(r)) depends on said operating point reference value ($FI_{REF}$(r)), and said first temporal relation ($R_T$(r); $T_D$; FI(r)).

77. The system according to any of examples 72 to 76, comprising a measuring unit comprising at least one sensor (70,170) arranged at the tumbling mill (10), and arranged to provide said signal ($E_P$, P(i), P(j), P(q)) indicative of a rotational position of said rotating shell, and provide said signal ($S_{FIMP}$; $S_{EA}$, $S_{MD}$, Se(i), S(j), S(q)) indicative of said vibration ($V_{IMP}$).

78. The system according to example 77, wherein said measuring unit comprises at least one vibration sensor, wherein said vibration sensor is arranged at said rotatable shell (20) generating a vibration signal ($S_{FIMP}$; $S_{EA}$, $S_{MD}$, Se(i), S(j), S(q)); said vibration sensor being configured to generate said vibration signal based on vibration exhibited by said rotatable shell (20).

79. The system according to example 77 or 78, wherein said measuring unit comprises at least one position sensor is configured to generate a position signal indicative of a predetermined rotational position of said rotatable shell (20).

80. The system according to example 79, wherein at least one position marker (180) is provided at said rotatable shell (20), wherein said at least one position sensor is arranged to detect the at least one position marker (180), and wherein said position signal comprises a time sequence of position signal values (P(i), P(j), P(q)).

81. The system according to example 77 or 78, comprising a control unit (150B) comprising a regulator arranged to control an angular toe position (FI(r), $A_{TOE}$) based on said extracted value ($R_T$(r); $T_D$; FI(r)) indicative of a position of the toe (205) of the charge of said material (30).

82. The system according to any of example 77 or 78, wherein the said measuring unit, said monitoring unit and/or said control unit are arranged at different locations and arranged to communicate via a communications network.

83. The system according to example 82, wherein said monitoring unit and/or said control unit are arranged at a location geographically distant from said tumbling mill (10).

84. The system according to any preceding example, wherein said monitoring unit and said measuring unit are arranged at the tumbling mill (10).

85. The system according to any preceding example, wherein said measuring unit comprises a first sensor for generating a first vibration signal ($S_{FIMP}$; $S_{EA}$, $S_{MD}$, Se(i), S(j), S(q)); said first sensor being configured to generate said first vibration signal based on vibration exhibited at a first part of said rotatable shell (20); and a second sensor for generating a second vibration signal ($S_{FIMP}$; $S_{EA}$, $S_{MD}$, Se(i), S(j), S(q));

said second sensor being configured to generate said second vibration signal based on vibration exhibited at a second part of said rotatable shell (20);

wherein said monitoring unit is arranged to detect a fourth occurrence of an event signature ($S_P$(r); $S_P$) in a time sequence of first vibration signal sample values (Se(i), S(j), S(q));

said monitoring unit being configured to detect a fifth occurrence of said event signature ($S_P$(r); $S_P$) in a time sequence of second vibration signal sample values (Se(i), S(j), S(q));

said monitoring unit being configured to generate data indicative of an order of occurrence between said fourth occurrence and said fifth occurrence; and, determining said value ($R_T$(r); $T_D$; FI(r)) indicative of a position of the toe (205) of the charge of said material (30) based on said order of occurrence.

An example 86 relates to computer implemented method of representing an internal state of a grinding process in a tumbling mill (10) on a screen display (210S) of a digital tumbling mill monitoring system for generating and displaying information relating to a grinding process in a tumbling mill (10) having a rotatable shell (20) for rotating around an axis (60) at a speed of rotation ($f_{ROT}$) for grinding charge material (30) by tumbling the charge material in the rotatable shell (20); wherein the rotatable shell (20) has an internal shell surface (22), the internal shell surface including a certain number (L) of internal projections (310) for engaging material (30) when the shell rotates, thereby causing a mechanical vibration ($V_{IMP}$) having a repetition frequency (fR) dependent on the rotational speed ($f_{ROT}$) of the rotatable shell (20), the method comprising:

receiving a signal ($E_P$, P(i), P(j), P(q)) indicative of a rotational position of the rotating shell (20), generate a position reference value (1; 1C, 0%; 100%) based on said position signal ($E_P$, P(i), P(j), P(q)) such that said position reference value is provided a first number of times per revolution of the rotatable shell (20), said first number of position reference values being indicative of a first number of predetermined rotational positions of the rotatable shell (20), and receiving a vibration signal ($S_{FIMP}$; $S_{EA}$, $S_{MD}$, Se(i), S(j), S(q)) based on the mechanical vibrations ($V_{IMP}$) emanating from rotation of said shell (20);

detecting an occurrence of an event signature ($S_P$(r); $S_P$) in said vibration signal ($S_{FIMP}$; $S_{EA}$, $S_{MD}$, Se(i), S(j), S(q));

displaying on said screen display (210S)

a polar coordinate system, said polar coordinate system having a reference point (O), and a reference direction (0,360); and a first internal status indicator object ($S_{P1}$, $T_{D1}$), indicative of said internal state of said grinding process at a first polar angle ($T_{D1}$) in relation to said reference direction (0,360), said first polar angle ($T_{D1}$) being indicative of a temporal duration ($T_{D1}$) between occurrence of said event signature ($S_P$(r); $S_P$) and occurrence of a rotational reference position of said rotating shell; and/or said first polar angle ($T_{D1}$) being indicative of an angular position of the rotatable shell (20) at the occurrence of said event signature ($S_P$(r); $S_P$); and/or said first polar angle ($T_{D1}$) being indicative of an angular position of a charge material toe (205) at the occurrence of said event signature ($S_P$(r); $S_P$).

87. The method according to any preceding example, wherein said first number is at least two and/or said first number is equal to said certain number.

88. The method according to any preceding example, wherein said vibration signal includes a time sequence of vibration sample values (Se(i), S(j), S(q)); and wherein said detection includes detecting an occurrence of an event signature ($S_P$(r); Sp) in said time sequence of vibration sample values (Se(i), S(j), S(q)).

An example 89 relates to computer implemented method of representing an internal state of a grinding process in a tumbling mill (10) on a screen display (210S) of a digital tumbling mill monitoring system for generating and displaying information relating to a grinding process in a tumbling mill (10) having a rotatable shell (20) for rotating around an axis (60) at a speed of rotation ($f_{ROT}$) for grinding charge material (30) by tumbling the charge material in the rotatable shell (20); wherein the rotatable shell (20) has an internal shell surface (22), the internal shell surface including a certain number (L) of internal projections (310) for engaging material (30) when the shell rotates, thereby causing a mechanical vibration ($V_{IMP}$) having a repetition frequency ($f_R$) dependent on the rotational speed ($f_{ROT}$) of the rotatable shell (20), the method comprising:

receiving a signal ($E_P$, P(i), P(j), P(q)) indicative of a rotational position of the rotating shell (20), receiving a vibration signal ($S_{FIMP}$; $S_{EA}$, $S_{MD}$, Se(i), S(j), S(q)) dependent on mechanical vibrations ($V_{IMP}$) emanating from rotation of said shell;

detecting an occurrence of an event signature ($S_P$(r); $S_p$) in said vibration signal ($S_{FIMP}$; $S_{EA}$, $S_{MD}$, Se(i), S(j), S(q));

displaying on said screen display a polar coordinate system, said polar coordinate system having a reference point (O), and a reference direction (0,360); and a first internal status indicator object ($S_{P1}$, $T_{D1}$), indicative of said internal state of said grinding process at a first polar angle ($T_{D1}$) in relation to said reference direction (0,360), said first polar angle ($T_{D1}$) being indicative of a temporal duration ($T_{D1}$) between occurrence of said event signature ($S_P$(r); Sp) and occurrence of a rotational reference position of said rotating shell.

90. The method according to any preceding example, wherein said first internal status indicator object ($S_{P1}$, $T_{D1}$) is displayed, on said screen display, at a first radius ($S_{P1}$) from said reference point (O).

91. The method according to any preceding example, wherein said first internal status indicator object ($S_{P1}$, $T_{D1}$) is displayed, on said screen display, at a first radius ($S_{P1}$) from said reference point (O), and wherein said first radius ($S_{P1}$) is indicative of an impact force ($F_{IMP}$) generated when a projection on an internal shell surface of the rotating shell interacts with the charge material.

92. The method according to any preceding example, wherein said vibration signal includes a time sequence of vibration sample values (Se(i), S(j), S(q));

An example 93 relates to a system for monitoring an internal state of a tumbling mill including a rotatable shell configured with an internal shell surface having a certain number (L) of internal projections for engaging material when the shell rotates, thereby causing a vibration having a repetition frequency dependent on a speed of rotation of said shell, said system comprising:

a monitoring unit for receiving a position signal indicative of a predetermined rotational position of said rotating shell, said position signal including a time sequence of position signal values (P(i), P(j), P(q)); and a signal ($S_{EA}$, Se(i), S(j), S(q)) indicative of said vibration, said vibration signal ($S_{EA}$, Se(i), S(j), S(q)) including a time sequence of vibration sample values (Se(i), S(j), S(q)); wherein said monitoring unit is configured to generate a position reference value based on said position signal such that said position reference value is provided a first number of times per revolution of said shell, said first number of position reference values being indicative of a first number of predetermined rotational positions of said rotatable shell, said first number of predetermined rotational positions corresponding to positions of said internal projections on the internal shell surface of said rotatable shell; said first number being at least two and/or said first number being at most equal to said certain number; and wherein said monitoring unit is configured to extract, from said vibration signal, a signal signature that occurs when said internal projection engages with a toe portion of said material; said signal signature being extracted from said vibration signal said certain number of times (L) per revolution of said shell;

said monitoring unit being configured to measure a first duration from occurrence of a first position reference value to occurrence of a second position reference value;

measure a second duration between occurrence of said signal signature and said occurrence of said first position reference value, or between occurrence of said signal signature and said occurrence of said second position reference value; and generate a relation value based on said second duration and said first duration; said relation value being indicative of a momentary position of said toe portion (205) between two said predetermined rotational positions of said rotatable shell (20) during rotation of said shell.

94. The system according to any preceding example, wherein said monitoring unit is arranged to extract said signal signature from said vibration signal said certain number of times per revolution of said shell.

95. The system according to any preceding example, wherein said monitoring unit being configured to generate said temporal relation value at least once during one revolution of said shell, and/or generate said temporal relation value said certain number of times during one revolution of said shell, and/or generate said temporal relation value said certain number of times per revolution of said shell.

An example 96 relates to a system for monitoring an internal state of a tumbling mill (10) including a rotatable shell (20) configured with an internal shell surface having a certain number (L) of internal projections for engaging material when the shell rotates, thereby causing a vibration having a repetition frequency dependent on a speed of rotation of said shell, said system comprising:

a monitoring unit for receiving a position signal indicative of a predetermined rotational position of said rotating shell, said position signal including a time sequence of position signal values (P(i), P(j), P(q)); and a signal ($S_{EA}$, Se(i), S(j), S(q)) indicative of said vibration, said vibration signal ($S_{EA}$, Se(i), S(j), S(q)) including a time sequence of vibration sample values (Se(i), S(j), S(q)); wherein said monitoring unit is configured to generate a position reference value based on said position signal such that said position reference value is provided a first number of times per revolution of said shell, said first number of position reference values being indicative of a first number of predetermined rotational positions of said rotating shell, said first number being at least two; and wherein said monitoring unit is configured to extract, from said vibration signal, a signal signature that occurs when said internal projection engages with a toe portion of said material; said monitoring unit being configured to measure a first duration from occurrence of a first position reference value to occurrence of a second position reference value;

measure a second duration between occurrence of said signal signature and said occurrence of said first position reference value, or between occurrence of said signal signature and said occurrence of said second position reference value; and generate a relation value based on said second duration and said first duration; said relation value being indicative of a momentary position of said toe portion between two said predetermined rotational positions of said rotatable shell during rotation of said shell.

90. The system according to any preceding example, wherein said occurrence of said second position reference value being consecutive to said occurrence of said first position reference value.

An example 96 relates to a system for monitoring an internal state of a tumbling mill (10) including a rotatable shell (20) configured with an internal shell surface having a certain number (L) of internal projections for engaging material when the shell rotates, thereby causing a vibration having a repetition frequency dependent on a speed of rotation of said shell (20), said system comprising:

a monitoring unit for receiving a position signal indicative of a predetermined rotational position of said rotating shell, and a signal indicative of said vibration, wherein said monitoring unit is configured to provide a rotational position indicator signal based on said position signal such that said rotational position indicator signal is provided a first number of times per revolution of said shell; and wherein said monitoring unit is configured to extract, from said vibration signal, a signal signature that occurs when said internal projection engages with a toe portion of said material;

said monitoring unit being configured to measure a first duration from the provision of a first rotational position indicator signal to the provision of a second rotational position indicator signal;

measure a second duration between the occurrence of said signal signature and the occurrence of said first rotational position indicator signal, or between the occurrence of said signal signature and the occurrence of said second rotational position indicator signal; and generate a temporal relation value based on said second duration and said first duration; said temporal relation value being indicative of a momentary position of said toe portion between (in relation to) two consecutive predetermined rotational positions of said rotating shell;

said first number being at least two.

An example 97 relates to a system for monitoring an internal state of a tumbling mill (10) including a rotatable shell (20) configured with an internal shell surface having a certain number of internal projections for engaging material when the shell rotates, thereby causing a vibration having a repetition frequency dependent on a speed of rotation of said shell, said system comprising:

a monitoring unit for receiving a position signal indicative of a predetermined rotational position of said rotating shell, and a signal indicative of said vibration, wherein said monitoring unit is configured to detect a first occurrence of a first reference position signal value (1; 1C, 0%) in a time sequence of position signal sample values (P(i), P(j), P(q));

said monitoring unit is configured to provide a rotational position indicator signal based on said position signal such that said rotational position indicator signal is provided a first number of times per revolution of said shell; and wherein said monitoring unit is configured to extract, from said vibration signal, a signal signature that occurs when said internal projection engages with a toe portion of said material;

said monitoring unit being configured to measure a first duration from the provision of a first rotational position indicator signal to the provision of a second rotational position indicator signal;

measure a second duration from the provision of said first rotational position indicator signal to the occurrence of said signal signature; and generate a temporal relation value based on said first duration and said second duration; said temporal relation value being indicative of a position of said toe portion between two consecutive predetermined rotational positions of said rotating shell; said certain number being at least two.

98. The system of example 97, wherein said monitoring unit is configured to generate said temporal relation value at least twice per revolution of said rotating shell; Said certain number being at least two.

99. The system of example 97 or 98, wherein said monitoring unit being configured to generate a relation value based on said signal signature and two position signals, said relation value being generated at least twice per revolution of said rotating shell; Said certain number being at least two.

An example 100 relates to a tumbling mill arrangement (730; 780; 720) having a rotatable shell (20) including an internal shell surface (22) having a number (L) of protrusions (310) for engaging material (30) when the shell rotates, thereby causing a vibration ($V_{IMP}$) having a repetition frequency ($f_R$) dependent on a speed of rotation ($f_{ROT}$) of said shell (20);

the tumbling mill arrangement comprising a vibration sensor for generating a signal ($S_{FIMP}$; $S_{EA}$, $S_{MD}$, Se(i), S(j), S(q)) indicative of said vibration ($V_{IMP}$);

a position sensor for generating a signal ($E_P$, P(i), P(j), P(q)) indicative of a rotational position of said rotating shell, and a first tumbling mill arrangement data port (800, 820), connectable to a communications network;

a first tumbling mill arrangement communications device (790) being configured to deliver, via said first tumbling mill arrangement data port (820):

data indicative of said vibration signal ($S_{FIMP}$; $S_{EA}$, $S_{MD}$, Se(i), S(j), S(q)), and data indicative of said position signal ($E_P$, P(i), P(j), P(q)).

101. The tumbling mill arrangement of example 100, wherein said communications network comprises the world wide internet, also known as the Internet.

102. The tumbling mill arrangement according to example 100 or 101, further comprising:

a second tumbling mill arrangement data port (800B; 820B), connectable to a communications network;

a second tumbling mill arrangement communications device (790B) being configured to receive, via said second tumbling mill arrangement data port (800B; 820B):

data ($T_D$; FI(r); $R_T$(r); X1(r); X2, Sp(r); X5, $f_{ROT}$, $dR_T$(r), X4; dSp(r), X3) indicative of an internal state of said mill process.

103. The tumbling mill arrangement according to any preceding example, further comprising:

a second tumbling mill arrangement data port (800B; 820B), connectable to a communications network;

a second tumbling mill arrangement communications device (790B) being configured to receive, via said second tumbling mill arrangement data port (800B; 820B):

data ($R_T$(r); $T_D$; FI(r); X1(r); X2, Sp(r), $f_{ROT}$, $dR_T$(r); d Sp(r)) indicative of a position of a toe (205) of a charge of said material (30).

104. The tumbling mill arrangement according to any preceding example, further comprising:

a Human Computer Interface (HCI; 210) for enabling user input/output; and a screen display (210S); and wherein said Human Computer Interface (HCI; 210) is configured to display, on said screen display (210S), data ($T_D$; FI(r); $R_T$(r); X1(r); X2, Sp(r); X5, $f_{ROT}$, $dR_T$(r), X4; dSp(r), X3) indicative of said internal state (X) of said mill process.

105. The tumbling mill arrangement according to any preceding example, further comprising:

a Human Computer Interface (HCI; 210) for enabling user input/output; and a screen display (210S); and wherein said Human Computer Interface (HCI; 210) is configured to display, on said screen display (210S), data ($T_D$; FI(r); $R_T$(r); X1(r); X2, Sp(r); X5, $f_{ROT}$, $dR_T$(r), X4; dSp(r), X3) indicative of indicative of a position of a toe (205) of a charge of said material (30).

106. The tumbling mill arrangement according to any preceding example, wherein:

second tumbling mill arrangement communications device (790B) is said first tumbling mill arrangement communications device (790) and said second tumbling mill arrangement data port (800B; 820B) is said first tumbling mill arrangement data port (820).

107. The tumbling mill arrangement according to any preceding example, further comprising:

a control module (150, 150B) configured to receive said data ($T_D$; FI(r); $R_T$(r); X1(r); X2, Sp(r); X5, $f_{ROT}$, $dR_T$(r), X4; dSp(r), X3) indicative of an internal state of said mill process.

108. The tumbling mill arrangement according to any preceding example, wherein:

said control module (150, 150B) includes a regulator (755) configured to control a solid material feed rate into said tumbling mill based on said data ($T_D$; FI(r); $R_T$(r); X1(r); X2, Sp(r); X5, $f_{ROT}$, $dR_T$(r), X4; dSp(r), X3) indicative of an internal state of said mill process; and/or a regulator configured to control the rotational speed ($f_{ROT}$) of the rotatable shell (20) based on said data ($T_D$; FI(r); $R_T$(r); X1(r); X2, Sp(r); X5, $f_{ROT}$, $dR_T$(r), X4; dSp(r), X3) indicative of an internal state of said mill process; and/or a regulator configured to control a liquid feed rate into said tumbling mill based on said data ($T_D$; FI(r); $R_T$(r); X1(r); X2, Sp(r); X5, $f_{ROT}$, $dR_T$(r), X4; dSp(r), X3) indicative of an internal state of said mill process.

109. The tumbling mill arrangement according to any preceding example, wherein:

said control module (150, 150B) includes a regulator (755) configured to control a solid material feed rate into said tumbling mill based on said value ($R_T$(r); $T_D$; FI(r)) indicative of a position of a toe (205) of a charge of said material (30), and/or a regulator configured to control the rotational speed ($f_{ROT}$) of the rotatable shell (20) based on said value ($R_T(r)$; $T_D$; FI(r)) indicative of a position of a toe (205) of a charge of said material (30), and/or a regulator configured to control a liquid feed rate into said tumbling mill based on said value ($R_T(r)$; $T_D$; FI(r)) indicative of a position of a toe (205) of a charge of said material (30).

An example 105 relates to a monitoring apparatus (870; 880; 150; 150A) for cooperation with a tumbling mill arrangement according to any preceding example, or according to any of examples 100 to 109, the monitoring apparatus comprising:

a monitoring apparatus data port (920, 920A), connectable to a communications network (810), for data exchange with a tumbling mill arrangement; wherein said monitoring apparatus (870; 880; 150; 150A) is configured to receive, via said monitoring apparatus data port (920, 920A):

data indicative of a vibration signal ($S_{FIMP}$; $S_{EA}$, $S_{MD}$, Se(i), S(j), S(q)), and data indicative of a position signal ($E_P$, P(i), P(j), P(q));

the monitoring apparatus (870; 880; 150; 150A) further comprising:

a status parameter extractor (450) being configured to generate data ($T_D$; FI(r); $R_T(r)$; X1(r); X2, Sp(r); X5, $f_{ROT}$, $dR_T(r)$, X4; dSp(r), X3) indicative of an internal state of said mill process based on said vibration signal and said position signal.

110. The monitoring apparatus according to any preceding example, wherein:

said monitoring apparatus (870; 880; 150; 150A) is configured to transmit, via said monitoring apparatus data port (920, 920A):

generated data ($T_D$; FI(r); $R_T(r)$; X1(r); X2, Sp(r); X5, $f_{ROT}$, $dR_T(r)$, X4; dSp(r), X3) indicative of said internal state of said mill process to said tumbling mill arrangement.

111. The monitoring apparatus according to any preceding example, wherein said monitoring apparatus (870; 880; 150; 150A) is configured to generate and transmit a value ($R_T(r)$; $T_D$; FI(r)) indicative of a position of a toe (205) of a charge of said material (30) to said tumbling mill arrangement.

112. The monitoring apparatus according to any preceding example, wherein said monitoring apparatus (870; 880; 150; 150A) is configured to utilize a server (830) at a remote server location (860) to generate and/or transmit a value ($R_T(r)$; $T_D$; FI(r)) indicative of a position of a toe (205) of a charge of said material (30) to said tumbling mill arrangement, and/or store and/or retrieve data indicative of a vibration signal ($S_{FIMP}$; $S_{EA}$, $S_{MD}$, Se(i), S(j), S(q)), and/or data indicative of a position signal ($E_P$, P(i), P(j), P(q)).

113. The monitoring apparatus according to any preceding example, wherein said monitoring apparatus (870; 880; 150; 150A) comprises a memory storage (890) and said monitoring apparatus is configured to store on and/or retrieve from said memory storage (890), data indicative of a vibration signal ($S_{FIMP}$; $S_{EA}$, $S_{MD}$, Se(i), S(j), S(q)), and/or data indicative of a position signal ($E_P$, P(i), P(j), P(q)).

An example 114 relates to an assembly for cooperation with a tumbling mill arrangement according to any preceding example, or according to any of examples 100 to 113, the assembly comprises a monitoring module (150; 150A), a control module (150; 150B), and at least one assembly data port (920, 920A, 920B), connectable to a communications network (810), for data exchange with a tumbling mill arrangement; wherein said monitoring module (150; 150A) is configured to receive, via said assembly data port port (920, 920A):

data indicative of a vibration signal ($S_{FIMP}$; $S_{EA}$, $S_{MD}$, Se(i), S(j), S(q)), and data indicative of a position signal ($E_P$, P(i), P(j), P(q));

the monitoring module (150; 150A) being configured to generate data ($T_D$; FI(r); $R_T(r)$; X1(r); X2, Sp(r); X5, $f_{ROT}$, $dR_T(r)$, X4; dSp(r), X3) indicative of an internal state of said mill process based on said vibration signal and said position signal, said control module (150; 150B) is arranged to communicate with said tumbling mill arrangement via an assembly data port (920, 920B), and said control module (150, 150B) includes a regulator (755) configured to control a solid material feed rate into said tumbling mill based on said data ($T_D$; FI(r); $R_T(r)$; X1(r); X2, Sp(r); X5, $f_{ROT}$, $dR_T(r)$, X4; dSp(r), X3) indicative of an internal state of said mill process; and/or a regulator configured to control the rotational speed ($f_{ROT}$) of the rotatable shell (20) based on said data ($T_D$; FI(r); $R_T(r)$; X1(r); X2, Sp(r); X5, $f_{ROT}$, $dR_T(r)$, X4; dSp(r), X3) indicative of an internal state of said mill process; and/or a regulator configured to control a liquid feed rate into said tumbling mill based on said data ($T_D$; FI(r); $R_T(r)$; X1(r); X2, Sp(r); X5, $f_{ROT}$, $dR_T(r)$, X4; dSp(r), X3) indicative of an internal state of said mill process.

115. The assembly according to any preceding example, wherein the assembly is arranged at a location geographically distant from said tumbling mill (10).

116. A method for generating information relating to an internal state (X) of a tumbling mill (10) having a shell (20) that rotates at a speed of rotation ($f_{ROT}$) for grinding a charge of material (30) by tumbling the material in the rotating shell; said shell (20) having an internal shell surface (22) including a first number (L) of protrusions (310) configured to engage material as the shell (20) rotates about the axis (60), thereby causing a vibration ($V_{IMP}$) having a first repetition frequency ($f_R$) dependent on the speed of rotation ($f_{ROT}$); the method comprising receiving a position signal (E, P, P(i), P(j), P(q)) indicative of a rotational position of said rotating shell (20) such that said position signal ($E_P$, P(i), P(j), P(q)) has a second repetition frequency ($f_{RP}$) dependent on said speed of rotation ($f_{ROT}$);

receiving a vibration signal ($S_{EA}$, Se(i), S(j), S(q)) dependent on mechanical vibrations ($V_{IMP}$) emanating from rotation of said shell, said vibration signal ($S_{EA}$, Se(i), S(j), S(q)) including a time sequence of vibration sample values (Se(i), S(j), S(q));

detecting, in said time sequence of vibration sample values (Se(i), S(j), S(q)), an event signature ($S_P(r)$; $S_P$) having an event signature occurrence frequency ($f_R$), said event signature occurrence frequency being equal to said first repetition frequency ($f_R$);

generating, based on said event signature occurrence frequency, a periodic event signal exhibiting said first number (L) of periods per revolution of said shell during operation of the tumbling mill (10);

generating, based on said position signal (E, P, P(i), P(j), P(q)), a periodic reference signal exhibiting said first number (L) of periods per revolution of said shell during operation of said tumbling mill (10);

generating data indicative of a first temporal relation (X1(r), $R_T$(r); $T_D$; FI(r)) between said periodic event signal, and said periodic reference signal; said temporal relation being indicative of said internal state (X) of the tumbling mill (10).

117. The method according to any preceding example, wherein:

said periodic event signal is a sinusoidal event signal; and said periodic reference signal is a sinusoidal reference signal; and said data indicative of a first temporal relation (RT(r); TD; FI(r)) is indicative of a first temporal relation (RT(r); TD; FI(r)) between said sinusoidal event signal, and said sinusoidal reference signal.

118. The method according to any preceding example, wherein:

said periodic reference signal is generated based on said first number (L) and said position signal (E, P, P(i), P(j), P(q))

such that said periodic reference signal is configured to exhibit said first number (L) of periods per revolution of said shell during operation of said tumbling mill (10).

119. The method according to any preceding example, wherein:

said periodic reference signal is generated based on said first number (L) and said position signal (E, P, P(i), P(j), P(q))

such that said periodic reference signal is configured to exhibit said first number (L) of periods per revolution of said shell during operation of said tumbling mill (10), and a reference amplitude value, such as a peak value, based on a certain position signal value (E, P, P(i), P(j), P(q)).

120. The method according to any preceding example, wherein:

said periodic reference signal is configured to exhibit least two periods per revolution of said shell during operation of said tumbling mill (10).

121. The method according to any preceding example, wherein:

said position signal includes a time sequence of position signal sample values (P(i), P(j), P(q)); and said second repetition frequency ($f_{RP}$) is a frequency lower than, or equal to, said first repetition frequency ($f_R$).

122. A method for generating information relating to an internal state (X) of a tumbling mill (10) including a rotatable shell (20) configured with an internal shell surface having a first number (L) of internal protrusions (310) for engaging material (30) when the shell rotates, thereby causing a vibration having a repetition frequency dependent on a speed of rotation of said shell, the method comprising the steps:

receive a position signal relating to rotational position of said rotating shell, and detect, in a time sequence of position signal values (P(i), P(j), P(q)), a first occurrence of a first reference position signal value (1; PS) indicative of a predetermined rotational position of said rotating shell;

provide a reference signal (1, 1C, PS, PC, 0%) based on said position signal such that said reference signal is provided a certain number (L) of times per revolution of said shell; said certain number being at least two; and receive a signal indicative of said vibration, detect, in said vibration signal, a signal event signature that occurs when a said internal protrusion (310) engages with a toe portion of said material;

measure a first duration (100%) from the provision of a first reference signal (1, 1C, PS, PC, 0%) to the provision of a subsequent reference signal (1, 1C, PS, PC, 100%); and measure a second duration between the provision of a reference signal to the occurrence of a subsequent said signal event signature, or measure the second duration between the occurrence of said signal event signature to the provision of a subsequent reference signal; and generate a temporal relation value based on said second duration and said first duration (100%); said temporal relation value being indicative of said internal state (X) of the tumbling mill (10).

123. The method according to any preceding example, wherein:

said temporal relation value is indicative of a position of said toe portion (205) between two consecutive predetermined rotational positions (Ps, Pc) of said rotating shell.

124. The method according to any preceding example, wherein:

a said protrusion (310) is positioned, on said internal shell surface (22), in a mutually equidistant manner in relation to another said protrusion (310).

125. The method according to any preceding example, wherein:

a said protrusion (310) is an elongated protrusion (310) having a direction of elongation, the direction of elongation extending in a direction substantially perpendicular to a direction of movement of said protrusion (310) during operation of said tumbling mill (10), said elongated protrusion (310) moving at said speed of rotation ($f_{ROT}$) of said shell (20) during operation of said mill (10).

126. The method according to any preceding example or according to any example dependent on example 116, further comprising:

generating said first temporal relation ($R_T$(r); $T_D$; FI(r)) as a phase angle (FI(r)) between said periodic event signal, and said periodic reference signal.

127. The method according to any preceding example, wherein:

said first temporal relation ($R_T$(r); $T_D$; FI(r)) is indicative of a proportion of a certain distance, said certain distance being the distance between two adjacent of said protrusions (310).

128. The method according to any preceding example, wherein:

Said first temporal relation ($R_T$(r); $T_D$; FI(r)) is indicative of a relative toe position (205).

129. The method according to any preceding example, wherein:

said event signature is indicative of an impact force ($F_{IMP}$) generated when a protrusion (310) on an internal shell surface (22) of the rotating shell (20) interacts with a toe portion (205) of the charge material (30).

130. The method according to any preceding example, further comprising controlling an angular toe position (FI(r), X1(r), $A_{TOE}$) based on a toe position reference value ($FI_{REF}$(r), $X1_{REF}$(r)), said first temporal relation ($R_T$(r); $T_D$; FI(r)), and a toe position error value ($FI_{ERR}$(r), $X1_{ERR}$(r)), wherein said toe position error value ($FI_{ERR}$(r), $X1_{ERR}$(r)) depends on said toe position reference value ($FI_{REF}$(r), $X1_{REF}$(r)), and said first temporal relation ($R_T$(r); $T_D$; FI(r)).

131. The method according to any preceding example, wherein:

said toe position error value ($FI_{ERR}$(r)) depends on a difference between said toe position reference value ($FI_{REF}$(r)), and said first temporal relation ($R_T$(r); $T_D$; FI(r)).

132. The method according to any preceding example or according to example 130 or 131, further comprising controlling a solid material feed rate set point ($R_{SSP}$) in dependence on said toe position reference value ($FI_{REF}$ (r)), wherein a solid material feed rate ($R_S$) depends on said solid material feed rate set point ($R_{SSP}$), said solid material feed rate ($R_S$) being an amount of solid material per time unit that is being fed into an input (100) of said tumbling mill (10).

133. The method according to any preceding example or according to any of examples 130-132, further comprising controlling speed of rotation set point ($f_{ROTSP}$) in dependence on said toe position reference value ($FI_{REF}$(r)), and wherein said speed of rotation ($f_{ROT}$) depends on said speed of rotation set point ($f_{ROTSP}$); and/or controlling a liquid feed rate set point ($R_{LSP}$) in dependence on said toe position reference value ($FI_{REF}$(r)), and wherein a liquid feed rate ($R_L$) depends on said liquid feed rate set point ($R_{LSP}$), said liquid feed rate ($R_L$) being an amount of liquid per time unit that is being fed into an input (130) of said tumbling mill (10).

134. The method according to any preceding example or according to any of examples 130 to 133, wherein:

said tumbling mill (10) is located at a mill location (780), and wherein at least a part of the method is performed at a location (870) remote from said mill location (780), and/or wherein at least a part of the method is performed at a remote location (870), said remote location (870) being geographically separated from the mill location (780) by a geographic distance; wherein the method further comprises the step:

transfer at least some of said signals between said mill location (780) and said remote location (870).

135. The method according to any preceding example, wherein said geographic distance exceeds one kilometer; and/or wherein said mill location (780) is in a first country constituting a first jurisdiction, and said remote location (870) is in a second country constituting a second jurisdiction such that at least a part of the method is performed in said first country and at least a part of said method is performed in said second country.

136. The method according to any preceding example, wherein at least a part of said signal transfer is performed by a communications network (810), such as e.g. the Internet.

137. The method according to any preceding example or according to any of examples 122-136, wherein said event signature is indicative of an impact force ($F_{IMP}$) generated when a projection (310) on an internal shell surface (22) of the rotating shell (20) interacts with a toe portion (205) of the charge material (30).

138. The method according to any preceding example or according to any of examples 122-137, wherein said event signature is an amplitude value ($S_P$(r); Sp; $C_L$(r); $C_1$(r)), such as e.g. a peak amplitude value.

139. The method according to any preceding example or according to any of examples 122-138, wherein said first temporal relation ($R_T$(r); $T_D$; FI(r)) is generated by a Fourier Transformer configured to generate said first temporal relation ($R_T$(r); $T_D$; FI(r)).

140. The method according to any preceding example or according to any of examples 126-139, wherein said first duration, between two consecutive reference signals, is measured by counting a total number of samples ($N_B$) from the occurrence of a first reference signal to the occurrence of the consecutive reference signal; and said second duration is measured by counting another number of samples ($N_P$) between the provision of a reference signal to the occurrence of a subsequent said signal event signature, or by counting another number of samples ($N_P$) between the occurrence of said signal event signature to the provision of a subsequent reference signal; the method further comprising:

generating said first temporal relation ($R_T$(r); $T_D$; FI(r)) based on said another number ($N_P$) and said total number ($N_B$).

141. The method according to any preceding example or according to any of examples 122-140, wherein said first temporal relation ($R_T$(r); $T_D$; FI(r)) is based on a relation between said another number and said total number.

142. The method according to any preceding example or according to any of examples 122-141, wherein said first temporal relation ($R_T$(r); $T_D$; FI(r)) is generated by a status parameter extractor (450) configured to generate said first temporal relation ($R_T$(r); $T_D$; FI(r)).

143. A method of operating a comminution process in a tumbling mill (10) including a rotatable shell (20) having an internal shell surface (22) with a first number (L) of protrusions (310) configured to engage material when the shell (20) rotates for grinding a charge of material (30) by tumbling the material in the rotating shell so as to generate product particles (95; 96) at a mill output (200), thereby causing a vibration ($V_{IMP}$) having a first repetition frequency ($f_R$) dependent on a speed of rotation (U1, $f_{ROT}$) when a protrusion (310) engages with a toe portion (205) of said material (30);

the method comprising receiving a vibration signal ($S_{FIMP}$; $S_{EA}$, $S_{MD}$, Se(i), S(j), S(q)) indicative of said vibration ($V_{IMP}$);

receiving a position signal ($E_P$, P(i), P(j), P(q)) indicative of a rotational position of said rotating shell;

generating at least one status parameter value (X1(r), FI(r), $T_D$, $R_T$(r); X2, Sp(r); X3, dSp(r); X4, $dR_T$(r); X5, $f_{ROT}$; X6, $A_{TOE}$(r); X7) indicative of an internal state (X) of said comminution process based on said vibration signal and said position signal; said at least one status parameter value including a toe position value (X1(r), FI(r), $T_D$, $R_T$(r); X6, $A_{TOE}$(r)) indicative of a position of the toe portion (205).

144. The method according to example 140, wherein said at least one status parameter value (X1(r), FI(r), $T_D$, $R_T$(r); X2, Sp(r); X3, dSp(r); X4, d$R_T$(r); X5, $f_{ROT}$; X6, $A_{TOE}$(r); X7) is said first temporal relation as defined in any of examples 112-138, or wherein said at least one status parameter value (X1(r), FI(r), $T_D$, $R_T$(r); X2, Sp(r); X3, dSp(r); X4, d$R_T$(r); X5, $f_{ROT}$; X6, $A_{TOE}$(r); X7) is said temporal relation value as defined in any of examples 118 to 138 or wherein said at least one status parameter value (X1(r), FI(r), $T_D$, $R_T$(r); X2, Sp(r); X3, dSp(r); X4, d$R_T$(r); X5, $f_{ROT}$; X6, $A_{TOE}$(r); X7) is generated as defined in any of examples 1 to 111.

145. The method according to any of examples 143 to 144, further comprising providing a solid material feed rate set point value ($U2_{SP}$, $R_{SSP}$) for setting a solid material feed rate (U2, $R_S$); said solid material feed rate (U2, $R_S$) being an amount of solid material feed particles (115) per time unit that is being fed into an input (100) of a tumbling mill (10) thereby influencing said internal state (X); said feed particles (115) having a feed particle size distribution.

146. The method according to any of examples 143 to 145, further comprising analysing at least a portion of said product particles (96);

generating at least one product measurement value (Y1; Y2) based on said product particle analysis; said at least one product measurement value (Y1; Y2) being indicative of a discharge material state (Y(r)).

147. The method according to any preceding example or according to any of examples 143 to 146, further comprising performing correlation of said at least one product measurement value (Y1; Y2) and said at least one status parameter value (X1(r), FI(r), $T_D$, $R_T$(r); X2, Sp(r); X3, dSp(r); X4, d$R_T$(r); X5, $f_{ROT}$; X6, $A_{TOE}$(r); X7); and generating, by said correlation, a correlation data set indicative of a causal relationship between said at least one status parameter value (X1(r), $T_D$, FI(r), $R_T$(r); X2, Sp(r); X3, dSp(r); X4, d$R_T$(r); X5, $f_{ROT}$; X6, $A_{TOE}$(r); X7) and said at least one product measurement value (Y1; Y2) and/or a correlation data set indicative of a causal relationship between said internal state (X) and said discharge material state (Y(r)).

148. The method according to any preceding example or according to any of examples 143 to 147, further comprising receiving data indicative of a desired discharge material state ($Y_{REF}$(r));

generating at least one status parameter reference value ($X1_{REF}$; $FI_{REF}$) based on said data indicative of said desired discharge material state (YREF(r)) and said correlation data set; the generated at least one status parameter reference, value ($X1_{REF}$; $FI_{REF}$) including a toe position reference value ($X1_{REF}$(r), $FI_{REF}$ (r), $T_{DREF}$; $X6_{REF}$, $A_{TOEREF}$(r);

149. The method according to any preceding example or according to any of examples 143 to 148, further comprising receiving data indicative of a desired discharge material state (YREF(r));

generating at least one status parameter reference value ($X1_{REF}$; $FI_{REF}$) based on said data indicative of said desired discharge material state (YREF(r)) and a correlation data set;

wherein the generated at least one status parameter reference value ($X1_{REF}$; $FI_{REF}$) includes a toe position reference value ($X1_{REF}$(r), $FI_{REF}$ (r), $T_{DREF}$; $X6_{REF}$, $A_{TOEREF}$(r)); and wherein said correlation data set is indicative of a causal relationship between said at least one status parameter value (X1(r), $T_D$, FI(r), $R_T$(r); X2, Sp(r); X3, dSp(r); X4, d$R_T$(r); X5, $f_{ROT}$; X6, $A_{TOE}$(r); X7) and said at least one product measurement value (Y1; Y2) and/or wherein said correlation data set is indicative of a causal relationship between said internal state (X) and said discharge material state (Y(r)).

150. The method according to any preceding example or according to any of examples 143 to 149, further comprising displaying, by a user interface (210, 210S, 240, 250), said at least one status parameter reference value ($X1_{REF}$; $FI_{REF}$)

displaying, by said user interface (210, 210S, 240, 250), said at least one status parameter value (X1(r) $T_D$, FI(r), $R_T$(r); X2, Sp(r); X3, dSp(r); X4, d$R_T$(r); X5, $f_{ROT}$; X6, $A_{TOE}$(r); X7) including said toe position value (X6, $A_{TOE}$(r); X1(r), FI(r), $T_D$, $R_T$(r)) for enabling an operator (230) to adjust a mill set point value (U; U1; U2; U3);

receiving, by said user interface (210, 210S, 240, 250), a mill set point value (U; U1; U2; U3); said received mill set point value including a received solid material feed rate set point value (U2SP, $R_{SSP}$);

providing said received solid material feed rate set point value (U2SP, $R_{SSP}$) so that it sets said solid material feed rate (U2, $R_S$) thereby influencing said internal state (X) to control or influence said discharge material state (Y(r)).

151. The method according to any preceding example or according to any of examples 143 to 150, further comprising controlling said discharge material state (Y(r)) based on said at least one status parameter reference value ($X1_{REF}$; $FI_{REF}$), said at least one status parameter value (X1(r), FI(r); X6(r), $A_{TOE}$(r); X7), and a status parameter error value ($X1_{ERR}$(r), $FI_{ERR}$(r); $X6_{ERR}$, $A_{TOE\_ERR}$(r); $X7_{ERR}$), wherein said status parameter error value ($X1_{ERR}$(r), $FI_{ERR}$(r); $X6_{ERR}$, $A_{TOE\_ERR}$(r); $X7_{ERR}$) depends on said at least one status parameter reference value ($X1_{REF}$; $FI_{REF}$), and said at least one status parameter value (X1(r), FI(r); X6(r), $A_{TOE}$(r); X7).

152. The method according to any preceding example or according to any of examples 143 to 151, further comprising controlling a mill set point (U; U1; U2; U3) including said solid material feed rate set point value (U2SP, $R_{SSP}$), thereby influencing said internal state (X) to control or affect said at least one product measurement value (Y1; Y2) and/or said discharge material state (Y(r)), based on said at least one status parameter reference value ($X1_{REF}$; $FI_{REF}$), said at least one status parameter value (X1(r), FI(r); X6(r), $A_{TOE}$(r); X7), and a status parameter error value ($X1_{ERR}$(r), $FI_{ERR}$(r); $X6_{ERR}$, $A_{TOE\_ERR}$(r); $X7_{ERR}$), wherein said status parameter error value ($X1_{ERR}$(r), $FI_{ERR}$(r); $X6_{ERR}$, $A_{TOE\_ERR}$(r); $X7_{ERR}$) depends on said at least one status parameter reference value ($X1_{REF}$; $FI_{REF}$), and said at least one status parameter value (X1(r), FI(r); X6(r), $A_{TOE}$(r); X7).

153. The method according to any preceding example or according to any of examples 143 to 152, wherein said tumbling mill (10) is a ball mill, said method further comprising providing a ball feed rate set point value ($U4_{SP}$, $R_{BFSP}$,) for setting a ball feed rate (U4, $R_{BF}$); said ball feed rate (U4, $R_{BF}$) being a number of grinding balls per time unit that is being fed into an input (100) of said ball mill for enhancing said comminution process; said grinding balls having a feed ball size distribution.

154. The method according to any preceding example or according to any of examples 143 to 153, wherein said discharge material state (Y(r)) is a momentary product particle size distribution (Y), said momentary product particle size distribution being indicative a product particle size distribution measured during a measurement moment time period, said measurement moment time period being equal to or shorter than ten minutes.

155. The method according to any preceding example or according to any of examples 122 to 154, further comprising generating, based on said position signal, a second number (L) of static position indications or a second number (L) of static position indication values (P1, $P_C$, P1, P2, P3, PL), wherein a static position indication value is indicative of an immobile rotational position;

generating, based on said vibration signal, a first number (L) of variable position indications or variable position indication values, wherein a variable position indication value is indicative of a variable position between two of said immobile rotational positions.

156. The method according to any preceding example or according to example 155, further comprising generating, based on said variable position indications and said static position indications, a relation value; said relation value being indicative of a position of said toe portion between two of said static positions, 157. The method according to any preceding example or according to any of examples 122 to 156, further comprising generating, based on said event signature, a force value indicative of impact force;

generating, based on a combination of said force value and said speed value, a mass value indicative of a mass of at least a part of said charge of material.

158. The method according to any preceding example or according to any of examples 122 to 157, further comprising generating, based on said mass value and said relation value, an absolute toe position value.

159. The method according to any preceding example or according to any of examples 122 to 158, further comprising generating a mass value based on said absolute toe position value and said speed value and historic data relating to said force value as combined with said absolute toe position value and said speed value, said mass value being indicative of a total mass of said charge of material (30).

160. The method according to any of examples 143 to 159, wherein the tumbling of the material (30) in the rotating shell generates output material (95) including said product particles (96) at the mill output (200).

161. The method according to example 160, wherein the output material (95) comprises said product particles (96) and liquid.

162. The method according to any of examples 143 to 161, wherein the tumbling mill (10) includes a rotatable shell (20) having an internal shell surface (22) with a first number (L) of protrusions (310) configured to engage material when the shell (20) rotates for dry grinding a charge of material (30) by tumbling the material in the rotating shell so as to generate output material product particles (95, 96) at the mill output (200).

163. A method of operating a comminution process in a tumbling mill (10) including a rotatable shell (20) having an internal shell surface (22) with a first number (L) of protrusions (310) configured to engage material when the shell (20) rotates for grinding a charge of material (30) by tumbling the material in the rotating shell so as to generate output material (95) including product particles (95; 96) at a mill output (200), thereby causing a vibration ($V_{IMP}$) having a first repetition frequency ($f_R$) dependent on a speed of rotation (U1, $f_{ROT}$) when a protrusion (310) engages with a toe portion (205) of said material (30);

the method comprising receiving a vibration signal ($S_{FIMP}$; $S_{EA}$, $S_{MD}$, Se(i), S(j), S(q)) indicative of said vibration ($V_{IMP}$);

receiving a position signal ($E_P$, P(i), P(j), P(q)) indicative of a rotational position of said rotating shell;

generating, based on said vibration signal and said position signal, at least one status parameter value (X1(r), FI(r), $T_D$, $R_T$(r); X2, Sp(r); X3, dSp(r); X4, $dR_T$(r); X5, $f_{ROT}$; X6, $A_{TOE}$(r); X7) indicative of an internal state (X) of said comminution process; said at least one status parameter value including a first status parameter value (X1(r), FI(r), $T_D$, $R_T$(r); X6, $A_{TOE}$(r)) indicative of a position of the toe portion (205).

164. The method according to example 163, wherein said first status parameter value (X1(r), FI(r), $T_D$, $R_T$(r); X2, Sp(r); X3, dSp(r); X4, $dR_T$(r); X5, $f_{ROT}$; X6, $A_{TOE}$(r); X7) is said first temporal relation as defined in any of examples 112-138, or wherein said first status parameter value (X1(r), FI(r), $T_D$, $R_T$(r); X2, Sp(r); X3, dSp(r); X4, $dR_T$(r); X5, $f_{ROT}$; X6, $A_{TOE}$(r); X7) is said temporal relation value as defined in any of examples 118 to 138 or wherein said first status parameter value (X1(r), FI(r), $T_D$, $R_T$(r); X2, Sp(r); X3, dSp(r); X4, $dR_T$(r); X5, $f_{ROT}$; X6, $A_{TOE}$(r); X7) is generated as defined in any of examples 1 to 111.

165. The method according to any of examples 163-164 or according to any of examples 143 to 163, further comprising providing a solid material feed rate set point value ($U2_{SP}$, $R_{SSP}$) for setting a solid material feed rate (U2, $R_S$); said solid material feed rate (U2, $R_S$) being an amount of solid material feed particles (115) per time unit that is being fed into an input (100) of a tumbling mill (10) thereby influencing said internal state (X); said feed particles (115) having a feed particle size distribution.

166. The method according to any of examples 163 to 165 or according to any of examples 143 to 165, further comprising analysing at least a portion of said output material (95);

generating at least one output material measurement value (Y1; Y2) based on said output material analysis.

It is to be understood that each output material measurement value (Y1; Y2) may be associated with a timestamp or a time period corresponding to said output material analysis.

167. The method according to example 162 or any of examples 143 to 145 or according to any of examples 143 to 166, wherein said at least one output material measurement value (Y1; Y2) is indicative of an output material quality measure.

168. The method according to example 167 or any of examples 143 to 145 or according to any of examples 143 to 167, wherein said at least one output material measurement value (Y1; Y2) is indicative of a discharge material state (Y); the discharge material state (Y) being a momentary state of the output material (95).

169. The method according to any of examples 166-168 or according to any of examples 143 to 145 or according to any of examples 143 to 168, wherein said at least one output material measurement value (Y1; Y2) is one or several selected from the group:

a value (Y1; Y2) indicative of a mass per time unit of said output material (95);

a value (Y1; Y2) indicative of a mass per time unit of said product particles (96);

a value (Y1; Y2) indicative of a mass per time unit of said product particles (96), wherein said product particles (96) have a product particle size in a range between a smallest product particle size limit value and a largest product particle size limit value;

a value (Y1; Y2) indicative of a percentage of said product particles (96) having a product particle size in a range between a smallest product particle size limit value and a largest product particle size limit value;

a value (Y1; Y2) indicative of a product particle size distribution (Y), such as a standard deviation;

a value (Y1; Y2) indicative of a product particle size (Y1; Y2).

170. The method according to example 169, wherein said product particle size (Y1; Y2) is at least one selected from the group:

a product particle median size value;

a product particle mean size value;

a product particle median diameter value; and a product particle mean diameter value.

171. The method according to example 169, wherein said product particle size limit values are at least one selected from the group:

a product particle diameter value; and a product particle maximum width value.

It is to be understood that said smallest product particle size limit value may be set to zero. Said range between the smallest product particle size limit value and the largest product particle size limit value may be defined even with the smallest product particle size limit value is omitted, or the largest product particle size limit value is omitted, whereby the range becomes the values below the largest product particle size limit value, or values above the smallest product particle size limit value respectively.

This solution advantageously enables identification and/or determination of a cause and effect relationship between the internal state of the comminution process and the at least one output material measurement value.

Moreover, this solution advantageously enables identification and/or determination of a cause and effect relationship between the internal state of the comminution process and the discharge material state (Y). The discharge material state (Y) may also be referred to as the product material state (Y).

This solution is versatile in that it allows for the defining of a desired discharge material state (YREF), and for testing of alternative internal states of the comminution process in order to search and identify an internal state of the comminution process that causes, or produces, the desired discharge material state (YREF) or that causes or produces a discharge material state (Y) as near as possible to the desired discharge material state (YREF). Moreover, the recording of a detected momentary comminution process internal state (X(r)) in association with a corresponding momentary discharge material state (Y(r)), produces correlation data indicative of a causal relationship between a momentary comminution process internal state (X(r)) and a corresponding momentary discharge material states (Y(r)).

By performing repeated recording of a number of mutually different detected momentary comminution process internal states (X(r)) in association with momentary discharge material states (Y(r)) that were caused by the respective momentary comminution process internal states (X(r)), a correlation data set may be produced. Such a correlation data set is indicative of a causal relationship between a number of momentary comminution process internal states (X(r)) and a number of corresponding momentary discharge material states (Y(r)).

172. The method according to any of examples 166-171 or according to any of examples 143 to 145 or according to any of examples 143 to 171, further comprising performing correlation of said at least one product measurement value (Y1; Y2) and said at least one status parameter value (X1(r), FI(r), $T_D$, $R_T$(r); X2, Sp(r); X3, dSp(r); X4, $dR_T$(r); X5, $f_{ROT}$; X6, $A_{TOE}$(r); X7); and generating, by said correlation, a correlation data set indicative of a causal relationship between said at least one status parameter value (X1(r), $T_D$, FI(r), $R_T$(r); X2, Sp(r); X3, dSp(r); X4, $dR_T$(r); X5, $f_{ROT}$; X6, $A_{TOE}$(r); X7) and said at least one product measurement value (Y1; Y2) and/or a correlation data set indicative of a causal relationship between said internal state (X(r)) and said discharge material state (Y(r).

173. The method according to any of examples 166-172 or according to any of examples 143 to 145 or according to any of examples 143 to 172, further comprising receiving data indicative of a desired discharge material state ($YREF_D$(r));

generating at least one status parameter reference value ($X1_{REF}$; $FI_{REF}$) based on said data indicative of said desired discharge material state ($YREF_D$(r)) and a correlation data set;

the generated at least one status parameter reference, value ($X1_{REF}$; $FI_{REF}$) including a first status parameter reference value ($X1_{REF}$(r), $FI_{REF}$ (r), $T_{DREF}$; $X6_{REF}$, $A_{TOEREF}$(r))

174. The method according to any of examples 166-173 or according to any of examples 143 to 145 or according to any of examples 143 to 173, further comprising receiving data indicative of a desired discharge material state ($YREF_D$(r));

generating at least one status parameter reference value ($X1_{REF}$; $FI_{REF}$) based on said data indicative of said desired discharge material state ($YREF_D$(r)) and a correlation data set;

wherein the generated at least one status parameter reference value ($X1_{REF}$; $FI_{REF}$)

includes a first status parameter reference value ($X1_{REF}$ (r), $FI_{REF}$ (r), $T_{DREF}$; $X6_{REF}$, $A_{TOEREF}$(r)); and wherein said correlation data set is indicative of a causal relationship between said at least one status parameter value (X1(r), $T_D$, FI(r), $R_T$(r); X2, Sp(r); X3, dSp(r); X4, $dR_T$(r); X5, $f_{ROT}$; X6, $A_{TOE}$(r); X7) and said at least one product measurement value (Y1; Y2)

and/or wherein said correlation data set is indicative of a causal relationship between said desired discharge material state ($YREF_D$(r)) and a corresponding reference internal state ($X_{REF}$(r))

175. The method according to any of examples 166-174 or according to any of examples 143 to 145 or according to any of examples 143 to 174, further comprising causing a user interface (210, 210S, 240, 250) to convey information indicative of said first status parameter reference value ($X1_{REF}$(r), $FI_{REF}$ (r), $T_{DREF}$; $X6_{REF}$, $A_{TOEREF}$(r)); and causing a user interface (210, 210S, 240, 250) to convey information indicative of said first status parameter value (X1(r), FI(r), $T_D$; X6, $A_{TOE}$(r)), said first status parameter value being indicative of a position of the toe portion (205);

receiving, via a user interface (210, 210S, 240, 250), first user input relating to said solid material feed rate (U2, $R_S$);

generating said solid material feed rate set point value ($U2_{SP}$, $R_{SSP}$) thereby influencing said internal state (X) for controlling or affecting said discharge material state (Y(r)); wherein said generated solid material feed rate set point value ($U2_{SP}$, $R_{SSP}$) is based on said received first user input.

This solution advantageously generates information about a first status parameter reference value. The generated first status parameter reference value is indicative of a desired toe position that corresponds to a desired discharge material state (YREF(r)). Moreover, this solution advantageously generates information about an actual first status parameter value. The generated actual first status parameter value is indicative of a position of the toe portion (205), and thus it is indicative of the actual internal state (X) of said comminution process.

Thus, this solution advantageously conveys, to a user via a user interface, information relating to the actual internal state (X) of said comminution process as well as information relating to a desired internal state (X) of said comminution process. Such conveyed information may be useful to an operator (230) wishing to adjust a solid material feed rate (U2, $R_S$) for controlling or affecting said discharge material state (Y(r)).

In this document "desired" values may be referred to as "reference" values. Thus, for example, the above mentioned "first status parameter reference value" relates to a "desired first status parameter value". In the context of this document, the term "user" may relate to a person operating a tumbling mill, and such a user may also be referred to as an operator.

176. The method according to any of examples 166-175 or according to any of examples 143 to 145 or according to any of examples 143 to 175, further comprising generating said solid material feed rate set point value ($U2_{SP}$, $R_{SSP}$) thereby influencing said internal state (X) for controlling or affecting said discharge material state (Y(r)); wherein said generated solid material feed rate set point value ($U2_{SP}$, $R_{SSP}$) is based on said first status parameter reference value ($X1_{REF}$(r), $FI_{REF}$ (r), $T_{DREF}$; $X6_{REF}$, $A_{TOEREF}$(r)); and said first status parameter value (X1(r), FI(r), $T_D$; X6, $A_{TOE}$(r)), said first status parameter value being indicative of a position of the toe portion (205);

This solution advantageously generates information about a first status parameter reference value that is indicative of a desired toe position that corresponds to a desired discharge material state (YREF(r)).

Moreover, this solution advantageously generates information about an actual first status parameter value that is indicative of an actual position of the toe portion (205), and thus it is indicative of the current actual internal state (X) of said comminution process.

Thus, this solution advantageously automatically, generates a solid material feed rate set point value ($U2_{SP}$, $R_{SSP}$) which in turn affects the solid material feed rate (U2, $R_S$) for controlling or affecting said discharge material state (Y(r)).

In this document "desired" values may be referred to as "reference" values. Thus, for example, the above mentioned "first status parameter reference value" relates to a "desired first status parameter value".

177. A system for operating a comminution process in a tumbling mill (10), the system comprising one or more hardware processors configured to perform all, or at least some, of the steps of the method according to any preceding example or according to any of examples 112 to 172.

178. A first system for operating a comminution process in a tumbling mill (10), wherein said tumbling mill (10) is located at a mill location (780), and wherein the system comprises one or more hardware processors, located at said mill location (780), said one or more hardware processors being configured to perform at least some of the steps of the method according to any preceding example or according to any of examples 122 to 177.

179. A second system for co-operation with the first system according to example 178, wherein the second system comprises one or more hardware processors, located at a remote location (870), said remote location (870) being geographically separated from the mill location (780) by a geographic distance; and wherein said one or more hardware processors being configured to perform at least some of the steps of the method according to any preceding example or according to any of examples 122 to 178, wherein at least a part of the method is performed at a remote location (870), said remote location (870) being geographically separated from the mill location (780) by a geographic distance; wherein the method further comprises the step:

transfer at least some of said signals between said mill location (780) and said remote location (870).

the system comprising one or more hardware processors configured to perform at least some of the steps of the method according to any preceding example or according to any of examples 122 to 178.

wherein:

said tumbling mill (10) is located at a mill location (780), and wherein at least a part of the method is performed at a location (870) remote from said mill location (780), and/or wherein at least a part of the method is performed at a remote location (870), said remote location (870) being geographically separated from the mill location (780) by a geographic distance; wherein the method further comprises the step:

transfer at least some of said signals between said mill location (780) and said remote location (870).

180. The method according to any preceding example, wherein said geographic distance exceeds one kilometer; and/or wherein said mill location (780) is in a first country constituting a first jurisdiction, and said remote location (870) is in a second country constituting a second jurisdiction such that at least a part of the method is performed in said first country and at least a part of said method is performed in said second country.

181. The method according to any preceding example, wherein at least a part of said signal transfer is performed by a communications network (810), such as e.g. the Internet.

The invention claimed is:

1. A method of operating a comminution process in a ball mill including a rotatable shell having an internal shell surface with a first number of protrusions configured to engage a charge of material for grinding received solid material feed particles by tumbling the material in the rotating shell so as to generate product particles at a mill output, thereby causing a vibration having a first repetition frequency dependent on a speed of shell rotation when a protrusion engages with a toe portion of said material;

the method comprising rotating the shell at a constant, or substantially constant, speed of shell rotation during operation of the ball mill;

providing a solid material feed rate set point value for setting a solid material feed rate; said solid material feed rate being an amount per time unit, of said feed particles, that is being fed into an input of a ball mill thereby influencing an internal state of said comminution process;

analysing at least a portion of said product particles;

generating at least one product measurement value based on said product particle analysis;

said at least one product measurement value being indicative of a product particle median size;

receiving a vibration signal indicative of said vibration;

receiving a position signal indicative of a rotational position of said rotating shell;

generating, based on said vibration signal and said position signal, at least one status parameter value indicative of said internal state; said at least one status parameter value including a toe position value indicative of a position of the toe portion;

receiving data indicative of a desired product particle median size and/or desired product particle size distribution;

generating a toe position reference value based on said data indicative of said desired product particle median size and/or desired product particle size distribution, and a correlation data set;

said correlation data set being indicative of a causal relationship between a certain toe position value and a corresponding certain product particle median size, at said speed of shell rotation;

and/or indicative of a causal relationship between a certain internal state and a certain product particle size distribution;

causing a user interface to convey information indicative of said toe position reference value and causing a user interface to convey information indicative of said toe position value, receiving, via a user interface, first user input relating to said solid material feed rate;

generating said solid material feed rate set point value thereby influencing said internal state for controlling or affecting said product particle median size;

wherein said generated solid material feed rate set point value is based on said received first user input.

2. The method according to claim 1, wherein said generated solid material feed rate set point value, being based on said received first user input, causes the material in the rotating shell to be tumbled at said influenced internal state for causing the product particles to be generated with a product particle median size corresponding to said influenced internal state of said comminution process.

3. The method according to claim 2, wherein the material in the rotating shell is tumbled at said influenced internal state of said comminution process for causing the product particles to be generated with a corresponding product particle median size.

4. The method according to claim 3, wherein the material in the rotating shell is tumbled at said influenced internal state so as to cause the product particles to be generated with a product particle median size corresponding to said influenced internal state (X) of said comminution process.

5. The method according to claim 4, wherein said generated solid material feed rate set point value, being based on said received first user input, causes the material in the rotating shell to be tumbled at said influenced internal state so as to cause the product particles to be generated with a product particle median size corresponding to said influenced internal state of said comminution process.

6. The method according to claim 5, wherein the method further comprises the step receiving, via a user interface, second user input relating to a desired product particle median size and/or relating to a desired product particle size distribution; and generating said data indicative of a desired product particle median size and/or desired product particle size distribution;

wherein said generated data indicative of desired product particle median size and/or desired product particle size distribution is based on said received second user input.

7. The method according to claim 6, wherein the method further comprises causing a user interface to urge an operator to increase said solid material feed rate set point value when said toe position reference value is higher than said toe position value and/or causing a user interface to urge an operator to decrease said solid material feed rate set point value when said toe position reference value is lower than said toe position value.

8. The method according to claim 7, further comprising providing a liquid feed rate set point value for setting a liquid material feed rate; said liquid material feed rate being an amount per time unit, of liquid, that is being fed into an input of a ball mill thereby influencing said internal state of said comminution process;

receiving, via a user interface, third user input relating to said liquid material feed rate;

generating said liquid feed rate set point value thereby influencing said internal state for controlling or affecting said product particle median size;

wherein said generated liquid feed rate set point value is based on said received third user input.

9. The method according to claim 8, wherein said position signal has a second repetition frequency dependent on said speed of rotation; and said vibration signal includes a time sequence of vibration sample values;

the method further comprising detecting, in said time sequence of vibration sample values, an event signature having an event signature occurrence frequency, said event signature occurrence frequency being equal to said first repetition frequency;

generating, based on said event signature occurrence frequency, a periodic event signal exhibiting said first number of periods per revolution of said shell during operation of the tumbling mill;

generating, based on said position signal, a periodic reference signal exhibiting said first number of periods per revolution of said shell during operation of said tumbling mill;

generating data indicative of a first temporal relation between said periodic event signal, and said periodic reference signal;

said temporal relation being indicative of said internal state of the tumbling mill.

10. The method according to claim 9, or according to any preceding claim, further comprising detecting, in a time sequence of position signal values, a first occurrence of a first reference position signal value indicative of a predetermined rotational position of said rotating shell;

providing a reference signal based on said position signal such that said reference signal is provided a certain number of times per revolution of said shell; and detecting, in said vibration signal, a signal event signature that occurs when a said internal protrusion engages with a toe portion of said material;

measuring a first duration from the provision of a first reference signal to the provision of a subsequent reference signal; and measuring a second duration between the provision of a reference signal to the occurrence of a subsequent said signal event signature, or measuring the second duration between the occurrence of said signal event signature to the provision of the subsequent reference signal; and generating a temporal relation value based on said second duration and said first duration; said temporal relation value being indicative of said internal state of the tumbling mill.

11. The method according to claim 10, wherein said toe position value is said first temporal relation as defined in claim 10, or wherein said toe position value is said temporal relation value as defined in claim 10.

12. The method according to claim 11, wherein said generating at least one status parameter value; indicative of said internal state further comprises generating, based on said vibration signal and said position signal, another status parameter value indicative of said speed of shell rotation.

13. The method according to claim 12, further comprising providing a ball feed rate set point value for setting a ball feed rate;

said ball feed rate being an amount of grinding balls per time unit that is being fed into an input of said ball mill for enhancing said comminution process, said grinding balls thereby influencing said internal state of said comminution process.

14. The method according to claim 13, further comprising receiving, via a user interface, fourth user input relating to said ball feed rate;

generating said ball feed rate set point value thereby influencing said internal state for controlling or affecting said product particle median size;

wherein said generated ball feed rate set point value is based on said received fourth user input.

15. The method according to claim 14, further comprising detecting, in said vibration signal, a signal event signature that occurs when a said internal protrusion engages with said toe portion of said material;

said event signature being indicative of an impact force generated when a protrusion on an internal shell surface of the rotating shell interacts with a toe portion of the charge material.

16. The method according to claim 15, further comprising generating yet another status parameter value based on said impact force;

said yet another status parameter value, when generated at a known speed of shell rotation and at a known toe position value, being indicative of a mass of said charge of material.

17. The method according to claim 16, further comprising generating yet another status parameter value based on said impact force;

said yet another status parameter value, when generated at a known speed of shell rotation and at a known toe position value; and at a known charge material volume being indicative of a mean value of mass density of said charge of material.

18. The method according to claim 17, further comprising generating said ball feed rate set point value based on said mean value of mass density of said charge of material, and based on a first density information indicative of a mean density of said feed particles and second density information indicative of a mean density of said grinding balls.

19. The method according to claim 18, further comprising generating said ball feed rate set point value based on a combination of said impact force and said toe position value, and said speed of shell rotation.

20. The method according to claim 19, wherein said feed particles have a feed particle size distribution;

said feed particle size distribution including a feed particle median size value, wherein said feed particle median size value being larger than said product particle median size value.

21. A system for performing a comminution process in a ball mill including a rotatable shell having an internal shell surface with a first number of protrusions configured to engage a charge of material for grinding received solid material feed particles by tumbling the material in the rotating shell so as to generate product particles at a mill output, the system comprising one or more hardware processors configured to:

receive a vibration signal from a vibration sensor indicative of said vibration;

receive a position signal from a position sensor indicative of a rotational position of said rotating shell;

generate, based on said vibration signal and said position signal, a toe position value indicative of a position of a toe portion;

receive data indicative of a desired product particle median size and/or desired product particle size distribution;

generate a toe position reference value based on said data indicative of said desired product particle median size and/or desired product particle size distribution, and a correlation data set; said correlation data set being indicative of a causal relationship between a certain toe position value and a corresponding certain product particle median size, at a speed of shell rotation; and/or indicative of a causal relationship between a certain internal state and a certain product particle size distribution;

display information indicative of said toe position reference value and information indicative of said toe position value; and receive, via a user interface, a user input relating to a feed rate of said solid material feed particles thereby influencing said position of the toe portion for controlling or affecting product particle median size and/or product particle size distribution of said generated product particles.

22. A non-transitory computer-readable storage medium having thereon a computer program comprising program instructions, the computer program being loadable into a processor and configured to cause the processor to perform the method according to claim 1.

* * * * *